US012094003B2

(12) United States Patent
Gooch et al.

(10) Patent No.: US 12,094,003 B2
(45) **Date of Patent: *Sep. 17, 2024**

(54) APPARATUS, METHOD AND SYSTEM FOR PROVIDING AN ELECTRONIC MARKETPLACE FOR TRADING CREDIT DEFAULT SWAPS AND OTHER FINANCIAL INSTRUMENTS, INCLUDING A TRADE MANAGEMENT SERVICE SYSTEM

(71) Applicant: GFI GROUP, INC., New York, NY (US)

(72) Inventors: Michael Gooch, Rumson, NJ (US); Michael Everaert, Sevenoaks (GB)

(73) Assignee: GFI GROUP, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,823

(22) Filed: Jul. 21, 2023

(65) Prior Publication Data

US 2023/0368294 A1 Nov. 16, 2023

Related U.S. Application Data

(63) Continuation of application No. 17/091,473, filed on Nov. 6, 2020, now Pat. No. 11,823,263, which is a continuation of application No. 11/011,883, filed on Dec. 13, 2004, now Pat. No. 10,832,321.

(60) Provisional application No. 60/529,151, filed on Dec. 12, 2003.

(51) Int. Cl.
*G06Q 40/04* (2012.01)

(52) U.S. Cl.
CPC .................................. *G06Q 40/04* (2013.01)

(58) Field of Classification Search
None
See application file for complete search history.

(56) References Cited

PUBLICATIONS

Garthwaite, Alex; Nettles, Scott, "Transactions for Java", (Jan. 1, 1998), Proceedings of the IEEE International Conference on Computer Languages: 16-27. IEEE Comp Soc.pp. 1-49).*

* cited by examiner

*Primary Examiner* — Gregory A Pollock

(57) ABSTRACT

A method and system for providing integrated credit derivative brokerage services, the method or system including or using a credit trading arrangement, a credit trade capture arrangement, a trade management service arrangement to process trade data for the credit trading arrangement and the credit trade capture arrangement, and a central repository arrangement to store market data and shared reference data.

9 Claims, 74 Drawing Sheets

Internal Users

207a

14:12:16 JXXNY buys 5MM USD DCX Sub M Cnvt 20 Jun 2008 @ 35% + 125 from CSFBNY 14:11:11 DXXXNY buys SWT 10MM USD FUDD CREDIT CORP Sen R 20 Jun 2008 / FXXX CREDIT CORP Sen R 20 Jun 2006 @ 155 from MXXNY

External Users

207b

14:12:16 You bought 5MM USD DCX Sub M Cnvt 20 Jun 2008 @ 35% + 125 from CSFBNY 14:11:11 Sold SWT 10MM USD FXXX CREDIT CORP Sen R 20 Jun 2008 / FXXX CREDIT CORP Sen R 20 Jun 2006 @ 155

207c

14:12:16 You sold 5MM USD DCX Sub M Cnvt 20 Jun 2008 @ 35% + 125 to JXXNY

14:11:11 Sold SWT 10MM USD FXXX CREDIT CORP Sen R 20 Jun 2008 / FXXX CREDIT CORP Sen R 20 Jun 2006 @ 155

207d

14:12:16 Bought 5MM USD DCX Sub M Cnvt 20 Jun 2008 @ 35% + 125

14:11:11 You bought SWT 10MM USD FXXX CREDIT CORP Sen R 20 Jun 2008 / FXXX CREDIT CORP Sen R 20 Jun 2006 @ 155 from MXXXNY

207e

14:12:16 Bought 5MM USD DCX Sub M Cnvt 20 Jun 2008 @ 35% + 125

14:11:11 You sold SWT 10MM USD FXXX CREDIT CORP Sen R 20 Jun 2008 / FXXX CREDIT CORP Sen R 20 Jun 2006 @ 155 to DONTNY

Figure 3A

Internal Users

14:18:12 BARC bids 5MM USD HOUSEXXX FINANCE Sen M 5Y@ 45% + 150

14:17:23 DXXXNY cancels offer 10MM USD DCX Sen M 5Y @ 125

14:17:18 DENTNY offers 10MM USD DCX Sub M 3Y @ 95

14:22:43 DENTNY offers 10MM USD SWT FXXX CREDIT CORP Sen R 20 Jun 2008 / FXXX CREDIT CORP Sen R 20 Jun 2006 @ 155

External Users

14:18:12 New bid 5MM USD HOUSEXXX FINANCE Sen M 5Y@ 45% + 150

14:17:23 Cancelled offer 10MM USD DCX Sen M 5Y @ 125

14:17:18 Updated offer 10MM USD DCX Sub M 3Y @ 95

14:22:43 New offer 10MM USD SWT FXXX CREDIT CORP Sen R 20 Jun 2008 / FXXX CREDIT CORP Sen R 20 Jun 2006 @ 155

```
… // get trade factory from JNDI
TMSManager tms = TMSFactory.getManager();
Trade trade = TradeFactory.newTrade();
trade.setVolume(100);
trade = tms.saveTrade(trade);
…// display data or do stuff
```

```
… //get trade factory from JNDI
TMSManager tms = TMSFactory.getManager();
… // create trade or query it
trade.setVolume(110);
trade = tms.saveTrade(trade);
…// display data or do stuff
```

```
… // get trade factory from jndi
TMSManager tms = TMSFactory.getManager();
QueryManager qm = tms.getQueryManager();
Collection pendingTrades = qm.getTrades(States.PENDING);
… // display data or do stuff
```

```
… // get trade factory from JNDI
TMSManager tms = TMSFactory. getManager();
…//get trade id from somewhere
State state = new State(States.VALIDATED, Status.VALID, "my reason");
TradeObject validatedTrade = tms.updateTrade(tradeID, state);
… // display data or do stuff
```

```
… // get trade factory from jndi
TMSManager tms = TMSFactory. getManager();
EventManager eventManager = tms.getEventManager();
// … do something with trades here
eventManager.publishDataChange(trade);
```

```
// get trade factory from jndi
TMSManager tms = TMSFactory. getManager();
EventManager eventManager = tms.getEventManager();
Listener myListener = new DatListener();
eventManager.registerListener(myListener);
… // display data or do stuff
```

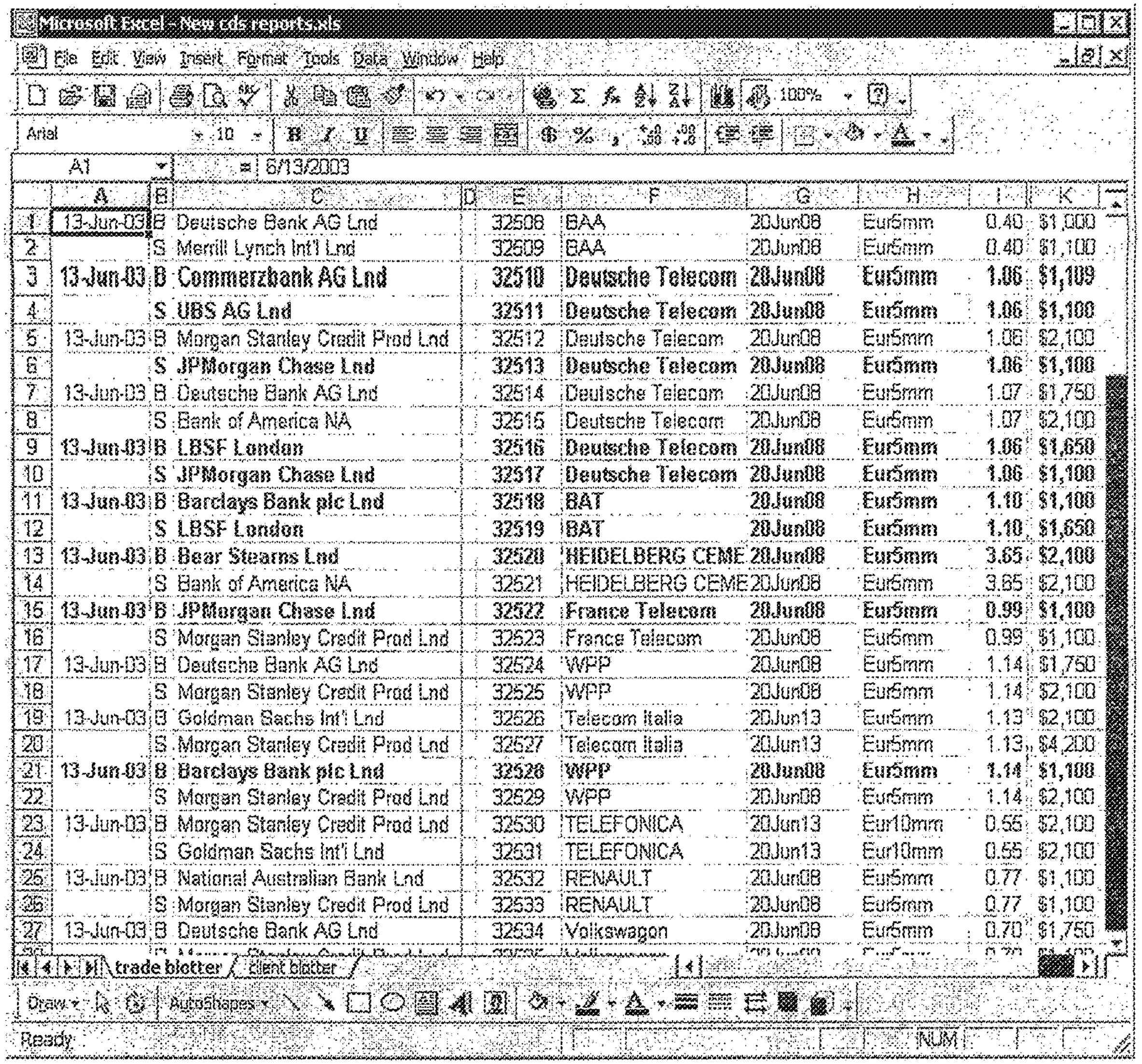

| | A | B | C | D | E | F | G | H | I | K |
|---|---|---|---|---|---|---|---|---|---|---|
| 1 | 13-Jun-03 | B | Deutsche Bank AG Lnd | | 32508 | BAA | 20Jun08 | Eur5mm | 0.40 | $1,000 |
| 2 | | S | Merrill Lynch Int'l Lnd | | 32509 | BAA | 20Jun08 | Eur5mm | 0.40 | $1,100 |
| 3 | **13-Jun-03** | **B** | **Commerzbank AG Lnd** | | **32510** | **Deutsche Telecom** | **20Jun08** | **Eur5mm** | **1.06** | **$1,109** |
| 4 | | **S** | **UBS AG Lnd** | | **32511** | **Deutsche Telecom** | **20Jun08** | **Eur5mm** | **1.06** | **$1,100** |
| 5 | 13-Jun-03 | B | Morgan Stanley Credit Prod Lnd | | 32512 | Deutsche Telecom | 20Jun08 | Eur5mm | 1.06 | $2,100 |
| 6 | | **S** | **JPMorgan Chase Lnd** | | **32513** | **Deutsche Telecom** | **20Jun08** | **Eur5mm** | **1.06** | **$1,100** |
| 7 | 13-Jun-03 | B | Deutsche Bank AG Lnd | | 32514 | Deutsche Telecom | 20Jun08 | Eur5mm | 1.07 | $1,750 |
| 8 | | S | Bank of America NA | | 32515 | Deutsche Telecom | 20Jun08 | Eur5mm | 1.07 | $2,100 |
| 9 | **13-Jun-03** | **B** | **LBSF London** | | **32516** | **Deutsche Telecom** | **20Jun08** | **Eur5mm** | **1.06** | **$1,650** |
| 10 | | **S** | **JPMorgan Chase Lnd** | | **32517** | **Deutsche Telecom** | **20Jun08** | **Eur5mm** | **1.06** | **$1,100** |
| 11 | **13-Jun-03** | **B** | **Barclays Bank plc Lnd** | | **32518** | **BAT** | **20Jun08** | **Eur5mm** | **1.10** | **$1,100** |
| 12 | | **S** | **LBSF London** | | **32519** | **BAT** | **20Jun08** | **Eur5mm** | **1.10** | **$1,650** |
| 13 | **13-Jun-03** | **B** | **Bear Stearns Lnd** | | **32520** | **HEIDELBERG CEME** | **20Jun08** | **Eur5mm** | **3.65** | **$2,100** |
| 14 | | S | Bank of America NA | | 32521 | HEIDELBERG CEME | 20Jun08 | Eur5mm | 3.65 | $2,100 |
| 15 | **13-Jun-03** | **B** | **JPMorgan Chase Lnd** | | **32522** | **France Telecom** | **20Jun08** | **Eur5mm** | **0.99** | **$1,100** |
| 16 | | S | Morgan Stanley Credit Prod Lnd | | 32523 | France Telecom | 20Jun08 | Eur5mm | 0.99 | $1,100 |
| 17 | 13-Jun-03 | B | Deutsche Bank AG Lnd | | 32524 | WPP | 20Jun08 | Eur5mm | 1.14 | $1,750 |
| 18 | | S | Morgan Stanley Credit Prod Lnd | | 32525 | WPP | 20Jun08 | Eur5mm | 1.14 | $2,100 |
| 19 | 13-Jun-03 | B | Goldman Sachs Int'l Lnd | | 32526 | Telecom Italia | 20Jun13 | Eur5mm | 1.13 | $2,100 |
| 20 | | S | Morgan Stanley Credit Prod Lnd | | 32527 | Telecom Italia | 20Jun13 | Eur5mm | 1.13 | $4,200 |
| 21 | **13-Jun-03** | **B** | **Barclays Bank plc Lnd** | | **32528** | **WPP** | **20Jun08** | **Eur5mm** | **1.14** | **$1,100** |
| 22 | | S | Morgan Stanley Credit Prod Lnd | | 32529 | WPP | 20Jun08 | Eur5mm | 1.14 | $2,100 |
| 23 | 13-Jun-03 | B | Morgan Stanley Credit Prod Lnd | | 32530 | TELEFONICA | 20Jun13 | Eur10mm | 0.55 | $2,100 |
| 24 | | S | Goldman Sachs Int'l Lnd | | 32531 | TELEFONICA | 20Jun13 | Eur10mm | 0.55 | $2,100 |
| 25 | 13-Jun-03 | B | National Australian Bank Lnd | | 32532 | RENAULT | 20Jun08 | Eur5mm | 0.77 | $1,100 |
| 26 | | S | Morgan Stanley Credit Prod Lnd | | 32533 | RENAULT | 20Jun08 | Eur5mm | 0.77 | $1,100 |
| 27 | 13-Jun-03 | B | Deutsche Bank AG Lnd | | 32534 | Volkswagon | 20Jun08 | Eur5mm | 0.70 | $1,750 |

WATER

| Entity | BidCust | BidSz | BidCond | Bid | Offer | OfCond | OfSz | OfCust |
|---|---|---|---|---|---|---|---|---|
| Anglian Water | MS | 5 | | 38.3 | 46.3o | 5.25% '03 only | 5 | JPM |
| SuezLyonnais | GSACH | 5 | 42 | 35.9o | 43.9 | | 5 | JPM |
| United Utilities | JPM | 5 | | 39.1 | 47.1 | | 5 | GSACH |
| Vivendi Environment | BEAR | 5 | | 43.1 | 51.1o | ref 56.5 | 5 | MS |
| Wessex waters | BEAR | 5 | | 55.0 | 65.0 | | 5 | MS |

5300

5400

5500

7100

7200

APPARATUS, METHOD AND SYSTEM FOR PROVIDING AN ELECTRONIC MARKETPLACE FOR TRADING CREDIT DEFAULT SWAPS AND OTHER FINANCIAL INSTRUMENTS, INCLUDING A TRADE MANAGEMENT SERVICE SYSTEM

RELATED APPLICATION INFORMATION

This application claims the benefit and priority of U.S. Provisional Patent Application Ser. No. 60/529,151 filed on Dec. 12, 2003, which is incorporated by reference herein in its entirety.

FIELD OF THE INVENTION

The present invention relates to a method and system for providing integrated credit derivative brokerage services, and to a Trade Management Service (TMS) Application Programming Interface (API).

BACKGROUND INFORMATION

Connectivity between broker and trader is believed to be an emerging area in credit derivatives trading. While not every credit derivative product in the market may be ready for fully interactive trading, it may be desirable to have a flexible platform available as the market matures.

In particular, it may be desirable to have a trading platform that can adapt to the developing market practices. Additionally, it may be desirable to continuously attract traders—not only through liquidity and the hybrid model—but also by integrating into the clients' trading environment and providing services through electronic connectivity.

Other systems may be limited in their ability to capture all market data. In particular, other systems may not capture every market movement (order) and may be limited in their ability to make enhancements or to delve further into client processing, such as, for example, sales orders or trading partners lists. Moreover, other systems may lack flexibility to add new trading products, including, for example, the ability to add certain attributes or criteria. In particular, options and spreads may not be available in such systems due to additional requirements and trading complexities they may impose. Other systems may also be limited in their ability to report and print information, including, for example, intra-day bids/offers, user-generated events, credit information, user-related information, and user permissions.

Additionally, other prior systems may not promote cross-product services, and order management for these systems may be non-flexible in that they do not support "one-cancels-other", an electronic trade confirmation, or a request for quote.

SUMMARY OF THE INVENTION

An exemplary method and system of the present invention is for providing electronic-based credit trading that integrates pre-trade, trading, and post-trade activities and enables brokers, for example, to enter and display quotes, manage their traders' order portfolios, investigate market depth, and execute transactions for any available entity or interest using, for example, feeds to/from analytic calculators, trader spreadsheets, electronic confirmations, and other accounting platforms.

In this regard, the exemplary method and/or system is providing good accessibility and deployment, high-availability, strong transaction security, and good response time, as well as permissions matrices, and administration. Moreover, the exemplary method and/or system may be utilized across all derivatives markets and may be adapted to future developments thereof.

An exemplary embodiment is directed to a system for providing integrated credit derivative brokerage services, the system having a credit trading arrangement, a credit trade capture. arrangement, and a trade management service arrangement to process trade data for the credit trading arrangement and the credit trade capture arrangement.

Another exemplary embodiment is directed to a system for providing integrated credit derivative brokerage services, the system further having a central repository arrangement to store market data and shared reference data, wherein the system is operable to create a new trade using the trade management service arrangement.

Yet another exemplary embodiment is directed to a system for providing integrated credit derivative brokerage services, wherein to create the trade, the system is operable to look up a factory class, invoke the factory class to instantiate a manager class, and invoke the manager class with trade data to perform the trade creation.

Still another exemplary embodiment is directed to a system for providing integrated credit derivative brokerage services, wherein the system is operable to query at least one of an individual trade and a collection of trades using the trade management arrangement.

Yet another exemplary embodiment is directed to a system for providing integrated credit derivative brokerage services, wherein to query at least one of the individual trade and the collection of trades, the system is operable to look up a factory class, invoke the factory class to instantiate a manager class, invoke the manager class to instantiate a query manager class, and invoke the query manager class to perform a trade query for pending data regarding at least one of the individual trade and the collection of trades.

Still another exemplary embodiment is directed to a system for providing integrated credit derivative brokerage services, wherein the system is operable to validate a trade using the trade management service arrangement.

Yet another exemplary embodiment is directed to a system for providing integrated credit derivative brokerage services, wherein to validate the trade, the system is operable to look up a factory class, invoke the factory class to instantiate a manager class, and invoke the manager class to validate the trade.

Still another exemplary embodiment is directed to a system for providing integrated credit derivative brokerage services, wherein the system is operable to publish a data change using the trade management service arrangement.

Yet another exemplary embodiment is directed to a system for providing integrated credit derivative brokerage services, wherein to publish the data change, the system is operable to look up a factory class, invoke the factory class to instantiate a manager class, and invoke the manager class to publish the data change.

Still another exemplary embodiment is directed to a system for providing integrated credit derivative brokerage services, wherein the system is operable to register a trade change using the trade management service arrangement.

Yet another exemplary embodiment is directed to a system for providing integrated credit derivative brokerage services, wherein to register the trade change, the system is operable to look up a factory class, invoke the factory class to instantiate a manager class, invoke the manager class to instantiate an event manager class, and invoke the event manager class to register the trade data.

Still another exemplary embodiment is directed to a system for providing integrated credit derivative brokerage services, wherein the credit trading arrangement at least one of manages orders and executes trades.

Yet another exemplary embodiment is directed to a system for providing integrated credit derivative brokerage services, wherein the credit trade capture arrangement at least one of maintains, confirms, and executes trades, and provides straight through processing to clients.

Still another exemplary embodiment is directed to a system for providing integrated credit derivative brokerage services, the system further including a price broadcast service arrangement to broadcast the orders.

Yet another exemplary embodiment is directed to a system for providing integrated credit derivative brokerage services, wherein the central repository arrangement provides universal views of the shared reference data.

Still another exemplary embodiment is directed to a system for providing integrated credit derivative brokerage services, the system further including a user interface to provide access to the shared reference data.

Yet another exemplary embodiment is directed to a system for providing integrated credit derivative brokerage services, the system including a credit portal arrangement to provide a customer-facing front end for real-time credit market data, wherein the credit portal includes a historical reporting and search facility, a market data processor to process market data, a credit mart arrangement to serve as a data source for the credit portal arrangement, and a credit editor arrangement to provide a data-cleansing interface to the credit mart arrangement, wherein the credit editor arrangement is accessible via the credit portal arrangement.

Still another exemplary embodiment is directed to a system for providing integrated credit derivative brokerage services, wherein the market data is at least one of collected, transformed, and formatted.

Yet another exemplary embodiment is directed to a system for providing integrated credit derivative brokerage services, wherein the trade management service arrangement delivers trade data from the credit trading arrangement and the credit trade capture arrangement to downstream consumers.

Yet another exemplary embodiment is directed to a system for providing integrated credit derivative brokerage services, wherein the trade management service arrangement includes an application programming interface.

Still another exemplary embodiment is directed to a system for providing integrated credit derivative brokerage services, wherein the application programming interface of the trade management service arrangement allows clients to listen to at least one of trade notifications and events in essentially real time.

Yet another exemplary embodiment is directed to a system for providing integrated credit derivative brokerage services, wherein the application programming interface of the trade management service arrangement allows clients to at least one of record new trades and change existing trades.

Still another exemplary embodiment is directed to a system for providing integrated credit derivative brokerage services, wherein the recording of new trades and changing of existing trades is orthogonal to normal market update processes so that a slow down in the market does not occur.

Yet another exemplary embodiment is directed to a system for providing integrated credit derivative brokerage services, wherein the application programming interface of the trade management service arrangement allows clients to query for recent trade event history.

Still another exemplary embodiment is directed to a system for providing integrated credit derivative brokerage services, wherein the credit trading arrangement includes a workspace to organize logically market and product data, a price sheet to group together related products within the workspace, a trade log to display trading details, an order book to view and manage at least one of open and cancelled orders, and a trader's eye function to view the market from the perspective of a specific trader.

Yet another exemplary method is directed to providing integrated credit derivative brokerage services, including at least one of managing orders and executing trades using a credit trading arrangement, at least one of maintaining, confirming, and reporting using a credit trade capture arrangement, and processing trade data for the credit trading arrangement and the credit trade capture arrangement using a trade management service arrangement.

Still another exemplary method is directed to providing integrated credit derivative brokerage services, including broadcasting orders using a price broadcast service arrangement.

Yet another exemplary method is directed to providing integrated credit derivative brokerage services, including storing at least one of market data and shared reference data using a central repository, wherein the central repository provides universal views of the shared reference data.

Still another exemplary method is directed to providing integrated credit derivative brokerage services, including providing access to the shared reference data via a user interface.

Yet another exemplary method is directed to providing integrated credit derivative brokerage services, including creating a new trade using the trade management service arrangement.

Still another exemplary method is directed to providing integrated credit derivative brokerage services, wherein the creating of a trade includes looking up a factory class, invoking the factory class to instantiate a manager class, and invoking the manager class with trade data to perform the trade creation.

Still another exemplary method is directed to providing integrated credit derivative brokerage services, including querying at least one of an individual trade and a collection of trades.

Yet another exemplary method is directed to providing integrated credit derivative brokerage services, wherein the querying of at least one of an individual trade and a collection of trades includes looking up a factory class, invoking the factory class to instantiate a manager class, invoking the manager class to instantiate a query manager class, and invoking the query manager class to perform a trade query for pending data regarding at least one of the individual trade and the collection of trades.

Still another exemplary method is directed to providing integrated credit derivative brokerage services, including validating a trade using the trade management service arrangement.

Yet another exemplary method is directed to providing integrated credit derivative brokerage services, wherein the validating of a trade includes looking up a factory class, invoking the factory class to instantiate a manager class, and invoking the manager class to validate the trade.

Still another exemplary method is directed to providing integrated credit derivative brokerage services, including publishing a data change using the trade management service arrangement.

Yet another exemplary method is directed to providing integrated credit derivative brokerage services, wherein the publishing of a data change includes looking up a factory class, invoking the factory class to instantiate a manager class, and invoking the manager class to publish the data change.

Still another exemplary method is directed to providing integrated credit derivative brokerage services, including registering a trade change using the trade management service arrangement.

Yet another exemplary method is directed to providing integrated credit derivative brokerage services, wherein the registering of the trade change includes looking up a factory class, invoking the factory class to instantiate a manager class, invoking the manager class to instantiate an event manager class, and invoking the event manager class to register the trade data.

Still another exemplary method is directed to providing integrated credit derivative brokerage services, including providing a customer-facing front end for real-time credit market data using a credit portal arrangement that includes a historical reporting and search facility, at least one of collecting, transforming, and formatting market data using a market data processor, providing data to the credit portal arrangement using a credit mart arrangement, and providing a data-cleansing interface to the credit mart arrangement using a credit editor arrangement that is accessible via the credit portal arrangement.

Yet another exemplary method is directed to providing integrated credit derivative brokerage services, including delivering trade data from the credit trading arrangement and the credit trade capture arrangement to downstream consumers using the trade management service arrangement.

BRIEF DESCRIPTION OF THE DRAWINGS

FIG. 3A shows exemplary trade messages for internal and external users.

FIG. 3B shows exemplary price messages for internal and external users.

FIG. 24 shows exemplary pseudo code to create a trade.

FIG. 25 shows exemplary pseudo code to update a trade.

FIG. 27 shows exemplary pseudo code to query a trade.

FIG. 31 shows exemplary pseudo code to validate a trade.

FIG. 33 shows exemplary pseudo code to publish a data change.

FIG. 35 shows exemplary pseudo code to register a listener.

FIG. 49 shows an exemplary trade blotter report.

DETAILED DESCRIPTION

Figure 1A:
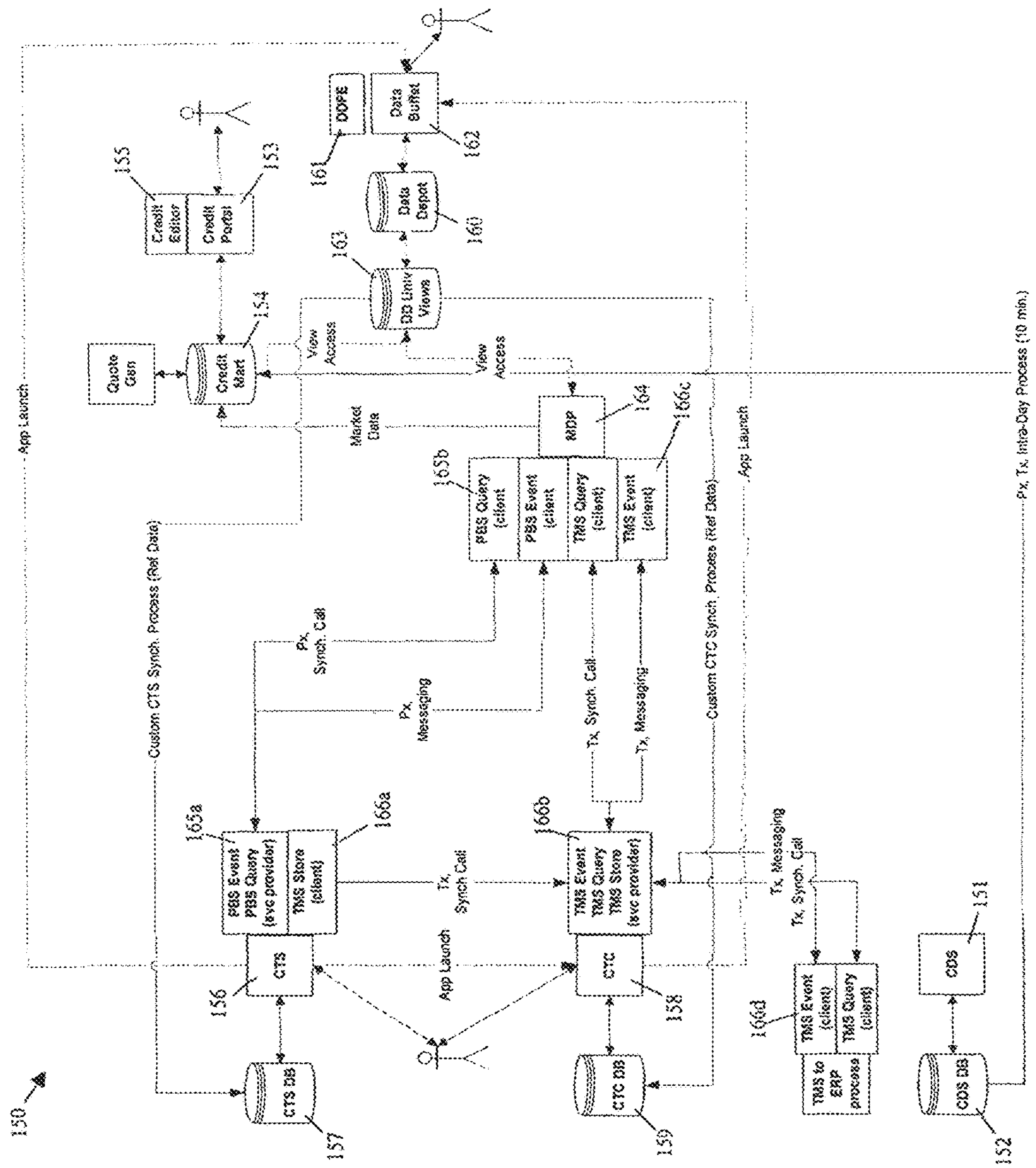
FIG. 1A shows an exemplary system for providing integrated credit derivative brokerage services.

An exemplary system may include a real-time trading application, referred to as the Credit Trading System (CTS), to support order management and execution of trades of default credit swaps (and other derivatives and financial instruments), a middle/back-office component, referred to as the Credit Trade Capture System (CTC), to maintain, confirm, and report trades and feed input to an accounting system and to provide Straight Through Processing (STP) to clients, and an application programming interface (API), referred to as the Trade Management Service (TMS), to process middle and back office trades and deliver trade data from the CTS and CTC to downstream consumers. Also, a central repository, referred to as the Data Depot (DD), may be provided to store shared reference data, a user interface (UI), referred to as the Data Buffet, may be provided to facilitate the maintenance of reference data within the DD, and a Price Broadcast Service (PBS), may be provided to deliver raw price data from the CTS to downstream consumers.

System Overview

In the system, workspaces may be provided so that users may logically organize the markets and products that they want to work with. For example, a user may want to create a workspace for a particular sector, across credit products or different structures. Workspaces may include one or more price sheets, which may be used to group related products together. For example, a price sheet may include of one or more interests with similar characteristics and defaults.

A trade log may be provided to display the key details of trades that were executed during the user's session. Messages within the trade log may include a timestamp and may appear in reverse chronological order. A price log of all pricing-related activity during the user's session may be provided to show notification messages related to events, such as, for example, a refresh of reference data or the addition, update or cancellation of interests. The trade and price logs may include filters to limit the display content.

An order book may be provided to view and manage open and cancelled orders. In particular, orders may be viewed, updated, and held based on a variety of selection parameters including, for example, the ability to change the status of orders, and to transfer orders from one trader to another. A trade book may be provided to view and manage executed trades.

A mapping to favorite client codes may be provided, for example, as function keys within a visual screen display, to facilitate data entry.

In regards to order management with the system, users may define new interests and simultaneously enter one or two-way prices for those interests. Users may also create, modify and cancel one and two-way orders for existing interests, create a basket of orders for multiple interests simultaneously, and cancel interests as well as any attached orders. All bids and offers may be submitted as limit price orders. Optional conditions may be attached to orders if the product line definition allows for it.

Users may also investigate prices by viewing the price details via the depth and tool tips. Users may also change the status of one or more orders and transfer orders from one trader to another trader within the same institution without losing priority. Certain users, such as, for example, brokers, may maintain lists of favorite customers and control the posting (broadcasting) of firm prices to customers and to market data feeds.

An interest entry screen may be provided to define new interests and simultaneously enter a bid and/or an offer for the interest. According to an exemplary embodiment, order maintenance may be limited to certain types of credit default swap structures, including, for example, a single name default swap (default), calendar spreads, and credit switches.

Also, a price entry screen may be provided to enter a new bid and/or offer on an existing interest. A basket entry screen may be provided to create separate orders for multiple interests simultaneously. An update function may be provided to modify a single order. A post/un-post toggle function may be provided so that certain users may broadcast an un-posted price, which may be viewed by other users, or withdraw a previously posted price from the external market. A hold function may be provided to hold a single order and a hold all function may be provided to hold multiple orders selected, for example, by product line, entity, interest, trader id, and/or side (bids vs. offers). A hold interest function may be provided to cancel an interest as well as any orders attached to it. A highlight toggle function may be provided so that brokers may turn interest/price highlights on or off. A clear/lock toggle function may be provided to lock the market on the selected interest for clearing to a counter bid or offer. Still further, a depth toggle function may be provided to open or close a floating window (popup), which displays the market depth for the currently selected interest. In addition, the user may also view the depth for an interest in-line within the price sheet using separate expand/collapse controls. Also, attributes and defaults may be derived from the definition of the product line and entity. Confirmation may be required when updating, deleting or changing the status of an order. In this regard, it is believed that anything that may affect order priority should require an additional click.

Double-click shortcuts may be provided in market and depth windows, as well as the order book, to enable quick action against a selected price. The type of user and price may determine the default behavior. If the user is a broker or another user who is authorized to trade, the system may assume an intent to trade against the selected price, and may present the broker with an appropriate execution screen, such as, for example, "Hit" if the selected price is a firm bid and "Lift" if the selected price is a firm offer. For customer-site users who are authorized to trade and who select one of his/her own prices, it may be assumed that he/she wishes to modify the order, so the price entry maintenance screen may be presented. If the user has selected a price from a trader within the same institution and the user is authorized to act on behalf of the selected trader, the system may assume that the user wishes to modify the order, and present the price entry screen. Otherwise, if the user is not authorized to act on behalf of the selected trader, the system may ignore the user's action. If the selected price is from outside of the user's institution, the system may assume that the user wants to trade against that price, and may therefore present an appropriate execution screen, such as, for example, a "Hit" if the selected price is a bid or a "Lift" if the selected price is an offer.

Still further, a quick history popup screen may be provided to show pricing statistics for the selected interest. A trader's eye feature may be provided so that brokers, managers and other authorized users may view the market from the perspective of a specific trader. A client list function may allow certain users to maintain a list of the clients that they prefer to work with. An end-of-day roll function may assist with orders left active at the end of the trading day, and may be used to clear out previously held orders.

In regards to execution and post-trade processing with the system, users may execute orders against existing prices and interests and optionally hold (cancel) the aggressor's standing orders on the opposite side. In the event of a partial execution, users may specify whether the balance of the order should remain open or be held (cancelled). User may also view an execution history, amend transaction details for previously entered executions, record off-screen executions, approve trades by completing the necessary details, and print/send confirmations for completed and approved trades.

With the system users may execute their orders by performing a hit or lift for a particular market price for the entire bid/offer size, or a smaller quantity. In particular, a "Hit" may be used to sell an interest at a selected price and a "Lift" may be used to buy an interest at the selected price. Authorized users may access trade maintenance functions, including, for example, the ability to input executions performed outside the trading platform and to amend and delete previously executed trades. Certain users may also record off-screen executions outside the trading platform (e.g., voice-brokered) as trades by certain brokers and clerks, etc. Execution confirmation may be required as a separate step only for executions in product lines whose definition calls for it, otherwise the user may be able to execute against the selected price with a minimum of two keystrokes. Execution disabled for ineligible prices—command buttons, menu options and keystroke equivalents may be disabled for prices that are non-tradable due to being part of the same institution, etc.

Execution notification messages may also be provided to affected users (brokers and traders on both sides) as well as other interested parties based on their entitlements. Trade confirmations may also be provided.

According to an exemplary embodiment, each user may have only one execution screen of any type open at any given moment in time. Company site or trader fields may not be displayed or require entry for traders. Only brokers may see or enter the site name. Non-traders (brokers and other client-site users) authorized to act on behalf of traders may see or enter the trade. The interest identification may be determined from the cell at which navigation originates for execution and the relevant interest description may be displayed in the title bar of all dialog boxes. For spreads and switches, the description of the first leg may be followed by the description of the second leg with a '/' as the separator. Attributes and defaults may be derived from the definition of the product line and Entity. Optional conditions acceptance may be required only when applicable, i.e., when the bid/offer being hit/lifted has at least one condition associated with it.

Reports may be provided that include, for example, information related to trade or broker details by customer or currency, a brokerage summary by date or transaction identifier or customer ID, and a trade or customer blotter by trade date. Access to reports may be controlled by user permissions. For example, reports may be limited to users of brokerage institutions and each report may have a parameter to limit the output to transactions for a particular brokerage site.

Orders may be validated according to certain rules when they are created. For example, according to an exemplary order validation rule, choice markets may be permitted so that a user may submit a bid equal to his/her own offer, or that of another user within his own institution, and vice versa. In this regard, a non-tradable price may be specified for all traders within that institution.

Orders may be processed or controlled according to certain rules. For example, according to an exemplary order processing rule, a user may not have more than one order generation screen open at the same time. As a further example, the user may not be allowed to create a standard limit order via the Bid/Offer screen and, at the same time, have the Specials or the Run screen open at the same time.

Trades may be executed according to certain rules. For example, a user may not have more than execution generation screen open at the same time. In particular, he may not be allowed to hit a bid via a Hit box while the Lift screen is open at the same time.

An important part of the system is the Trade Management Service (TMS) and an associated Application Programming Interface (API), which may support the role of service provider and compliance layer. In particular, TMS may include, for example, support for trade storage, trade querying, and trade event notification and publication.

The TMS API may provide a standard API as well as a compliance layer. Clients that are only interested in invoking TMS services may use the API as a "hook" into the TMS. External systems may integrate into the TMS and support the services via TMS connectors that support the same set of APIs.

The TMS API may define component classes that specify core classes and their function. The TMS API may support data management including, for example, creating, updating, deleting, and querying trades. The TMS API may also define trade states. The TMS API may also support event callbacks so that clients may publish changes to other consumers of the TMS and register for notifications of trade changes.

The TMS API may define core classes, which may be classified into service-related classes and trade data objects. Service related classes form the services part of the TMS API and trade data objects may be used to transport data from and to the TMS API.

The TMS API may support data management of trades. In this regard, data management may include the processes by which trades are created, updated and queried in the TMS system.

The TMS API may allow clients to publish trade changes to the TMS and register against the TMS to receive callbacks when trade data or trade state changes. In particular, clients may publish trade data and state changes, and register for callbacks, including, for example, trade data and state changes.

System Information

An asset class refers to the general market category for a group of financial products. It is the highest level of product classification. Asset classes may include, for example, equity, debt, currency (FX), money market, metals, energy, weather, and freight. Credit derivatives, for example, may be classified under debt.

A sub-asset class refers to the secondary grouping level in the product classification hierarchy. For example, the equity asset class may include the single stocks, indices, and sectors sub-asset classes, the debt asset class may include the fixed income, credit, and loans sub-asset classes, the currency (FX) asset class may include a currencies sub-asset class, the money market asset class may include an interest rates sub-asset class, the metal asset class may include gold, silver, and palladium sub-asset classes, the energy asset class may include electricity, natural gas, coal, and oil sub-asset classes, the weather asset class may include average temperature, heating degree days, cooling degree days, rainfall, snowfall, wind speed, sunshine/cloud cover, wave height & swell, and storm geography sub-asset classes, and the freight asset class may include wet and dry sub-asset classes.

The instrument type describes the type of tradable instrument represented by each product. The instrument type determines the characteristics (attributes) and processing applicable to the product. Each product may be defined, for example, as a stock, bond, note, link note, bill, commercial paper, future, option, forward, forward agreement, non-deliverable forward, swap, basis swap, default swap, asset swap, total rate of return swap, repurchase agreement, spot, collateralized debt obligation, collateralized loan or mortgage obligation, or certificate of deposit instrument.

A product line differentiates products within a sub-asset class by instrument type. The credit sub-asset class, for example, may include the product lines such as credit default swaps, asset swaps and total return swaps, which may then be considered credit derivatives.

A credit default swap (CDS) is a product line that requires the buyer of a "swap" to pay a fee to the seller of the swap in exchange for protection against an adverse "credit event" occurring to the reference entity. A CDS may be thought of as a form of default insurance. The value of a CDS is derived from the market's perception of an entity's creditworthiness.

In the context of financial instruments an entity or product name refers to the name of an issuer of securities within the selected product line. With respect to commodities, this may be the name of a specific product—the brand, variety, provider or location. For example, an entity for credit derivatives may be a corporation, government agency, local government or sovereign nation, whose credit is the underlying basis for the derivative. On the other hand, the electricity sub-asset class may refer to the name of the power grid through which the electricity is delivered.

An interest represents an instance of a tradable product with specific parameters such as the structure (where applicable), term or maturity/expiration date, coupon/interest rate, volatility, etc. For example, an interest for the product EUR/USD FX Options might be a 3-month (term) 25 delta (volatility) Risk Reversal (structure). An interest may include one or more primitives (a.k.a., legs), and may be quoted and traded as a single unit. An interest for credit default swaps may be a single CDS or multiple CDS, which may be linked together by a structure.

A structure is a defined relationship between the primitives or legs in an interest. Some of the structures employed in credit default swaps may include a single name default swap, a calendar name, a credit switch, and a package. The single name default swap is a primitive for the credit default swaps product line. The calendar spread involves simultaneous buying and selling of two interests on the same entity but having different terms and potentially different amounts. Credit switches involve simultaneous buying and selling of two interests on different entities, usually (but not always) with the same terms. A package involves simultaneous buying or selling of multiple interests on different entities, usually for the same terms and may be quoted and traded as a single deal.

A term, period, maturity, or expiration refers to the duration or life of a financial instrument, such as, for example, the term to maturity or the actual maturity date for a bond, the duration or expiration for an option, the term until delivery for a future or a forward, and so on. Most financial products other than stocks have a term or maturity/expiration date associated with them. In some instances, the term may be defined as a relative length of time—e.g., a 5 year CDS, or a 3-month FX Option. In other instances, the term may refer to a specific date or period—CAL 03 RWE Peakload for German Electricity, or a Treasury bond that matures on Jun. 30, 2010.

A calendar is a grouping of periods, terms or dates. Each product line that uses standard periods or terms may be associated with a calendar. When interests are defined within product lines that use calendars, the user may pick a date from a drop-down list of pre-defined terms or dates.

A market is a grouping of products from one or more product lines, which may be filtered or combined on the basis of one or more parameters such as a region, country, instrument category, etc. For example, the credit derivatives market may include product lines such as credit default swaps, asset swaps and total return swaps (the German electricity market, for example, may include all electricity forwards and options on power produced via all the grids located in Germany).

Supplementary data sets may be used to support key features of order management, including, for example, information related to countries of operation, geographic or economic regions, assignment of countries to regions, currencies, association of currencies with countries, industry sectors, credit ratings, and grade ratings. The information related to credit ratings may include an assigned character code, a description of the rating, a sort key, a sub-classification or grouping within the rating scheme, and an agency name of the source organization of the rating system. The information related to the grade ratings may include an assigned character code (e.g., IG to indicate investment grade, NI to indicate non-investment grade, and NR to indicate not rated) and a description.

References to internal users may be interpreted herein as brokerage institutions, i.e., companies with a brokerage role. External users may be deemed to be traders or others who are employees of non-brokerage institutions. Distinguishing between brokerage vs. non-brokerage users may make it easy to accommodate a new brokerage operation in the event that a different company becomes part of the brokerage institution group, and there is a need to separate certain users and information from that of another brokerage operation. Internal users may have access to all company sites whereas external users may have access only to sites for their company. For internal users, the defined client list may appear first in the site list in the defined order of appearance followed by the remaining site names sorted in alphabetical order. For external users, or for internal users without a defined client list, the site names may appear sorted alphabetically.

Internal users may have access to all traders whereas external users may have access only to traders with their company. Both internal and external users may have access to all brokers.

User entitlements may be defined and administered using permission sets that entitle certain users to perform specific functions for particular groups of products or product views, and to define the scope of these entitlements. A user may have, for example, multiple sets of permissions. External user administrators may be limited to working with users and groups associated with their own company. User entitlements may include, for example, the id of the company to which the user belongs, a name applicable to the user for the selected company, an assigned global role, and a set of permissions. The set of permissions may include, for example, a product view, an appropriate role, and scope of the role, such as, for example, defined levels for a user's product, company, group, and user view.

System Details

FIG. 1A shows an exemplary system 150 for providing integrated credit derivative brokerage services, which may be implemented using an appropriate computer or processing system (including, for example, the Internet or other suitable data network). The exemplary system 150 may include a Credit Default Swaps (CDS) entity 151 (or other trading entity) to perform trading, trade capture, confirmations, maintenance of reference data, and reporting. The CDS 151 may include an associated CDS database 152, referred to as the CDS DB.

The exemplary system 150 may include a Credit Portal 153 to provide a customer facing front end for real-time credit market data, which may serve as a historical reporting and search facility for brokers and traders.

The exemplary system 150 may include a Credit Mart 154 to provide a data mart structured specifically for data dissemination needs within the credit vertical. In this regard, the Credit Mart 154 may serve as a data source for the Credit Portal 153, or other market data feeds, such as, for example, Fenics Curves (Hull& White) and Reuters. In particular, the exemplary system may include the apparatus, method or system of U.S. patent application Ser. No. 10/366,500 filed on Feb. 14, 2003, entitled "AN APPARATUS, METHOD AND SYSTEM FOR DETERMINING CREDIT DERIVATIVE INDICES AND ESTIMATING CREDIT DERIVATIVE CREDIT CURVES, AND A CREDIT CALCULATOR FOR VALUING CREDIT DERIVATIVES BASED ON THE CREDIT CURVES", which is incorporated in its entirety by reference herein.

The exemplary system 150 may include a Credit Editor 155 to provide a data-cleansing interface to the Credit Mart 154 accessed via the Credit Portal 153.

The exemplary system 150 may include a Credit Trading System (CTS) 156 to provide order management. In this regard, the CTS 156 may serve as an authoritative source for real-time, electronic orders for Credit Default Swaps (CDS) 151. The CTS 156 may also serve as a Price Broadcast (PBS) compliant service provider. The CTS 156 may include an associated back-end database 157, referred to as the CTS DB.

The exemplary system 150 may include a Credit Trade Capture (CTC) system 158 to provide a middle-office trade capture and/or confirmation system, and provide Straight Through Processing (STP) to clients. In this regard, the CTC 158 may serve as an authoritative source of record for Credit Default Swaps (CDS) 151. The CTC 158 may also serve as a Trade Management Service (TMS) provider. The CTC 158 may include an associated back-end database 159, referred to as the CTC DB.

The exemplary system 150 may include a Data Depot (DD) 160 to provide a central store for all reference data and/or other market data. The exemplary system 150 may include a Data Depot Front End (DDFE) 161 to provide an administrative interface into the Data Depot 160, and a Data Buffet (DB) 162 to provide an administrative front end to the Data Depot 160 for manipulating reference data. The exemplary system 150 may include Data Depot (DD) Universal views 163 for Data Depot tables that may serve as the basis for a simple interface into Data Depot reference data for downstream systems, such as, for example, the Credit Trading System (CTS) 156 or the Credit Trade Capture (CTC) system 158.

The exemplary system 150 may include a Market Data Processor (MDP) 164 to provide a data collector, transformer, and/or formatter for market data. In this regard, the MDP 164 may serve as both a Trade Management Service (TMS) client and a Price Broadcast Service (PBS) client.

The exemplary system 150 may include a Price Broadcast Service (PBS) 165*a*, 165*b*, to provide one or more standard Application Programming Interfaces (APIs) for broadcasting orders. In particular, the PBS may include two sub-APIs, such as, for example, a PBS Event to allow clients to listen to price notifications and/or events in real time, or a PBS Query to allow clients to query service providers for a recent price history. The exemplary system 150 may include a PBS Provider, such as, for example, the Credit Trading System (CTS) 156, to implement a PBS API for broadcasting prices. The exemplary system 150 may include a PBS Client to provide a consumer of PBS data that may use the standard API's of PBS to interface with PBS compliant service providers.

The exemplary system 150 may include a Trade Management Service (TMS) 166*a-d* to provide one or more Application Programming Interfaces (APIs) for managing and interrogating trades, including, for example, during an entire trade lifecycle. The TMS may include sub-APIs, such as, for example, a TMS Event to allow clients to listen to trade notifications and/or events in real time, a TMS Store to allow clients to record new trades or enact changing on existing trades, and a TMS Query to allow clients to query service providers for recent trade event history.

The exemplary system 150 may include a TMS provider, such as, the Credit Trade Capture (CTC) system 158, which implements TMS API(s). The exemplary system 150 may include a TMS Client that uses the TMS APIs to communicate with a TMS provider. For example, the TMS Client may invoke a trade management function or inquire about trade lifecycle information in real-time or batch mode.

According to an exemplary embodiment, the Credit Trade System (CTS) 156 may create new trades in the Credit Trade Capture (CTC) system 158 via a Trade Management Service (TMS) Store API. Since the TMS Store process is orthogonal to normal market update processes in the CTS 156, a slow down in the market should not occur. If connectivity between the CTS 156 and the CTC 158 is interrupted, the CTS 156 may queue-up trades until connectivity is restored.

The Market Data Processor (MDP) 164 may use the TMS Query and TMS Event APIs to receive data. In particular, data may be received in real-time via the TMS Event, and if an intermittent disconnect occurs, data may be recovered and reconciled in a request-response exchange via the TMS Query. The MDP 164 may also use the Price Broadcast Service (PBs) Query and PBS Event APIs to receive data. In particular, data may be received in real-time via the PBS Event and, if an intermittent disconnect occurs, data may be recovered and reconciled in a request-response exchange via the PBS Query. The MDP 164 may also use stored procedures of the Credit Mart 154 to populate the Credit Mart 154 based on input from the TMS and PBS input handlers. The Credit Editor 155 may have direct access to the Credit Mart 154 to make in-place updates should there be a data quality issue.

The Credit Trade System (CTS) 156, Credit Trade Capture (CTC) system 158, and Market Data Processor (MDP) 164 may interact with the Data Depot (DD) 160 in real-time or in batch mode, for example, via a set of views 163 from the Data Depot (DD) 160 that are available to the downstream systems via a Data Buffet (DB) link. The downstream system may periodically query the Data Depot views 163 to check for updates. Based on the query, the downstream system may refresh local copies of the reference data as per the Data Depot 160. The Data Depot 160 may be updated in real-time via the Data Buffet 162. The Data Depot 160 may also provide reference data to the Credit Mart 154 via universal views.

The Credit Default Swap (CDS) 151 may include a custom feed that updates the Credit Mart 154 periodically, such as, for example, every five minutes. A refresh on demand may also be provided.

Figure 16A:
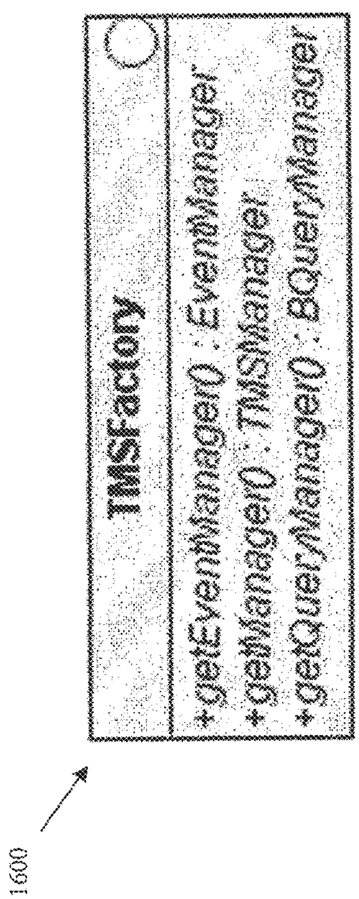
FIG. 16A shows an exemplary TMS Factory class.
Figure 16B:
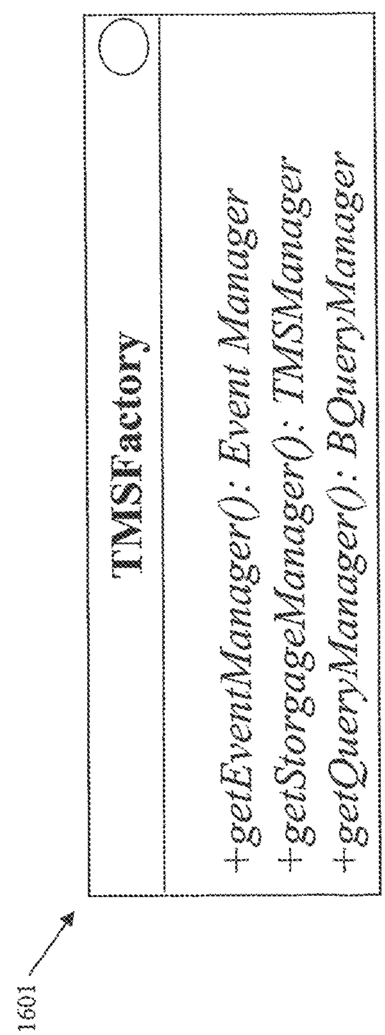
FIG. 16B shows another exemplary TMS Factory class.

As further regards the Trade Management Service (TMS), FIG. 16A shows an exemplary embodiment 1600 for a TMS factory class, referred to as the TMS Factory, that may be bound into, for example, a Java Naming and Directory Interface (JNDI) by the provider (such as, for example, a BOSS group) and may include information necessary to create trade specific management classes. Clients may lookup this class in a lookup service, such as, for example, JNDI, and use it to instantiate the TMS management classes. According to an exemplary embodiment, the exemplary TMS Factory class 1600 may instantiate the TMSManager, QueryManager and EventManager classes. FIG. 16B shows another exemplary embodiment 1601 of the TMS Factory class.

Figure 17A:
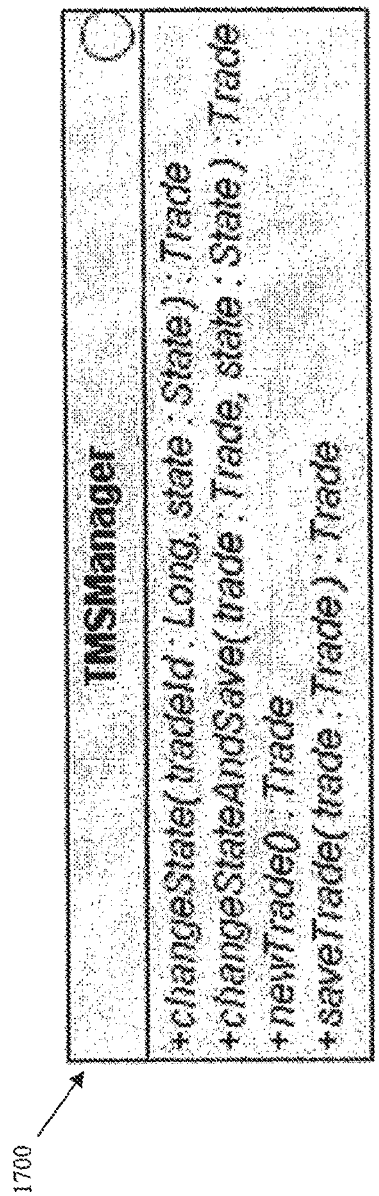
FIG. 17A shows an exemplary TMS Manager class.
Figure 17B:
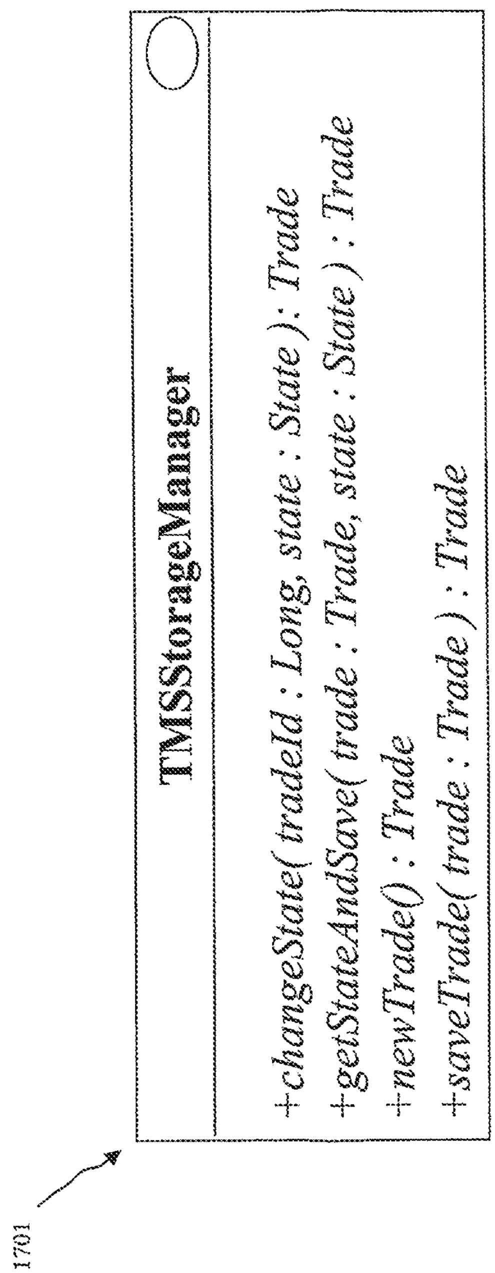
FIG. 17B shows an exemplary TMS Storage Manager class.

FIG. 17A shows exemplary embodiments 1700 for a TMS Manager class, referred to as the TMSManager, which allows clients to create, update, or modify trades. FIG. 17B shows another exemplary embodiment 1701 for the TMS Manager class, referred to in this instance as the TMS Storage Manager class.

Figure 18A:
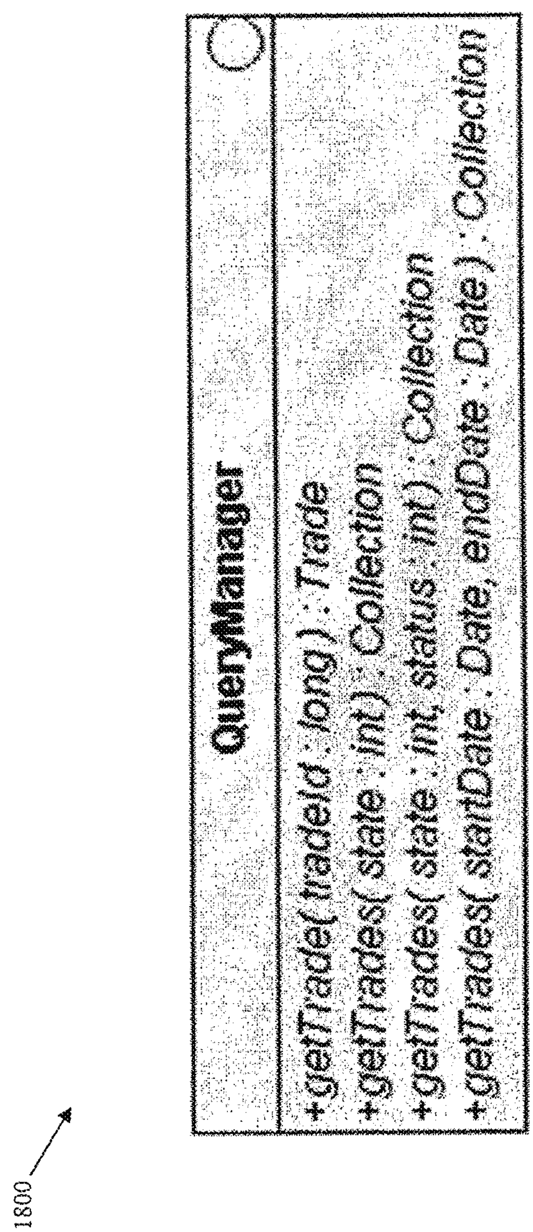
FIG. 18A shows an exemplary Query Manager class.
Figure 18B:
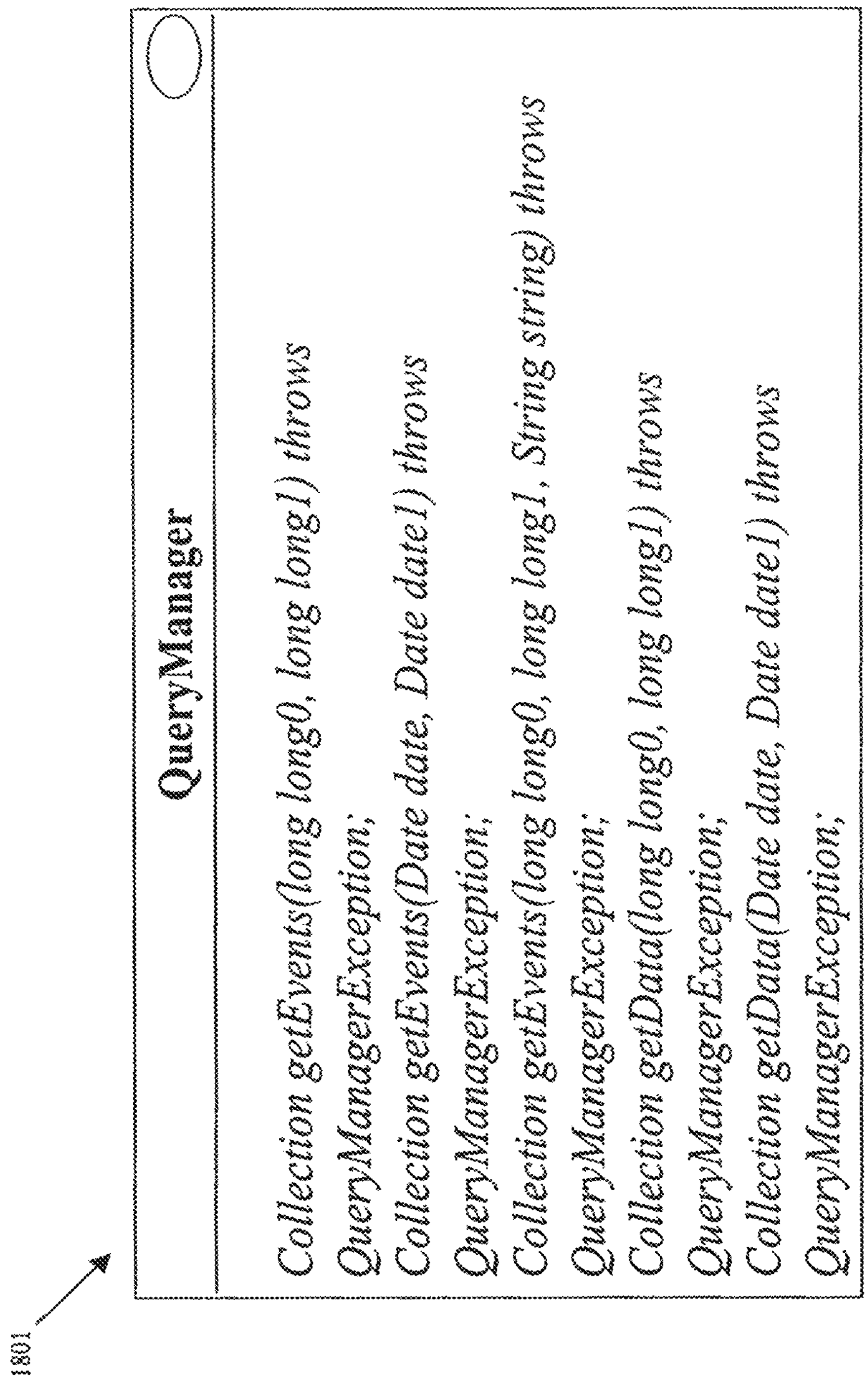
FIG. 18B shows an another exemplary Query Manager class.

FIGS. 18A and 18B show exemplary embodiments 1800, 1801, for a Query Manager class, referred to as the QueryManager, to handle an aspect of the data management features. It contains the queries that clients may perform against the TMS.

Figure 19A:
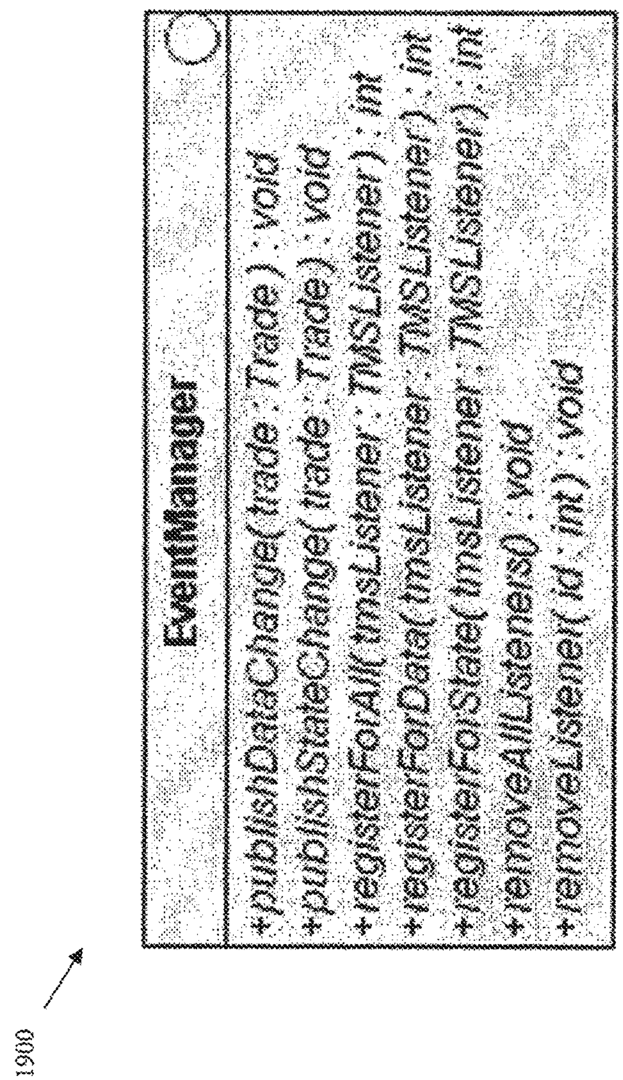
FIG. 19A shows an exemplary Event Manager class.
Figure 19B:
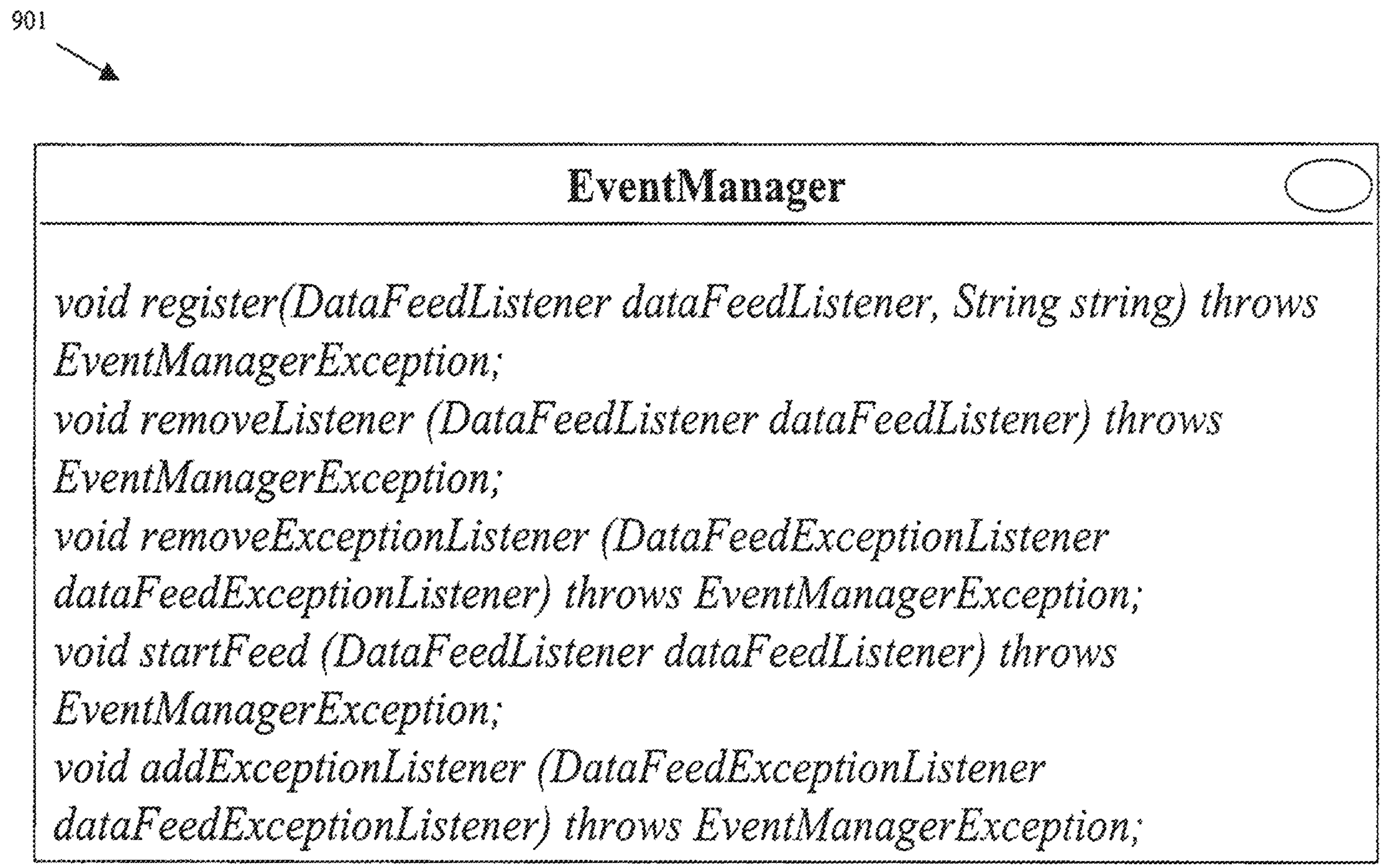
FIG. 19B shows another exemplary Event Manager class.

FIGS. 19A and 19B show exemplary embodiments 1900, 1901, for an Event Manager class, referred to as the EventManager, to handle callback registration and event publication. Classes that want to act as callback handlers may implement the interface.

Figure 20:
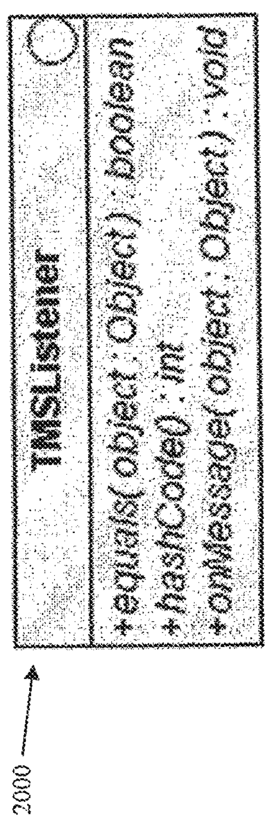
FIG. 20 shows an exemplary TMS Listener class.
Figure 21:
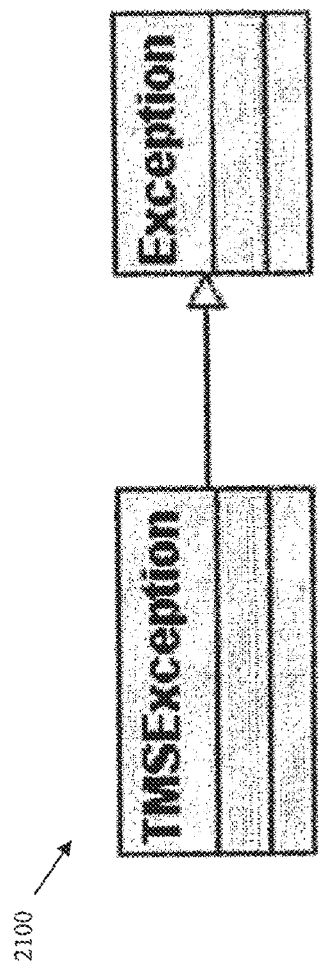
FIG. 21 shows an exemplary TMS Exception class.

FIG. 20 shows an exemplary TMS Listener class 2000, referred to as the TMSListener and FIG. 21 shows an exemplary TMS Exception class 2100, referred to as the TMSException, in which a single exception class extends a java.lang. Exception object. The exemplary TMS Exception class 2100 may be expanded to support a wider set of error conditions.

Figure 22:
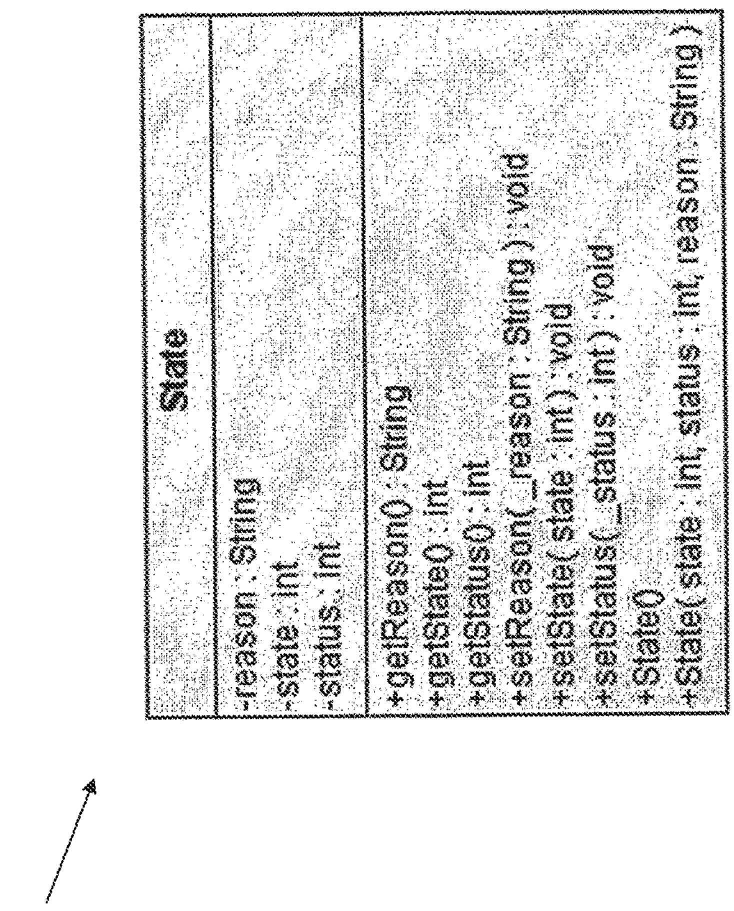
FIG. 22 shows an exemplary State class.

FIG. 22 shows an exemplary State class, referred to as the State, which encapsulates trade state information.

Figure 23:
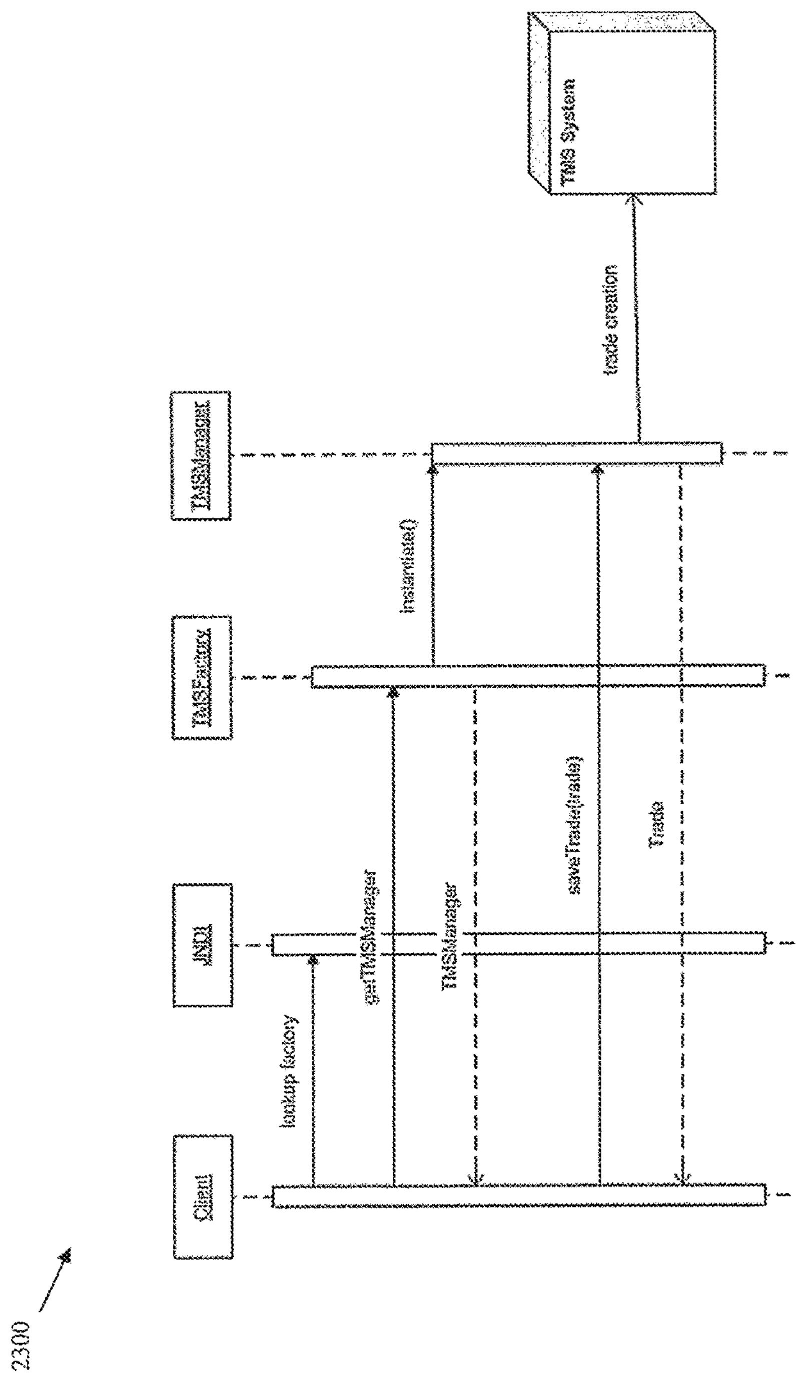
FIG. 23 shows an exemplary message sequence diagram to create a new trade.

FIG. 23 shows an exemplary message sequence diagram 2300 to create a new trade. The Client sends a lookup factory message to the JNDI to lookup the TMSFactory, and sends a getTMSManager message to the TMSFactory to get the TMSManager. The TMSFactory instantiates the TMSManager and returns the TMSManager to the Client. The Client sends a saveTrade message to the TMSManager passing it the trade data. The TMSManager sends a trade creation message to the TMS System. In this regard, the TMS System may appear as a black box to external clients. FIG. 24 shows exemplary pseudo code 2400 to create a trade.

FIG. 25 shows exemplary pseudo code 2500 to update a trade. Updating a trade may follow a message sequence similar to the exemplary message sequence diagram 2300 as trade creation. Therefore, Clients may similarly invoke the TMS API and the TMS may determine whether an update or create is applicable.

According to an exemplary embodiment, there is no trade deletion function. The TMS may support the cancellation of trades as a state change but may not delete trades from the system. Clients may simulate a logical delete by treating cancelled states as deleted.

Figure 26:
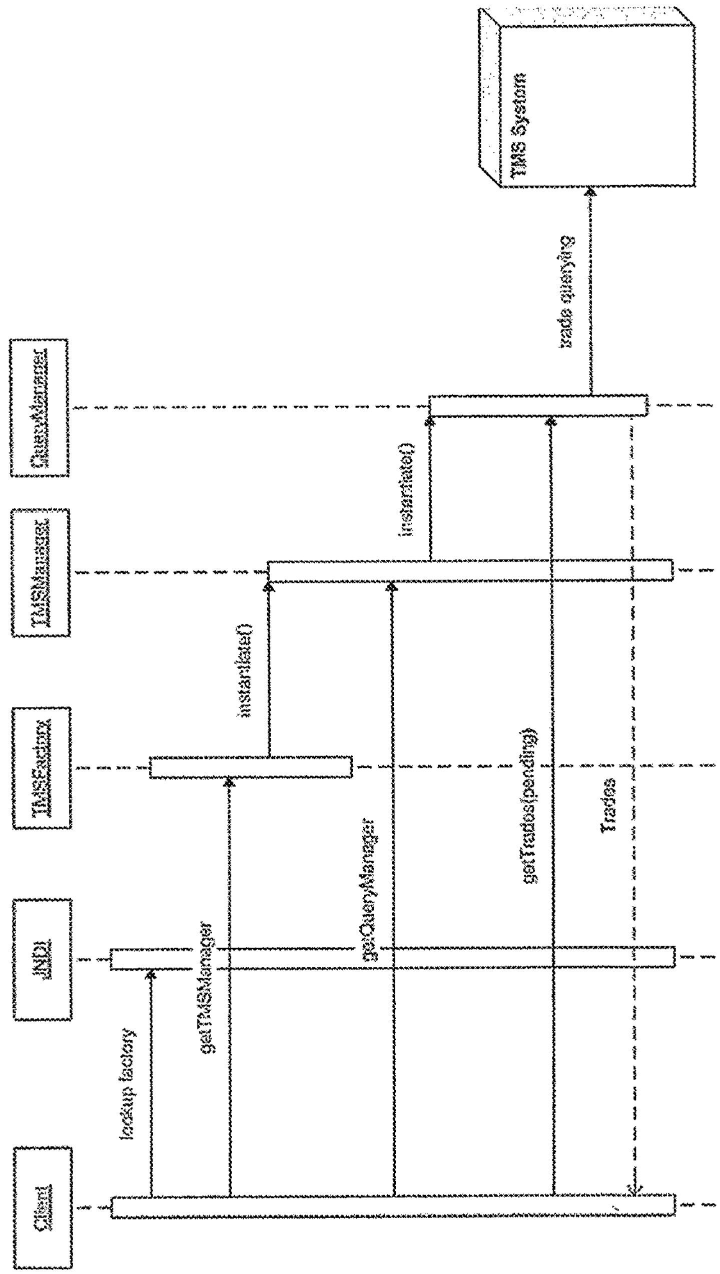
FIG. 26 shows an exemplary message sequence diagram to query for individual trades or a collection of trades.

FIG. 26 shows an exemplary message sequence diagram 2600 to query for individual trades or a collection of trades. In particular, FIG. 26 shows a client querying for pending trades but the exemplary method may be applied to any of the query functions of the QueryManager interface. The Client sends a lookup factory message to the JNDI to lookup the TMSFactory, and sends a getTMSManager message to the TMSFactory, which instantiates the TMSManager. The Client sends a getQueryManager message to the TMSManager, which instantiates the QueryManager. The Client sends a getTrades(pending) message or other desired query to the QueryManager, which invokes the TMS System. The TMS System processes the request, executes the query, and returns results to the client. FIG. 27 shows exemplary pseudo code 2700 to query a trade.

Figure 28:
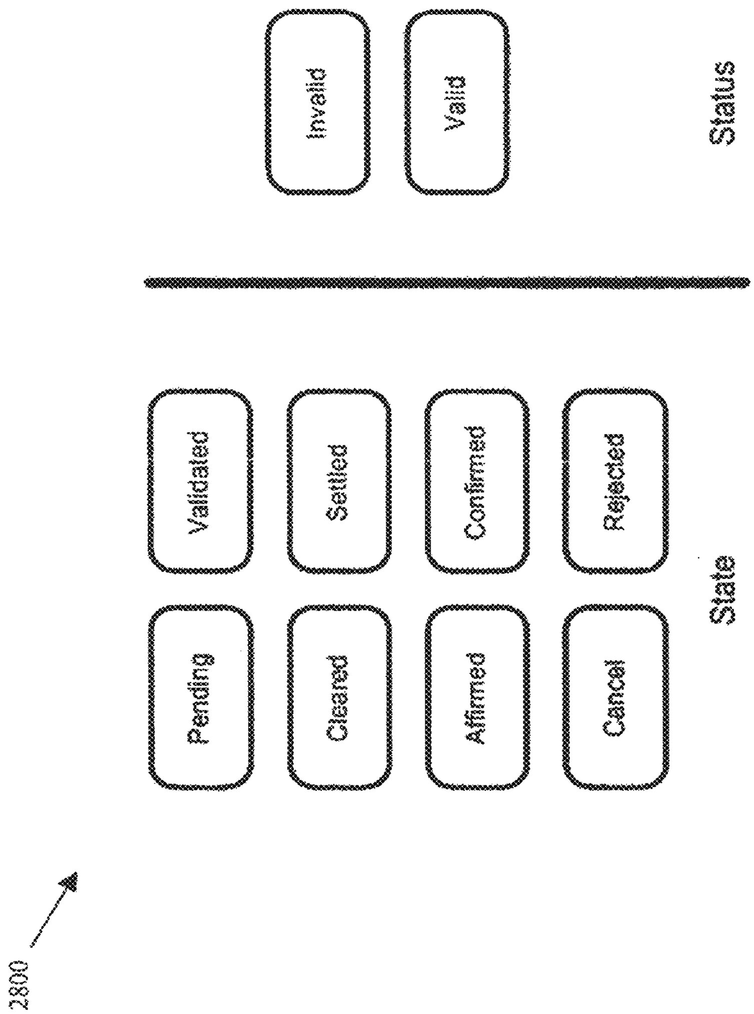
FIG. 28 shows exemplary trade states and statuses for TMS trades.

FIG. 28 shows exemplary trade states and statuses for TMS trades. In particular, a trade's state may be Pending, Validated, Cleared, Settled, Affirmed, Confirmed, Cancel, or Rejected.

A trade's status may be valid or invalid. Having both a trade state and trade status may provide greater flexibility to represent the business process around trades.

States represent the workflow that trade may go through. There may be no inherent rules governing the order of the states so that trades may move from any state to another depending on the trading platform.

Figure 29:
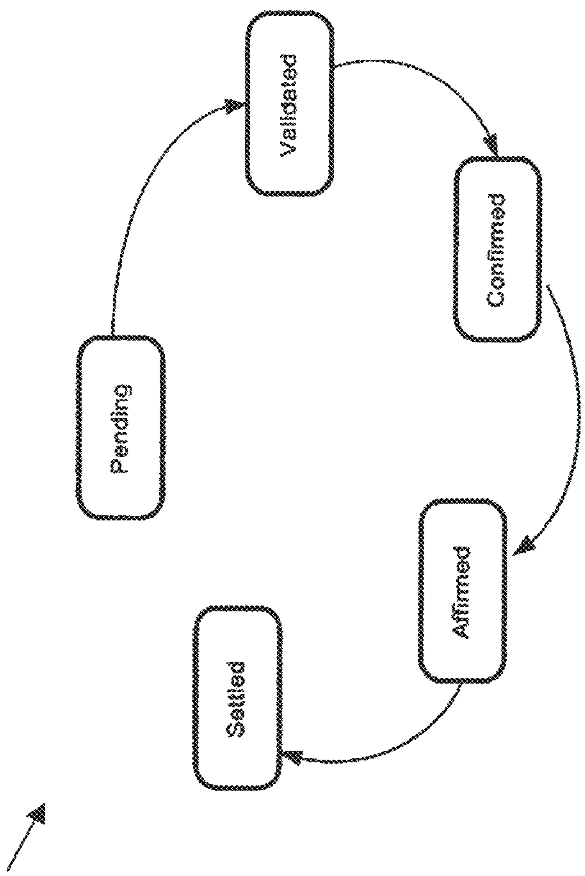
FIG. 29 shows an exemplary state transition or workflow, in which a trade's state may progress from Pending to Validated to Confirmed to Affirmed to Settled.

FIG. 29 shows an exemplary state transition or workflow 2900, in which a trade's state may progress from Pending to Validated to Confirmed to Affirmed to Settled.

According to an exemplary scenario, Client A creates ten new trades in the system through the TMS API. The trades are set to states of pending and statuses of valid by the TMS. A trade-check application lists all the pending trades to be validated. Broker B examines the trades to be validated and only validates half of them. The remainder of the trades may be incomplete or lack certain data. Consequently, trades 1 to 5 may have a validated state and a valid status, whereas, trades 6 to 10 may have a pending state and an invalid status.

Because the TMS system may support statuses along with trades, the trade-check application may now identify which trades have been examined and rejected by the broker. Hence, the trade check application may automatically notify other systems about these rejected trades without the broker having to manual do it.

The TMSManager class may provide functions for clients to execute business processes against the trades. Clients may not directly modify states or statuses but instead may send requests to approve or cancel trades to the TMS. The TMS may then decide based upon internal rules whether or not to perform the action requested by the client.

Figure 30A:
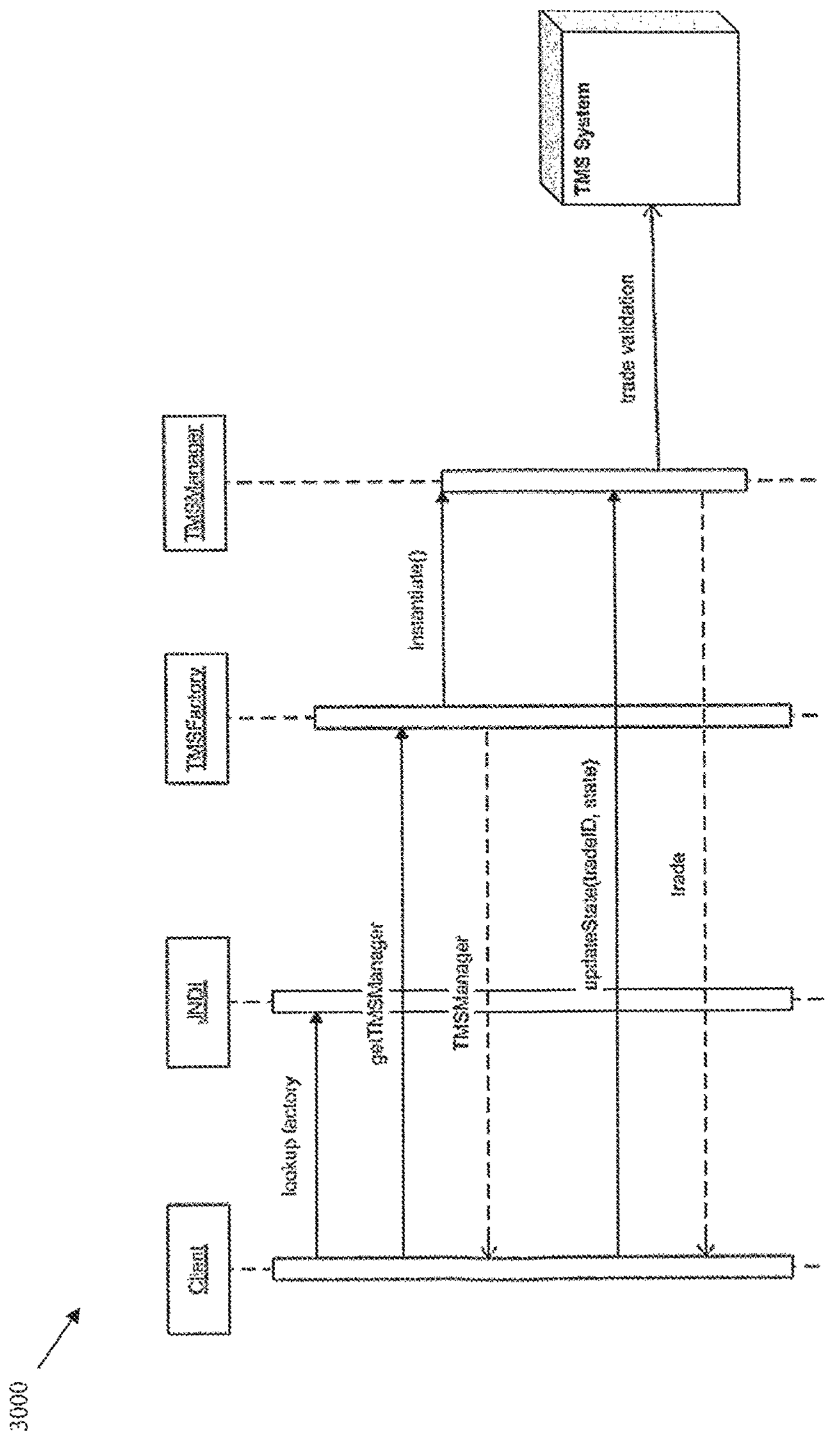
FIG. 30A shows an exemplary message sequence diagram to validate a trade.
Figure 30B:
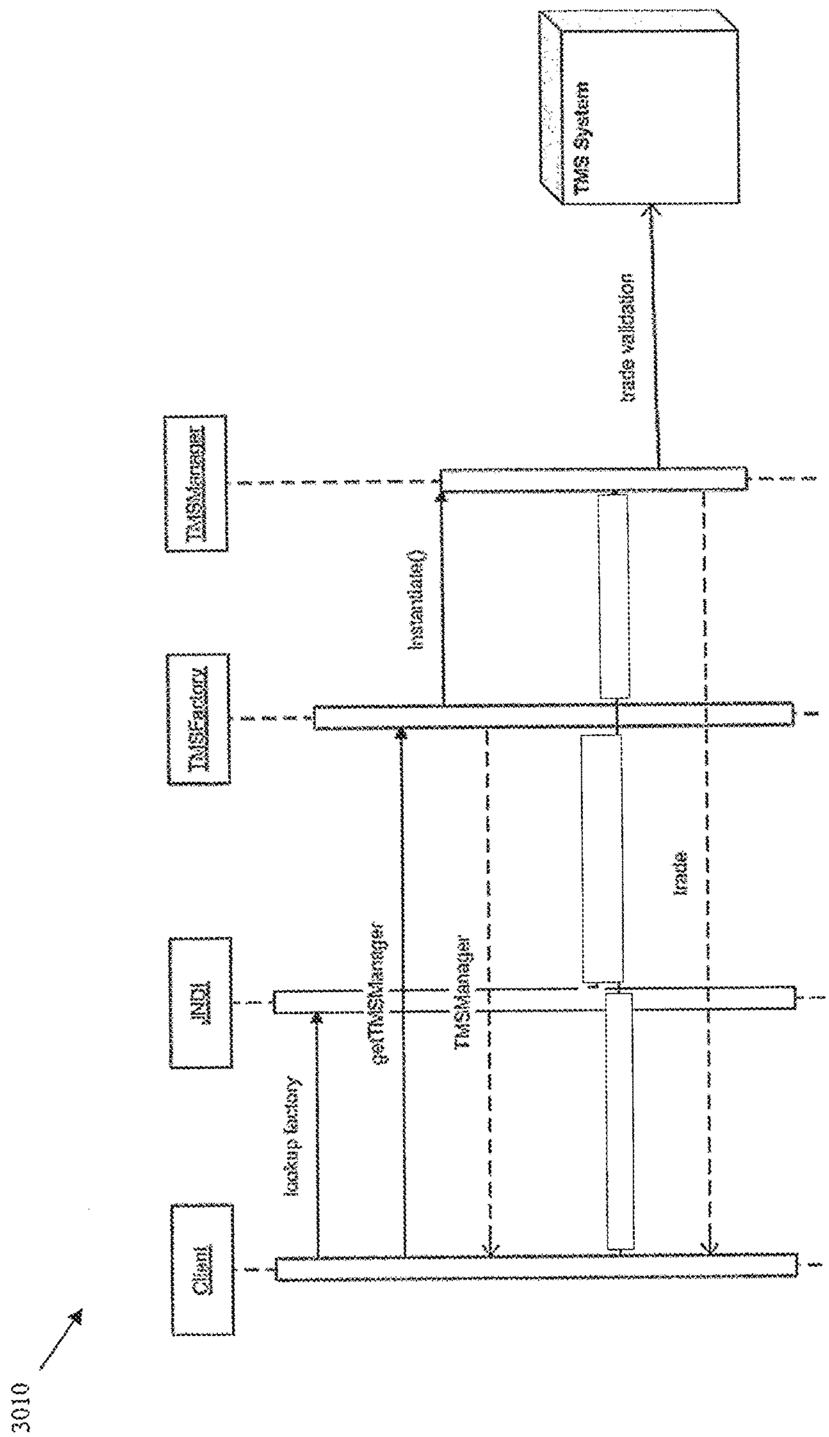
FIG. 30B shows another exemplary message sequence diagram to validate a trade.

A trade's state or statuses may be inspected by the client via the returning data object. Action processes, such as, for example, validation, affirmation, and cancellation, may be identical. FIG. 30A shows an exemplary message sequence diagram 3000 to validate a trade. The Client sends a lookup factory message to the JNDI, and sends a getTMSManager message to the TMSFactory, which instantiates the TMS-Manager. The Client sends an updateState message to the TMSManager supplying a trade id and state. The TMS manager sends a trade validation message to the TMS System, which returns a trade object including state and status data. FIG. 30B shows another exemplary message sequence diagram 3001 to validate a trade, with reduced messaging. FIG. 31 shows exemplary pseudo code 3100 to validate a trade.

Figure 32:
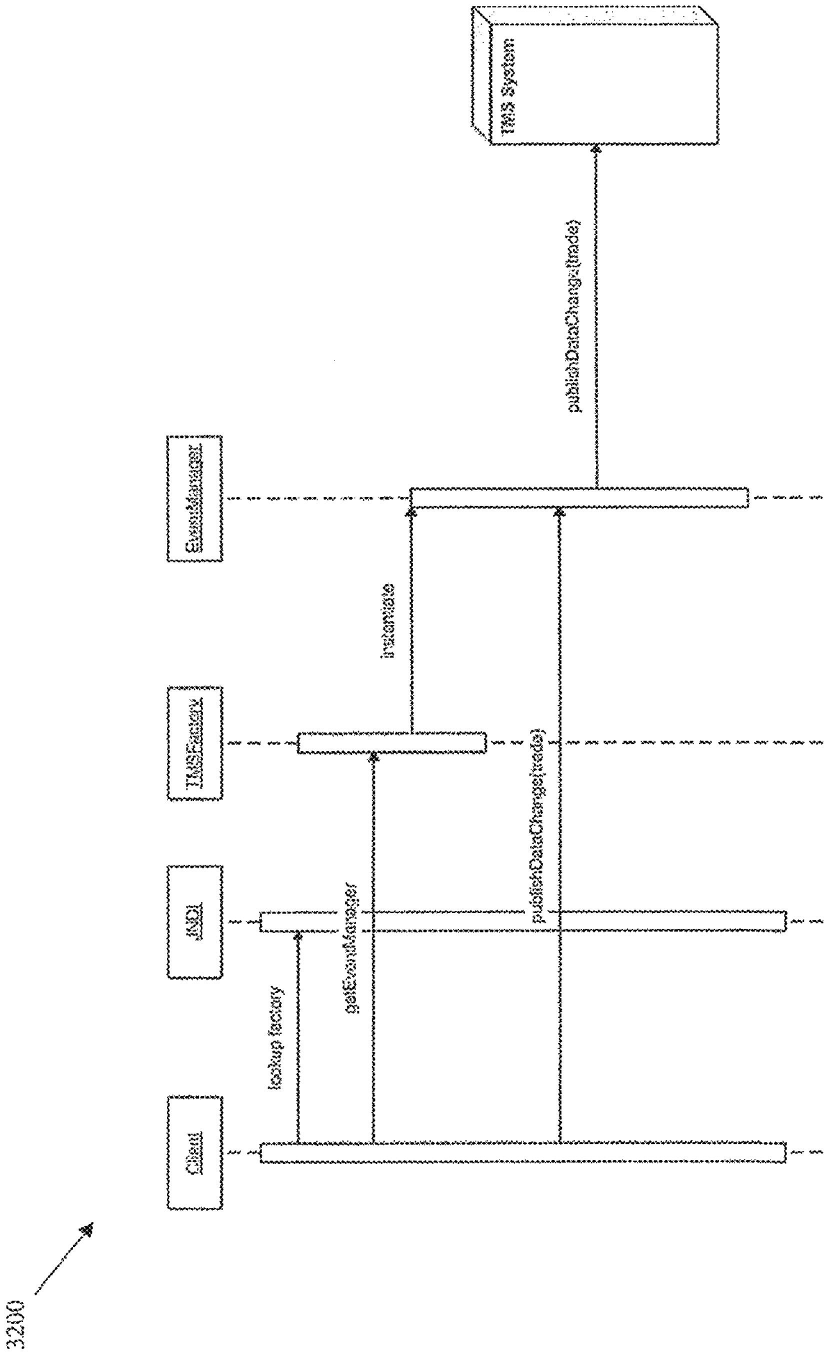
FIG. 32 shows an exemplary message sequence diagram to publish a data change.

FIG. 32 shows an exemplary message sequence diagram 3200 to publish a data change. The Client sends a lookup factory message to the JNDI, and a getEventManager message to the TMSFactory, which instantiates the EventManager. The Client sends a publishDataChange message to the EventManager, which forwards it to the TMS System, which handles the messaging details to other consumers. FIG. 33 shows exemplary pseudo code 3300 to publish a data change.

Figure 34:
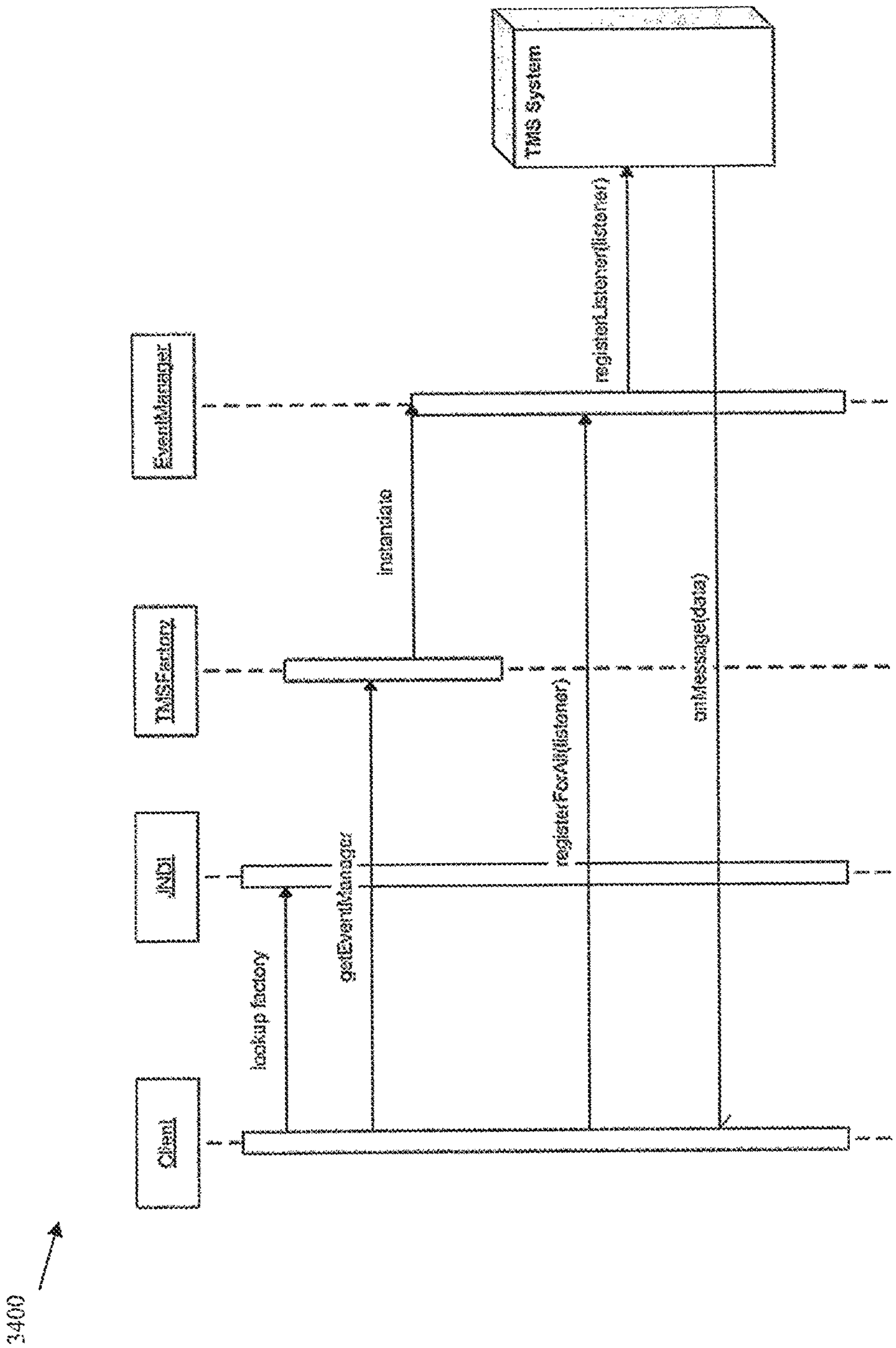
FIG. 34 shows an exemplary message sequence diagram to register a trade change.
Figure 36:
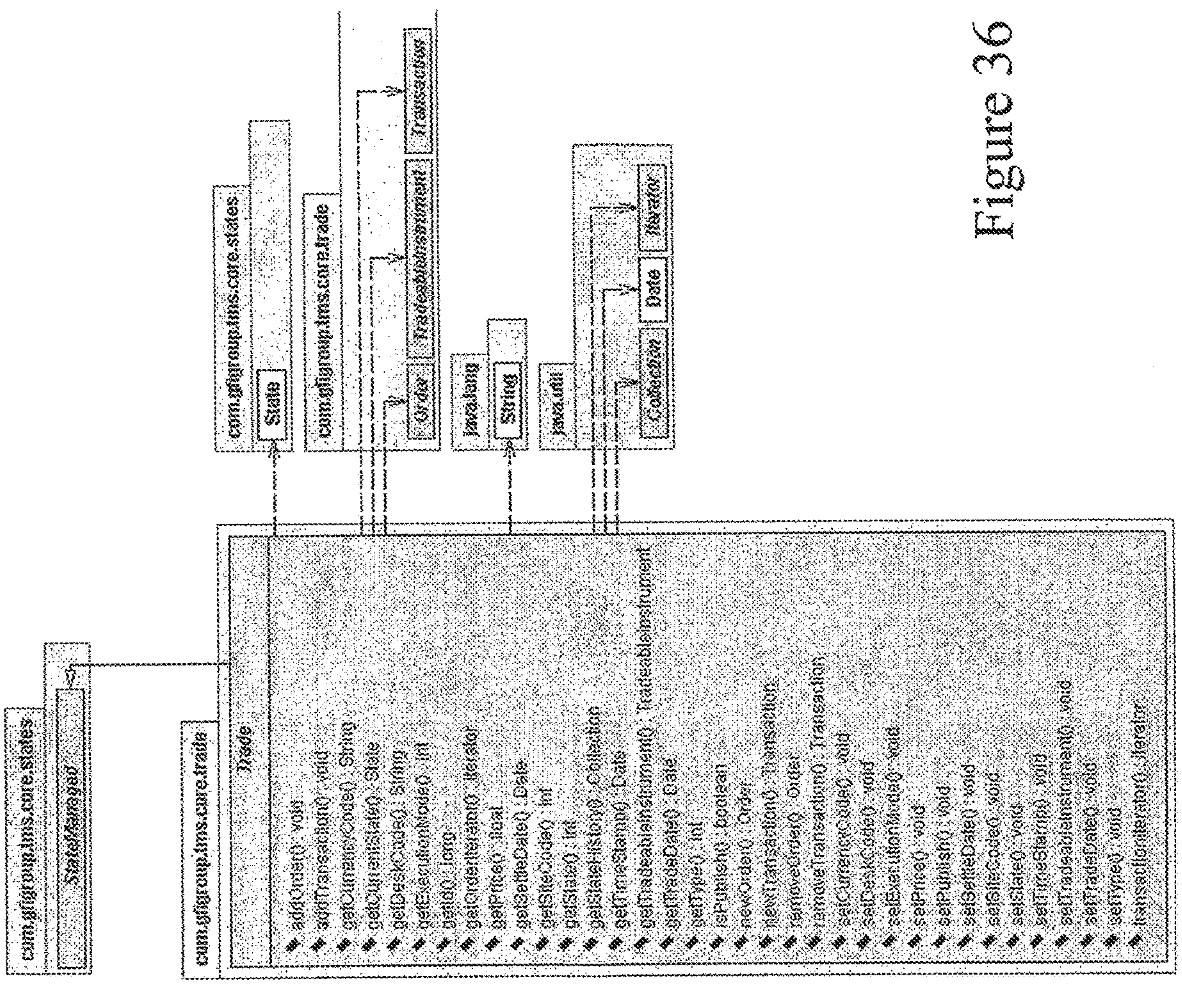
FIGS. 36 to 48 show exemplary TMS data objects.
Figure 37:
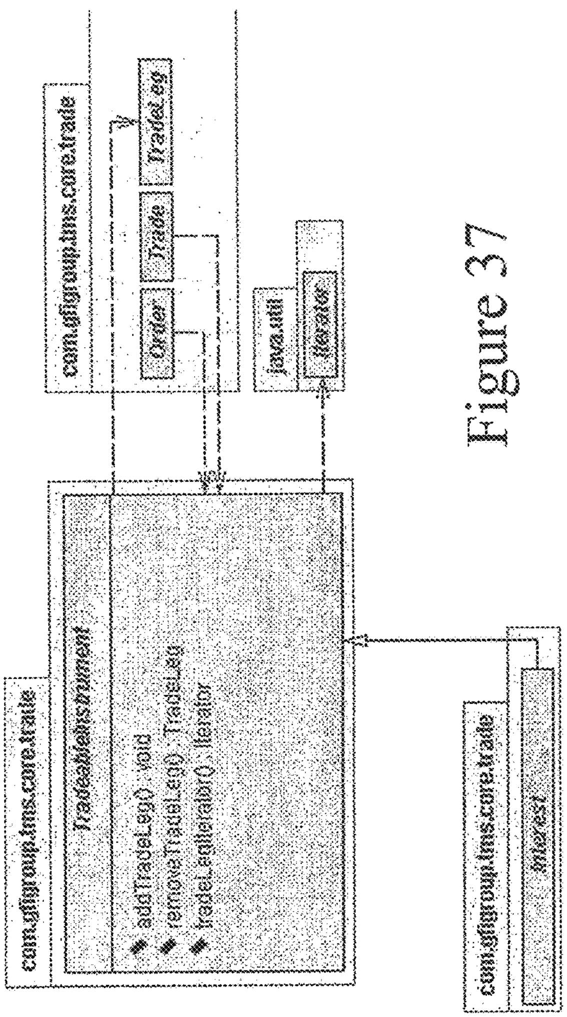
Figure 38:
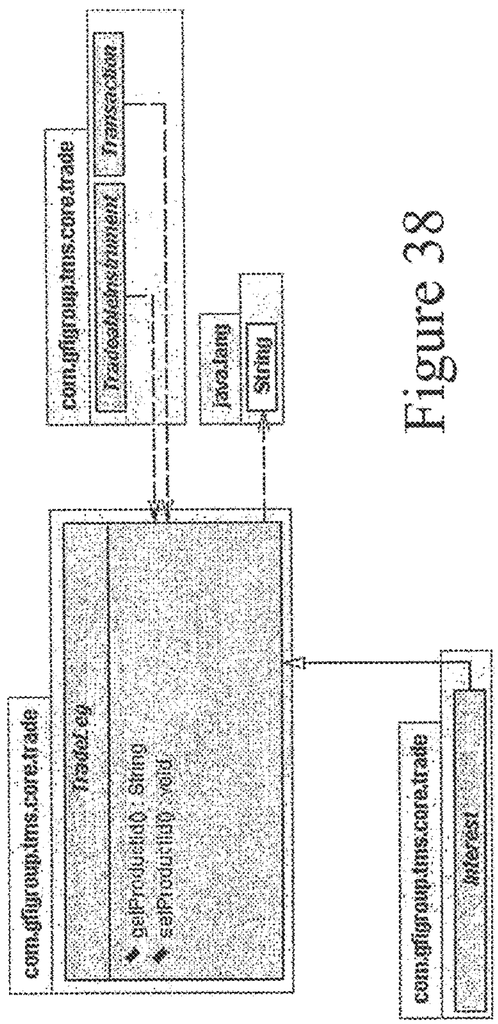
Figure 39:
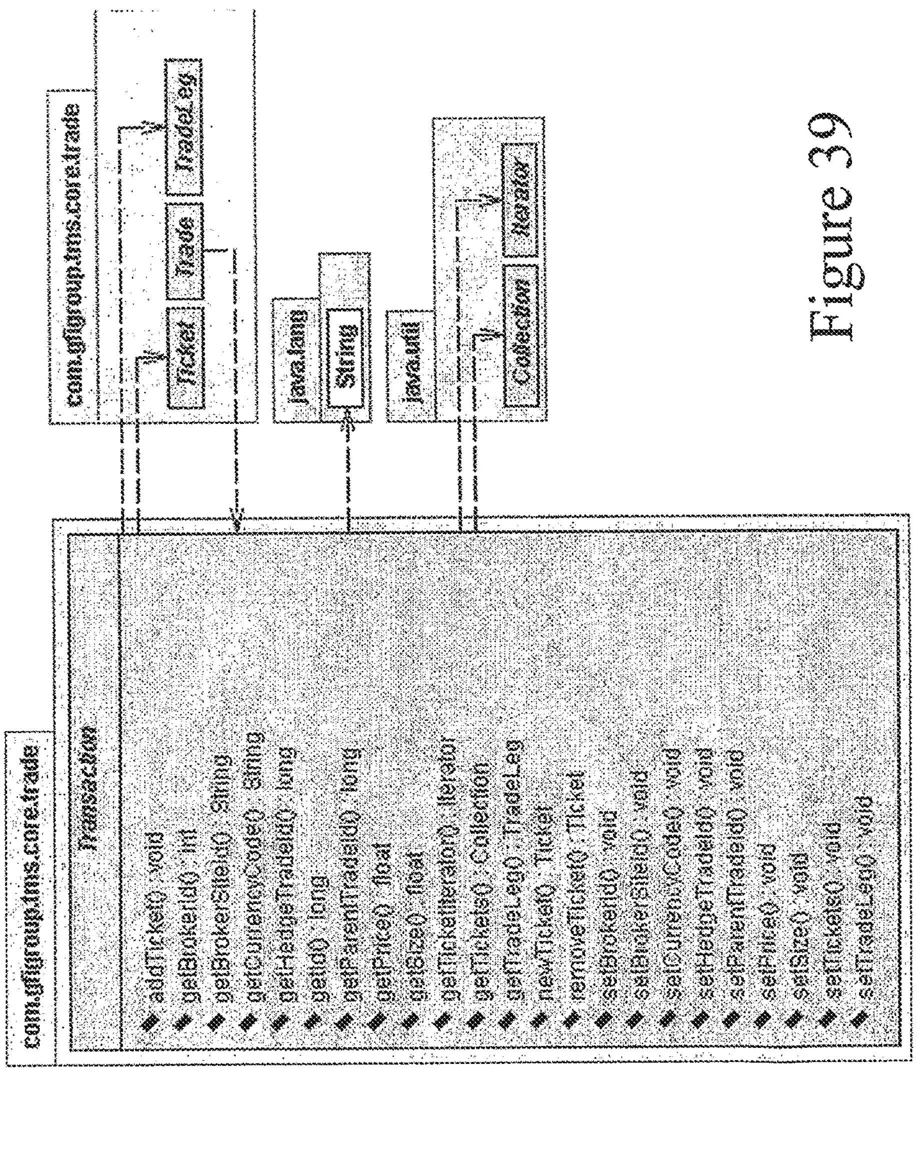
Figure 40:
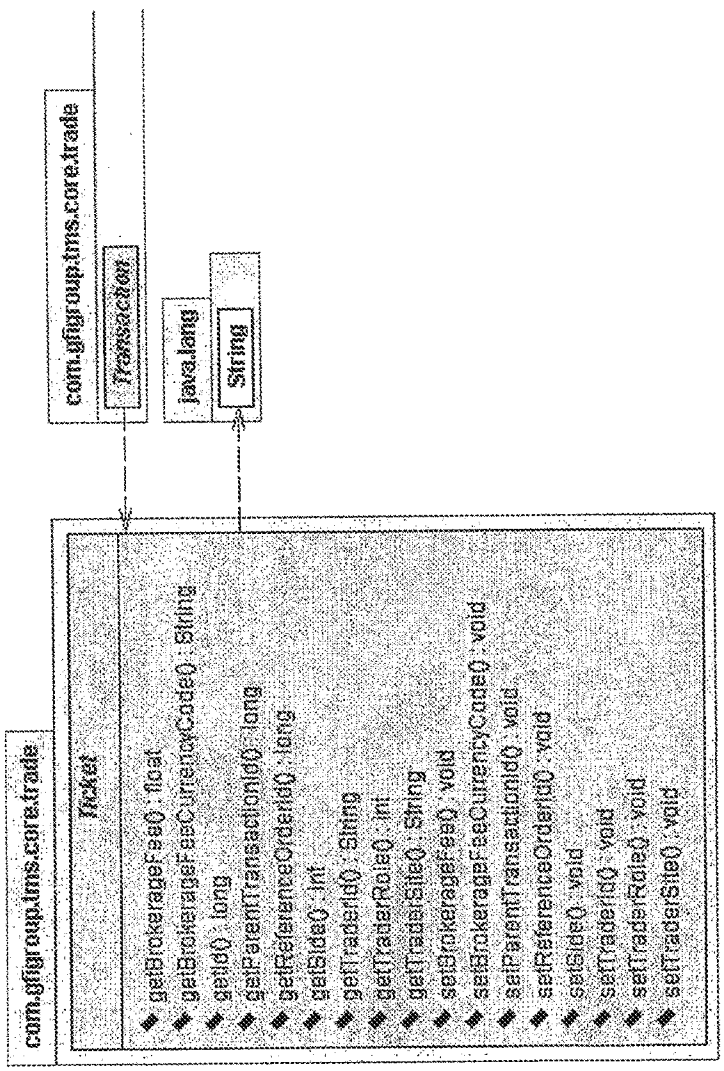
Figure 41:
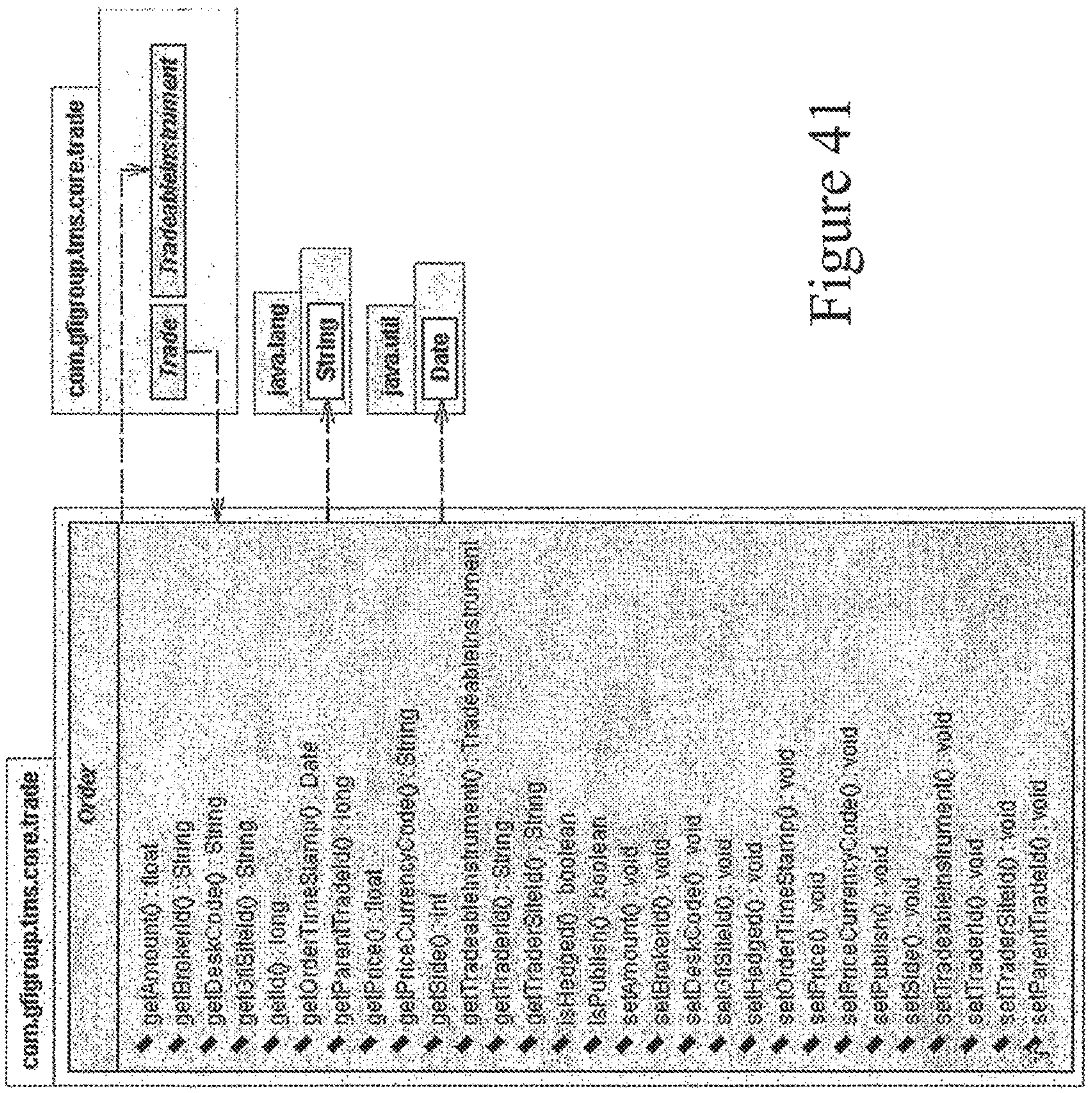
Figure 42:
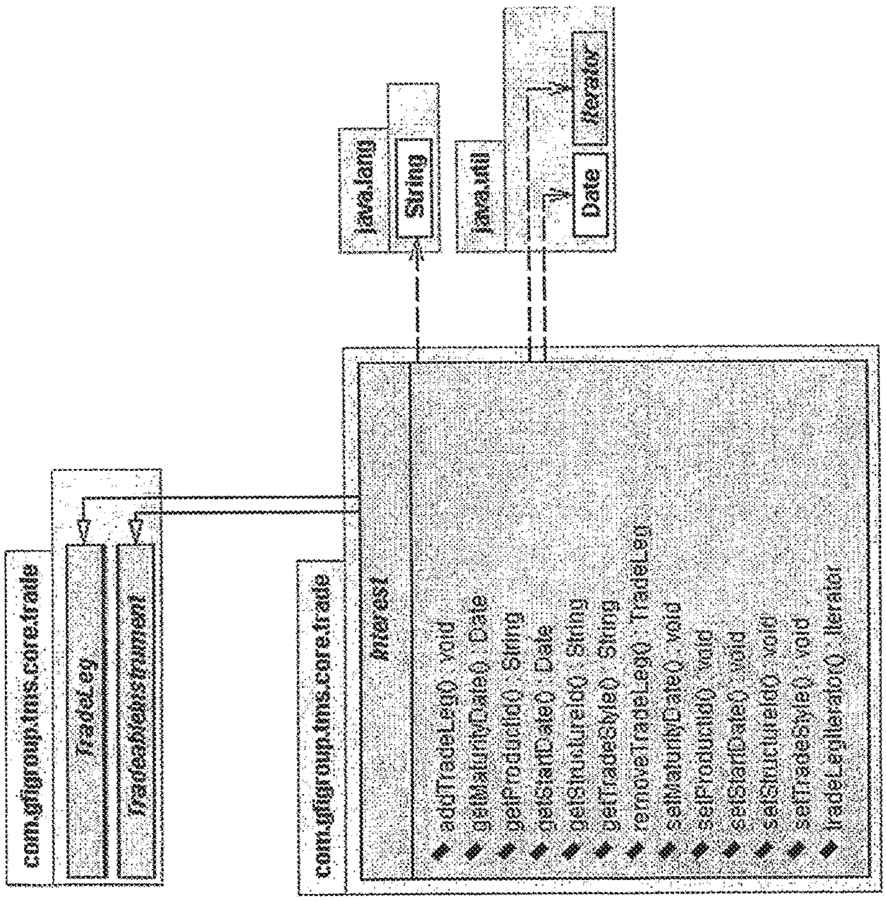
Figure 44:
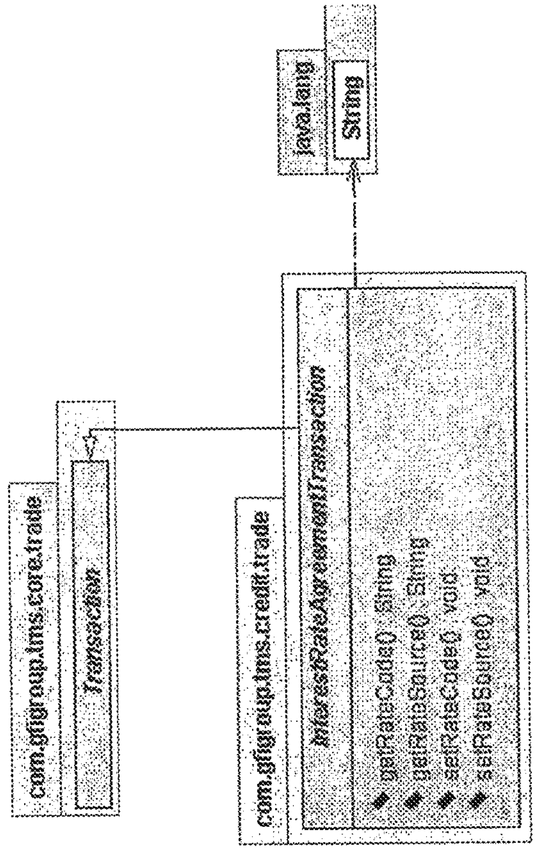
Figure 43:
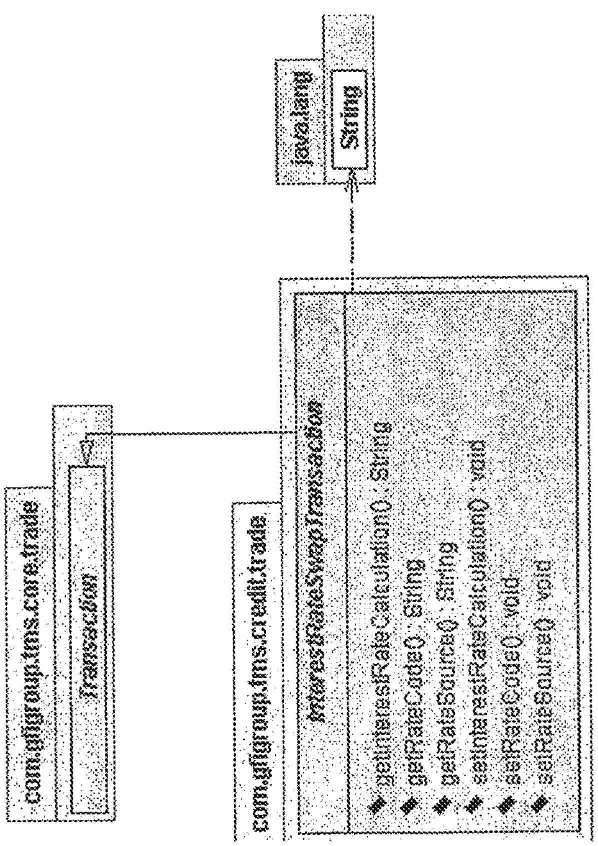
Figure 45:
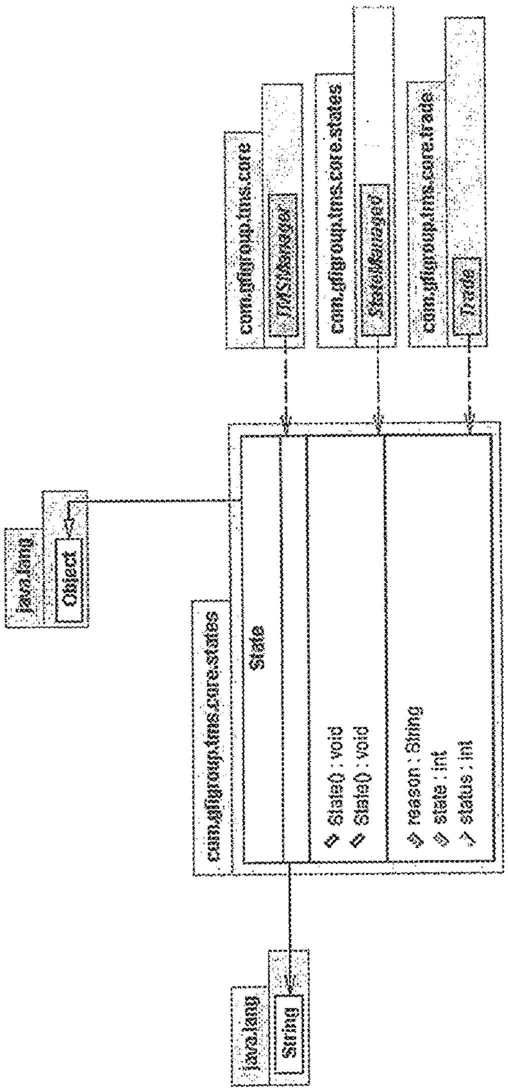
Figure 46:
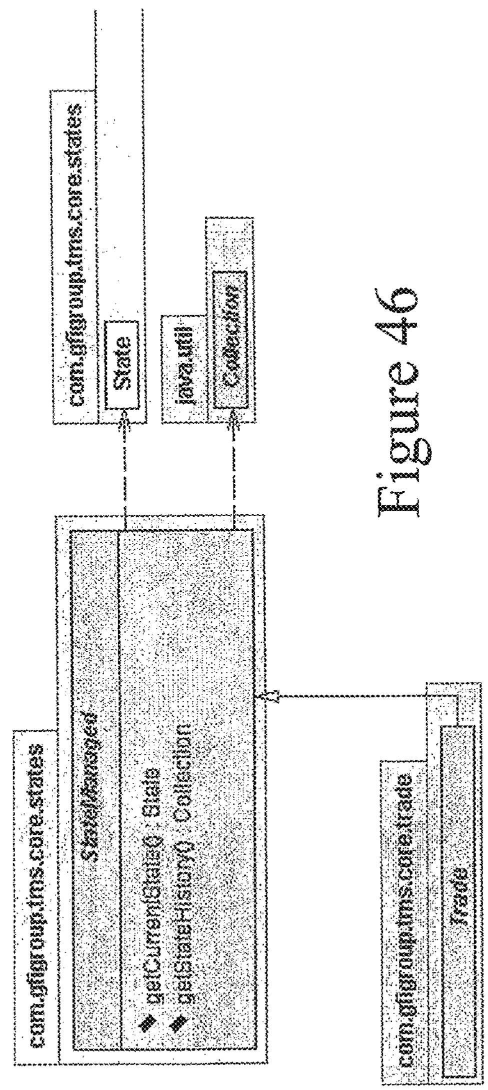
Figure 47:
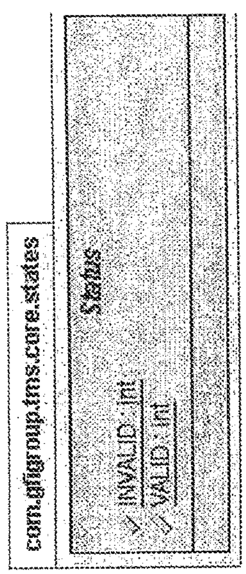
Figure 48:
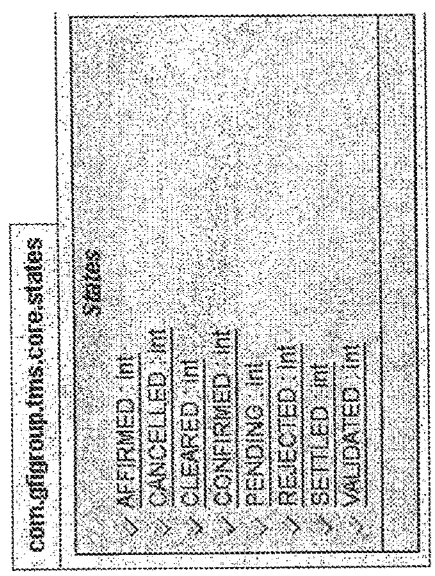

FIG. 34 shows an exemplary message sequence diagram 3400 to register a trade change. A Client sends a lookup factory message to the JNDI, and a getEventManager message to the TMSFactory, which instantiates the EventManager. The Client sends a registerForAll message to the EventManager to register a supplied listener. The Event-Manager sends a registerListener message to the TMS System, which performs callbacks to the listener, via an onMessage procedure of the TMSListener interface. FIG. 35 shows exemplary pseudo code to register a listener and FIGS. 36 to 48 show exemplary TMS data objects.

Figure 1B:
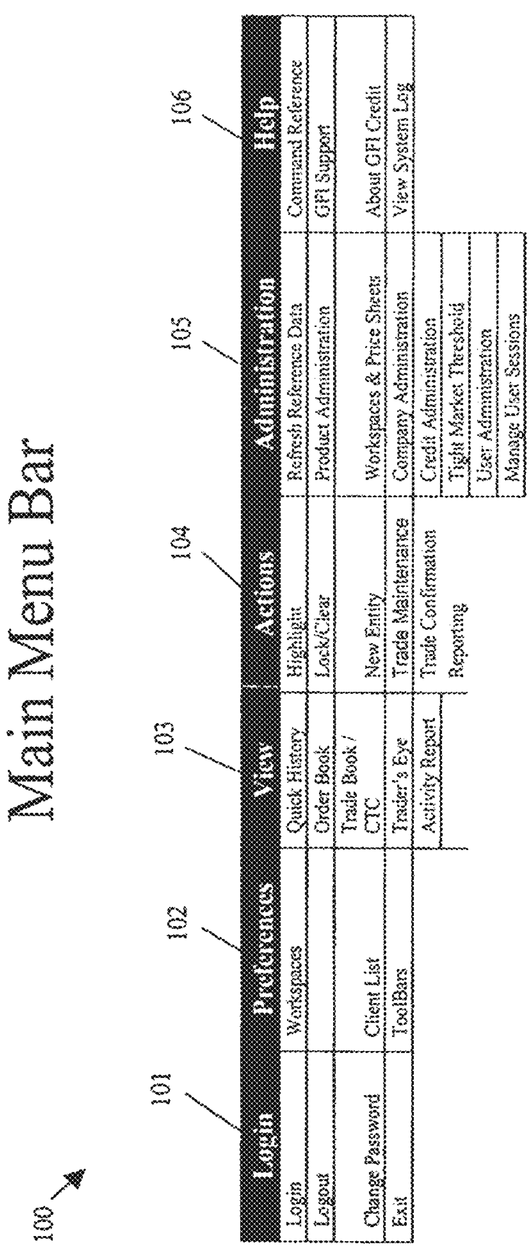
FIG. 1B shows an exemplary main menu bar providing access to functions and/or objects within an exemplary application for the exemplary system of FIG. 1A.

FIG. 1B shows an exemplary main menu bar 100 providing access to functions and/or objects within an exemplary application such as the CTS, CTC, and DB. The exemplary main menu bar 100 may include a login menu item 101, a preferences menu item 102, a view menu item 103, an actions menu item 104, an administration menu item 105, and a help menu item 106.

The login menu item 101 may include sub-menu items to login and logout of the exemplary trading system, change a user password, and exit an exemplary application.

The preferences menu item 102 may include sub-menu items to select or deselect a workspace from a list of available workspaces, set a default product view, create and maintain a list of favorite clients, and enable/disable toolbars. In regards to the workspaces sub-menu item, the user may also control the display order of the selected workspaces.

The view menu item 103 may include sub-menu items to open a quick history popup, view and maintain open orders (Order Book), view current and historical executions (Trade Book), create a view-only copy of the currently active workspace, assume an identity of a particular trader and view the markets from that trader's perspective (Trader's Eye), and examine an audit trail of bids, offers, and executions (Activity Report).

The actions menu item 104 may include sub-menu items to highlight a selected interest or quote, lock/unlock a market for a currently selected interest, setup a new entity in the exemplary system, and access trade maintenance, trade confirmation, and reporting functions of the exemplary system.

The administration menu item 105 may include sub-menu items to refresh reference data, maintain product-related data, create and maintain price sheets and workspaces, administer business sites and customer product entitlements, access a credit matrix function to set credit limits, adjust the Best Bid to Best Offer spread in basis points (Tight Market Threshold), administer users, user groups, roles and entitlements, and view a list of the active users sessions and their corresponding users and/or currently active application.

The help menu item 106 may include sub-menu items to access on-line help, contact information for system support, technical information related to the installed version of the system software, and a console log of system messages.

According to an exemplary embodiment, not all of above-described menu items and sub-menu items may be provided for each exemplary application. For example, the administration functions to maintain reference data may only be accessible within the Data Buffet (DB) application. In this regard, there may be no link between the DB and the CTS or CTC. Hence, reference data within the CTS and CTC may be refreshed using a special option, which may replicate the relevant reference data within each application's database.

Figure 2:
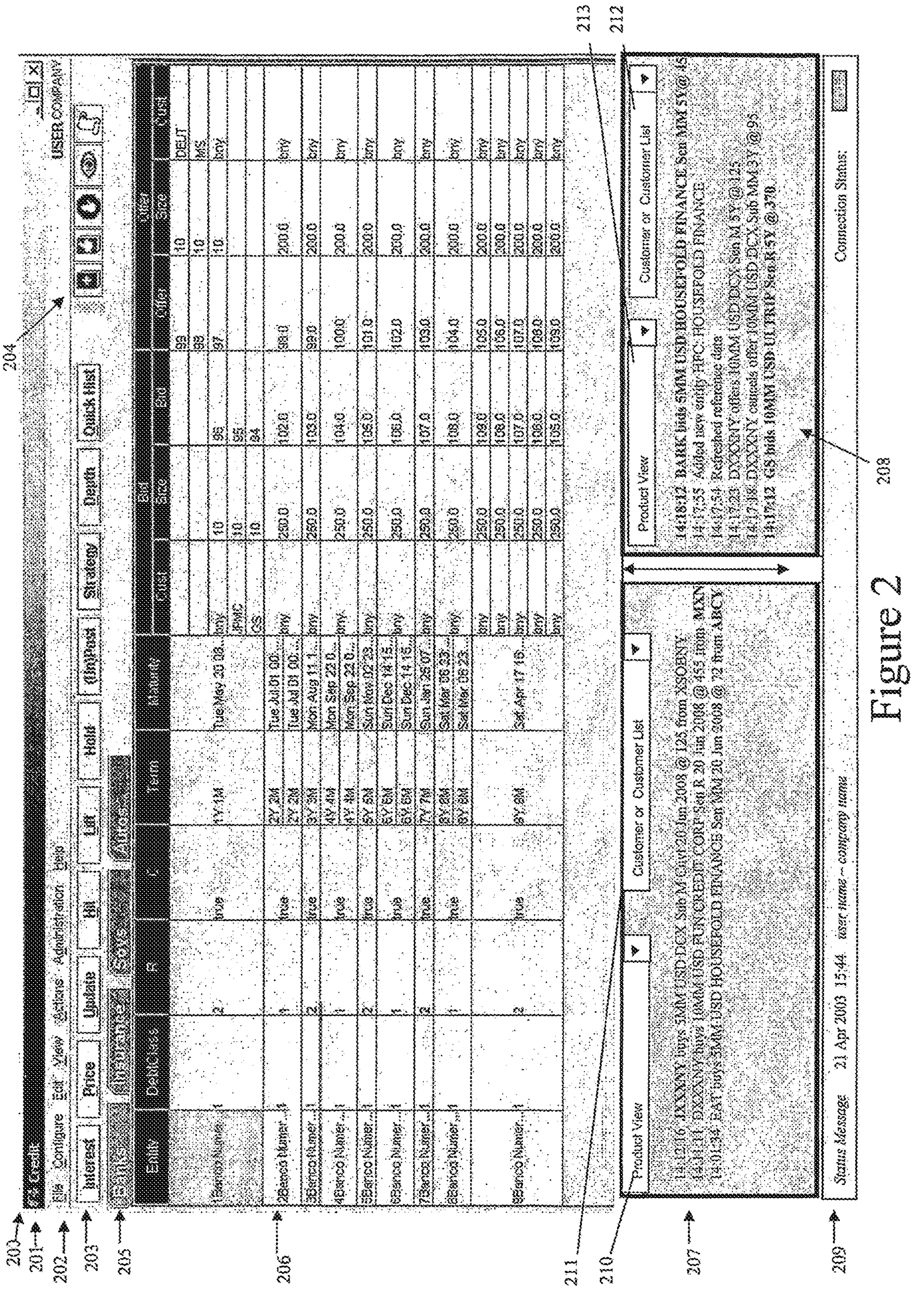
FIG. 2 shows an exemplary credit trade capture application main page/window.

FIG. 2 shows an exemplary CTS main page/window 200. The exemplary CTS main page/window 200 includes a title bar 201, a main menu bar 202, command buttons 203, icons 204, workspace tabs 205, a price sheet area 206, a trade log 207, a price log 208, and a status bar 209.

The main menu bar 202 may appear below the title bar 201, and provide access to functions and/or objects within the exemplary application, in this instance, the CTS application.

The command buttons 203 may appear below the main menu bar 202, and provide convenient access to frequently used trading commands, including, for example, commands to create a new interest, add a bid and/or offer for an existing interest, update an existing bid or offer, hit a selected bid, lift a selected offer, hold an order, post/unpost a price, and display the structure, market depth, or pricing statistics for a selected interest.

Icons 204 may appear adjacent to the command buttons 203 and include, for example, an order book icon represented as a black book with a "+" or "−" sign to access open and held bids and offers, a trade book icon represented as a green book with a "thumbs up" symbol to execute trades, and a hold all icon represented as a red octagon with an outstretched palm symbol to hold all orders for a selected trader.

Workspace tabs 205 provide access to workspaces, which are work areas within which a user may logically organize the markets and products that they want to work with. For example, a user may want to create a workspace for a particular sector, across credit products or different structures. In FIG. 2, for example, the workspace tabs 205 provide access to a Banks workspace, an Insurance workspace, a Sovs workspace, and an Autos workspace. Workspaces are further discussed below.

Price sheet 206 displays bank interests and association market information parameters in a matrix format. In particular, price sheet 206 displays individual bank interests in rows and specifics, such as, their debt class, bid, and offer details in columns. Price sheets are further discussed below.

The trade log 207 may appear in a resizable window at the bottom left of the main application window to display the key details of trades that were executed during the user's session. The price log 208 may appear in a resizable window at the bottom right of the main application window to display interest and price additions, updates and cancellations during the user's session. The trade log 207 and price log 208 may include product view filters 210, 213 and customer/customer list filters 211, 212 to further limit their content. Trade logs and price logs are further discussed below.

Status bar 209 may appear at the bottom of the main application window, and may include, for example, a system message area on the left to display system/session status, a system date, and a server time in Universal (GMT) time. The user's name and company site name may also appear, as well as a connection status displayed, for example, as a small icon bar, in which a green bar may indicate a normal connection status, a yellow bar may indicate a slow connection, and a red bar may indicate a lost connection. In this regard, a heartbeat function may be provided indicating the strength and/or network connection speed.

Edits applicable to entry fields within dialog boxes and query screens may be checked after a user submits the entry or changes. An appropriate error message may be displayed within the dialog box so that the user is unable to proceed until the error is corrected. System status and error messages other than those related to fields may be displayed with popup screens that require acknowledgement from the user.

An exemplary system may save ("persist") a user's desktop settings by login. That is, each user's desktop settings may be saved when s/he logs out, so that when s/he logs in the next time, their desktop configuration may be recalled as it existed during their previous session. The saved settings may include the physical dimensions (height and width) and the position of screens such as workspaces/price sheets, dialog boxes, logs, pop-ups and query pages. The saved settings may also include preferences for the selection and display order of workspaces and filter selections of logs, order book and trade book. According to an exemplary embodiment, a 'Save Desktop Settings' option from the Preferences submenu may be used to save desktop settings during the user's session. This may be advisable in instances where the user has made significant changes in their desktop settings and wants to safeguard against losing them in the event of an abnormal session termination.

A drop-down indicator, such as, for example, a downwardly pointing arrow, may be displayed if the user selects a field with a drop-down menu. Type-ahead may be provided. A scroll bar may also be provided for drop-down menus with many listed choices. Page-up, Page-down, Home, End, and the up/down arrow keys may be supported to perform scrolling.

Function keys may be provided so that brokers, for example, may map their favorite clients to these keys in lieu of selecting the desired client from a list. This may be used to facilitate entry of orders and executions. The mapping of function keys may be configurable by each user at the time they define their list of favorite clients. The mapped function keys may be rendered as buttons in a row below the command buttons, and may be labeled with the relevant client shortnames.

Workspaces are work areas within which a user may logically organize the markets and products that they want to work with. For example, a user may want to create a workspace for a particular sector, across credit products or different structures. In FIG. 2, for example, the workspace tabs 205 provide access to a Banks workspace, an Insurance workspace, a Sovs workspace, and an Autos workspace. Workspaces may include one or more price sheets, which may be used to group related products together. Workspaces may be default or custom.

Default workspaces are pre-defined layouts created and maintained by business administrators based on common/standard market configurations. Only administrators with the appropriate permissions may create and maintain default workspaces. Administrators may assign an appropriate unique title to each default workspace. Default workspace names may be displayed with an asterisk to the left of the assigned name. The administrator may also indicate whether or not a default workspace viewable by external users via a checkbox entitled 'Enable for External View.' The administrator may also designate the users authorized to access each workspace, which may be one specific user, a list of users or all users in the system. Users may be allowed to access and utilize default workspace definitions related to the product lines and product views that they are entitled to work with. For example, a default workspace that includes CDS and asset swaps products may not be made available to users who are authorized for only one of those two product lines. Administrators may be provided with checkboxes to control the release of new/modified default workspaces, and to determine whether a new or modified default workspace should be auto-refreshed/selected on the desktops of users who are authorized to access that workspace.

When a default workspace is created intra-day, the administrator may elect to have it automatically added to the eligible users' desktops so that the affected users may see a tab for that auto-selected workspace the next time they log in. Users may deselect the workspace if they do not wish to see it, and the system, if required, may retain this setting from that point forward. When a default workspace is deleted intra-day, it may be de-selected from the desktop of every affected user the next time they log in to the system.

It is understood that administrators may be unlikely to change or delete released workspaces during trading hours. According to one exemplary embodiment, only one workspace may be provided, which may be administered, for example, by a development team directly through the back-end. It is expected that such a workspace may remain relatively static. However, real-time updates related to additions/changes/deletions of default workspaces may be provided, although it may be required to allow the user to log off and log back in to obtain the updates.

Custom workspaces are market layouts created and maintained by users who wish to customize their desktop. Users may access only their own custom workspaces in addition to the default workspaces provided, for example, by business administration. By default, the system may assign titles, such as, for example, 'WS1,' 'WS2,' and so on, to each custom workspace created. However, the user may change these titles and assign their own names.

A user may configure their desktop with multiple workspaces, if desired, using any combination of default and/or custom workspaces that may be available to them. Within the user's desktop, the selected workspaces may appear in a tabbed format, as with a commercial work sheet program. The user may also specify the display order of the selected workspaces.

Workspaces may be added, updated and deleted via an interactive help utility called the Workspace Definition wizard that guides the user through the process. The layout and content of a workspace may be configured via the Workspace Configuration wizard. The Workspace Definition and Configuration wizards may be implemented as part of a suite of four interactive screens that facilitate the administration of default workspaces and price sheets.

Figure 4:
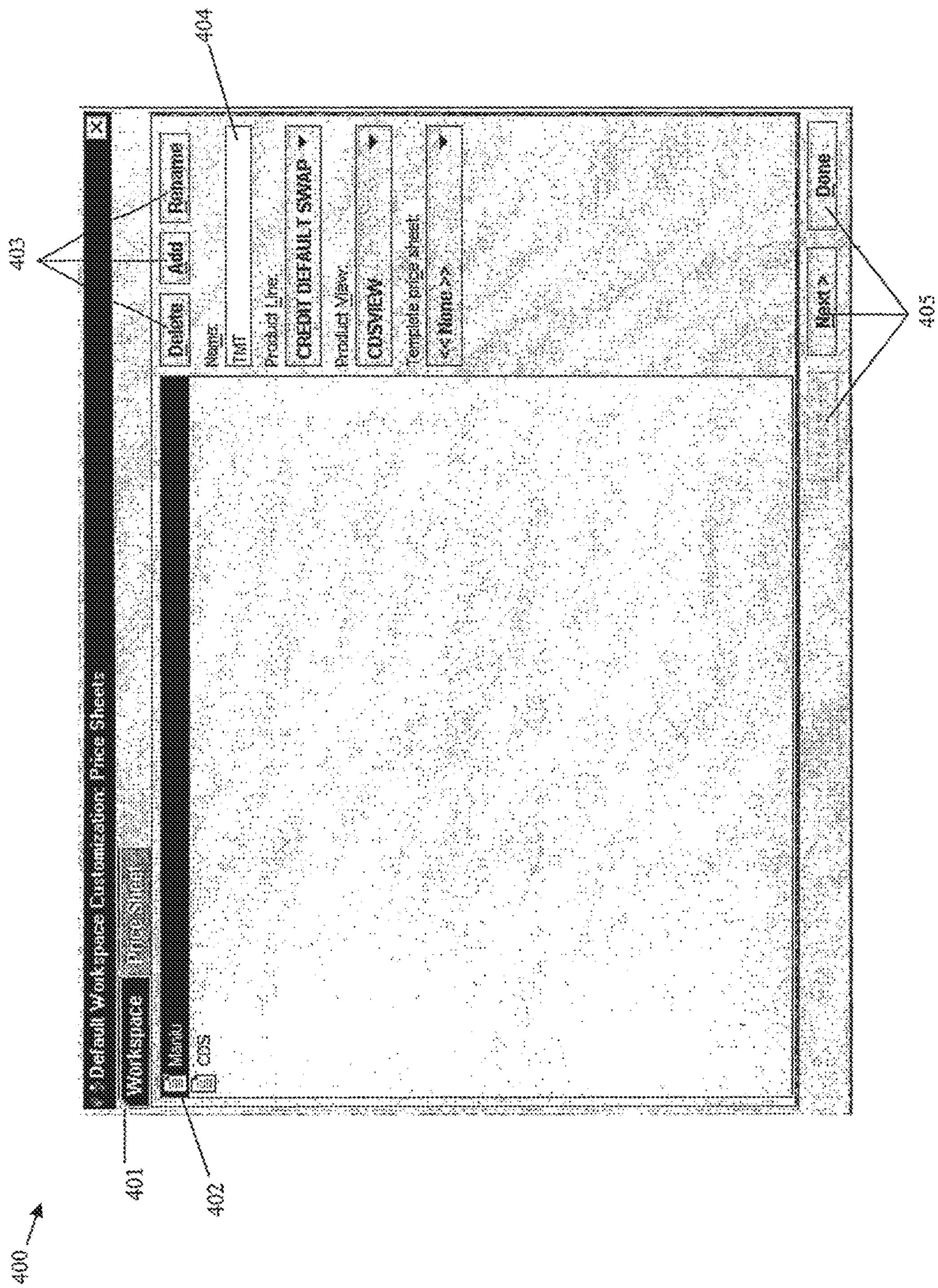
FIG. 4 shows an exemplary default workspace definition wizard user interface to add, modify, rename, and delete default workspaces.

FIG. 4 shows an exemplary default workspace definition wizard user interface 400 to add, modify, rename and delete default workspaces. Authorized users may access this wizard by selecting the Default Workspaces & Price Sheets option from the Administration sub-menu and then selecting the first tab 401 entitled 'Workspace.' This wizard may be configured to be the first page/screen accessed via the workspace tab. According to an exemplary embodiment, this function may be disabled for certain users so that some users may access it and others may not.

The exemplary default workspace definition wizard user interface 400 may include a list 402 of existing workspaces in a panel on the left, with three action buttons 403 on the top right, a name field 404 below those action buttons, and three navigation buttons 405 arranged on the bottom right. When modifying, deleting or renaming an existing workspace, the user may be required to select a workspace by selecting the appropriate row in the left panel. When creating a new workspace, the user may be required to configure the layout and content of the workspace by using the Workspace Configuration wizard described more fully below.

The action buttons 403 include a Delete button to delete a workspace, an Add button to create a new workspace, and a Rename button to rename a workspace. The Add and Rename action buttons may be enabled only when the name field is filled in. In this regard, the user may be required to first specify the desired name when adding or renaming a workspace. The name field 404 assigns a title to the workspace that is being added or renamed.

The navigation buttons 405 include a Previous button, a Next button, and a Done button. The Previous navigation button may be disabled on this first screen, as there is no previous page. The Next navigation button may be used to access the Workspace Configuration wizard, which is the next page/screen under this tab.

Figure 5:
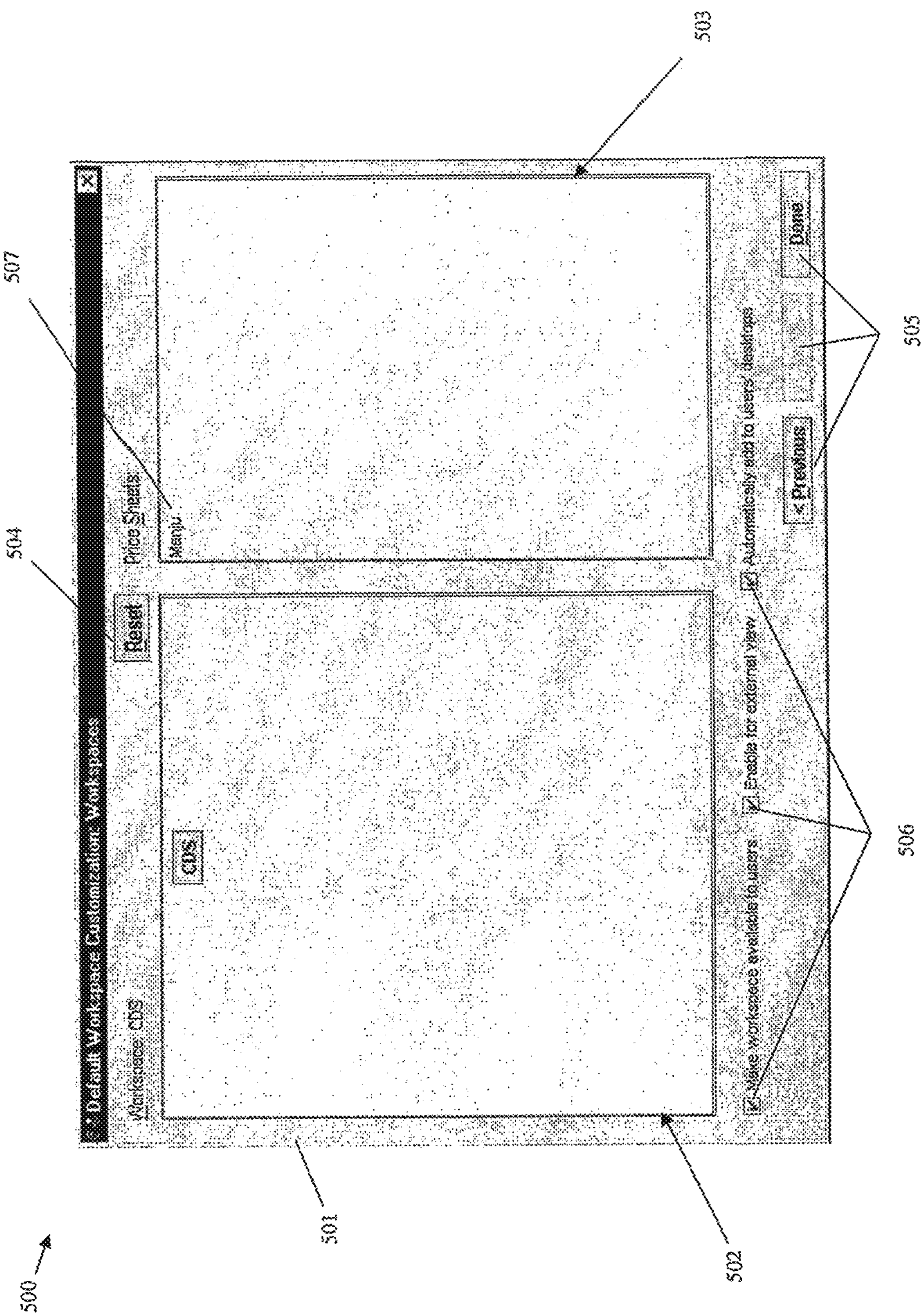
FIG. 5 shows an exemplary default workspace configuration wizard user interface to define and modify the layout and content of default workspaces.

FIG. 5 shows an exemplary default workspace configuration wizard user interface 500 to define and modify the layout and content of default workspaces. Authorized users may access this wizard by first selecting the Default Workspaces & Price Sheets option from the Administration sub-menu, then by selecting the first tab entitled 'Workspace,' and finally by pressing the Next button to get to the second page/screen accessed via the workspace tab.

The exemplary default workspace configuration wizard user interface 400 includes a screen 501 with a left panel 502 to define the physical layout of the workspace and right panel 503 to list all the available price sheets that may be included in the workspace. Action buttons 504 and navigation buttons 505 may be provided, as well as checkboxes 506 to control the release of the workspace to users.

According to an exemplary embodiment, a workspace may contain only one price sheet so that options related to the configuration of the physical layout via sub-division of the workspace may be disabled for future upgrade and/or release.

A Reset action button 504 may be provided at the top to clear the current workspace layout and start over. Workspace layout configuration commands may be provided via a right-click mouse menu within the layout panel.

The default workspace layout may be a single price sheet container. According to an exemplary embodiment, the default layout may always apply, and therefore may not be changeable. Each price sheet container may be split horizontally and/or vertically into two containers, each of which may then be further sub-divided, and may in turn include one or more price sheets tiled either horizontally (by default) or vertically (via a configuration command). The price sheet(s) to be included in each container may be selected from a list 507 of available price sheets, and may be dragged and dropped into the appropriate container when designing the physical layout.

The bottom of the workspace configuration screen 501 may include three checkbox configuration options 506 to control when and how to release the workspace to users, to indicate whether or not the workspace is available for external viewing by certain users, and to control whether or not a newly released workspace is automatically added to the eligible users' desktops.

Custom workspaces may be configured to include custom price sheets only. The user may make copies of default price sheets and save those under a different name as their own custom price sheets.

The Previous navigation button may be used to access the Workspace Definition page, which is the first/previous page/screen under this tab. The Next navigation button may be disabled on this first screen 501, as there is no next page.

Figure 6:
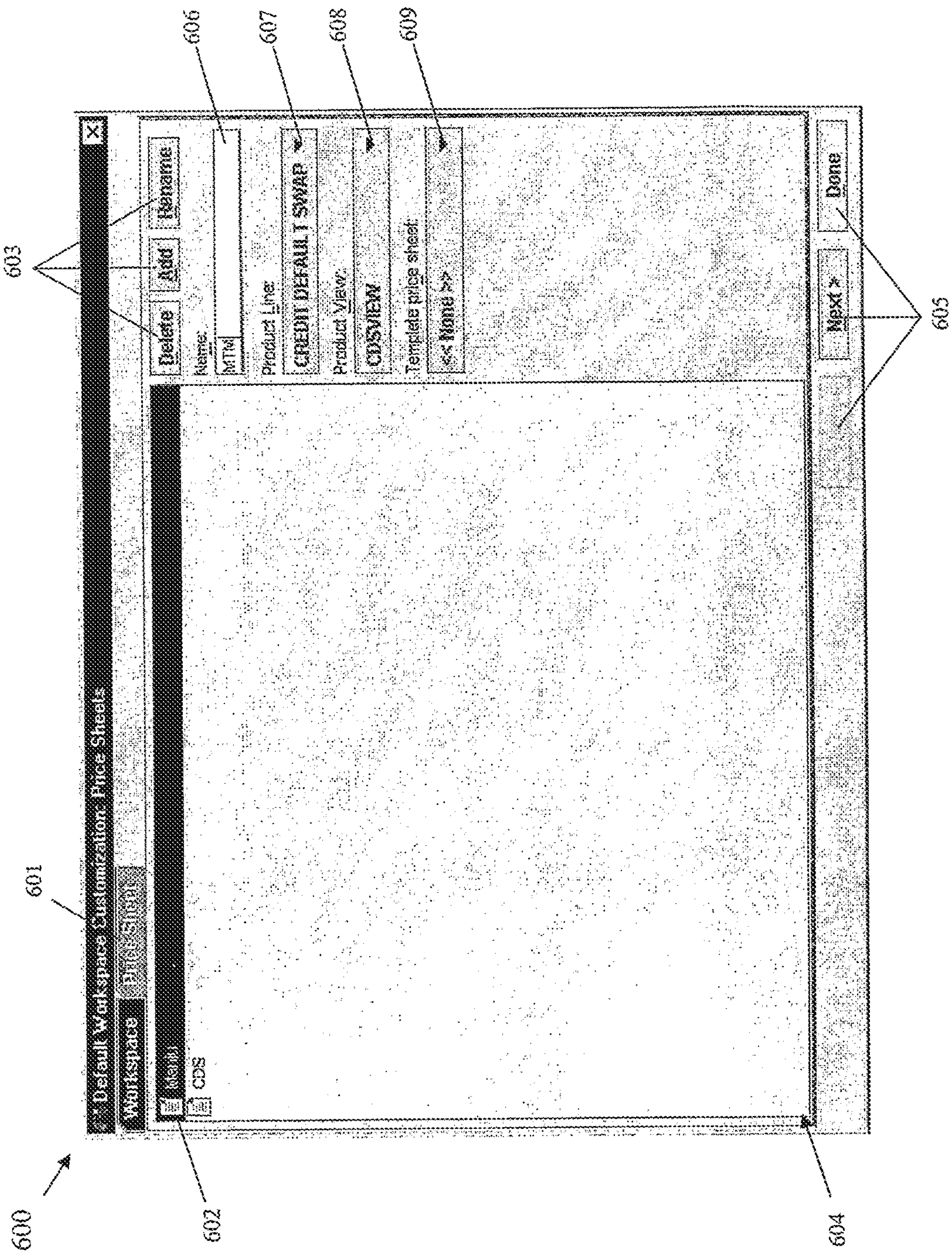
FIG. 6 shows an exemplary price sheet display.

FIG. 6 shows an exemplary price sheet(s) display 600, which is a market display that groups products and shows the market (bids/offers/trades) for specific interests within those products. Each price sheet may include of one or more interests with similar characteristics and defaults. Price sheets may be presented in a matrix format, which displays individual interests in rows, and specific interest and price parameters in columns. Price sheet columns may be determined by product line, therefore the list of available ones is hard-coded, but an exemplary system may allow for the customization of the content and layout. According to an exemplary embodiment, only one completely hard-coded price sheet may be available.

Price sheets may be default or custom. Default price sheets are common or standard product groupings that may be created and maintained, for example, by business administration. Default price sheets may be made available to all users based on their market and product entitlements at the company and group levels. For example, a user who is not entitled to work with asset swaps may not have access to default price sheets that contain asset swap interests. Default price sheets layouts may be created, modified or deleted only by authorized users, such as, for example, an authorized administrator. The administrator may be required to assign a unique name to each default price sheet. Modifications may become effective the next time each user of the affected price sheet/s logs in to the system. When a default price sheet is deleted intra-day, it may be removed from the affected default workspaces and from the desktop of every affected user. In the event that a price sheet within an active workspace is deleted by system administration, it may not be removed until the affected user has moved away from the workspace. It is understood that administrator may be unlikely to change or delete default price sheets within released default workspaces during trading hours. Accordingly, only one price sheet may be administered by the development team directly through the back-end. However, real-time updates related to additions/changes/deletions of default price sheets may be supported, although the user may be required to log off and log back in to get the updates.

Custom price sheets are product layouts created and maintained by users who wish to customize their desktop. Users may maintain only their own custom price sheets. Copies of default price sheets may be provided, for example, by business administration, which may be saved as private copies for custom price sheets. By default the system may assign titles like 'PS1,' 'PS2,' and so on, to each custom price sheet created. However the user may change these titles and assign their own names.

Price sheets may be added, updated and deleted via the Price Sheet Definition wizard, and the layout and content of a price sheet may be provided via the Price Sheet Configuration wizard as described below, which are part of a suite of four screens provided for the administration of default workspaces and price sheets. A user's entitlements may limit the product views and default price sheets that are made available to them.

The Price Sheet Definition wizard may enable administrators to add, modify, rename and delete default price sheets. Authorized users may access this wizard by selecting the Default Workspaces & Price Sheets option from the Administration sub-menu and then selecting the second tab 601 entitled 'Price Sheet.' According to an exemplary embodiment, the Price Sheet Definition wizard may be the first page/screen accessed via the price sheet tab. According to an exemplary embodiment, this function may be disabled for certain users and enabled for other users.

The exemplary price sheet definition wizard user interface 600 may include a list 602 of existing price sheets in a left panel 604, three action buttons 603 arranged on the top right, a few fields below those action buttons, and three navigation buttons 605 arranged on the bottom right.

When modifying, deleting or renaming an existing price sheet, the user may be required to select the price sheet by selecting the appropriate row in the left panel 604. When creating a new price sheet, the user may be required to configure the layout and content of the price sheet by using the Price Sheet Configuration wizard (described below). The Add and Rename action buttons 603 may be enabled only when the name field is filled in. In this regard, the user may be required to first specify the desired name when adding or renaming a price sheet.

The administrator may have the option of using an existing price sheet as a template when creating a new one. Product views may be used to filter the products and interests to be included on a price sheet.

The action buttons 603 include a Delete button to delete a price sheet, an Action button to create a new price sheet, and a Rename button to rename a price sheet. The name field 606 assigns a title to the price sheet that is added or renamed. The product line drop-down menu 607 may be used to limit the selection of product views, and may default to 'ALL,' which means all of the product lines that the price sheet administrator is authorized to work with. A single product line may be selected to narrow down the list of available product views. According to an exemplary embodiment, the product line may default to credit default swaps.

The product view drop-down menu 608 selects a view for the currently selected product line. The template price sheet drop-down menu 609 selects an existing price sheet for the selected product line as a template for building a new price sheet. The navigation buttons 605 include a Previous button, which may be disabled on this first screen, as there is no previous page, and a Next button to access the Price Sheet Configuration wizard, which is the next page/screen under this tab.

Figure 7:
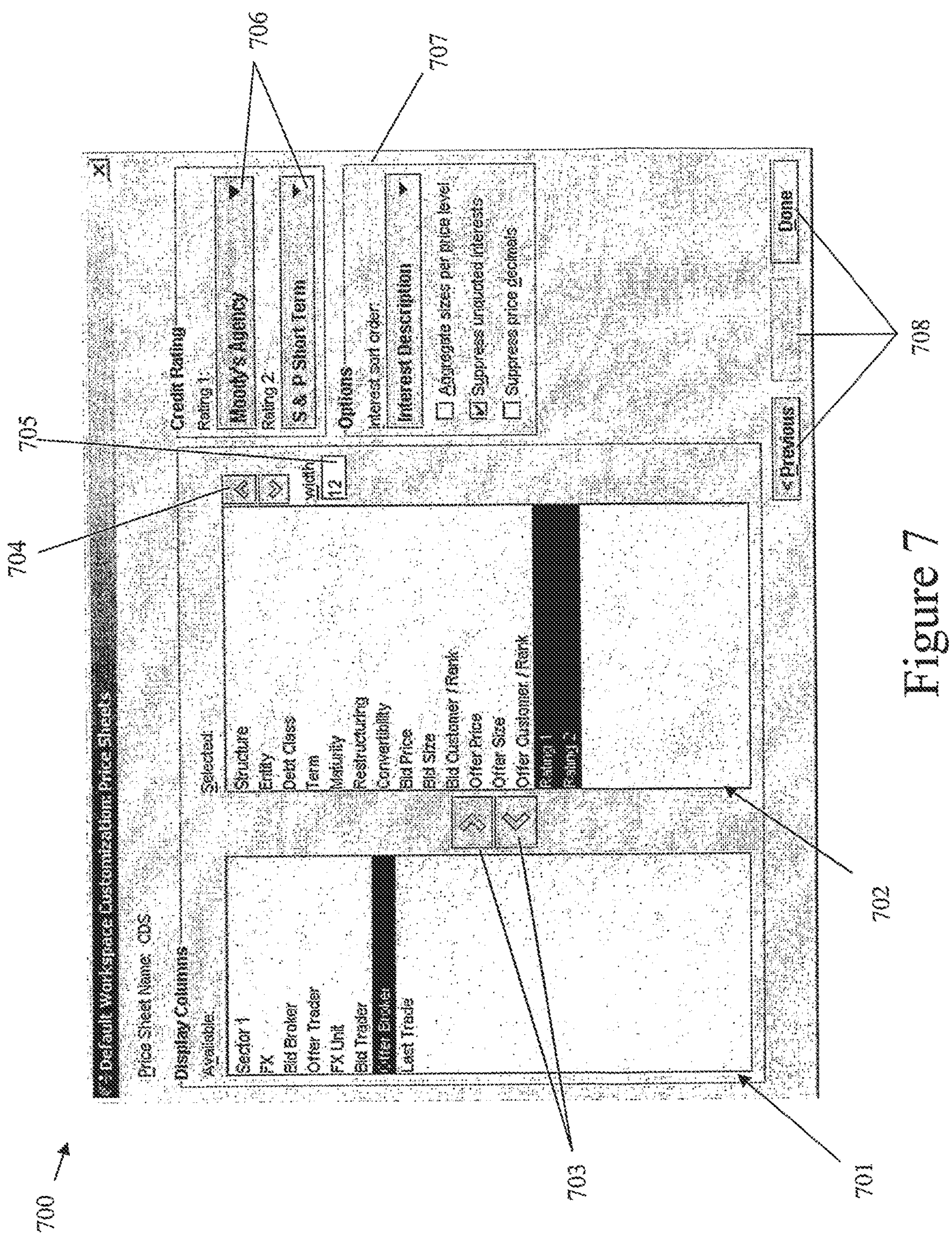
FIG. 7 shows an exemplary default price sheet configuration wizard user interface to define and modify the layout and content of default price sheets.

FIG. 7 shows an exemplary default price sheet configuration wizard user interface 700 to define and modify the layout and content of default price sheets. Authorized users may access this wizard user interface 700 by first selecting the Default Workspaces & Price Sheets option from the Administration sub-menu, then by selecting the second tab entitled 'Price Sheet,' and finally by pressing the Next button to get to the second page/screen accessed via the price sheet tab. According to an exemplary embodiment, this function may be disabled for certain users and enabled for other users.

The exemplary price sheet configuration wizard user interface 700 may include a left panel display 701 to define the actual physical layout of the price sheet, and a right panel display 702 to list all the available display columns that may be included in the price sheet. The two panels 701, 702 may be separated by one or more horizontal directional (left/right) arrow icons 703 that enable the user to select or de-select columns to be included in a price sheet. Vertical directional (up/down) arrow icons 704 control the display order of the selected columns and a width field 705 specifies the desired column widths in characters. Credit rating drop-down menus 706 apply when one or both of the rating columns are selected. An options area 707 having a drop-down menu and checkboxes specifies further options that may control the sort order of interests within the price sheet, the aggregation of orders within a price level, the display or suppression unquoted interests, and the display of insignificant decimals in prices. Three navigation buttons 708 are also provided.

For example, a CDS price sheet may include one or more of the following columns: a Structure column to display a short code for the structure of the interest (may be preceded by a subscript "u" for interests with an up-front premium payment), an Entity column to display the designated market name (short name) for the interest or interest leg, a Debt class column to display the short code for the debt class of the interest or interest leg, a Maturity column to display the actual maturity date for the interest or interest leg, a Bid Customer/Rank column to display the site id of the trader responsible for the bid or the rank of the bid in the depth/queue, a Bid Size column to the bid size, including the unit, a Bid Price Column to display the bid price, an Offer Price column to display the offer price, an Offer Size column to display the offer size, including the unit, an Offer Customer/Rank column to display the site id of the trader responsible for the Offer or the rank of the Offer in the depth/queue, a Term column to display the relative term in years and months for the interest or interest leg when the interest is non-specific, i.e., has relative maturity date(s), a Restructuring column to display the restructuring type for the interest or interest leg, a Convertibility column to display the convertibility of the underlying debt instrument for the interest or interest leg, an FX column to display the denomination currency for the interest, a Bid Trader Column to display the trader id responsible for the bid, a Bid Broker column to display the broker id responsible for the bid, an Offer Trader column to display the trader id responsible for the Offer, an Offer Broker column to display the broker id responsible for the Offer, an FX Unit column to display the denomination currency unit, a Last Trade column to display the price and direction of the last trade for the interest, with the timestamp in a tool tip, a Rating 1 Column to display the rating for the entity under the selected rating 1 type, a Rating 2 column to display the rating for the entity under the selected rating 2 type, a Sector 1 column to display the sector for the Entity on the interest or interest leg for the designated industry classification scheme, a Sector 2 column to display the sector for the Entity on the interest or interest leg for the designated industry classification scheme, a Region column to display the region of the Entity's country of domicile, a Country column to display the Entity's country of domicile, a Parent column to display the Entity's parent institution, a Product Attribute column(s) to display the attribute(s) of an interest per the product line definition, an Interest Description column to display interest parameters as a concatenated space-separated string in a single column, a Last Quote column to display the timestamp and the best bid and ask prices from the latest quote for the interest, a Bid Descriptor column(s) to display additional information related to the bid based on the enabled product line definition, an Offer Descriptor column(s) to display additional information related to the offer based on the enabled product line. The options area 707 may specify the sorting method for interests within the price sheet. In particular, interests may be sorted by entity shortname (with preceding premium designation subscript when applicable)+debt class+term+restructuring+convertibility. The interests may also be sorted by customer, term, or sector.

The options area 707 may also specify whether or not orders at a given price level are to be aggregated in the display, or whether the display of interests without orders is to be suppressed for all users other than the one who initially created the interest or whether the display of insignificant decimal digits is to be suppressed in price columns.

A price sheet's configuration determines the basic layout and content of the market data that will be displayed within it. However, other features and display rules may govern the price sheet's content and functionality as described below.

Exemplary Display Rules

According to exemplary general display rules for interests, each interest may be displayed in one or more rows within the price sheet, and may be sorted per the designated sort order. The number of rows that appear for each interest may depend on the structure type. In general, if a price sheet is configured to suppress unquoted interests, users other than the creator of an unquoted interest may not see that interest displayed in price sheets. A default reference obligation tool tip may be provided at the entity level. "Hovering" over the Entity column on any price sheet row may activate a popup showing the default reference obligation for the entity, including the description, CUSIP and/or ISIN, maturity date and coupon rate of the bond issue. A structure or details view may be activated via a mouse menu option to view the details for each leg of the currently selected interest.

According to exemplary display rules for key interest parameters, interest parameters may be displayed in an interest-level perspective or a leg-level perspective. Interest-level parameters may be displayed via a single value for all interest legs, regardless of the structure type. These may include, for example, a code or icon in the Structure column to indicate the structure of the interest, a "u" subscript appearing to the left of the structure code to designate an up-front premium, a currency code in the FX column to indicate the currency denomination for the interest, a units symbol, such as, for example, "MM" for millions or "B" for billions, to indicate the denomination currency unit, a concatenated space-separated string of interest descriptions in a single column.

Leg-level parameters may include content that varies by leg for multi-legged interests, depending on the structure. For example, depending on the structure the Entity column may display a single short name or multiple short names, the Debt column may display a single debt class or multiple debt classes, the Term column may display a single term or multiple terms, the Maturity column may display a single maturity date or multiple maturity dates, the Restructure column may display a single restructure class or multiple restructure classes, the Convertible column may display a single convertible class or multiple convertible classes.

According to exemplary rules for optional entity/interest displays, certain interest-level columns may be optionally included based on the price sheet configuration. These include a Last Trade column to display the price, size and direction of the last trade subject. In particular, if the last trade was executed via a 'Lift' command, then the direction of the trade is indicated as an up arrow '↓.' If the last trade was executed via a 'Hit' command, then the direction of the trade is indicated as a down arrow '↓.' The size and price of the trade is shown separated by a '/.' For example, '↑ 5 MM/35' indicates that the last trade was done by lifting and offer for a size of 5 million at a price of 35. When applicable, an exemplary system may always show the very last trade for a displayed interest, even when there are no active prices currently in the market for that interest. When this column is refreshed with information on a new trade, the new information may be shown in bold font with a red background for a duration of nn seconds immediately following the execution. Thereafter it may revert to normal font and background. The date and time of the last trade may be provided via a tool tip instead of being displayed within the column. Certain users may not see information related to un-posted trades in this column.

Also, the Last Quote may be optional and may display the timestamp and the best bid and ask prices from the latest quote for the interest. In this regard, the qualifying time frame or cutoff date for the last trade and last quote may be stipulated at the product line level. For example, credit default swaps may use a one-year cutoff so that if no trade occurred on the interest within the past year, nothing is displayed in the last trade column.

Also, an interest may be further defined by additional optional attributes so that the price sheet may have a row for each unique combination of interest definition plus optional product attribute values provided that there are released (broadcast) prices for that particular combination. Each optional attribute column may be sorted in ascending or descending order based on its definition within the product line administration. Moreover, the price sheet may further include one or more industry sectors, credit rating classifications, a domicile country, a region within the domicile country, and a short name for the parent institution.

According to exemplary general display rules for orders, price sheets may only show bids and offers with firm prices, held (cancelled) orders may be seen in the Order Book only, certain users may post (broadcast) orders only, the minimum and maximum number of decimals to be displayed for both size and price may be based on the product line definition, and an order details tool tip may be attached to the size and price of an order within the price sheet and depth. Hovering over either the bid or offer price or size may activate a popup showing details of that order, including the interest, site (company) name, trader name, broker name, the full actual size, size conditions, the price, price conditions, posting status, timestamp and duration of the order. Certain users may not see the company or trader name and the posting status in this popup.

According to exemplary general rules for the display of bid and offer price and size conditions, to maximize efficient space utilization, the display of order conditions may be limited to two indicators each in the price and size columns, columnar indicators for order conditions may appear to the left of the bid/offer size or price and may be shown as super or subscripts, in a smaller font than that used for the size and price, columnar indicators may be used to communicate general or key conditional information only, additional details on specific order conditions may be provided via symbols or text within the order details tool tip so that when orders are aggregated, the tool tip may provide details on conditions that apply to the first order at that price level only, the user may be required to use the tool tip in the depth to view the details on conditions applicable to an order that is not the first one within an aggregated quote, all the applicable conditions may be shown in the tool tip for unaggregated quotes, and where two or more conditions apply, they may appear in the order in which they are described under price and size details below, separated by semicolons.

According to exemplary display rules for key order parameters, in particular, customer and broker related columns and the Cust/Rank column may show blanks if there are no orders on that side for the selected interest. If there are one or more standing orders on that side, then the information displayed varies by user type. Based on permissions, a Broker or other authorized user may see the site id (company) for the trader associated with the first order in the queue at that price; when in-line depth is enabled, then the relevant site for each bid/offer may be displayed on each row. A user who is not authorized to view the identity of traders may see blanks. A client-site user sees blanks if his organization has no live orders at that price level. A trader with a live order sees the rank and size of his own best order. A client-site user with no live orders of his own may see the rank of his company's best order. The Trader column displays the name of the trader responsible for the price and the column displays the name of the broker responsible for the price.

According to exemplary rules for key order parameters, in particular, the bid and offer size columns, the decimals may be suppressed when the size is a whole number and sizes may be right justified with the decimal points (when applicable) aligned to ensure that the numbers within each column are properly lined up. If the orders are unaggregated at each price level, then users see the size of the best (first) available order—for customer-site users. This may be the first (best) order that they are allowed to trade against, so any preceding ineligible orders may be bypassed. For certain users, the size displayed on aggregated orders may be the sum of the sizes of all orders at the best price, regardless of their eligibility so that posted and unposted orders at the best price may be aggregated. An indicator may inform the broker that the available size is composed of a mix of posted and unposted orders. For certain users, the size displayed on aggregated orders may be the sum of all posted orders at the best price. In regards to conditional indicators, "+" is shown as a superscript for an aggregated quote that represents more than one bid or offer of the same type (posted or un-posted), a "m" is shown as a superscript on an aggregated quote that includes posted as well as unposted orders, and a "c" is shown as a subscript on a quote that represents one or more orders with optional conditions attached—the detail of these may be viewed via the order details tool tip on the quote or in the depth. Also, if an order has one or more optional size conditions associated with it, based on the product line definition, then the order details tool tip may display a label "Size conditions:" followed by the symbols or codes for those conditions.

According to exemplary display rules for key order parameters, in particular, the bid and offer price columns. In regards to conditional indicators, an asterisk is shown as a superscript on a quote that is locked for clearing, "Δ" is shown as a superscript on a quote that represents one or more orders that involve a delta hedge, a "u" is shown as a subscript on a quote that involves an up-front premium payment, a "c" may be shown as a subscript on a quote that represents one or more orders with optional price conditions attached—the detail of these may be viewed via the order details tool tip on the quote or in the depth. Also, if an order has one or more optional price conditions associated with it based on the product line definition, then the order details tool tip will display a label "Price conditions:" followed by the symbols or codes for those conditions.

According to exemplary display rules for key order parameters, in particular order-related columns, bid and offer descriptor fields may be provided to stipulate alternate labels in the price sheet.

According to exemplary in-line depth display rules, the market depth for each interest may be viewed in-line, i.e., within the price sheet and hotkey commands may be provided to expand/contract the depth for the currently selected interest. For example, a "=" key may be provided to expand the depth view and a "−" key may be provided to contract the depth view. When expanded, the depth display may be displayed in 'inverted ladder format' as described below.

Log Messages

A log of trades executed during the user's session may appear in a resizable window at the bottom left of the main application window. By default the trade log display 207 may be limited to trades related to the interests within the workspaces that the user has selected.

The execution messages of the trade log 207 may appear in reverse chronological order with the most recent one at the top. Each trade message may include a timestamp of the execution in hh:mm:ss format. For certain users, the site code for the buyer (in bold font if the buyer was the aggressor) may be displayed followed by the word 'buys'. For certain users, if the user's institution was counterparty to the trade on the buy side, the phrase 'You bought' with the word 'You' in bold may be displayed. If the user's institution was the aggressor or if the user's institution was counterparty to the trade on the sell side, the phrase 'You sold' with the word 'You' in bold may be displayed if the user's institution was the aggressor. If the user's institution was not involved in the trade, and the execution was done via a bid being hit, the word 'Sold' may be displayed. If the user's institution was not involved in the trade, and the execution was done via an offer being lifted, the word 'Bought' may be displayed.

The trade message may also include the amount of the trade along with the relevant unit of size, a code for the denomination currency of the interest, and a short code for the relevant strategy for spreads and switches. Certain information may be shown for each interest leg, including, for example, an entity name for the leg, a debt class of the leg, a restructuring type code for the leg, the word 'Cnvt' if the leg applies to convertible debt, a maturity date of the leg in the user's default date format, and a '/' as a separator between legs if another interest leg is to follow.

The trade message may also include a price on the trade preceded by '@'. For up-front interests, the main price may be followed by a '%' sign and if there are running points, then a '+' followed by the running points may be displayed after the '%.' For spreads and switches, the differential price may be shown.

The trade message may also include a site code for the seller (in bold font if the seller was the aggressor), preceded by the word 'from' if the user is an internal user. For external users, if the user's institution was counterparty to the trade on the buy side, the word 'from' is displayed followed by the site code for the seller (in bold font if the seller was the aggressor). Otherwise, if the user's institution was counterparty to the trade on the sell side, the phrase 'to' followed by the site code for the buyer (in bold font if the buyer was the aggressor). External users may not be shown the counterparties on trades that do not involve their institution.

The trade messages may be displayed in red font to make them prominent. Un-posted executions may be excluded from the log for external users, unless their institution is a counterparty on the trade.

FIG. 3A shows exemplary trade message for internal and external users, in which for a particular trade execution, trade message 207*a* is displayed for internal users and one of trade message formats 207*b*-207*e* may be displayed for external users depending on the user's institution. In particular, trade message 207*b* may be displayed for an exemplary user at an exemplary JPML institution, trade message 207*c* may be displayed for an exemplary user at an exemplary CSFB institution, trade message 207*d* may be displayed for an exemplary user at an exemplary DEUT institution, and trade message 207*e* may be displayed for an exemplary user at an exemplary MERR institution.

The trade log display 207 may include a product view filter 210 and a customer/customer list filter 211 to further limit the content of the trade log. The product view filter 210 may be used to limit the trade log content to trades for entities within the selected product view/s, and the customer/customer list filter 211 may be used to limit the trade log to trades for a single company or site or to a predefined client list. By default, all the product views corresponding to the workspaces selected by the user is displayed and certain users may only limit the query to their own company or a site within their company.

Vertical resizing of the trade log window 207 may affect the price log window 208. In this regard, a single control may be provided for the vertical resizing of the two logs. Triangular arrow icons may be provided below the price sheet to expand/contract the trade and price logs 207, 208. The top row, showing the last action in the two logs may be visible even when the log is contracted to ensure that the user can always view the latest trade and price messages. Horizontal and vertical scroll bars will be provided to enable the user to view the contents of the log beyond what might be currently visible in the window. According to an exemplary embodiment, trades and prices may be combined in a single consolidated reverse chronological log window with the desired message formats, in which filtering, resizing, scrolling, and expand/contract icons may be optionally provided.

A price log 208 of all pricing-related activity during the user's session may be provided, for example, in a resizable window at the bottom right of the main application window. The price log 208 may show notification messages related to events, such as, for example, a refresh of reference data, the addition of one or more new entities, the addition of a new interest, a cancellation of a held interest, the addition of a new price via the Bid, Offer, or Price commands, a price update, and a price cancellation for each price that is removed via the Hold or Hold Interest commands, or as a result of the 'Hold Standing Orders,' or 'Hold Remaining Balance,' options on the Hit/Lift dialogs. Note, however, that a price that is removed by an execution may not generate a cancellation message. By default the display may be limited to pricing events within the workspaces that the user has selected.

The price log display 208 may include a product view filter 212 and a customer/customer list filter 213 to further limit the content of the price log display 208. The product view filter 212 may be used to limit log content to pricing events for entities within the selected product view(s), and the customer/customer list filters 213 may be used to limit log contents to pricing events for a single company or site, or to a predefined client list. By default, all the product views corresponding to the workspaces selected by the user may be displayed and certain users may only limit to their company or a site within their company.

The price log messages may appear in reverse chronological order with the most recent one at the top. Reference data refresh and new entity messages may not appear in the logs of external users. Additionally, external users may not see any messages related to un-posted interests or prices, and may not be shown the counterparties on orders.

FIG. 3B shows exemplary price messages for internal and external users. Whenever an order is added, updated or cancelled, an appropriate price message may be displayed. In particular, new orders may appear in bold green font, order updates may appear in normal green font, and order cancellations may appear in blue font. Each message may include a timestamp in hh:mm:ss format, a site code for the buyer, the term 'cancels bid' or 'cancels offer' when a price is cancelled, the word 'bids' or 'offers' when a price is added or updated, the amount of the order along with the relevant unit of size, a code for the denomination currency of the interest, and the short code for the relevant strategy for spreads and switches. Certain information may be displayed for each interest leg, including, for example, an entity name for the leg, a debt class of the leg, a restructuring type code for the leg, the word 'Cnvt' if the leg applies to convertible debt, a maturity date of the leg in the user's default date format, and a '/' as a separator between legs if another interest leg is to follow. The price on the bid/offer preceded by '@.' For up-front interests, the main price will be followed by a '%' sign and if there are running points, then a '+' followed by the running points will be displayed after the '%.'

Vertical resizing of the trade log may also affect the trade log window. In this regard, a single control may be provided for the vertical resizing of the two logs. Triangular arrow icons may be provided below the price sheet to expand/contract the trade and price logs. The top row, showing the last action in the two logs may be visible even when the log is contracted to ensure that the user can always view the latest trade and price messages. Horizontal and vertical scroll bars may be provided to enable the user to view the contents of the log beyond what might be currently visible in the window.

Figure 3C:
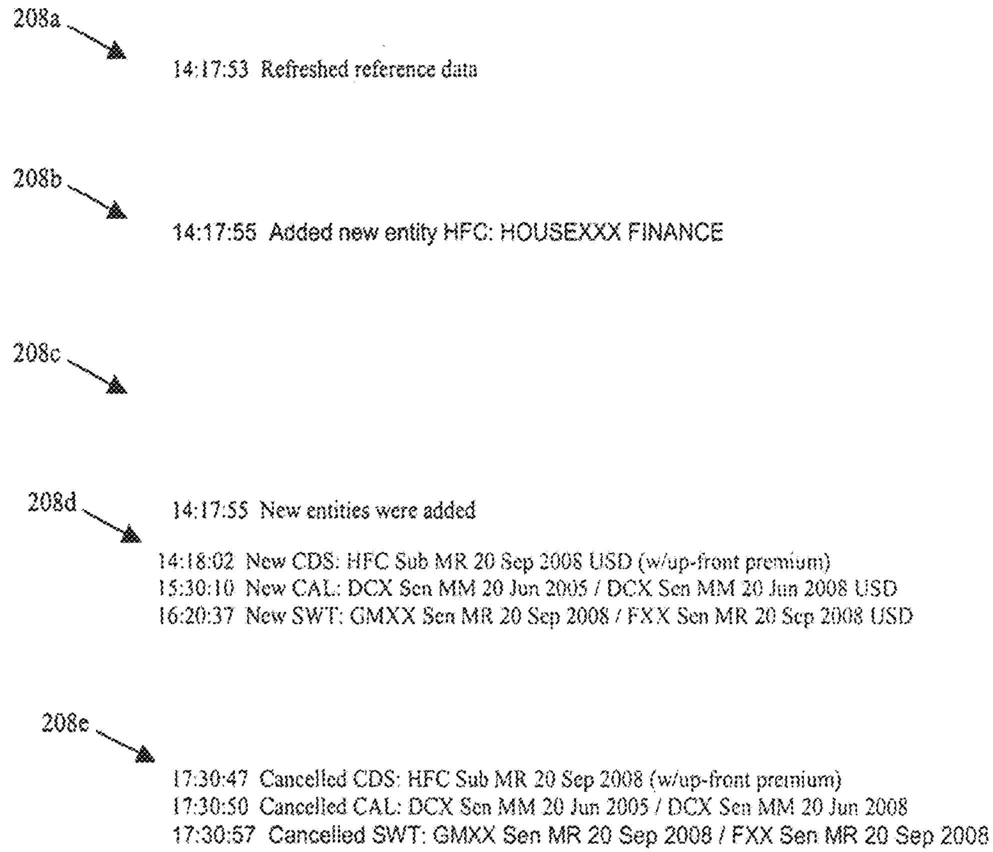
FIG. 3C shows exemplary price log messages.

FIG. 3C shows exemplary price log messages, including a reference data refresh message 208*a*, a new entity message 208*b*, a new entity message 208*c* as a result of a reference data refresh, new interest messages 208*d*, and interest cancellation messages 208*e*.

Reference data refresh and new entity messages may appear, for example, in black font. New entity messages may include a timestamp in hh:mm:ss format, the phrase 'Added new entity', a short name for the new entity followed by ':', and a full legal name of the entity.

New interest messages may appear in green font, and may include a timestamp in hh:mm:ss format, the word 'New', and a code for the structure type of the interest followed by a ':'. Certain information may be displayed for each interest leg, including, for example, an entity shortname for the leg, a debt class of the leg, a restructuring type code for the leg, the word 'Cnvt' if the leg applies to convertible debt, a maturity date of the leg in the user's default date format, and a '/' as a separator between legs if another interest leg is to follow. The new interest message may also include a code for the denomination currency of the interest and the phrase '(w/up-front premium)' if the interest is to be quoted with up-front premium.

Interest cancellation messages may appear in blue font, and may include a timestamp in hh:mm:ss format, a term 'Cancelled', and a code for the structure type of the interest followed by a ':'. Certain information may be displayed for each interest leg, including, for example, an entity shortname for the leg, a debt class of the leg, a restructuring type code for the leg, the word 'Cnvt' if the leg applies to convertible debt, the maturity date of the leg in the user's default date format, and a '/' as a separator between legs if another interest leg is to follow. The interest cancellation message may also include a code for the denomination currency of the interest and the phrase '(w/up-front premium)' if the cancelled interest was quoted with up-front premium.

Figure 8A:
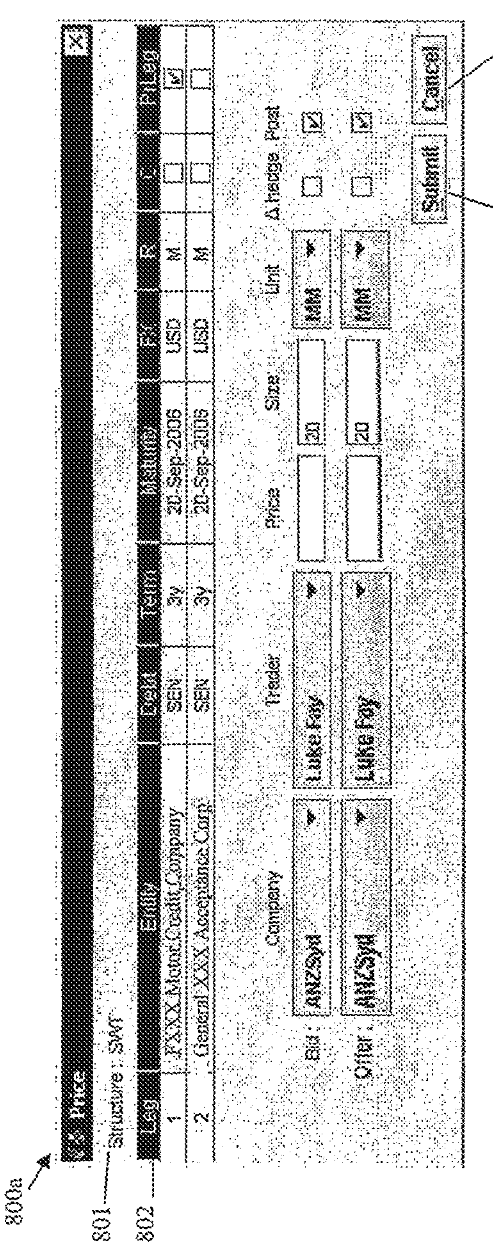
FIG. 8A shows an exemplary price entry display.
Figure 8B:
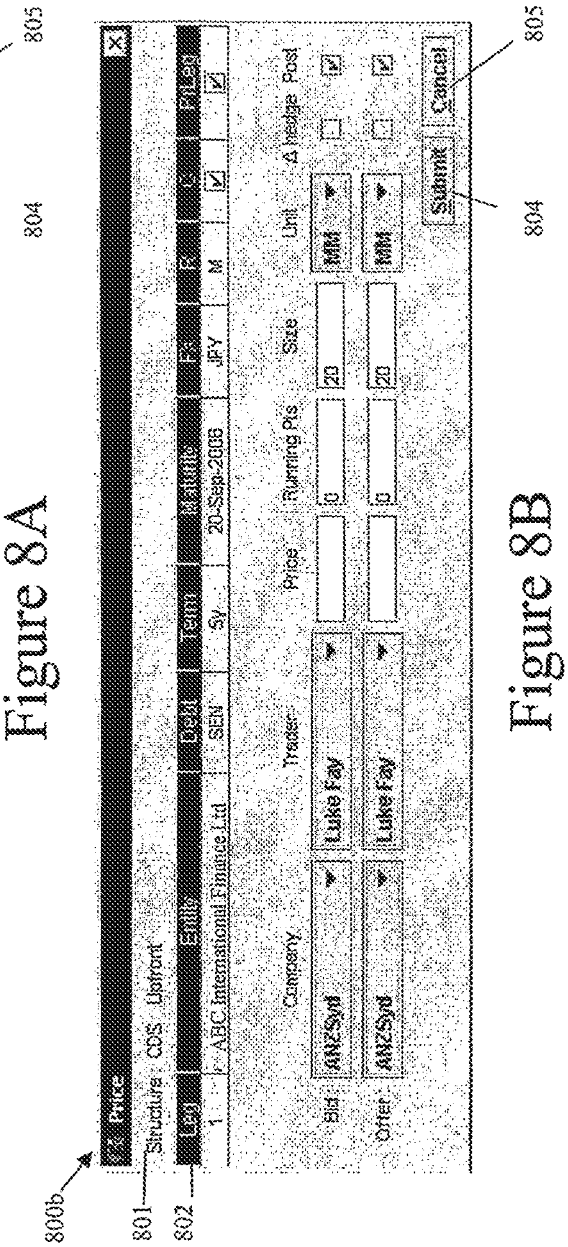
FIG. 8B shows another exemplary price entry display.

FIGS. 8A and 8B show exemplary price entry displays 800*a* and 800*b*. Authorized users may access this function for new order entry when positioned on an existing interest row by creating and submitting a new interest or by issuing a price command, selecting the price option on the price sheet mouse menu, activating hotkeys, such as, for example the P hotkey, the B hotkey (for Bid), O hotkey (for Offer), or Double-clicking on an empty cell on either the bid or offer side for the selected interest.

According to an exemplary embodiment, only certain users may enter prices. Authorized users, for example, may access this function for order modification when positioned on a quote or a price within a price sheet or the depth via the Update command button, the Update option on the price sheet mouse menu, the Update option on the depth mouse menu, the U hotkey, or Double-clicking on own bid or offer (for traders only).

Interest identification may be determined from the cell at which navigation originates for order entry. The relevant interest description may be displayed in the title bar of all dialog boxes. For spreads and switches, the description of the first leg may be followed by the description of the second leg with a '/' as the separator.

Only one Interest or Price entry screen may be activated at any given point in time. In this regard, the user may not have more than one order entry box open at the same time. The price dialog box may be automatically presented to the user upon creation of a new interest. The user may enter/update either a one-way or two-way order—i.e., a single bid or offer or prices on both sides. If the user selects the Company on the bid, the Company on the offer may default to the same. Similarly, the trader on the offer may default to the trader on the bid. Changes to the site on the offer should not affect the bid side.

If a two-way order is entered, the system may generate two separate orders—one for the bid and one for the offer. If invoked for update from an aggregated quote row within a price sheet, only the best bid and/or the best offer may be recalled for update. On an update, the user may modify the price or size of the order, as well as any conditions such as 'Delta hedge' or the posting status, and the trader but not the company site, broker, or any of the interest parameters. According to an exemplary embodiment, broker entry fields may not be provided or displayed within the price entry screens, however the primary broker who services the trader may be picked up automatically and saved on the order as well as any related execution/s. According to another exemplary embodiment, a broker entry field may be provided which defaults to the primary broker specified on the user profile for the selected trader. If there is no primary broker specified for the trader, the broker may default to the name of the user inputting the price.

The exemplary price entry displays 800*a* and 800*b* include a Structure field 801 to display an interest structure code. A "u" (for up-front premium) may appear as a subscript to the left of the structure code if applicable.

The exemplary price entry displays 800*a* and 800*b* also include interest legs description fields 802 (one row per structure leg) which default from the currently selected interest in the active price sheet and include, for example, a shortname of the Entity or reference credit, a class of debt for the underlying obligation, a term of the swap in years and months, a maturity populated for swaps specified with specific terms only, a denomination currency of the swap, a restructuring type for the swap, an indication whether or not the underlying obligation is a convertible, an indication for the premium leg on multi-legged structures, and other attributes that further define the interest.

The number of leg description rows displayed determines the structure type. For example, a single name default swap may be shown as a single row, calendar spreads and credit switches may each have two rows, and packages may be shown with 2 or more rows depending on the number of swaps in each. In particular, packages with more than 10 legs may be displayed 10 rows at a time with a scroll bar.

The price interest display 800*a* or 800*b* may include data entry rows 803 to create/update a bid and/or an offer for the interest. When this screen is accessed for order update, the details of the existing bid and/or offer may be recalled and displayed. The first row applies to the bid side, and the second to the offer side.

The data entry rows 803 may include, for example, a company field to select the relevant company site name from a drop-down list of all business sites for companies authorized to deal in the selected product (entity). According to an exemplary embodiment, the list may exclude the business sites that do not have any users authorized to deal in the product. The selection list may be sorted to show the broker's favorite clients at the top, followed by the remaining ones in alphabetical order.

The data entry rows 803 may also include a Trader field to select a name of the trader who quoted the price. According to an exemplary embodiment, the Trader field may be preset to the name of the default trader for the selected product (entity) and business site. If there is no default trader specified for the selected site and product, it may default to the first trader for the selected site in the user's client list, or in the absence of a client list, it may default to the first trader for the selected site. The broker may override the default by selecting another name from a drop-down list of traders within the selected business site who are entitled to deal in the selected product.

The data entry rows 803 may also include a Price field to specify an interest rate (for premium) expressed either in terms of basis points (for standard premiums), or as a percentage (for up-front premiums). The price may be required to be less than 10,000 basis points (i.e., 100%). In this regard, for interests with up-front premiums, the price may be required to be greater than zero and less than 100, and for standard premiums it should be greater than zero and less than 10,000.

The data entry rows 803 may also include a Running Points field that apply only when the interest is designated as having an up-front premium payment. If up-front premium payments are involved, there may also be running basis points that are paid periodically as with regular periodic payments on interests that do not involve an up-front premium. The running points may be required to be less than 10,000 basis points (i.e., 100%). Default setting may be zero. The Running Points field in some instance may not appear at all or may be protected from user input if the interest is not designated as having an up-front premium. Moreover, the variance on the entered price may be checked against the high and low price limits set at the product line and/or entity level. If the variance exceeds the relevant limit, a warning may be given, which the user may override if the price is legitimate (see order validation rules for further details).

The data entry rows 803 may also include an Amount or Order Size field to specify the amount of protection being bought or sold, and may be expressed in terms of the currency unit specified in the Unit field (the next described field). The Amount or Order Size field may be set to the default size for the product line, and may be overridden by the user.

The data entry rows 803 may also include a Unit field to specify to currency unit of the order amount. It may be pre-populated with the default currency unit from the user's site, but may also be overridden by the user to "MM" for millions or "B" for billions. The data entry rows 803 may also include a "Δ hedge" checkbox to indicate whether or not the quoted price involves a delta hedge component, which may apply to interests on sovereigns and emerging market names. By default it may be unchecked.

The data entry rows 803 may also include a Post checkbox to broadcast/release the price to the external marketplace and make it available for publication via market data services. If the Entity-Product Line default setting for this is blank, then this box may be checked by default, otherwise the product line default setting may apply. Regardless, a broker may override the default setting by checking or unchecking it.

The data entry rows 803 may also include a Broker field specifying the name of the broker responsible for the order. This field may default to the name of the primary broker specified on the user profile for the selected trader. If there is no primary broker specified for the trader, the broker may default to the name of the user inputting the price and may be overridden by selecting another broker name from a drop-down list of brokers.

The data entry rows 803 may also include one or more Descriptor fields depending upon the configuration of the product line and price displays. These fields may not be edited or validated, and may not be used for matching purposes or other processing. The data entry rows 803 may also include checkboxes for Order Conditions that specify certain optional conditions attached to the order. The number and type of conditions may be based on the product line definition.

The +/− icons may be provided for price and size fields to adjust the field up or down by the appropriate tick sizes stipulated in the product line definition. The maximum number of decimal places allowed for price and size input may be based on the product line definition. According to an exemplary embodiment, the cursor within the screen may be focused on the Bid company field for internal users, unless the screen was accessed via the 'O' hotkey for Offer, in which case the focus may go to the Offer company field. For external users, the focus may be on the bid price field, unless the screen was accessed via the 'O' hotkey for Offer, in which case the focus may go to the Offer price field.

A tabbing order may be provided as follows: Bid Company, Bid Price, Bid Running Points (only for up-front interests), Bid Amount, Offer Company, Offer Price, Offer Running Points (only for up-front interests), Offer Amount. The user may access the skipped fields by back-tabbing.

A Submit action button 804 or <Enter> key may be used to process the information entered/changed by the user, resulting in the creation of a new order or the updating of an existing order, and a Cancel action button 805 or the <Esc> key may be used to exit the screen without taking any action. In this instance, information entered by the user may be ignored.

Figure 9:
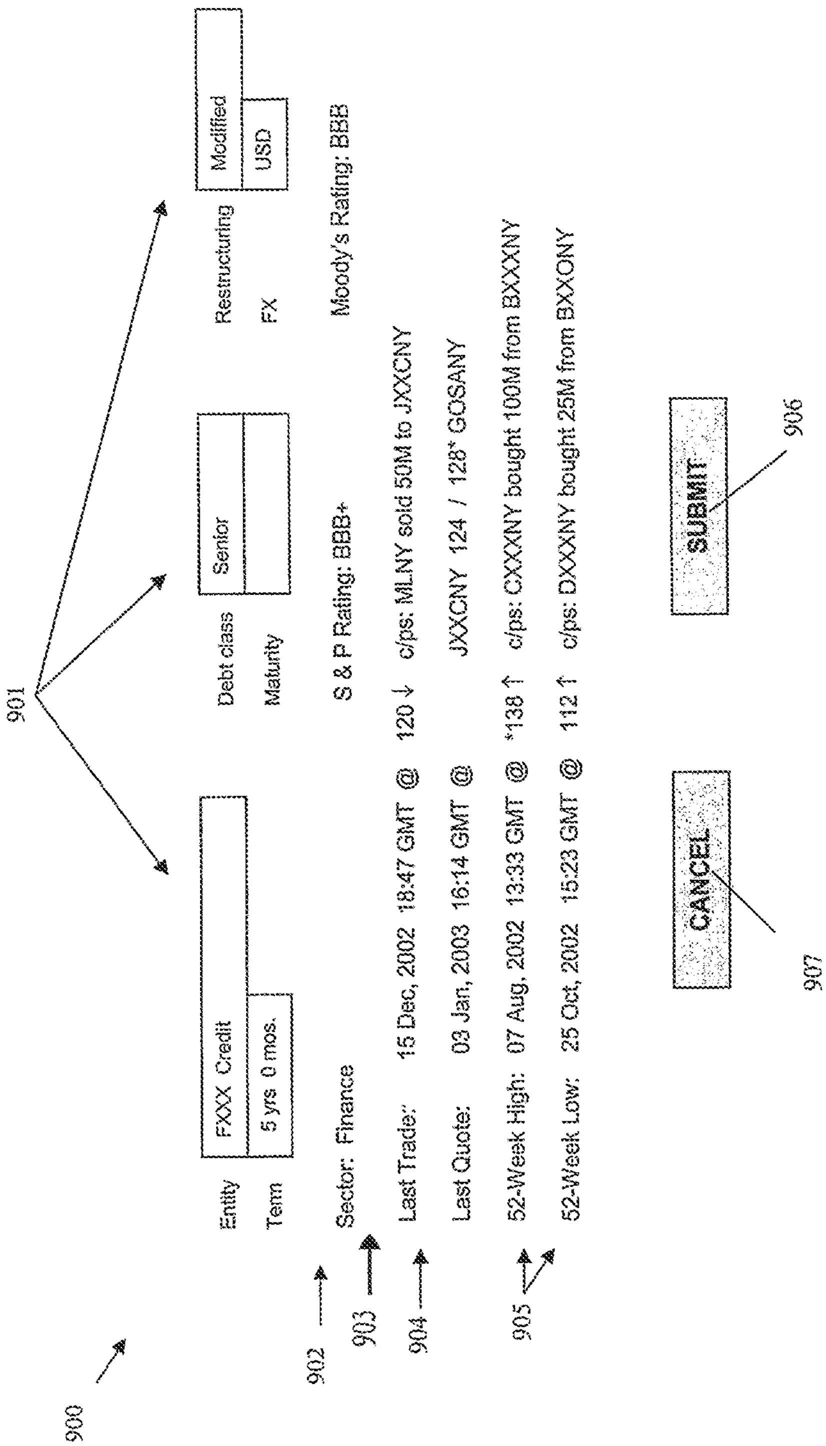
FIG. 9 shows an exemplary quick history popup.

FIG. 9 shows an exemplary quick history popup 900. The quick history function may or may not be part of the Trading system. However, it may be seamlessly accessible from the trading system. Authorized users may access the quick history function via the Quick History option on the View sub-menu or on the price sheet mouse menu, or via Q hotkey. If the user invokes this function when positioned on an existing price sheet row, it may be assumed that s/he wishes to run a quick history query for the selected interest. Therefore, an exemplary popup 900 may be presented with quick history results for the selected interest in which the query parameters may be pre-filled.

The exemplary quick history popup 900 may include query filters 901 to filter based on a desired entity name, debt class, restructuring type, term, maturity date, and a currency denomination.

The exemplary quick history popup 900 may include display fields 902 to display, for example, a primary industry sector, an S & P rating, and a Moody's rating for the selected entity. The display fields 904 may also include details 903 regarding the last quote for the selected interest, such as, for example, a date & time, bidding customer code, best bid, best offer, and a customer code offering. The display fields 904 may also include details regarding the last trade for the selected interest, such as, for example, a date & time, a last traded price, an up/down arrow indicating a lifted offer or hit bid, and an indication regarding an aggressor's action, site code(s) of the initiator or aggressor, or a size of the trade.

The exemplary quick history popup 900 may also include statistics 905 within a 52-week period or the past 1 year based on the current date. If there is no data available for any of the statistics within the past year, it may not be presented. An asterisk next to the 52-week high price or next to an offer price for the last quote indicates an un-posted price.

The exemplary quick history popup 1000 may include a Submit button 906 to process the query and a Cancel button 907 to terminate the query and exits the screen. In this regard, the <Enter> key may function as the Submit button 906 and the <Esc> key may function as the Cancel button 907.

Once initiated, the exemplary popup 900 may remain open until the user chooses to close it via the Cancel button 907 or the window close icon. The user may run other queries with different parameters using the Submit button 906.

Figure 10:
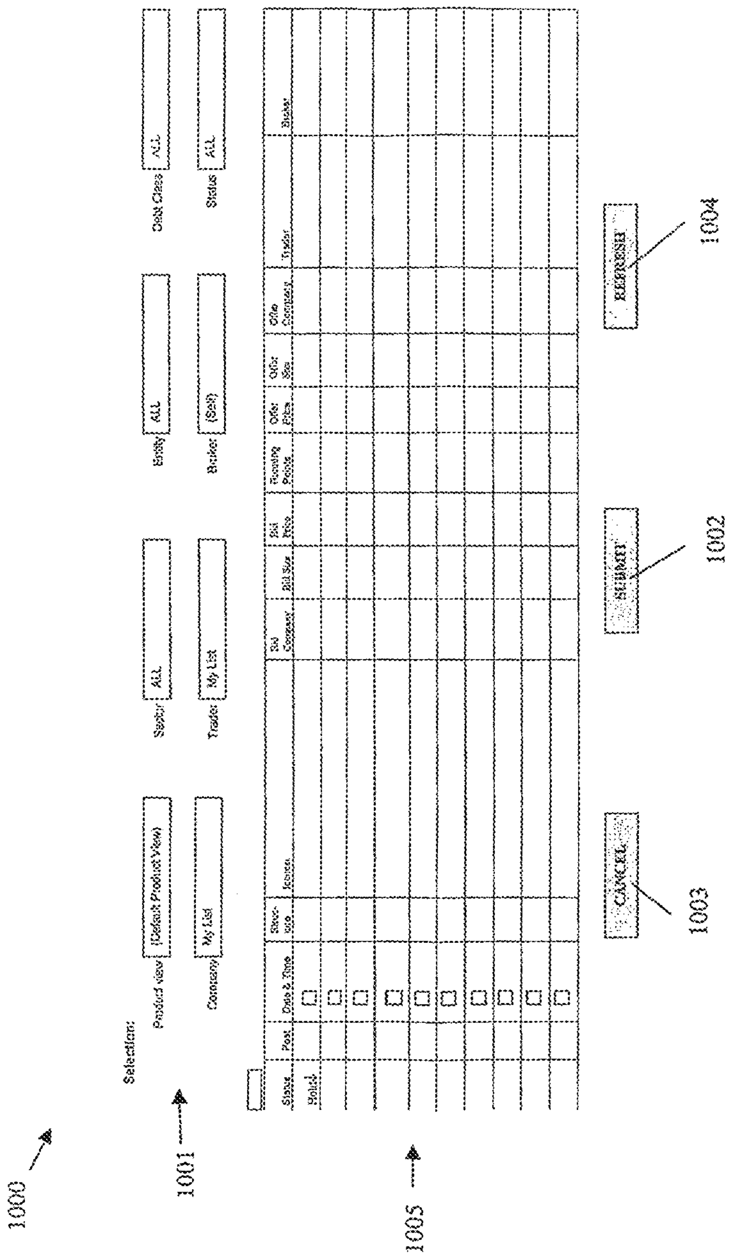
FIG. 10 shows an exemplary order book to view and manage open orders.

FIG. 10 shows an exemplary order book 1000 to view and manage open orders. Authorized users may access the exemplary order book 1000 via the Order Book option on the View sub-menu, the Order Book icon on the toolbar, or the <ctrl> O hotkey combination. According to an exemplary embodiment, users may view and deal with open (unexecuted) orders for all the entities (products) and interests that they are entitled to access. The query may be limited to a single entity or interest, for a single company site, trader, and/or broker. Alternately, a Product View filter may be applied for order selection. Access may be controlled by the user's role and entitlements. Certain users may be limited to viewing orders for their own company only.

By default a broker or a trader may be shown all of his/her own orders only. In particular, brokers may see all the orders for all the clients included on their defined client list. A single order/price may appear on each row, therefore either the bid columns (company, size and price), or the offer columns (price, size and company) may be blank. Users with the appropriate authority may edit and delete orders, as well as change the order status.

The status, price, amount and trader associated with an order may be edited. However, the remaining order information may not be changed. Edited fields on each row may be highlighted via a different background. Multi-legged interests may be displayed on two or more rows. However, most of the parameters may be concatenated into a single string for display to conserve space. When a price on a held interest is firmed, then the interest itself may also be reactivated and moved to the relevant price sheet/s with the price. Selected orders may be transferred from one trader to another trader within the same company.

Order selection filters 1001 may be provided to limit the selection of orders according to product, sector, entity, debt class, company site, trader, broker, desk, and order status. The orders may be sorted according to chronological order by entry/update status, structure, entity, bid class, offer, trader, company site, and broker.

A Submit button 1002 or the <Enter> key may be used to process the query or the actions selected on each row when the user is in edit mode. A Cancel button 1003 or the <Esc> key may be used to exit the screen without taking any action. In this case any information entered by the user may be ignored. A Refresh button 1004 may be used to process/refresh the query, which may result in the loss of any unsubmitted changes entered by the user—a warning may be provided in this case, giving the user the option to proceed or cancel.

The exemplary order book 1000 may include a status field to indicate the desired status on each row that is enabled for editing. The changes may take effect upon pressing the SUBMIT button 1002. A master status may be selected above this column to apply the same status to each row below. When no master status is selected, the system may display the order's current status. The user may then override the status on individual editable rows as needed. The status may be set to, for example, "Hold" to hold the selected firm posted or unposted order, "Firm" to change the order status from held to firm, "Delete" to permanently delete the selected order, or "Transfer" to mark the selected order for transfer.

The exemplary order book 1000 may also include a post field to broadcast/release an un-posted price to the external market place and make it available for publication via market data services, or withdraw a posted price from the market.

The exemplary order book 1000 may also include timestamp to indicate when the order was last updated, a code indicating the structure, and a concatenated interest description. Multi-legged interests may be displayed.

The exemplary order book 1000 may also include the site of the trader on the bid side, the amount of the bid and the currency unit that it is expressed in, the non-up-front bid in basis points, or the up-front premium in percentage, and the running points for up-front quotes.

The exemplary order book 1000 may also include the non-up-front offer in basis points, or the up-front premium in percentage, the size of the offer and the currency unit that it is expressed in, the site of the trader on the offer side, the id of the trader associated with the order, and the id name of the broker who is responsible for the order.

The Trader's Eye function may enable users with the appropriate permissions, such as, for example, brokers and managers, to temporarily assume the identity of a trader and view the market from that trader's perspective. In this regard, the user may view the market as the selected trader would view it. For example, prices that are restricted to the selected trader, may show up as credit-restricted for the user as well. Users with the appropriate permissions may also act on behalf of that trader.

The Trader Eye function may be activated via the menu bar, the toolbar Eye icon, or the <Ctrl>E hotkey combination. When invoked, the user may be presented with an option to assume a trader id from a drop-down list, which may be limited to the traders a user is entitled to work with. The Cancel key exits the function without any action and the Return key allows the user to resume their own identity.

To remind the user that they have assumed another identity, the assumed trader's id may be displayed via a prominent icon at the top of the main application page, in between the Main Menu and the user's own login id. When a user has invoked the identity of a trader, any actions performed by him with respect to order management or execution may be attributed to the selected trader. When the user is a broker, his own id may still be assigned to the broker field on transactions. For brokers, the selected trader's company site and name may be pre-populated within the various screens—e.g., Bid/Offer, Hit/Lift, etc. Certain users may see both customer and rank information in the Cust/Rank column on price sheets.

The End-Of-Day Roll function may run automatically at a designated time after the end of the trading day, and may handle firm orders that are left active, and also held orders that are more than one business day old. The End-Of-Day Roll function may, for example, hold all firm prices (posted and un-posted), hold all interests with firm or held prices for the current date, delete all held prices with a time stamp earlier than the current date (the trading day that just ended), and delete all held interests with no prices for the current date. In this regard, prices from different sites may be processed together (such as, for example, prices from the NY and London sites), or they may be handled separately (such as, for example, the prices from the Hong Kong and Sydney sites). According to an exemplary embodiment, held prices and interests may be firmed up the next day via the order book. In some instances, this may require rolling forward the maturity date for fixed term interests.

Figure 11A:
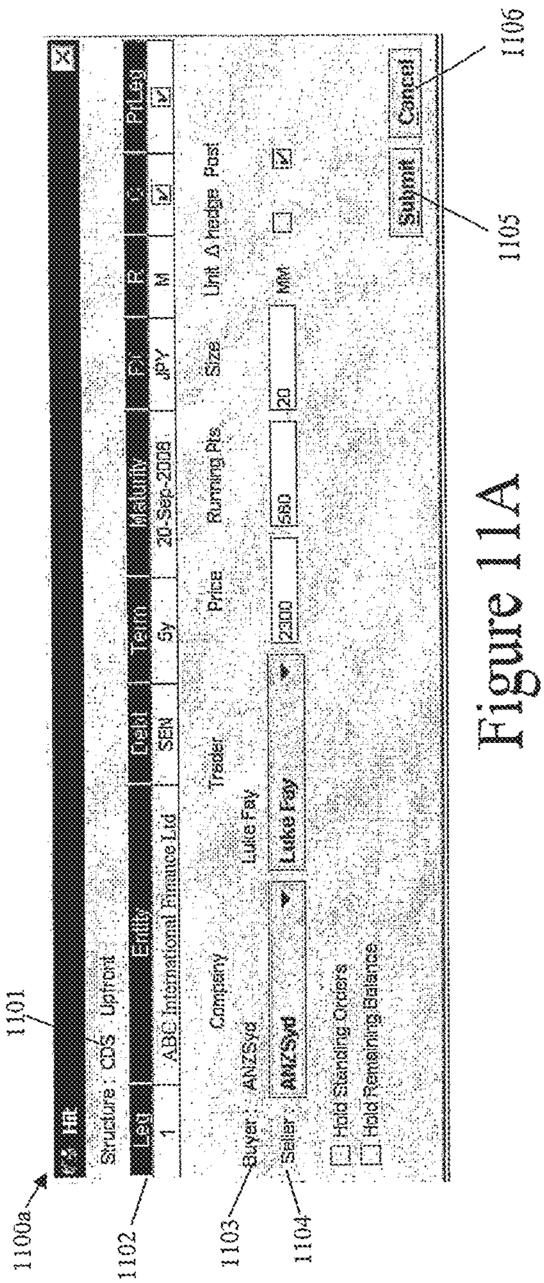
FIG. 11A shows an exemplary hit entry display that permits users to sell by "hitting" a firm bid.
Figure 11B:
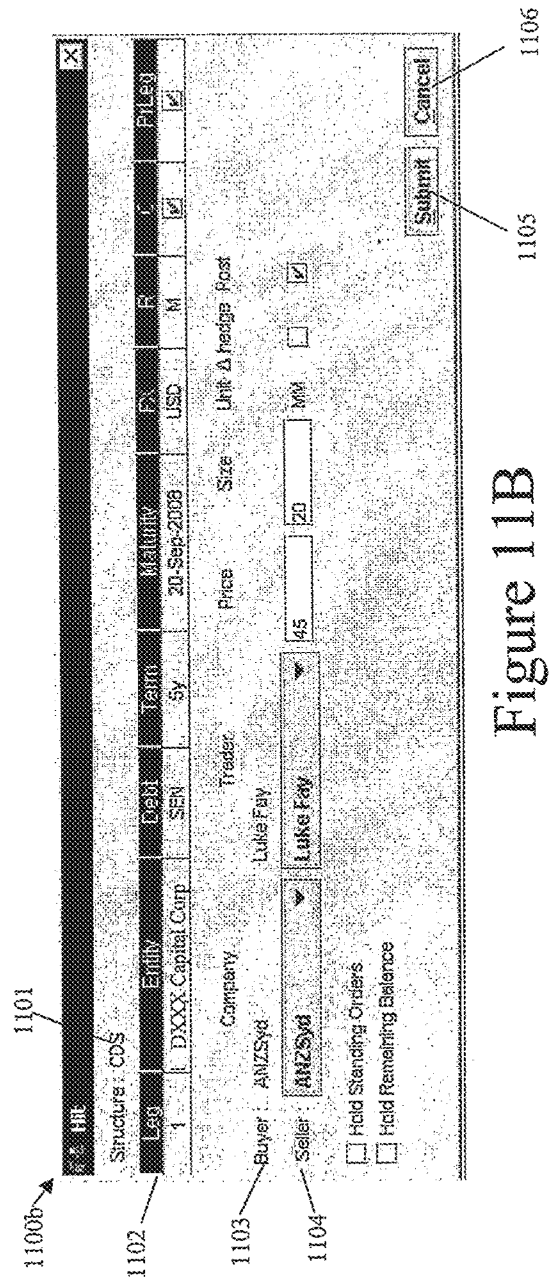
FIG. 11B shows another exemplary hit entry display that permits users to sell by "hitting" a firm bid.

FIGS. 11A and 11B show exemplary Hit entry displays 1100*a* and 1100*b* that permit users to sell by "hitting" a firm bid. An appropriately authorized user may access the exemplary Hit entry displays 1100*a* and 1100*b* after selecting a firm bid within a price sheet or depth display. In particular, the user may access the exemplary hit entry displays 1100*a* and 1100*b* via the Hit command button, the Hit option on the price sheet mouse menu, the Hit option on the depth mouse menu, the H hotkey, or double-clicking on the bid. According to an exemplary embodiment, internal users may have access to this function, and it may be disabled for external users. Also, the user may not be allowed to have more than one Hit, Lift or Off-screen Trade entry box open at the same time so that only a single execution screen per user may be open at any point in time. If the focus is not on either the price, size or customer cell of a particular bid when the Hit entry function is invoked, then the best firm bid for the interest on the relevant price sheet row may be selected for execution. The default execution mode is "Deal By Price" and therefore the sale price and size and default to those of the selected bid. For aggregated offers, the size may be set to the total available (aggregated size).

The +/− icons may be provided for all size fields to adjust each field up or down by the appropriate tick sizes stipulated in the product line definition. On initial presentation, the cursor within the screen may be focused on the Seller company field. The user may adjust the size up or down to sell a quantity greater than or less than that currently bid. When the order is partially executed, the balance of that order may remain open unless the user indicates that it should be held. Brokers may also adjust the price on the execution up or down. In this case, the original order price may be updated before the execution is processed. The user may bypass the best bid and execute against a worse bid in the depth provided that the product line allows for this. According to an exemplary embodiment, broker entry fields may not be provided or displayed within the execution entry screens. However, the names of the primary brokers who service the traders on either side of the trade may be picked up automatically and saved on the execution record. According to another exemplary embodiment, a broker entry field may be provided for the aggressing side, and it may default to the primary broker specified on the user profile for the trader on that side. If there is no primary broker specified for the aggressing trader, the broker may default to the name of the user inputting the price. The execution may be assigned a pending status.

The exemplary Hit entry displays 1100*a* and 1100*b* may include an interest structure code 1101, in which a "u" (for up-front premium) may appear as a subscript to the left of the structure code when applicable. The exemplary Hit entry displays 1100*a* and 1100*b* may also include one or more rows of interest legs description fields 1102, which describe each leg of the selected interest. The number of rows displayed may be determined by the structure. For example, a single name default swap may be shown as a single row, and calendar spreads or credit switches may each have two rows. The interest legs description fields 1102 may include a short name of the entity or reference credit, a class of debt for the underlying obligation, the term of the swap in years and months, a maturity populated for swaps specified with specific terms only, a denomination currency of the swap, a restructuring type for the swap, and an indication of whether or not the underlying obligation is a convertible. The interest legs description fields 1102 may also include optional attributes having an attribute label and an attribute value. The attribute label may be stipulated in the product line definition and the attribute value may default to the value of the appropriate column in the currently selected price sheet row or may be left blank if no value is assigned. Based on the attribute definition, the user may be required to provide a value of the appropriate type or select a valid entry from a drop-down list. An exemplary attribute may include a strike for options.

The exemplary Hit entry displays 1100*a* and 1100*b* may also include data rows 1103 and 1104 showing the details of the selected price. The top row 1103 shows the buy side information, and the bottom row 1104 shows the sell side information. The common fields related to the transaction details such as the price and size may appear once, and may be centered between the two rows. The buy side information of the top row 1103 may include the company site and trader id for the selected bid. The sell side information of the bottom row 1104 may include a drop-down menu to select the sell side company site name from a list of all business sites authorized to deal in the selected entity. According to an exemplary embodiment, the list may include other business sites as well or the list or the list may be sorted with a user's favorite clients listed first. The sell side information may also include a drop-down menu to select the name of the trader who hit the bid from a list of traders within the selected business site who are entitled to deal in the selected product. The sell side information may also include fields to input a price, running points if the selected interest is designated has having an up-front payment, and an order size of the amount to be sold expressed in terms of a currency unit specified in the adjacent Unit field. The order size may be changed to reflect a partial execution. The sell side information may also include a "A hedge" checkbox to indicate whether or not the trade involves a delta hedge, which may apply, for example, to trades on sovereigns and emerging market names. The sell side information may also include a post checkbox to broadcast/release the trade to the external marketplace and make it available for publication via market data services. It may default from the selected bid, but the broker may override the default setting by checking or unchecking it. The sell side information may also include a name field of the broker responsible for the execution, descriptor fields, and checkboxes to hold remaining orders, hold standing orders, or confirm executions.

The Submit button 1105 or the <Enter> key may be used to initiate execution of the selected offer(s). The Cancel button 1106 or <Esc> key may be used to exit the exemplary Hit entry displays 1100*a* and 1100*b* without taking any action.

Figure 12A:
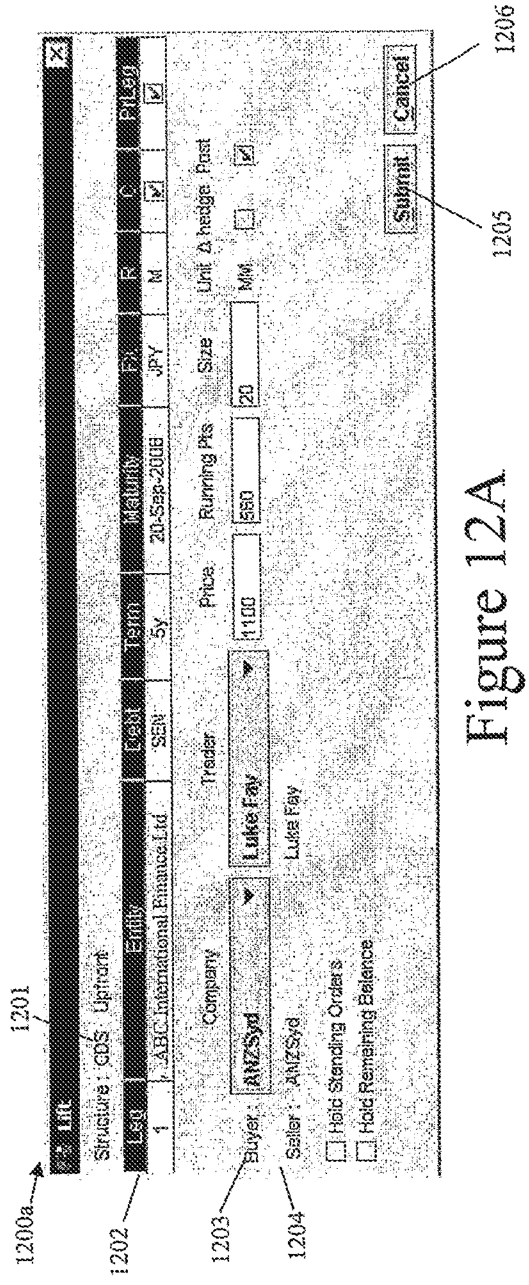
FIG. 12A shows an exemplary lift entry display to lift a firm offer.
Figure 12B:
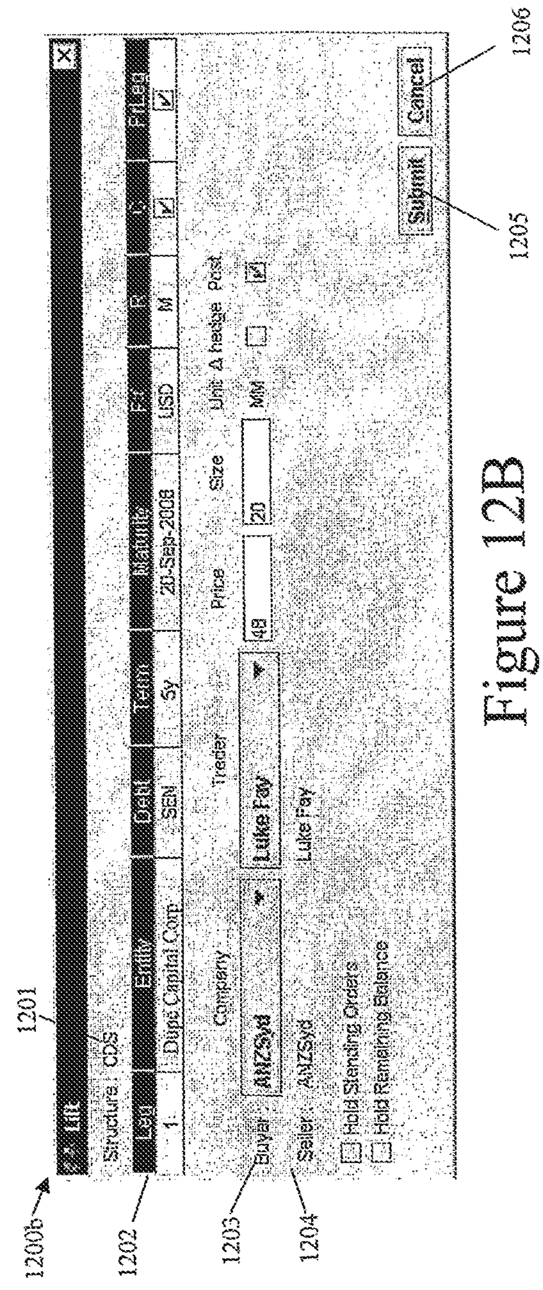
FIG. 12B shows another exemplary lift entry display to lift a firm offer.
Figure 13A:
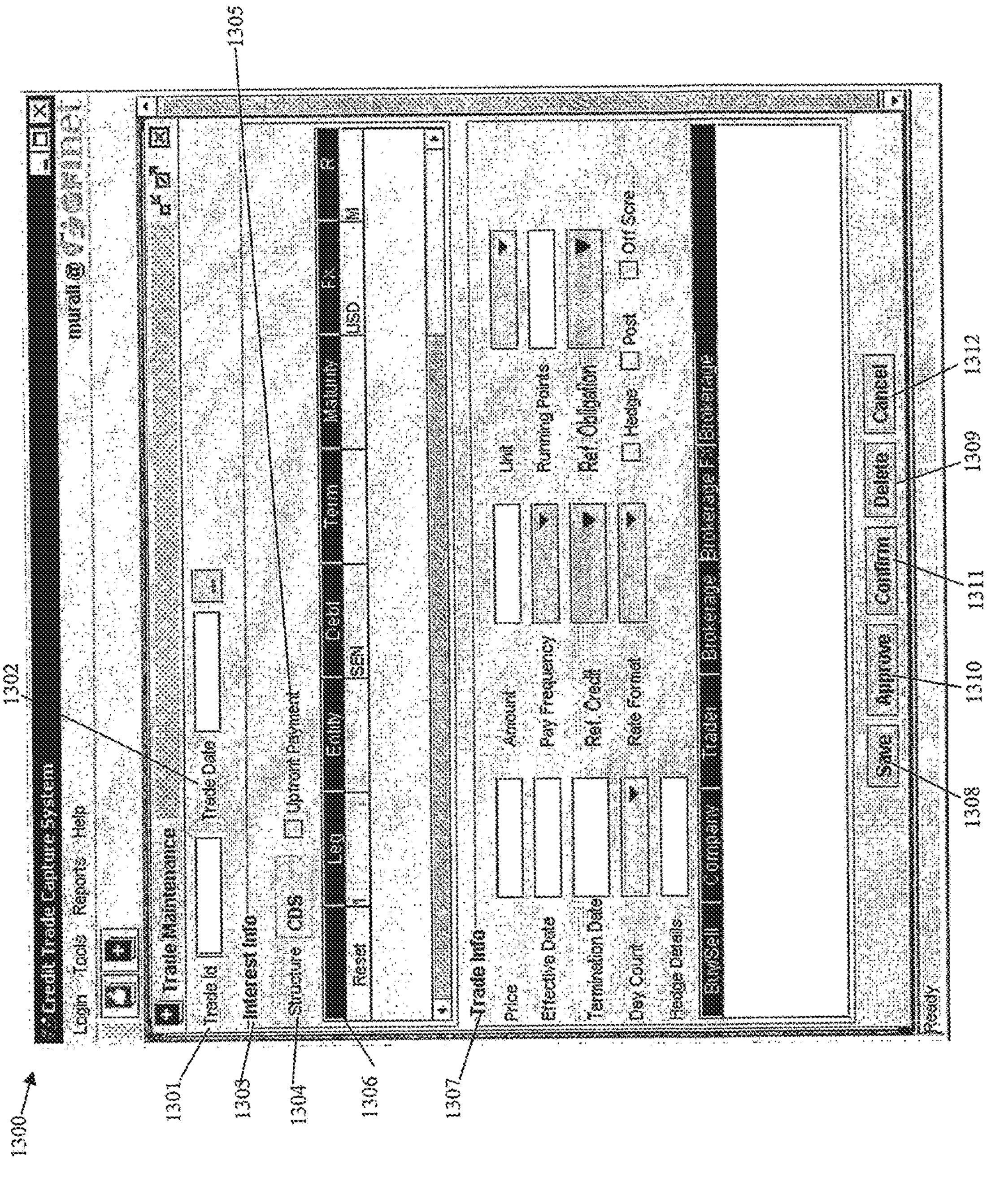
FIG. 13A shows an exemplary trade maintenance display to enter new off-screen or voice-brokered trades, to modify or delete existing trades, complete the trade details, and approve existing trades for confirmation.
Figure 13B:
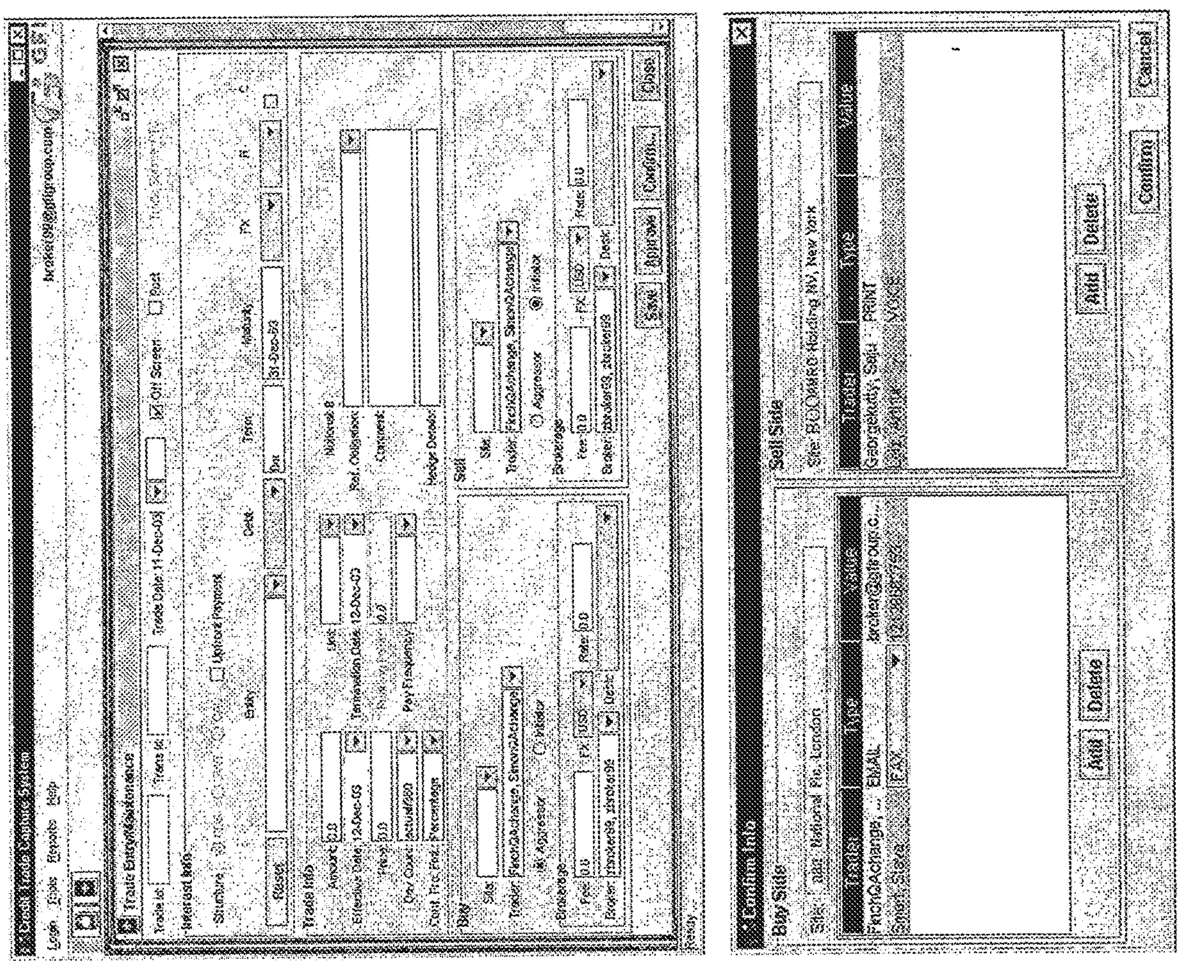
FIG. 13B shows another exemplary trade maintenance display and associated confirm information display.
Figure 13C:
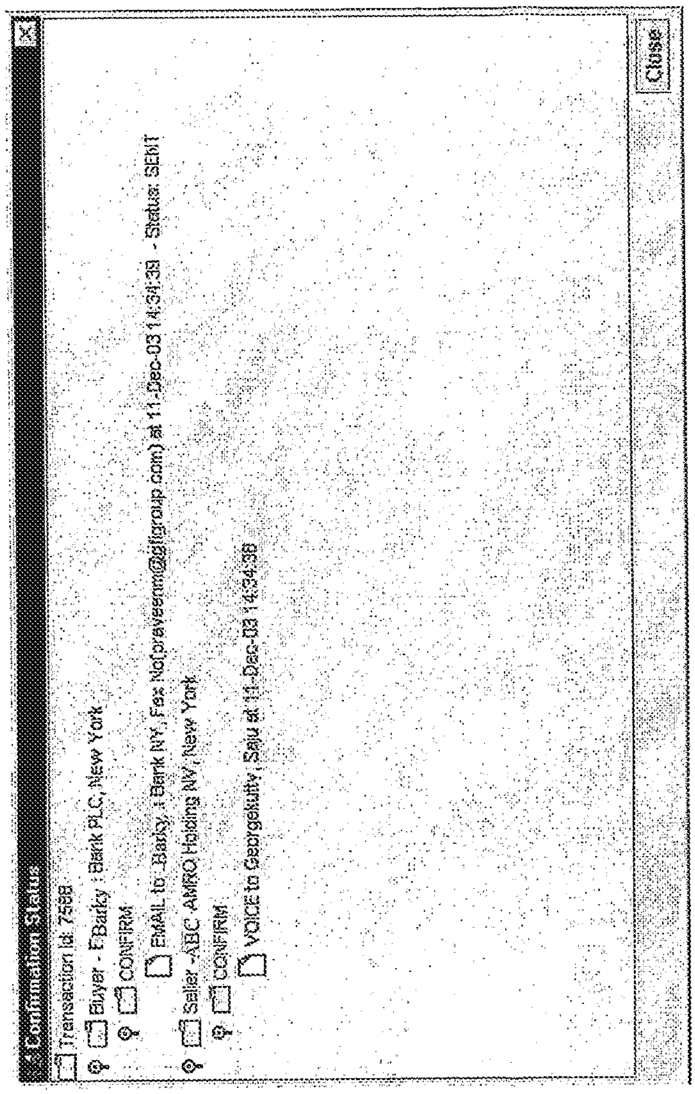
FIG. 13C shows an exemplary confirmation status display.
Figure 13D:
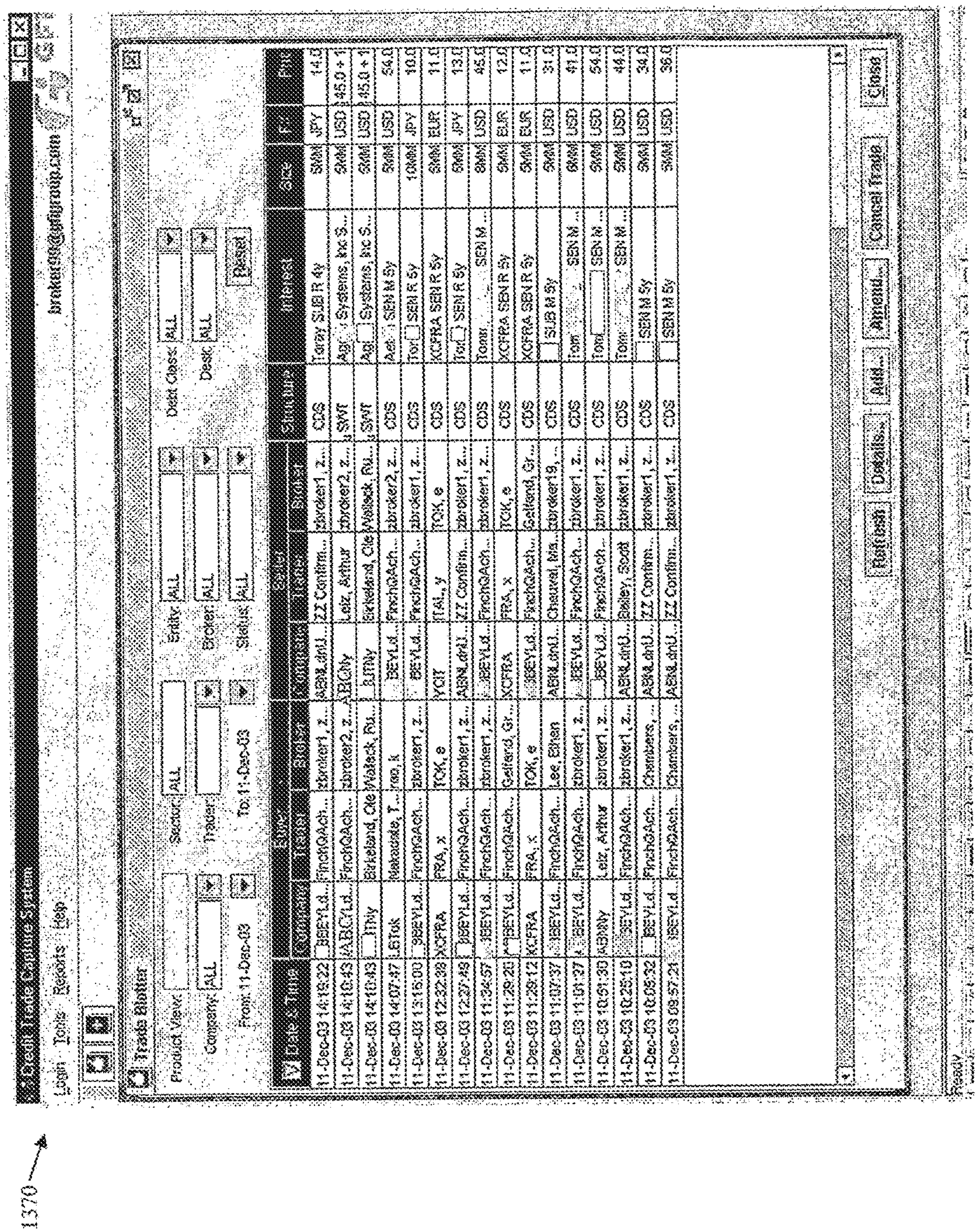
FIG. 13D shows an exemplary trade blotter display listing details for each side of each transaction for a single date or over a date range.

FIGS. 12A and 12B show exemplary lift entry displays 1200*a* and 1200*b* to lift a firm offer. An appropriately authorized user may access the exemplary lift entry displays 1200*a* and 1200*b* after selecting a firm offer within a price sheet or depth display. In particular, the user may access exemplary lift entry displays 1200*a* and 1200*b* via the Lift command button, the Lift option on the price sheet or depth mouse menu, the L hotkey, or double clicking on the offer. According to an exemplary embodiment, only certain user may access to the lift entry display. Also, the user may not be allowed to have more than one Hit, Lift or Off-screen Trade entry box open at the same time so that only a single execution screen may be open at any point in time. If the focus is not on either the price, size or customer cell of a particular offer when this function is invoked, then the best firm offer for the interest on the relevant price sheet row may be selected for execution.

The default execution mode may be "Deal By Price", therefore the purchase price and size may default to those of the selected offer. For aggregated offers, the size may be set to the total available (aggregated size). The +/− icons may be provided for all size fields to adjust each field up or down by the appropriate tick sizes stipulated in the product line definition. On initial presentation, the cursor within the screen may be focused on the Buyer company field. The user may adjust the size up or down to buy a quantity greater than or less than that being offered. When the order is partially executed, the balance of that order may remain open unless the user indicates that it should be held. The user may also adjust the price on the execution up or down. In this instance, the original order price may be updated before the execution is processed. The user may bypass the best offer and execute against a worse offer in the depth provided that the product line allows for this. According to an exemplary embodiment, broker entry fields may not be provided or displayed within the execution entry screens. However, the names of the primary brokers who service the traders on either side of the trade may be picked up automatically and saved on the execution record. According to another exemplary embodiment, a broker entry field may be provided for the aggressing side, and may default to the primary broker specified on the user profile for the trader on that side. If there is no primary broker specified for the aggressing trader, the broker may default to the name of the user inputting the price. The execution will be assigned a pending status.

The exemplary lift entry displays 1200$a$ and 1200$b$ may include an interest structure code 1201, in which a "u" (for up-front premium) may appear as a subscript to the left of the structure code when applicable. The exemplary lift entry displays 1200$a$ and 1200$b$ may also include one or more rows of interest description fields 1202, which describe each leg of the selected interest. The number of rows displayed may be determined by the structure. For example, a single name default swap may be shown as a single row or calendar spreads and credit switches may each have two rows. The interest description fields 1202 may include fields similar to the interest description fields 1102 of the exemplary Hit entry displays 1100$a$ and 1100$b$.

The exemplary lift entry displays 1200$a$ and 1200$b$ may also include data rows 1203 and 1204 showing the details of the selected price. The top row 1203 may show the Buy side information, and the bottom row 1204 may show the Sell side. The common fields related to the transaction details such as the price and size appear once, and may be centered between the two rows.

The Submit button 1205 or the <Enter> key may be used to execute the selected offer(s). The Cancel button or the <Esc> key may be used to exit the screen without taking any action. FIG. 13 shows an exemplary trade maintenance display 1300 to enter new off-screen or voice-brokered trades, to modify or cancel existing trades, complete the trade details, and approve existing trades for confirmation. The exemplary trade maintenance display 1300 may be accessed via the Trade Maintenance option on the Actions sub-menu, the Amend option on the trade book mouse menu, the Delete option on the trade book mouse menu, the Add option on the trade book mouse menu, the T hotkey, or by double-clicking on an execution in the trade book. According to an exemplary embodiment, internal users may have access to this function, and external users may only transfer here from the trade book via a double-click in order to view the details on one of their own approved or confirmed transactions. In this instance, certain data fields may be hidden from the external user's view.

The exemplary trade maintenance display 1300 may not reside in the trading system, but may be seamlessly accessible from there. The user may not be allowed to have more than one Hit, Lift or Trade Maintenance box open at the same time so that only a single execution screen may be open at any point in time. The user may also be required to define both the interest and record its execution. According to an exemplary embodiment, users may be limited to adding and editing transactions for single CDSs only, therefore for spreads and switches, each leg (transaction) may be required to be entered/edited separately. If the user accesses the exemplary trade maintenance display 1300 via the Add option on the trade book, the interest details on the trade maintenance screen may be pre-populated from the interest on the selected trade book row. The user may then either use that pre-defined interest, or use it as a template to create a new one by overriding one or more of the details. When the user creates a new interest in the exemplary trade maintenance display 1300, the system may need to check if the newly defined interest already exists in the database, and if so, then the existing definition may be required to be used without giving any error or warning message to the user.

In addition to the basic execution information, authorized users may also fill in the additional trade details such as brokerage, reference obligations, etc. that are required for trade approval and confirmation. When the exemplary trade maintenance display 1300 is invoked from a non-blank row in the trade book, it may be assumed that the user wants to maintain the transaction displayed on that row, therefore the screen may be pre-populated with that transaction. In other instances, a blank screen may be displayed. According to an exemplary embodiment, changing the counterparties on a confirmed trade may not be permitted so that the user may need to delete the existing transaction and create a new one with the correct counterparties. According to another exemplary embodiment, counterparties on confirmed trades may be provided.

A new trade may also be entered by selecting a row, which becomes a template for the new trade to be entered. The details of the old trade may be displayed, and a new trade may be entered with the same details or with changed details. For example, if the price is different from the template, but the other details are the same as the template trade, then the user may just change the price appropriately and the new trade is saved.

When a trade is selected for deletion the user may be asked to confirm his/her intention via a popup (see delete action below). When this screen is accessed via the Delete mouse menu option of the trade book, the selected trade may be displayed along with the confirmation popup. When the user selects the exemplary trade maintenance display 1300 from a non-blank row in a price sheet, the screen may be pre-populated with the definition of the interest on the selected price sheet row. The user may then alter any of the structure details to create a new interest, which may be desired when the new interest is similar to the selected one, or when the user wishes to record an off-screen voice brokered trade for the existing interest. If the entity for the new interest doesn't already exist, a new entity may be set up with minimal data by an authorized user.

A flag may be used to indicate whether the trade is an off-screen trade. Off-screen trades may not be broadcast (flashed) within CTS price sheets except to those brokers and traders who are involved in the trade. According to an exemplary embodiment, any trades entered via this function may not be broadcast within CTS price sheets.

The +/− icons may be provided for all price and size fields to enable the user to adjust each up or down by the appropriate tick sizes stipulated in the product line definition. The maximum number of decimal places allowed for price and size input may be based on the product line definition. On initial presentation, the cursor may be focused depending on how the exemplary trade maintenance display 1300 is invoked.

Newly entered trades may be assigned a status of pending. If the confirmed trade is amended, then the trade is automatically reconfirmed.

Trade Maintenance

The exemplary trade maintenance display 1300 includes trade or transaction identifier 1301 that uniquely identifies the trade or transaction and may be automatically assigned. When the user accesses the screen from a non-blank row in the trade book, the trade id 1301 for the selected transaction may be displayed. The trade id 1301 may be hidden for certain users.

The exemplary trade maintenance display 1300 includes a trade date 1302 specifying a date and time when the trade was executed, which may default to the current date and time, although the user may override the default with an earlier date and time.

The system may maintain an audit trail of all amendments and status changes for trades along with a timestamp for each action.

The exemplary trade maintenance display 1300 includes interest information 1303, which includes a structure code 1304, an up front premium or payment checkbox 1305, and interest legs description fields 1306 for a Reset indication, an Entity name, a debt class, a term, a maturity, a denomination currency, a restructuring type, a convertibility indication, a premium leg indication, a payment term, and other optional attributes.

The exemplary trade maintenance display 1300 includes trade information 1307, which may include a field to specify an interest or price (for premium) expressed either in terms of basis points (for standard premiums), or as a percentage (for up-front premiums). On spreads and switches executed via CTS, the price on each leg may be set to the differential price on the execution, and may be overridden with the correct price for the leg.

The trade information 1307 may also include fields to specify running points, an order amount or size, a currency unit for the specified order amount, an effective date of the trade, a Payment Frequency (e.g., M for monthly payment, Q for quarterly payment, S for semi-annual payment, A for annual payment), a checkbox to indicate whether or not the trade involves a delta hedge, a checkbox to broadcast/release the trade to the external market place and make it available for publication via market data services, descriptor fields, checkboxes for optional conditions attached to the execution, a flag to indicate whether or not the execution represents an off-screen trade, a termination date of the default protection, which may be calculated using the effective date plus the term of the swap trade, and a reference obligation in the event of a credit event, which may be specified by the entity name, the annual coupon percentage, a maturity date, an ISIN number, a CUSIP number, or a first coupon payment date.

The trade information 1307 may also include fields that specify billing information, a brokerage fee or rate, a broker name and desk, an override indication, hedge details, day count method, a premium rate format, the buyer's company site name, the name of the trader on the buyer's side, an indication of whether the buyer is an aggressor or initiator of the trade, the seller's company site name, the name of the trader on the seller's side, and a comment field. According to an exemplary embodiment, changing the counterparties on a confirmed trade may not be permitted so that the user may be required to delete the existing transaction and create a new one with the correct counterparties. According to another exemplary embodiment, the counterparties may be changed.

The exemplary trade maintenance display 1300 includes a Save button 1308 to process the information entered/changed by the user, resulting in the creation of a new trade or the updating of an existing trade, a Delete button 1309 to delete the selected trade, an Approve button 1310 to process and save new or modified data submitted by the user and then approve the trade for confirmation, a Confirm button 1311 to process and save new or modified data submitted by the user, approve the trade, and then transfer to the confirmation setup screen for the generation or transmission of confirmations, where the user may override the default confirmation delivery information for the trade, a Resend button to confirm a previously confirmed trade, and a Cancel button 1312 to exit the screen without taking any action. Some buttons may be disabled or hidden from external users.

Trade Book

Figure 14:
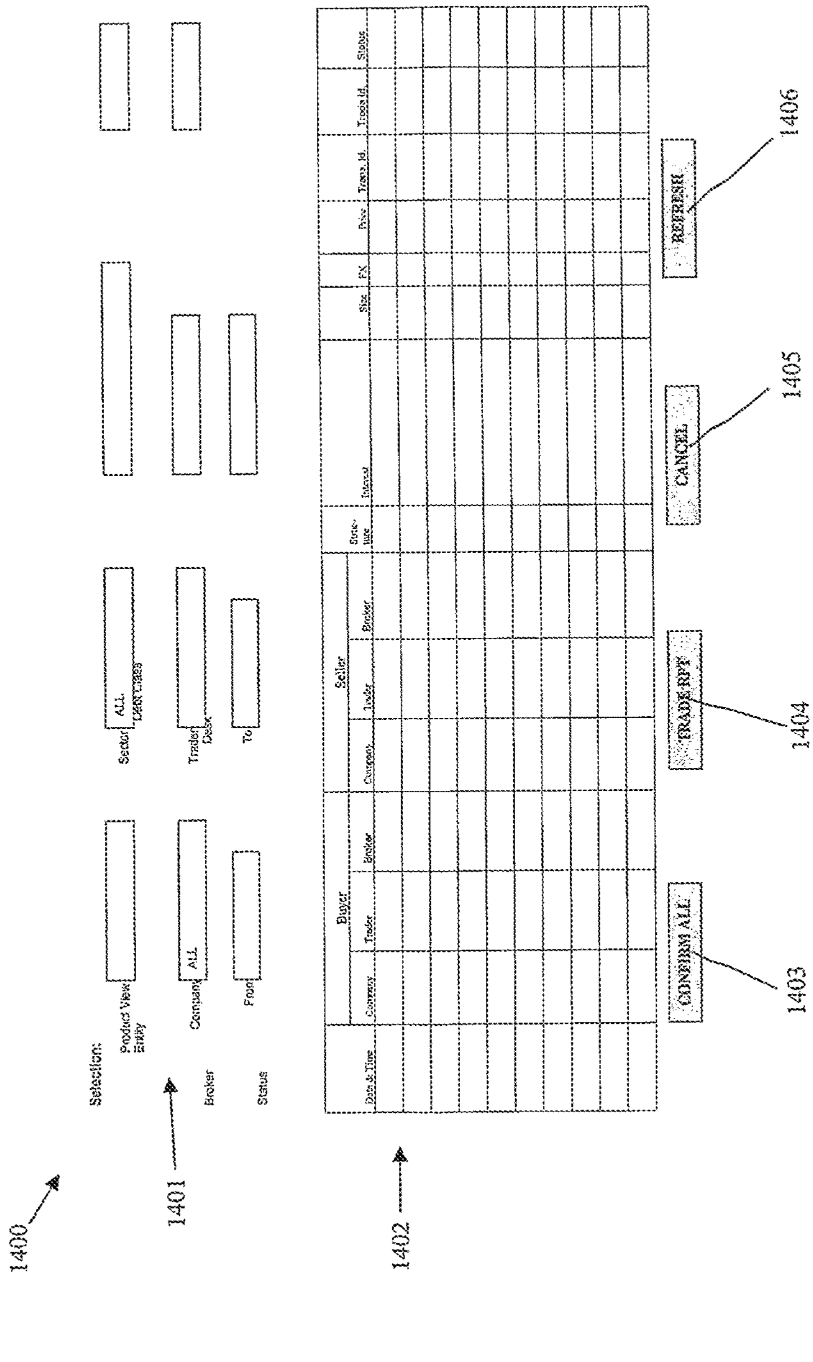
FIG. 14 shows an exemplary trade book display to view and manage trades.
Figure 15:
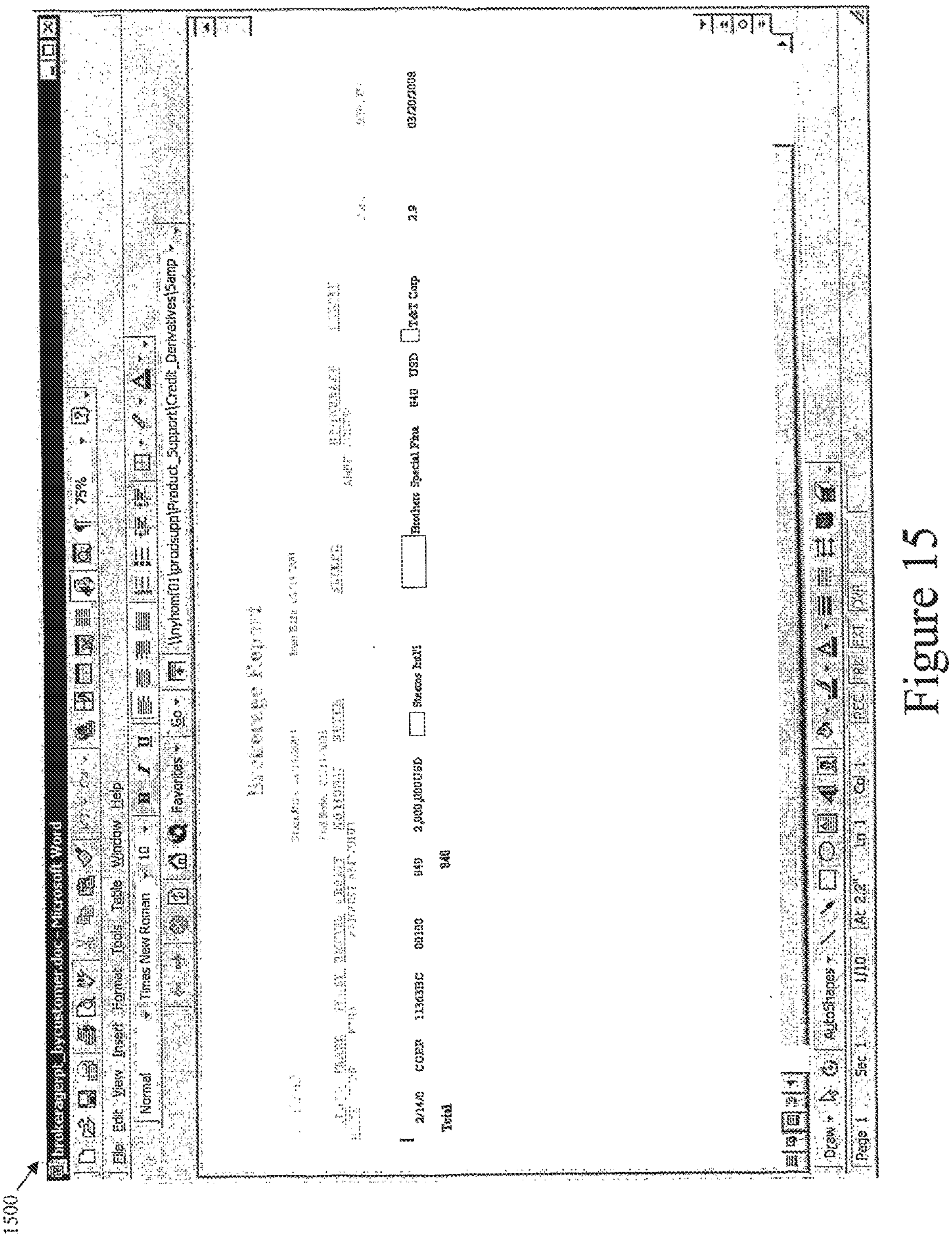
FIG. 15 shows an exemplary brokerage report.

FIG. 14 shows an exemplary Trade Book display 1400 to view and manage trades. The Trade Book display 1400 may be accessible via the Trade Book option on the View sub-menu, the Trade Book icon on the toolbar, or the <ctrl>T hotkey combination, and may be controlled by the user's role and entitlements. According to an exemplary embodiment, external users may only view trades.

The exemplary Trade Book display 1400 may not reside in the trading system, but may nonetheless be seamlessly accessible from there.

A query may be limited to a single sector, entity or entity plus debt class, for a single company site and/or trader, and for a single broker or desk. Alternately, a Product View filter may be applied for order selection. In addition, trades may be viewed for a single date or a range of dates. By default, a broker or a trader may be shown all of his/her own trades only. In particular, brokers may see all the trades for all the traders included on their tailored short list. For external users, company and trader selections may limit the query to executions on which their own institution is one of the counterparties. Off-screen trades may be marked with a flag, and italicized to clearly identify them as such. Double-clicking on an execution may allow an authorized user to bring up the trade on the Trade entry screen in order to amend or delete it. According to an exemplary embodiment, external users may transfer to the trade maintenance screen only to view the details for their side of any transaction that has been approved or confirmed.

A mouse menu option may allow the user to transfer to the Trade entry screen in order to add a new trade using the interest on the selected Trade book row. With this feature, the user may reuse the existing interest definition from the selected trade and not have to re-define the interest on the Trade entry screen. Other mouse menu options may be provided to approve or confirm individual trades. Users may download the displayed trades into a CSV export file.

The exemplary Trade Book display 1400 may include filters 1401 to define a product view of all selected entities and associated interests, an entity view of trades for interests related to all entities a user is permitted to view, and a company site view of one or more company sites depending upon the authorization entitlement of the user. The filters 1401 may also include a filter to limit trade selection to those submitted by one specific trader or broker, or by a specific brokerage desk. The filters 1401 may also include fields to limit based upon the starting or ending entry/update for the trade/order selection so that trade/order executed within the specified range may be included in the query. The filters 1401 may also filter according to the status of the trades, including, for example, pending, approved, confirmed, unconfirmed or al trades.

The exemplary Trade Book display 1400 may sort the selected trades according to the date & time, structure, interest, buyer, seller, price, transaction identifier, trade identifier, status, or other attributes. The sorting may displayed in a table 1402, in which each field may include clickable up/down arrows to control sorting in either direction on each column.

The exemplary Trade Book display 1400 may include a Confirm All button 1403 to approve and/or confirm all of the selected trades. In this regard, the selected Pending trades may be automatically approved and the user may be presented with a confirmation setup screen showing each selected trade that has complete information required for confirmation. Additionally, the trades may be confirmed using the default delivery information so that the user may not override the information since there may be multiple transactions involved. If one or more of the trades are missing any of the required data, they may not be confirmed, and the system may display a message, such as, for example, 'Some incomplete trades could not be approved for confirmation.'

The exemplary Trade Book display 1400 may also include a Trade Report button 1404 to print/send a report of the selected trades to the selected customer, which may be applicable only when trades for a single company are selected, and may transfer the user to the reporting screen with the 'Trade Details Report' pre-selected along with the start and end dates pre-filled based on the Trade Book query. Here the user may override the default report format and transmission method. This report may be used in lieu of individual confirms. According to an exemplary embodiment, the transmission of the report may not be automatic. In this regard, the Trade report button 1404 may only transfer the user to the appropriate reporting screen, from where they can actually run and transmit the report.

The exemplary Trade Book display 1400 may also include a Close button 1405 to exit the screen without taking any action, a Refresh button 1406 to process/refresh the query based on the filter selections, and an Export button to export the displayed trades into a CSV file. The buttons may be disabled/hidden for certain users.

The exemplary Trade Book display 1400 may support a mouse menu including options to add, amend, confirm and delete a Trade entry.

Order Validation and Processing Rules

Orders may be validated according to certain rules when they are created. For example, according to an exemplary order validation rule, choice markets may be permitted so that a user may submit a bid equal to his/her own offer, or that of another user within his own institution, and vice versa. In this regard, a non-tradable price may be specified for all traders within that institution.

According to another exemplary order validation rule, a user may not submit a bid higher than his/her own offer, or conversely submit an offer lower than his/her own bid (creates a cross-market or inverse market situation) unless the Product line allows inverted markets. If the exemplary rule is violated, an error message, such as, for example, "Inverse Market" may be generated.

According to another exemplary order validation rule, unless the Product line allows inverted markets, a trader's market entry may not be higher than the quote, i.e., a bid may not be higher than the best offer, and an offer may not be lower than the best bid (cross-market). Technically, they should just go ahead and hit or take the existing bid or offer. The only exception to this exemplary rule is when the trader submitting the order is unable to execute against the existing bid or offer as a result of a credit restriction or some other special condition. The comparison/test should exclude held prices. If this exemplary rule is violated, an error message, such as, for example, "Illegal Execution" may be generated.

According to another exemplary order validation rule, a user may not submit a price that is not a multiple of the price tick size stipulated in the product definition. If the exemplary rule is violated, then an error message, such as, for example, "Price must specified in ticks of xx.xx" may be generated, where xx.xx is the Price Tick for the product line.

According to another exemplary order validation rule, a user may not submit a price with more decimals than the product line allows. If the exemplary rule is violated, then an error message, such as, "This product line does not allow for prices with more than x decimals" may be generated, where x is the Maximum Price Decimals for the product line.

According to another exemplary order validation rule, a user may not submit a size that is not a multiple of the size tick size stipulated in the product definition. If the exemplary rule is violated, then an error message, such as, for example, "Price must specified in ticks of xx.xx" may be generated, where xx.xx is the Size Tick for the product line.

According to another exemplary order validation rule, a user may not submit a size with more decimals than the product line allows. If the exemplary rule is violated, then "This product line does not allow for sizes with more than x decimals" may be generated where x is the Maximum Size Decimals for the product line.

According to another exemplary order validation rule, if the user submits a price that varies from the last price for the selected interest by more than the higher or lower price limit set at the entity or product line level, the user may receive a popup warning within an popup, such as, for example, "Warning: Price is xxx.xx % higher(lower) than the last price [CONTINUE]/[CANCEL]", where xxx.xx is the variance percentage between the entered price, and the last price for the interest being quoted or traded; the warning will read 'higher than the last price' if the higher price limit is breached; and the warning will read 'lower than the last price' if the lower price limit is breached; [CONTINUE] and [CANCEL] are action buttons that enable the user to override the warning and continue on, or cancel the entry. If the user cancels the entry, the price may not be submitted, and the focus will return to the price field to allow the user to adjust the price.

According to an exemplary order validation rule, a user may not enter firm bids/offers during hours outside of the trading day for his site—i.e., at a time that is earlier than the start of the trading day or later than the end of the trading day. (A user may enter held prices.) If the exemplary rule is violated, then an error message, such as, for example, "Trading closed at <time> for <date> and will re-open <date and time site opens>" may be generated. Bids/Offers may be entered as 'Indicative' and made 'Firm' when the market opens.'

The processing of orders may be controlled according to certain order processing rules. For example, according to an exemplary order processing rule, a user may not have more than one order generation screen open at the same time. For example, the user may not be allowed to create a standard limit order via the Bid/Offer screen and also have the Specials or the Run screen open at the same time.

According to another exemplary order processing rule, when a user enters a new order with a price that matches an existing order on the other side for a product he/she will be given the option to execute or cancel. This exemplary rule may not apply to all product lines. If the exemplary rule is violated, then an error message, such as, for example, "Full or partial execution is possible. Submit your order? Execute/Cancel Order" may be generated.

According to another exemplary order processing rule, a user may have multiple open bids and/or offers in the market for any set of products and interests.

According to another exemplary order processing rule, orders may be displayed (in the Depth) and processed in terms of price-time priority. For example, orders may be processed according to the best price first, where the best bid is the one with the highest price, and the best offer is the one with the lowest price, or the orders may be processed according to time, where orders within the same price level are ranked in time order, with the earliest one at the top. A new bid or offer may be appended to the end of the queue for that status group and price level and on interests with up-front premiums, the running points may be used to break ties when the base price between two prices is the same.

According to another exemplary order processing rule, when the price on an existing order is changed via the Update function, the system may delete the existing order and submit the changed order as a new one. In this instance, the order may lose its queue ranking. A link should exist between original and current price.

According to another exemplary order processing rule, if the Product Line has the 'Allow Work-ups' box checked, then an increase to the size of an existing order without a change to the price, may retain its prior queue position even if there are other standing orders behind the changed order at the same price level. If work-ups are not allowed for the product line, increasing the size of a standing order may result in the order being re-ranked. A decrease in the size of the order may retain the order's original ranking regardless of the product line flag setting.

Trading Execution Rules

Trades may be executed according to certain rules. For example, a user may not have more than one execution generation screen open at the same time. In particular, s/he may not be allowed to hit a bid via a Hit box while the Lift screen is open at the same time.

According to another exemplary execution rule, when a user submits his entry via a Hit or Lift command, it may be assumed that the aggressor accepts the normal conditions associated with the passive bid or offer that is being hit or lifted. On a Hit or Lift command, the aggressor may be required to explicitly accept any optional conditions that are associated with the passive bid or offer that is being hit or lifted. The order processing engine (OPE) may process executions by generating a new aggressing bid or offer that inherits the conditions associated with the selected passive order. When the OPE attempts to match existing orders after a change to one side, it may be required to pay attention to all conditions associated with each order. In this regard, the exemplary execution rules may not apply to all products.

According to an exemplary execution rule, for executions in Product lines that have the 'Confirm Executions' flag set, the aggressor may be required to separately acknowledge their intention to execute. A checkbox may be presented for this purpose. The user may not be able to submit the execution without checking the box.

According to another exemplary execution rule, executions on product lines that do not have 'Bypass Best Price' flag checked, may be required to be filled at the best average price according to the price-time priority as long as the conditions match. In other words, the system may be required to force execution at the best price and ranking unless conditions prohibit it. If the exemplary rule is violated, an error message, such as, for example, "Execution against non-best price is not allowed".

According to another exemplary execution rule, a trader may not hit a bid, or lift an offer submitted by another trader within the same company/institution. Execution functions may be disabled for these ineligible or restricted prices. IF the exemplary rule is violated, then an error message, such as, for example, "Illegal Execution—You cannot trade with yourself!" may be generated.

According to another exemplary execution rule, if the user is unable to execute as a result of timing, i.e., if another user got in before him/her and hit the bid or lifted the offer, or if the order was changed/held/deleted, then there a message may be provided to the user, such as, for example, "Price is no longer active".

According to another exemplary execution rule, when the 'Hold standing orders' option is checked on for an execution, it should result in the holding of opposite side standing orders only within the interest that was traded.

According to another exemplary execution rule, if the price of the selected order is amended at execution time, then the price change should be processed as follows before any accompanying size changes and before the actual execution. In particular, a price change on the execution of an order in a product line that has enabled both the 'Bypass best price,' and 'Allow inverted market,' may be processed and the execution may then proceed regardless of the order's queue ranking after the update. If a price change results in a lower queue ranking than another eligible standing order on the same side, and the product line does not have 'Bypass best price' enabled, then execution may not be processed and the user may be notified with a message, such as, for example, "Execution against non-best price is not allowed." If a price change results in an inverse market, an the product line does not have 'Allow inverted market' box checked, then execution may not be processed and the user may be notified with a message, such as, for example, "Inverse Market".

According to another exemplary execution rule, if the size of the order is amended at execution time, then the size change may be processed after any accompanying price changes, but before the actual execution. In particular, in the event that the size of the execution is less than that of the order and the hold remaining balance box is not checked, the remaining size of the order should remain open in its current queue ranking—there is no update prior to execution in this case. If the product line allows work-ups, and the size of the execution is greater than that of the first selected order, then that order's size should be updated to equal the execution size, and the order should maintain its current queue position. If the product line does not allow work-ups, and the size of the execution is greater than that of the first selected order, the execution should be filled from the standing orders at that price level. If the size of the execution is greater than the total of all standing orders at that price level, a new order should be created on the opposite side for the aggressor.

Trade Blotter by Trade Date

FIG. 49 shows an exemplary trade blotter report 4900, which lists key details for each side of every transaction for a single date or over a date range. The report 4900 is sorted chronologically by transaction id, and may be run at the end of each day by a CDS brokerage desk in a remote location. The output may also be written to an Excel spreadsheet.

The exemplary trade blotter report 4900 may include filters and/or parameters, according to, for example, a particular brokerage site, brokerage desk, or date. The report header may show the name of the relevant brokerage desk, the From Date for the report, the To Date for the report, and the date and time the report was run. The report body may show the trade date for the transaction, the side of the trade (e.g., 'B' for buy or 'S' for sell), the name of the customer on the above side, the id for the above side of the transaction (e.g., the transaction id and 'B' or 'S' for the appropriate side), the sum of brokerage charged to the customer over the selected date(s) in U.S. dollars, the name of the reference credit on the swap contract, the maturity date of the swap contract, the notional/principal amount of the swap contract preceded by the currency code of the contract, the brokerage fee rate for the above side of the transaction, and the actual brokerage fee for the above side of the transaction shown in terms of U.S. dollars, preceded by the '$' symbol.

Client Blotter by Trade Date

Figure 50:
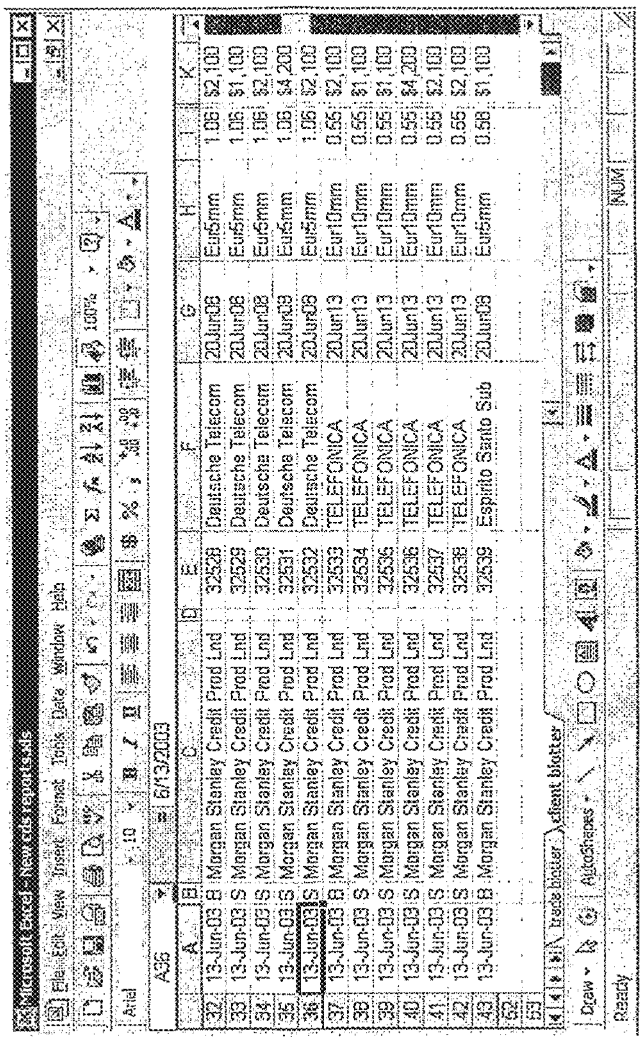
FIG. 50 shows another exemplary trade blotter report.

FIG. 50 shows an exemplary trade blotter report 5000, which lists key details for each side of every transaction by client institution for a single client or all clients, and for a single date or over a date range. The report 5000 may be sorted first by client name, and therein chronologically by transaction id. The report 5000 may be grouped by client with a page break after each client, and may be run at the end of each day by a CDS brokerage desk in a remote location. The output may be written to an Excel spreadsheet.

The exemplary trade blotter report 5000, may include filler and/or parameters, according to, for example, a particular brokerage site, brokerage desk, client name or date. The report header may show the name of the relevant brokerage desk, the name of the single selected client, or all clients if a single one is not selected, the From Date for the report, the To Date for the report, the date and time the report was run. The report body may show the trade date for the transaction, the side of the trade (e.g., 'B' for buy or 'S' for sell), the name of the customer on the above side, the id for the above side of the transaction (e.g., the transaction id and 'B' or 'S' for the appropriate side, the sum of brokerage charged to the customer over the selected date(s) in U.S. dollars, the name of the reference credit on the swap contract, the maturity date of the swap contract, the notional/principal amount of the swap contract preceded by the currency code of the contract, the brokerage fee rate for the above side of the transaction, and the actual brokerage fee for the above side of the transaction shown in terms of U.S. dollars, preceded by the '$' symbol.

Adding and Updating Conditions to Prices

According to the exemplary embodiment, a condition may be added to a price. In this regard, the condition may be, for example, free-format text with a maximum field length of 30 characters, and may be entered via a price entry dialog box.

Figures 51, 52:
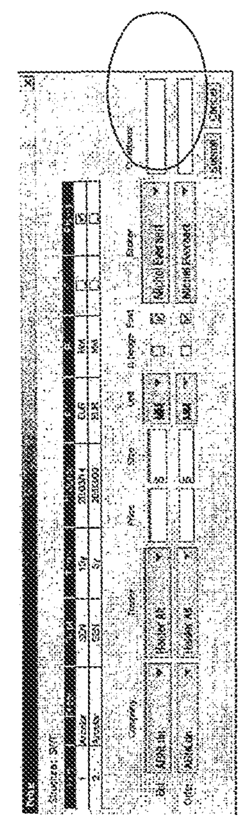
FIG. 51 shows an exemplary price dialog box with conditions.
FIG. 52 shows an exemplary update dialog box with conditions.

FIG. 51 shows an exemplary price dialog box 5000 with conditions. When updating a price, the conditions may be edited in a similar fashion, as shown, for example, in FIG. 52 discussed below.

FIG. 52 shows an exemplary update dialog box 5000 with conditions. When a price has conditions attached, the conditions may be shown as a subscript "c" to the right of the bid and offer price, so as not to conflict with Delta and Upfront indicators. The conditions may also be shown in a tooltip after a label titled Condition.

The exemplary update dialog box 5200 includes two columns to indicate Bid and Offer conditions, which are entitled "B/Cond" and "O/Cond", and which may be added or removed in the price sheet definition like other columns. Text may be entered in the column. If the text is too wide for the column, it may be clipped to the left and right due to centering.

Workspace and Multiple Price Sheets

According to an exemplary embodiment, multiple price sheets may be displayed within a workspace, which may provide an improved display and customized market data content.

Figure 53:
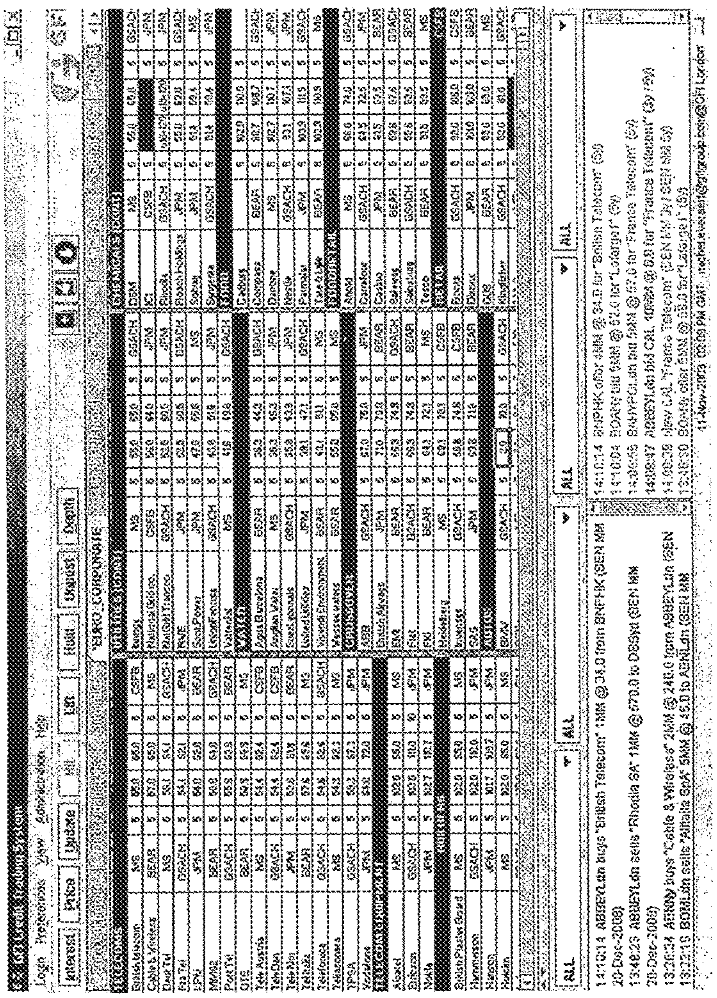
FIG. 53 shows an exemplary workspace with multiple price sheets.

FIG. 53 shows an exemplary workspace 5300 with multiple price sheets. The exemplary workspace 5300 may have between one and five columns, and each workspace column may contain between one and five price sheets. The maximum number of columns allowed per workspace may be limited to five, and the maximum number of price sheets allowed per column may be limited to twenty-five. Price sheets included within a column and/or workspace may be individually configured so they need not have the same layout or format. For example, a workspace with a CDS price sheet may be configured next to a Cash Bonds price sheet.

Within each column, in the workspace definition screen, the user may drag and drop the price sheets to be stacked vertically one on top of the other within that column. The user may specify the order of the price sheets, and the width of each workspace column may be set to default width of the widest price sheet included in that column. Price sheets may have a label row that identifies the entities grouped into the price sheet, which defaults to the price sheet name, with the option to override it with a custom/different heading. A custom label may be defined, for example, by double clicking the label to change it. The label background and foreground colors may be the same as header row, and the label font may be bold. An option to turn the column scroll bars on or off at the workspace level may be provided. In this regard, the price sheet level may be configured to suit certain requirements. For example, when scroll bars are turned on, there may be a vertical scroll bar for each workspace column (with one or more price sheets each), and only the horizontal scroll bar for the entire workspace. An option may be provided to turn the price sheet header rows in a workspace on or off at work workspace level unless the workspace contains only one price sheet. Hence, suppression of column headers may be effective only for workspaces consisting of two or more price sheets. When headers are displayed, the individual data columns may be resizeable. An option may be provided to turn the display of labels on or off at workspace level.

At the price sheet level, there may be an option to sort interests in the price sheet either alphabetically (sorted by entity name, term) or by interest entry date/time (e.g., the most recent at the top). A workspace level option may be provided to enable depth for traders. When this option is checked on, both interactive and view-only traders may be able to view the depth on any interest displayed within the workspace.

On both the workspace and price sheet configuration pages, a Save button may be provided to save changes without closing the dialog box. Pressing the Done button on any page may save any as yet unsaved settings and close the dialog box and exit. The Cancel button may be configured to close the dialog box without saving the settings.

Each price sheet may show all of the interests defined within it, that is, the display may be automatically adjusted. Within a workspace that includes multiple price sheets, the user may not resize individual price sheets or columns within any price sheet. Within such workspaces, the width of each column may be set to that of the widest price sheet within it. The Tab key may be used to navigate from one price sheet to another within a workspace. The movement may be top-down within the current workspace column and left-right from column to column. The Shift-Tab key combination may allow the user to move in the reverse direction and the arrow keys may be configured so that only movement within a price sheet between relevant columns may be enabled. Hence, the other columns may be skipped over.

Within price sheets that have the Aggregate orders per price level option checked, all traders may be shown aggregated posted quotes. In this regard, display rules may apply relating to the depth display for traders. In particular, if the trader's currently selected workspace has the Enable depth for traders option checked, the depth button and mouse-menu option may be enabled. If the Enable depth for traders option is unchecked, then the button and mouse-menu option may be disabled for all traders only, and may have no impact on broker functionality. When depth is enabled, traders may see individual posted orders within the depth as brokers do, however, they may not view the customer codes or unposted orders. In the depth view, traders may see only the bid size, bid, offer and offer size for posted bids and offers. When depth is enabled, traders may view both the floating as well as inline depth.

Quick History

Figure 54:
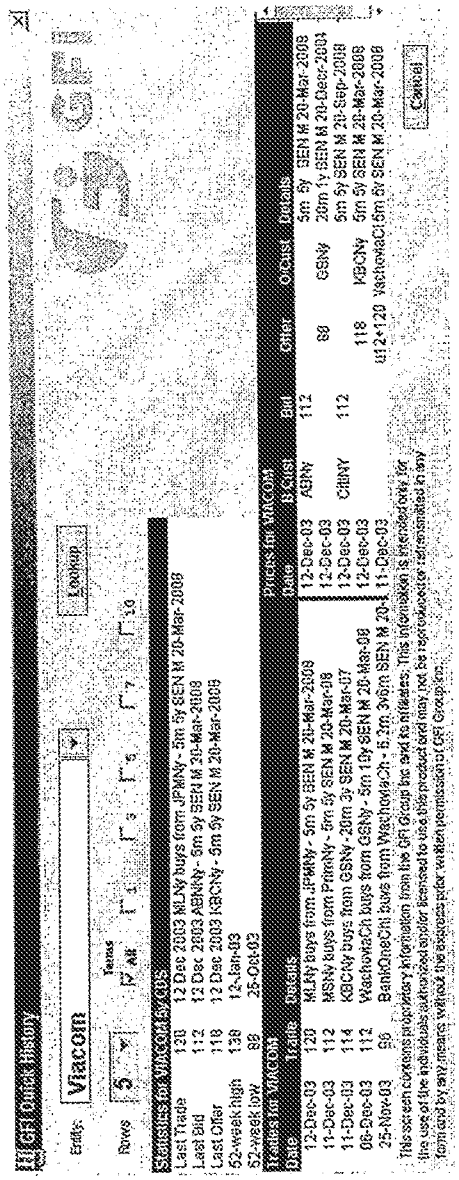
FIG. 54 shows an exemplary illustration of the Quick History dialog box window.

FIG. 54 shows an exemplary illustration of the Quick History dialog box 5400, which may be invoked, for example, by double clicking the Entity field in the workspace, selecting a new Quick interest icon in the toolbar, selecting a right click menu item labeled Quick History, or pressing the new 'Q' keyboard shortcut.

The exemplary Quick History dialog box 5400 includes a filter area that allow users to select an entity to be pre-populated with the currently selected entity (if there is one) when the user opens the dialog box. If there is no pre-selected entity when this dialog is opened, the user may select an entity from a drop-down list and submit the query. The filter area also allows users to select a number of records to return for trades and prices.

The filter area further allows users to select all terms or limit the search to a specific fixed term. The default is 5 years and may be set when the window is opened. Changes to the default term may not be saved when the window is opened and closed. Selecting a checkbox may deselect the other terms. Hence, it may not be required to select multiple terms. In this regard, a radio button may be provided.

The exemplary Quick History dialog box 5400 includes a statistics area which displays statistics for the 5Y CDS for the selected entity, irrespective of the term chosen. In particular, the statistics area displays the last trade, the last bid, and the last offer, as well as the 52-week high and low. In this regard, the statistic area may be configured according to the type of user, that is, for example, whether the user is a broker or an external user. More specifically, in terms of the last trade, brokers may see a concatenated string with [date] [buyerclient] 'buys from' [sellerclient] '-' [size] [term] [debttype] [restruct] [maturity] [FX] and external users may see concatenated string with [date] '-' [size] [term] [debttype] [restruct] [maturity] [FX]. In terms of last bid, brokers may see concatenated string with [date] [bidclient] '-' [size] [term] [debttype] [restruct] [maturity] [FX]. In terms of the last offer, brokers may see a concatenated string with [date] [offerclient] '-'[size] [term] [debttype] [restruct] [maturity] [FX], and external users may see a concatenated string with [date] '-' [size] [size] [term] [debttype] [restruct] [maturity] [FX].

The exemplary Quick History dialog box 5400 includes a History area which displays traders to the left and prices to the right, and may be configured according to the type of user, that is, for example, whether the user is broker or an external user. In particular, in terms of traders, brokers may see the format [buyclient] 'buys from' [sellclient] '-'[size] [term] [debttype] [restruct] [maturity] [FX], and external users may see the format of [size] [term] [debttype] [restruct] [maturity] [FX]. Likewise, for prices, brokers may see the format of [bidclient] [bid] or [offer] [offerclient] and concatenated [size] [term] [debttype] [restruct] [maturity] [FX].

The History area may also include horizontal and vertical scrollbars that are displayed only if the grid is larger than the display size allowed by the window size. The other parts of the window may not have scrollbars. The History area may not update automatically, but rather may only update when the Lookup button is pressed or when the window first opens. When the user submits a new query, an hourglass icon may be shown until the records are returned.

The configurable logo may be positioned in the top right of the window, and cut and paste from the Quick History screen may be restricted. When a user presses the Lookup button for an entity, the name of the entity may be shown in the 3 title areas of statistics, trades and prices.

The Quick History dialog box 5400 may be resizable, maximisable, minimisable and/or non-modal. If there is not enough data to display, e.g., there are only 3 trades in the database and 20 rows were selected for display, then the rows may simply be empty. The window may be kept open. Having multiple Quick History windows open may be prohibited and unposted prices may not be shown in Quick History dialog box 5400.

Hot Keys for the In-Line and Floating Depth Displays

A<ctr> key combination may be used as a toggle command to open and close the floating depth instead of the current d hotkey, which may alternatively be used for the in-line depth. The <Esc> key may also close the window.

The d hotkey may be used as a toggle to open and close the in-line depth instead of the current+/−hotkeys, which may alternatively be used for opening the update dialog box. In this regard, the above-discussed may be functional for traders only within workspaces that have enabled depth for traders.

The +/−hotkeys may enable users to quickly adjust the selected price up or down by a tick. The '+' key may result in the opening of the update dialog with the selected price adjusted up by a single tick while the '-' key may perform the same and may automatically adjust the selected price down by a single tick. The user may submit the change by pressing enter or clicking the Submit button. In addition, both + and − on the main keyboard, as well as on the numeric keypad, may also have this behavior.

According to an exemplary embodiment, standing orders may be automatically held and/or cancelled when a better price is submitted by a rival trader, or when an execution takes place against another order for that interest. In this regard, checkbox options may be provided at the entity level so that when the bid/offer is bested by another bid/offer, it is automatically held or when another bid/offer is executed, the order is automatically held. In regards to the price entry dialog, checkbox options may also be provided, however, when checked on a bid, the order may be cancelled if a higher firm bid is submitted or when checked on an offer, the order be cancelled if a lower firm offer is submitted.

Permanent Interests

According to an exemplary embodiment, a checkbox labeled "Permanent Interest" may be provided, for example, in an interest creation dialog box in the CTS. In this regard, permanent interests may not be removed during the overnight end of day process. However, the prices for permanent interests may be held.

According to an exemplary embodiment, the price entry dialog may include a hit/lift button. When pressed, the bid/offer are entered into the market, and the Hit/Lift Dialog opens with a buyer and seller pre-selected from the values entered in the Bid/Offer dialog of the Price entry dialog box.

Figure 55:
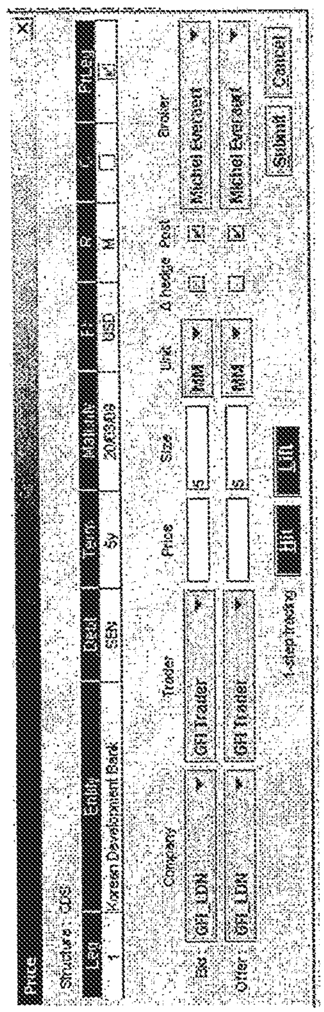
FIG. 55 shows an exemplary 1-step trading price entry dialog box.

FIG. 55 shows an exemplary 1-step trading price entry dialog box 5500, which simplifies the user interface, and defines an aggressor without the need to add checkboxes, etc. In this manner, an interest may be created and traded in a succession of, for example, 3 dialog boxes. When Hit or Lift are clicked from the exemplary price dialog box 5500, a Hit or Lift dialog pops up pre-populated with a bid price, bid size, seller info, buy info, etc. Delta hedge settings and post setting may be used from the price dialog box. No other bid or offer may be posted at this time. In the Hit/Lift dialog box the user may select and deselect other trade related options, change the underlying price or size if required. When Hit or Lift is clicked in the subsequent Hit/Lift dialog box then a bid and offer is posted to the portal. The same bid and offer may be shown in the activity log and the trade may be registered in CTC and CTS (last trade, trade log, etc.)

End-of-Day Process

The End-of-Day process may run by site for a reference transaction date, which may be set to the current business day. The timing for running this process may be configurable in the database for each site. The trading day start and end times may be stored in a site table so that at least the end time may be used for the End-of-Day process. In this regard, the trading start/end times may be set in GMT. The process may run twice daily—once for Asia (e.g., Sydney+Hong Kong), and the second time for New York and London, for example. Users need not be required to log out when this process runs. Instead the following warning may be given in the status bar for relevant site(s): "End-of-day" process in progress, which may disappear when the process is completed.

During run time, the End-of-Day process may hold all active prices posted by the selected site (e.g., broker's site) with a transaction date equal to or earlier than the date for which the process is being run. The process may also hold all non-permanent interests without active prices and permanently delete held prices with transaction dates that are earlier than the preceding business day. All held prices from the current business day may be retained in the order book in a held state so that the next morning brokers may see what they were working on the preceding day. The desktops of logged-in users may be refreshed with any updates to the workspace/price sheet configurations. Pop ups may be provided, which include the following message pup up for all logged in users: 'As part of the EOD process, your desktop will be refreshed with latest workspace/price sheet updates. Please press <ENTER> or press [OK] to continue or [SKIP] to wait until the next business day or your next login.' The popup may present the user with two response buttons [OK] and [SKIP]. If there is no response from the user within 10 seconds, for example, OK is assumed and the updates are propagated to the client machine. If the user selects [SKIP] the changes are not propagated. The changes may then either go through at the user's next login or the next time the End-Of-Day progress runs.

Interactive Order Management

Selected traders may interactively manage their own orders via the CTS user interference. In this regard, interactive order management may be enabled primarily for the CDS indices. In particular, a setting "The Entity Access Level" may be configured with Entity-Product Line defaults, so that certain types of trading may be permitted by entity name, including, for example, "Voice Only", "View Only", "Semi-Interactive", and "Interactive". For Voice Only trading, prices and executions related to this entity may not be displayed/published for traders. However, traders may view the details of trades for their own institution in the trade book. For View Only trading, traders may view prices and executions for this entity, but may not interactively maintain their orders or execute trades in this name. Only brokers may have the ability to add, change, remove or execute on the prices. For Semi-Interactive trading, traders may maintain their own orders/prices for interests in this name. However, they may execute trades interactively. For Interactive trading traders may both maintain their own orders/prices for interests in this name, and select bids/offers for execution. In addition to the entity access level, an Interactive Trader role may be created for users, which allows them to interactively manage their orders. Only users with this role may interactively manage orders for entities with either a Semi-Interactive or Interactive Access Level.

Trader functionality may be enabled or disabled in accordance with the trader role and the Entity Access Level. In particular, for entities with a Voice Only access level, the display of interests, prices and trades may be disabled everywhere except in the trade book. Hence, traders may not see any information on these entities within price sheets, the trade and activity logs and the order book. For entities with a View Only access level, interests, prices and trades may be displayed everywhere. The interest, price, update, hit, lift, hold, post, and depth functions may be disabled for traders. For entities with Semi-Interactive or Interactive access levels, interests, prices and trades may be displayed everywhere, and the certain functions, such as, for example, "price", "bid", "offer", "hold", "update", "+" and "−", may be enabled only for Interactive Traders (that is, users with an Interactive Trader role).

In this regard, for non-interactive traders, entities with Semi-Interactive or Interactive access levels may be treated the same as those with a View Only access level. In the price entry dialog, the bid & offer company may default to the trader's own site, and the selection list may be limited to sites for the trader's own institution only. Multi-legged interests may follow the most conservative display route and take the lowest functional common denominator. For example, if in a switch, one entity is Voice Only and the other is Interactive, then the structure may inherit the most restrictive level of access, which in this instance may be Voice Only. No activity should show up in the Activity Log for Voice Only entities, and no activity should show up in the Trade Log for Voice Only Trades. Within the trade book, traders may view the details of all their trades, even those involving Voice Only entities.

Inverted Markets

To prevent the user from entering an inverted market, the system may check whether a price entered or updated by a trader results in an inverted posted market. The check may occur after the trader submits the price but before the price is displayed on screen. In this regard, if a new posted bid is higher than the highest posted offer, then a warning may appear. The warning message may read, for example, "your action will create an inverted market. Do you wish to continue and display an inverted market? [Yes] [No]", where selecting [yes] may submit or post the price, and selecting [no] ignores the action.

When a price is firmed from the orderbook resulting in an inverted market, orderbook may the price is not firmed in the order book and a warning is displayed. If multiple prices are being firmed from the orderbook, those prices that would have generated an inverted market are not firmed in the order book. The other prices may be firmed. A warning may appear once if there are one or more prices that are not re-submitted due to the inverted market conditions being triggered. The warning message for inverted firms from the orderbook may be "some price updates you have submitted would have created an inverted market and have been ignored for your protection. Please check the orderbook for un-submitted prices. [OK]".

Traders may receive an inverted market warning only when a firm posted price creates an inverted market when compared with the best firm posted price on the opposite side. Brokers may receive an inverted market warning whenever any firm price (posted or unposted) creates an inverted market when compared with the best firm price (posted or unposted) on the opposite side.

New MyPrices Area in PriceSheets

A set of optional pricesheet columns and toolbar controls collectively referred to as the MyPrices area, may enable users to see and maintain within a single pricesheet view, a particular trader's quotes next to the market on the listed interests within that pricesheet. The other existing pricesheet columns may be referred to as the MarketPrices area The MyPrices area may provide users the ability to view the market prices side by side with the selected trader's prices on the same interests, and the ability to see the price and/or size of the selected trader's quotes (best bid and best offer) for the interests listed within the pricesheet, including held and unposted orders, when applicable, and the ability to carry out basic order management tasks for the selected trader very quickly, without having to use dialog boxes (e.g., by typing in the order prices and sizes directly into the pricesheet cells). Brokers may be provided with the ability to distinguish between prices entered or last updated by a broker versus a trader.

Figure 56:
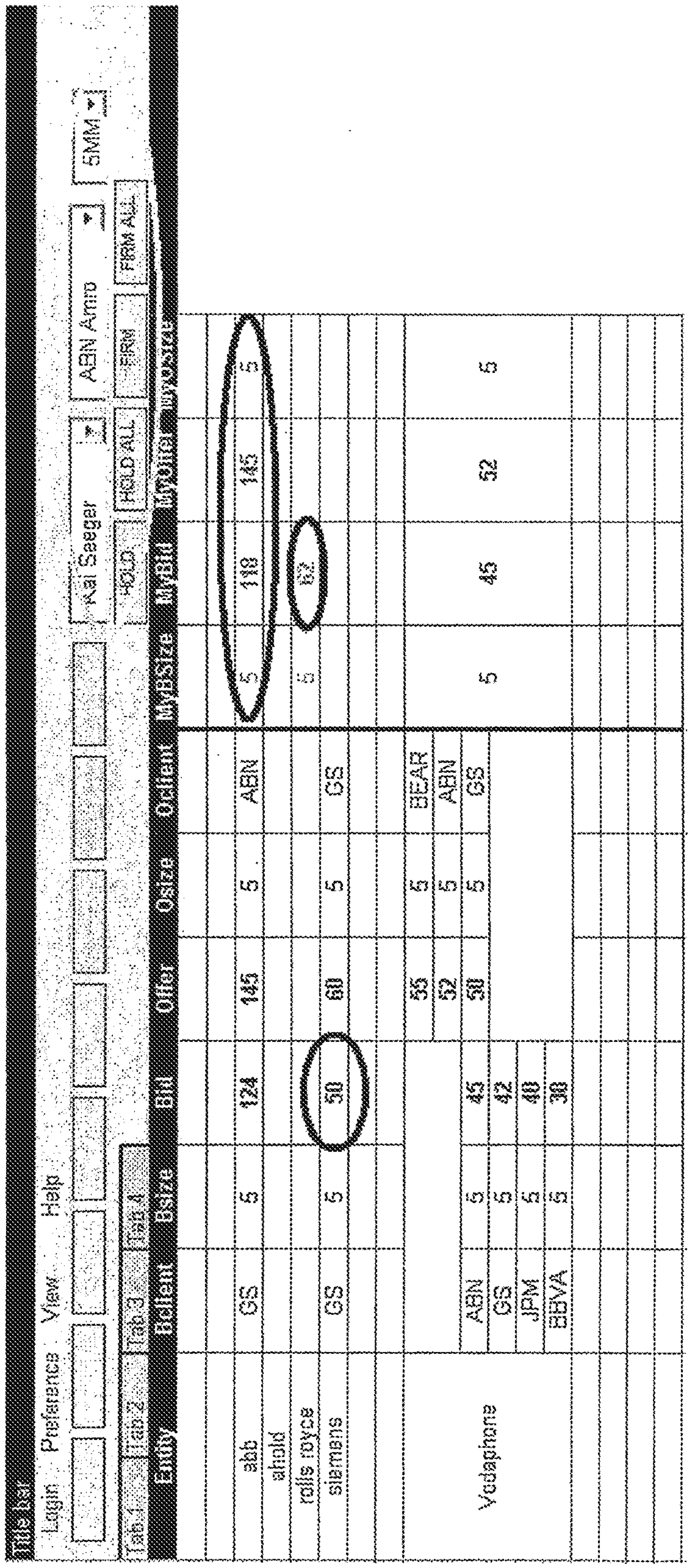
FIG. 56 shows an exemplary broker view of price information for the My Prices area.

FIG. 56 shows an exemplary broker view of price information for the My Prices area. Here, the broker may see in one place where the market is pricing the listed interests, and where the selected trader is providing prices on those interests, as well as a consolidated place to manage standard orders for that trader very quickly without having to use the dialog box.

Figure 57:
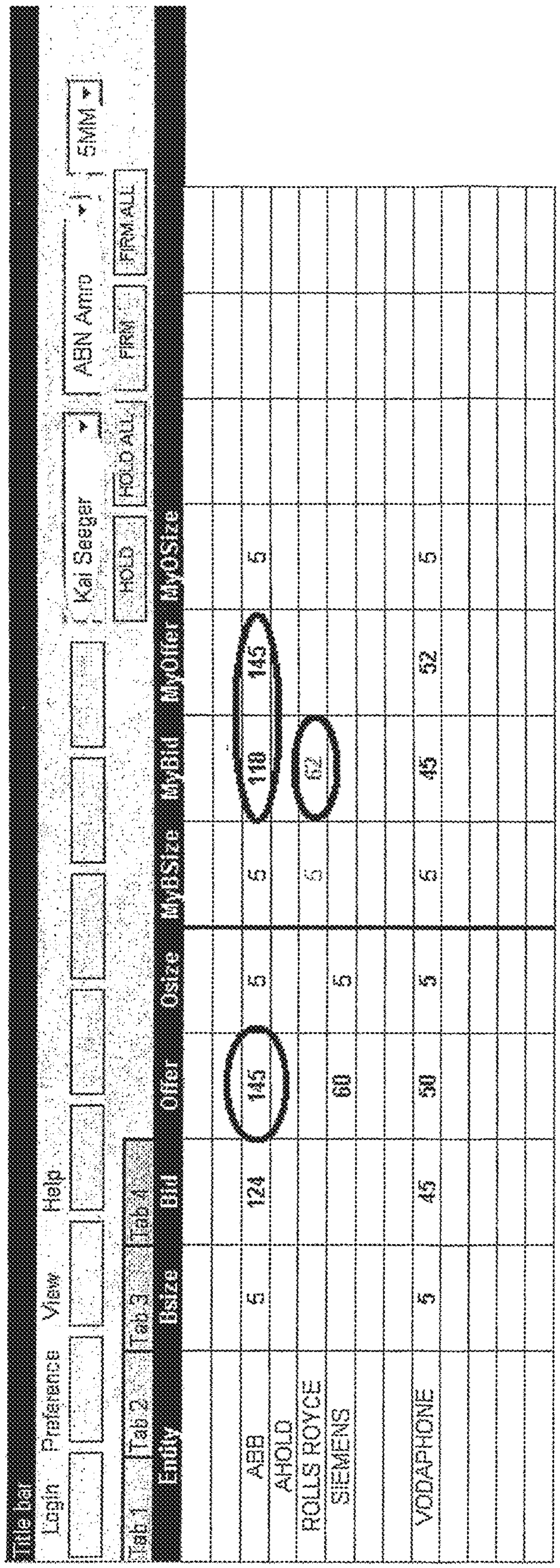
FIG. 57 shows an exemplary trader view of price information for the My Prices area.
Figure 58:
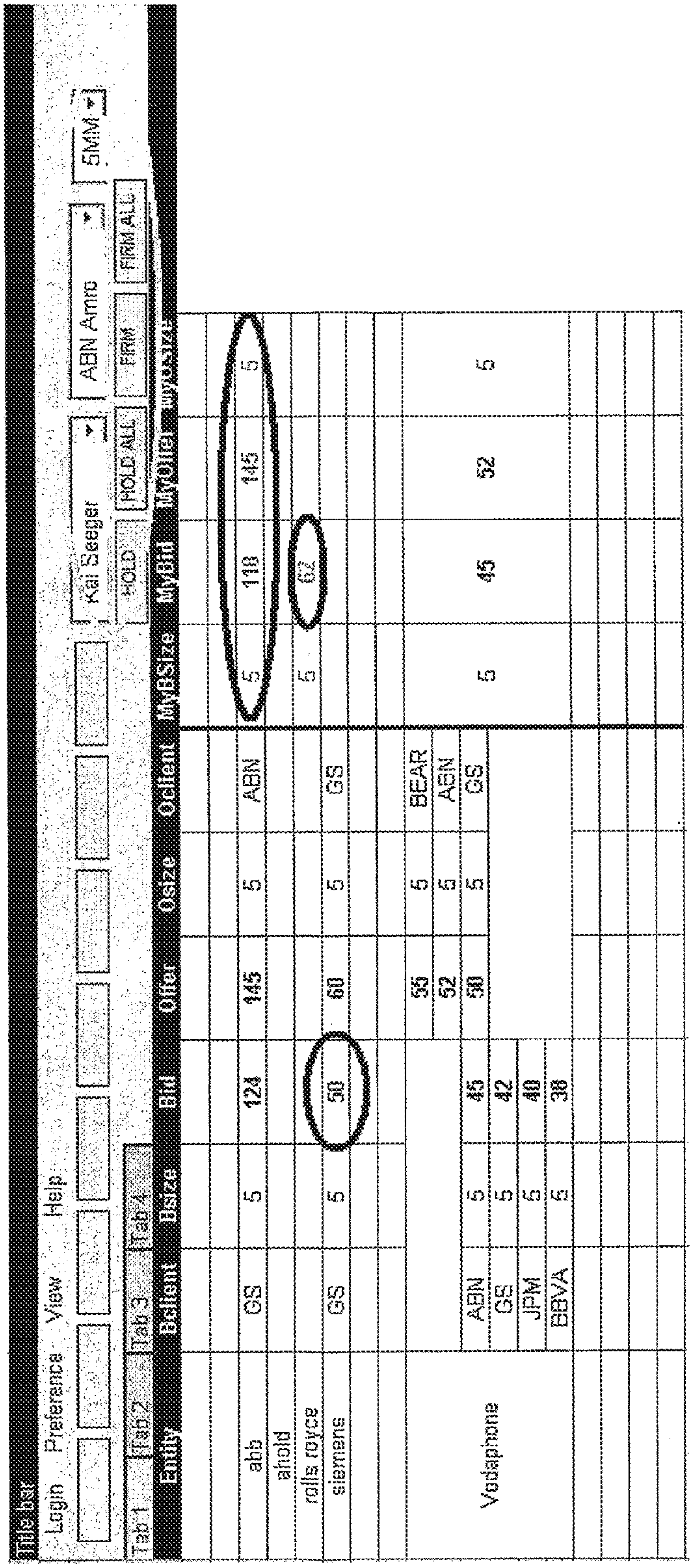
FIG. 58 shows an exemplary broker view of price information for the MyPrices area.
Figure 59:
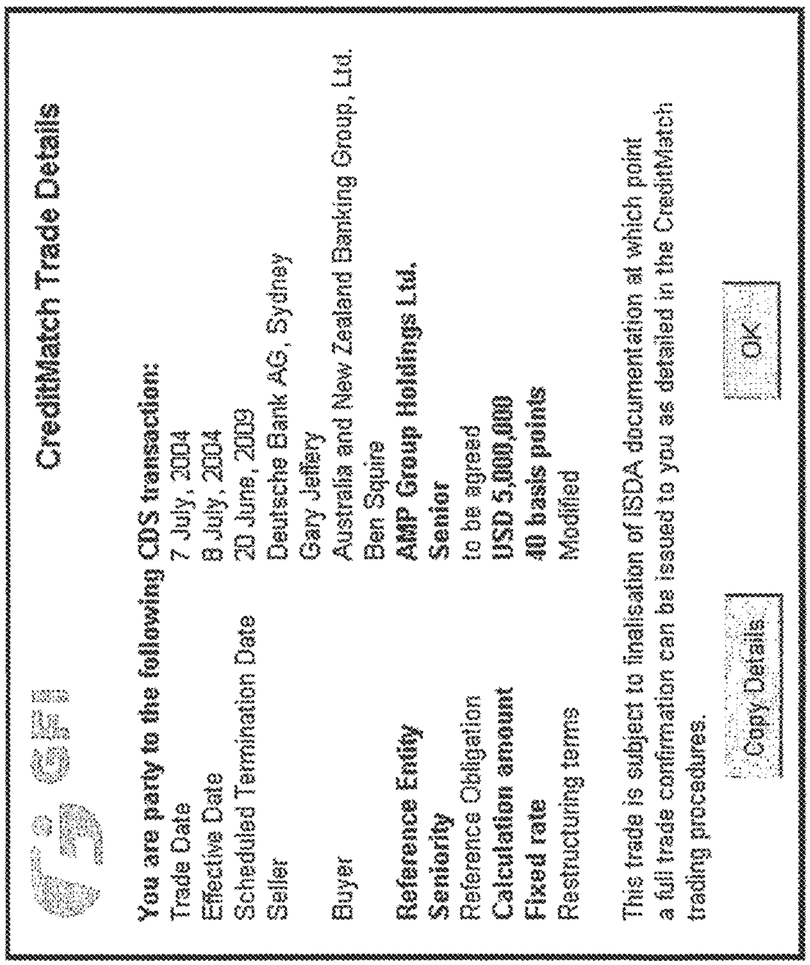
FIG. 59 shows an exemplary illustration of an execution pop up layout for a single CDS.
Figure 60:
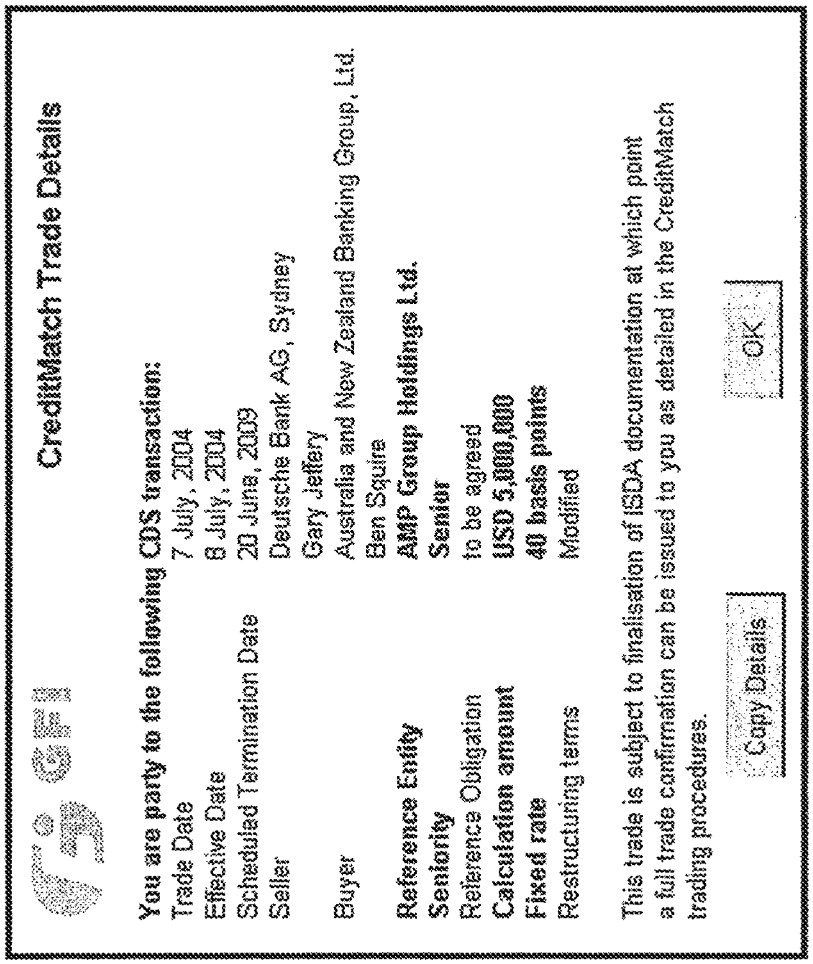
FIG. 60 shows an exemplary illustration of an execution pop up for a single non-upfront CDS trade.
Figure 61:
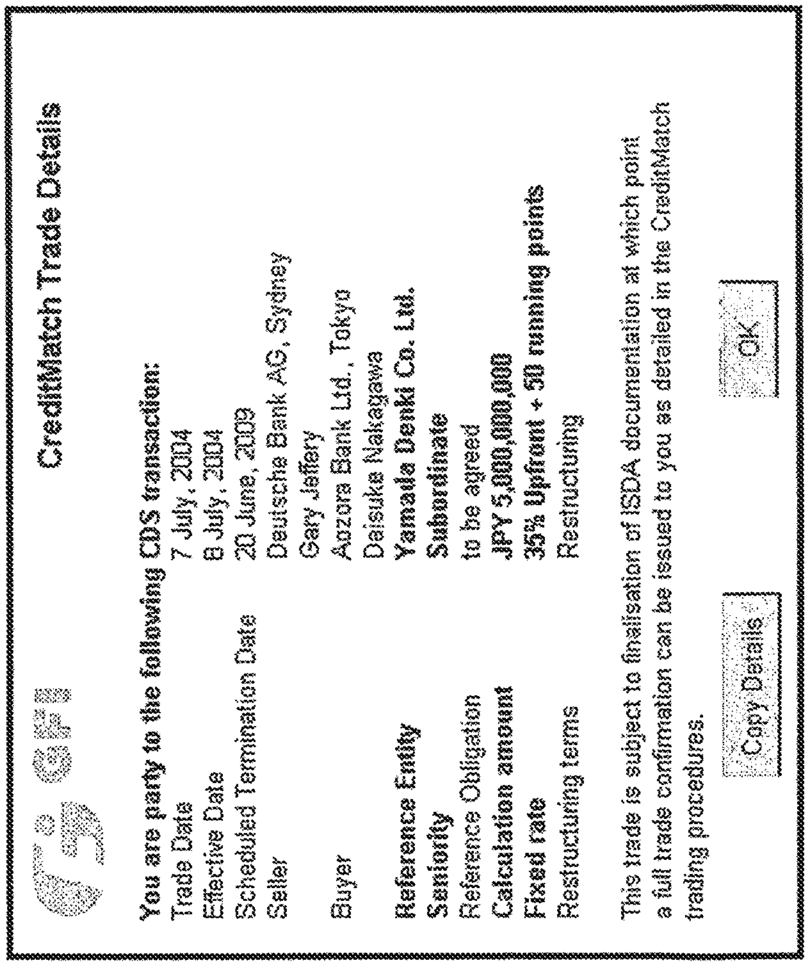
FIG. 61 shows an exemplary illustration of an execution pop up for single upfront CDS trade.
Figure 62:
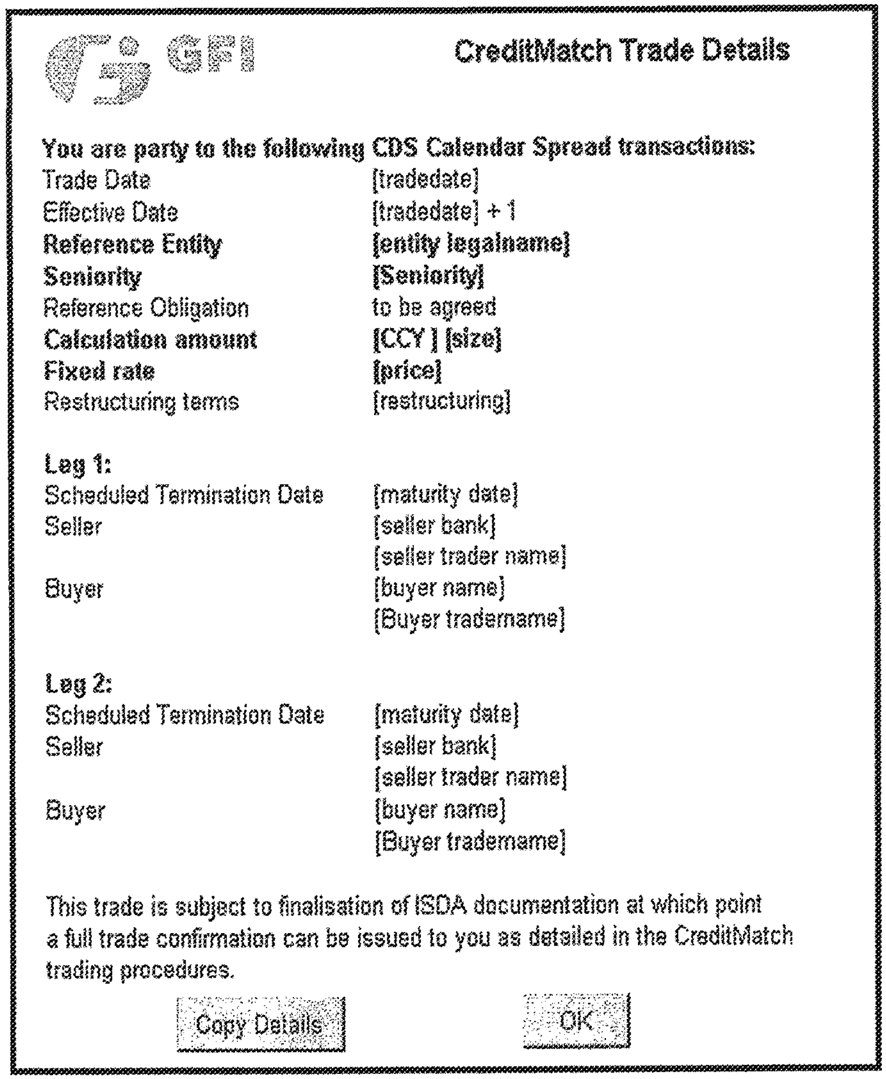
FIG. 62 shows an exemplary illustration of the execution popup layout for a CDS calendar spread.
Figure 63:
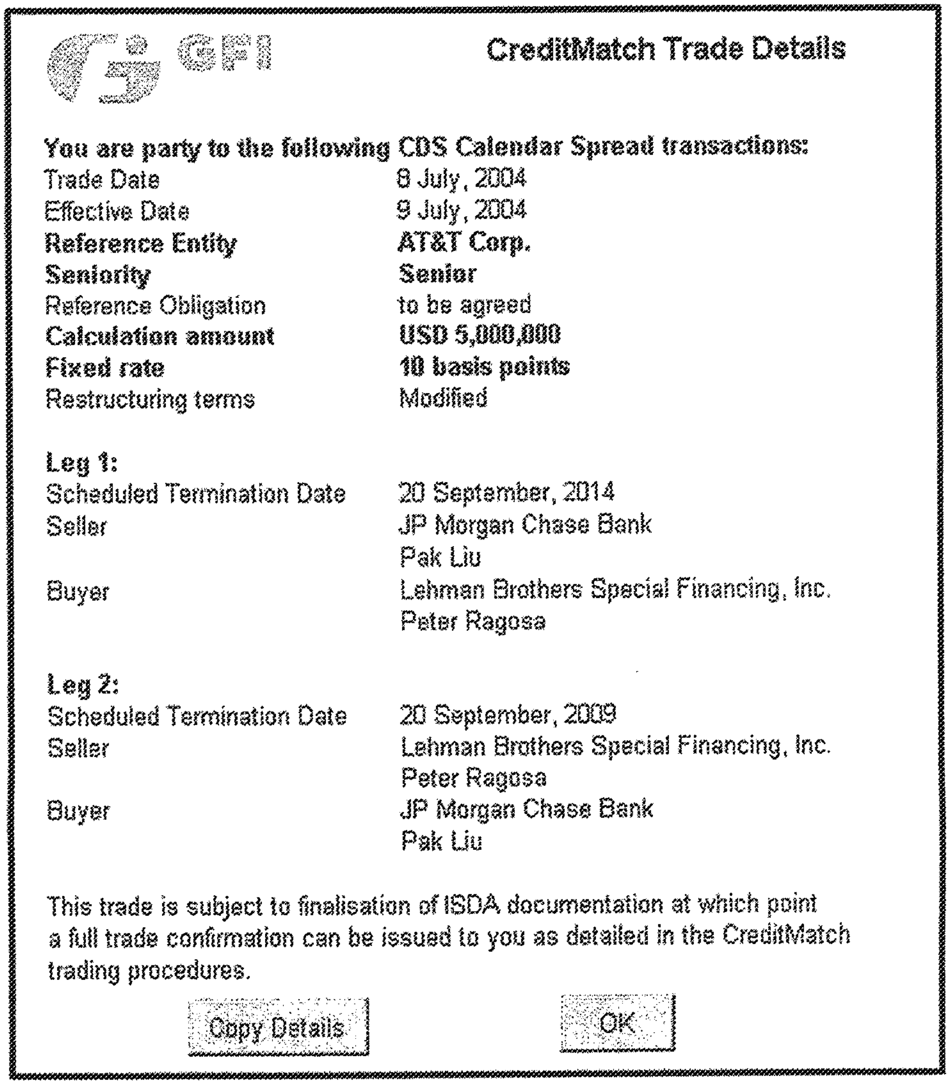
FIG. 63 shows an exemplary illustration of an execution popup for a CDS calender spread trade.
Figure 64:
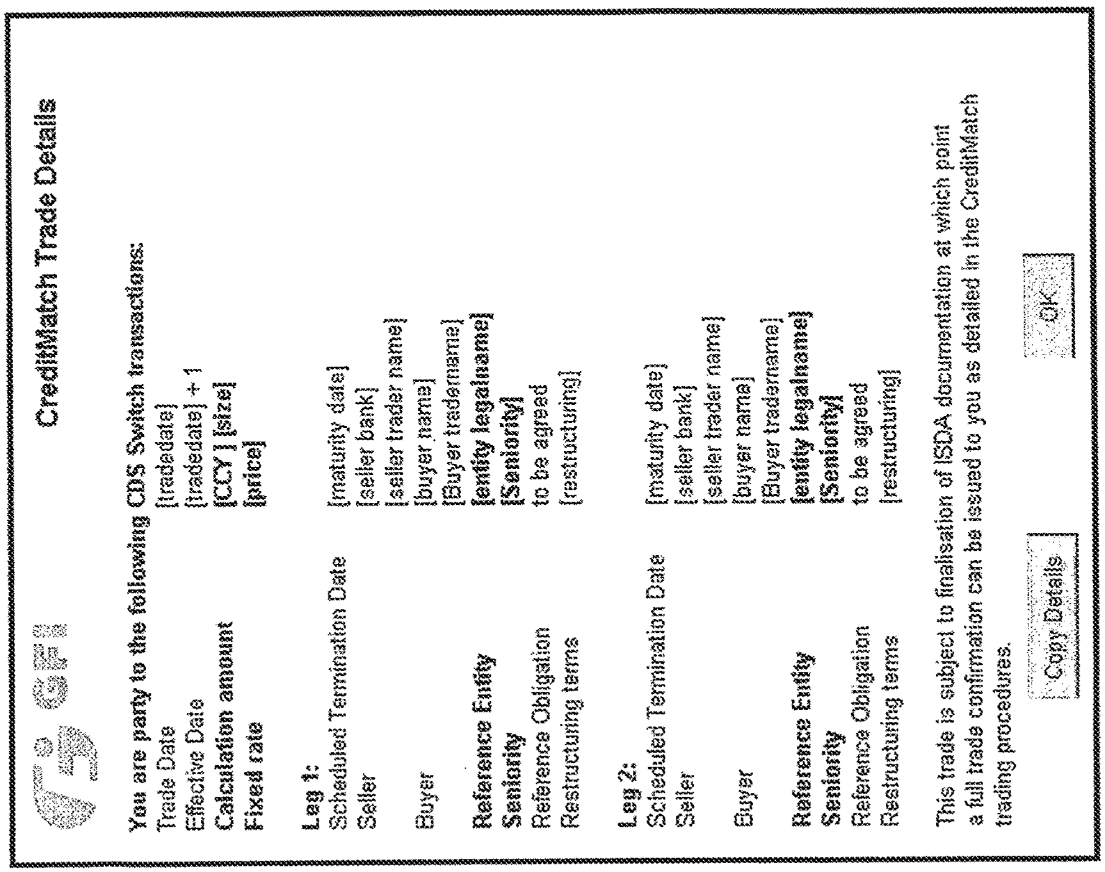
FIG. 64 shows an exemplary illustration of an execution popup layout for a CDS switch.
Figure 65:
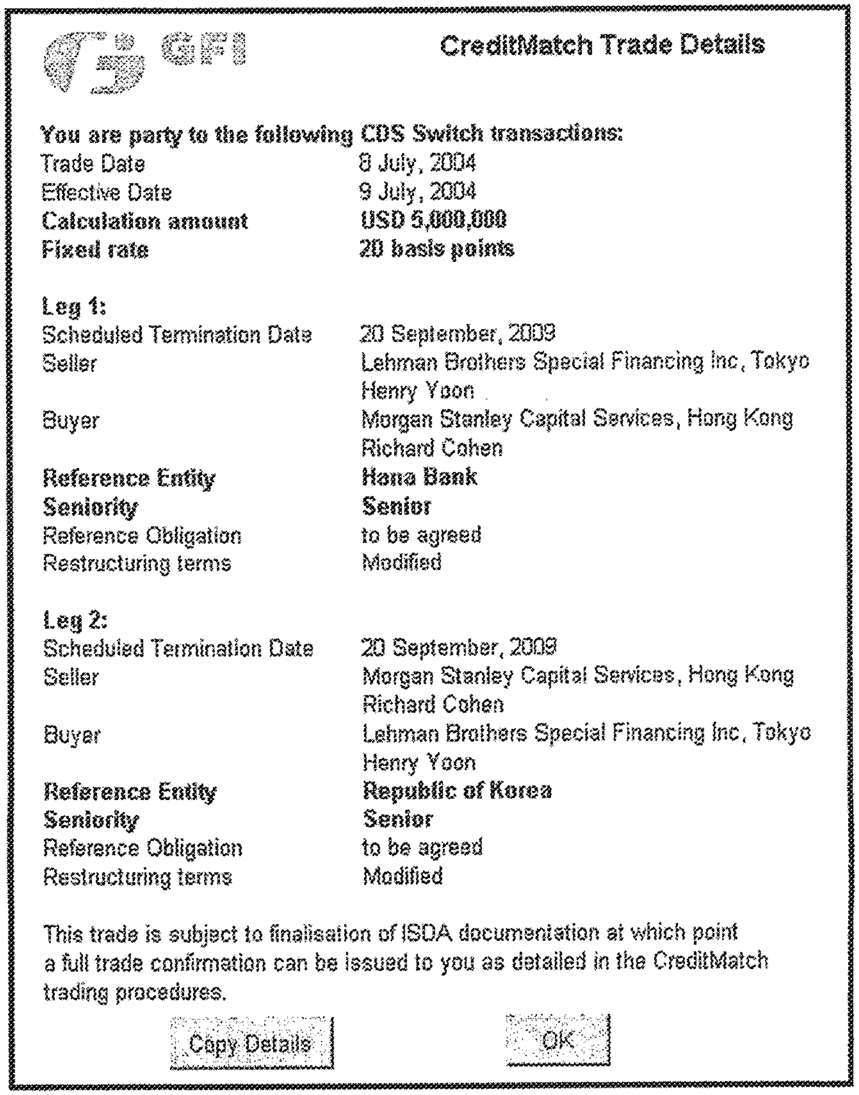
FIG. 65 shows an exemplary illustration of an execution popup for a CDS switch trade.

FIG. 57 shows an exemplary trader view of price information for the My Prices area. Here, the trader may see in one place where the market is pricing the listed interests, where he/she is providing prices on those interests, as well as a consolidated place to manage standard orders very quickly without having to use the dialog box.

The broker and/or trader view of the My Prices columns may display the size and/or price of the trader's best bid or offer, and may include dropdown controls to select, for example, a particular trader, site, or order size that is to be displayed and maintained in the My Prices area.

According to an exemplary embodiment, the Hold button holds just the single price in focus and may be actionable by clicking the <Delete> key. When a held price is selected within the My Prices columns, the label of the Hold button may change to [Firm]. Clicking on this button may firm just the single price in focus. [Firm] may also be actionable by clicking the <insert> key. The Hold/Firm button label may change depending on whether the price selected is firm or held.

According to an exemplary embodiment, the brokers view of the My Prices area may only show the trader's best price in each interest, which may be either posted, unposted or held. If the trader has at least one firm price on an interest, then the best firm price may be displayed even if it is unposted. If the trader has no firm prices, but at least one held price on an interest, then the best held price may be displayed. The price and size of each firm order (posted or unposted) that was either entered or last updated by a broker may appear in bold black font. The prize and size of each held order will appear in normal (non-bold) grey font.

According to an exemplary embodiment, the broker and trader views of the My Prices area and orders where the price has a condition may be displayed with an "*" sign as a superscript on the left side of the price. Instead of the subscript u for up-front prices, and the superscript A for delta hedge, the information may be included in a tool tip function. In this regard, an order details tool tip may appear when the user hovers over the size or price of any bid or offer.

Manual Flash Toggle

According to an exemplary embodiment, the broker may quickly indicate a trade on a price to the external users without waiting for the time it would take to fill in the necessary counterparty and other details on the execution. This may be done, for example, by flashing the affected price immediately so that traders may know that the price is no longer available. A toggle function may be provided for brokers to manually turn flashing on or off on a selected price. In this regard, the manual flash toggle may be accessible via a Lightbulb icon or an F hotkey, and when invoked, the bid/offer size and price columns of the currently selected interest may start (or stop) flashing. To turn flashing on (or off) for the bid side only, the focus may be required to be on either the price or size of the bid. The same may be required for the offer. The toggle function may be disabled when the focus is not on the price or size of a bid or an offer, and the flashing may appear like that of an execution in the Last Trade column. Once turned on, the flashing may continue indefinitely until it is toggled off via the icon or hotkey. The removal of the flashing price(s) from the market as a result of cancellation or execution may also stop the flashing.

According to an exemplary embodiment, to improve readability of sizes and prices in price sheets, the size and price of each firm order may be displayed in a darker or bolder font within price sheet columns. For more efficient space utilization, the blank spaces on either side of the '+' sign may be removed when displaying up-front prices with running points. When the unit of size is millions, a "MM" may not be displayed in the size columns after the actual size. When the unit is anything other than "MM", it may be displayed after the size as it is currently.

Timed Orders

According to an exemplary embodiment, users may be able to credit timed orders that will time out or expire automatically after the specified period. In this regard, users may be given the ability to create timed orders that will 'time out' or expire after a specified period of time so the system may automatically hold these orders when their time runs out. In this regard, the timeout value may be specified in terms of minutes and may be added to all bids and offers, and a setting of zero indicates no timeout, that is, an order with a zero timeout value will be a GTC (Good-Till-Canceled) order. Default timeout preference setting may be provided which may be set to zero for all users on implementation, but may be set to a non-zero value by the user and this value may then be saved along with the user's other desktop settings. All posted orders created by the user may have their timeout set to the value specified as the Default Timeout. This includes all orders created in the MyPrices area. Non-posted orders may default to a zero timeout regardless of the Default Timeout setting, and brokers may need to type in the desired timeout on non-posted orders. The user may override the default or existing timeout value when creating or updating orders via the Price dialog. When an existing order is updated, it's timeout may be reset to the default value, which may also apply to orders updated in the MyPrices area. For example, if the size of an order with a default 10-minute timeout is changed when there are 3 minutes remaining before it's expiration, the order may be updated with the new size and a new timeout of 10 minute. The user may change the reset timeout as desired before submitting the order via the Price dialog. When a posted order is unposted via the Unpost option, it's timeout may be set to zero by default, but again the user may override it via the Update dialog as desired. However, if an order is unposted via the update dialog box, it's timeout may be reset to the default as for all other updates. An Extend option may be provided via the right-click mouse menu and the E hotkey so the user may reset the timeout on an existing posted order to the default without using the Price dialog or in the MyPrices area. For example, if the user wants to reset the timeout on an order with 3 minutes until it expires to the default value of 10 minutes, s/he may focus on that order and click on the Extend menu option or use the E hotkey to do it without having to update it via the Price dialog. In this regard, the Extend option may not apply to held or unposted orders.

When a held order is firmed, it's timeout may be set to the default value and the user may be required to override the default in the price dialog. Changing the timeout on an existing order may not affect the order's ranking in the queue Order Management in and with the MyPrices Area According to an exemplary embodiment, the MyPrices area in pricesheets may allow the viewing, input, editing, holding, and firming of prices without the use of dialog boxes, that is, users may carry out basic order management tasks by typing in key order details directly into the relevant price sheet cells. Brokers and traders may add, update and delete orders directly within the relevant price sheet cells based on the rules. For example, direct cell editing may be enabled only within the MyPrices area, that is, only within these four price sheet columns of My Bid Size, My Bid, My Offer, and My Offer Size. Therefore, direct cell editing may not be permitted in pricesheets that do not include any of the above columns. Since the user may be required to select the trader and site when working in the MyPrices area, direct cell editing may only be enabled for the orders of one trader at a time. Editing may be limited to just the price and size of any order, so that the user may only add basic standard posted orders without special conditions and updates may be limited to just those two fields. When editing an existing order via direct cell input, any data other than the price, size, status (firm/held) or posting status, may remain unaffected by an update—e.g., conditions, hedge flag.

Navigation and parsing rules for in-cell editing may be like those that apply in Excel. For example, the user may use the certain keys to navigate from cell to cell, in which <Enter> may enable vertical movement downwards, <Shift><Enter> may enable vertical movement upwards, <Tab> may enable movement to the next pricesheet, and <Shift><Tab> may enable movement to the previous pricesheet. The four arrow keys may enable movement in the direction of each arrow. If a cursor is at the top, bottom, rightmost or leftmost column in a pricesheet, no further movement in the direction of the arrow may be permitted.

The editable cells may accept only the certain key values to represent the order size and price, including, for example, the numeric characters: 0 through 9, and one period or decimal point. In addition, to allow for the input/maintenance of up-front prices, the My Bid and My Offer cells may accept a '+' sign only when it is preceded by at least one numeric character. Certain special keys may be supported for in-cell editing of price and size data. For example, the space bar to clear the contents of a cell, <Backspace> to make corrections or blank out entered data while the user is in the midst of inputting data in a cell, + to tick up the existing price by one basis point or percent (only when it is used before typing any other valid character into the cell),— to tick down the existing price by one basis point or percent (only when it is used before typing any other valid character into the cell).

Certain special keys may be used for managing order status. For example, the <Delete> key may hold the selected firm order, and the <Insert> key may firm the selected held order. A '+' typed in as the first character within a populated price cell may be interpreted as the increment command and may tick the existing price up. A '+' typed in as the first character within an un-populated price cell may be ignored as an invalid entry. A '+' typed in after a number within a price cell, may be interpreted as part of the price. In this regard, if the interest is an up-front interest, the number preceding the '+' may be taken as the upfront price in %, and any number entered after the '+' may become the running points. If there is no number following the '+', the running points will be set to zero. If the interest is not an up-front interest, the number preceding the '+' may be taken as the price in basis points, and the '+' as well as any characters following the '+' may be ignored. In-cell editing mode may be enabled when the user places his/her focus on an editable cell, and may be invoked as soon as the user types in a valid character as outlined above, provided that there is no related dialog box open at the time. If the user types in an invalid character (alpha or other special characters, including hotkeys) once in-cell editing mode has been invoked, a beep may sound and the invalid character may be ignored. A newly typed-in value may replace the previous content of the cell upon its submission when the user exits the edited cell. When an existing held and/or unposted order is updated via in-cell editing, it may be replaced by a firm posted order. To submit the value entered in a cell, the user may use one of the navigation keys or key combinations above to exit the cell and move to a different cell, or shift the focus elsewhere using a mouse. When editing a cell, if the focus is lost as a result of the user clicking on a button or a menu option, whatever the user has typed into the cell may be submitted as the new value. To cancel editing mode once it has been invoked within a cell, the user may be required to press the <Esc> key to restore the cell's previous contents. Hence, clicking on the <Esc> key may be the only way to invalidate a value input into the cell while the focus is still on the cell. On a new order, if the user types in a price without typing in a size, the size may default to the value selected in the Size dropdown within the MyPrices menubar. Blanking out the price or size may be treated the same as the <Delete> key, that is, it will result in holding the order.

According to an exemplary embodiment, orders that are either created or updated via direct cell input may not be sent to the server until the entry or change is submitted as described above (i.e., after exiting the cell or changing focus). When a value entered into a cell is submitted, the server may validate and process as if the value were entered in the Price dialog and all of the validation rules would apply, including checks for inverted markets, price variation, etc. After the order has been validated, it may be published to all clients and appear in both the MarketPrices and MyPrices (where applicable) areas as a normal order created/updated via the Price dialog. When creating a new order via direct cell input, the order may be created only after a price has been submitted. That is, if the user has entered a size and not yet entered a price, nothing will be sent to the server until a price has been entered. However, a price may be entered without specifying a size, in which case the size may be assumed to be the default value selected in the MyPrices Size dropdown control. When the size of an existing order is updated via direct cell input, the server may process the entry by updating the size on the existing order without changing the position of that order in the queue. When the price of an existing order is updated via direct cell input, the server may process the entry by holding the previous order and replacing it with a new one, so the order's previous queue position may not remain the same. When a change to either the price or size of an existing held order is submitted via direct cell input, the server may process the entry as a firm order. That is, the order may automatically be firmed with the updated details. When a change to either the price or size of an existing unposted order is submitted via direct cell input, the server may process the entry as a posted order. That is, the order may automatically be posted with the updated details.

Firm Toggle for Hold Function

According to an exemplary embodiment, the [HOLD] button and mouse-menu option may serve a dual purpose. For example, the user may either hold a firm price or firm a held price, or may toggle between hold and firm depending on the current focus. In this regard, when the focus is on a firm price, the button/option label may read [HOLD] and clicking on it may result in firming the selected held price. When the focus is on an empty cell, the button/option may be displayed.

Hold All Function

According to an exemplary embodiment, a Hold All button may operate to hold multiple firm prices. In this regard, the Hold All button may be invoked via the <ctr><delete> key option and may remain red with white letters: Accordingly, all the firm prices may be held for the selected trader (via the Trader filter) in the current workspace, which includes prices in the depth.

Firm All Function

A Firm All button may be provided to firm up multiple held prices from the Order Book, which may be invoked via the <Ctrl><Insert> key combination and displayed green with white letters. When invoked, the command may run a canned query in the Order Book to show all of the held orders for the selected trader (via the desktop Trader filter) that were originally submitted on the current business day. The displayed held prices may have their status set to FIRM by default in preparation for the user to submit the update. The user may have the opportunity to make any desired changes before submitting the update to FIRM some, all or none of the displayed prices. All of the edits and validations that apply to newly submitted prices may also apply to prices firmed via this command. That is, the price variance and inverted market checks, etc.

Extent Option for Timed Orders

According to an exemplary embodiment, users may reset the timeout period on posted orders to the Default Timeout via an Extend Option, which is accessible via the right-click menu and the E hotkey in both the MarketPrices and MyPrices area. In this regard, the user may reset the timeout on an existing posted order to the default without using the Price dialog on the MyPrices area. The Extend option may not apply to held or unposted orders. That is, the option may be disabled when the focus is on a held or unposted price.

Encryption of Data

According to an exemplary embodiment, all data transmitted between the CTS server and client workstations may be encrypted for security and to protect client confidentiality.

Interactive Trader Role

Full interactivity may be provided via the Interactive Trader role, which grants traders the right to execute trades only for reference entities with an interactive access level. In this regard, access may be provided not only to a subset of interactive reference entities, but to all entities with an interactive access level, across all sectors and external workspaces.

One-Cancels-Others Orders

According to an exemplary embodiment, brokers and traders may apply One-Cancels-Others (OCO) conditions to orders, which allow traders to link two or more of their orders so that when one is executed, the other(s) are automatically held. In this regard, there may be only one OCO group for each trader, that is, on the execution of an OCO order for a particular trader, all of that trader's other firm OCO orders may be held (cancelled). A preference checkbox for OCO may be provided so that the user may indicate whether OCO is to be checked on or off by default on all new prices created by the user. The OCO checkbox may be provided in the price dialog between the Unit and delta hedge checkbox for both the bid and the offer. New orders created via direct cell input may inherit the default OCO setting for the user. Modification of an OCO condition on an existing order may be enabled only via the Price dialog box or the order book, so that orders updated via the price dialog or direct cell input may retain their original OCO setting regardless of the current default setting. Accordingly, the user may need to explicitly change the OCO setting when updating an order. Held orders may retain their original OCO setting. Brokers may be able to create and update OCO orders on behalf of a trader with certain limitations. Traders may see a superscript of 0 on the right side of their own OCO prices in both the MyPrices as well as the Market Prices areas. Brokers may see the 0 superscript on the right side of their currently selected trader's OCO prices in the MyPrices area only. All of a trader's firm OCO orders may be viewed together on the Order Book via a Show OCO mouse-menu option, which may open up the Order Book and automatically run a pre-defined query for the selected trader.

Order Book

According to an exemplary embodiment, for more effective management of multiple orders (especially held and OCO prices), the Order Book may include certain features described below.

A workspace filter may be provided, which includes a Today Only checkbox that limits the query to orders originally submitted on the current date only, and a OCO Only checkbox t hat limits the query to OCO orders only.

A Firm All button may be provided to open up the Order Book and automatically run a query showing all of the selected trader's held orders for the current workspace, that were originally submitted on the current system date only (prior days' held orders will be excluded), and a Show OCO mouse menu option may be provided to open up the Order Book, which automatically runs a query showing all of the selected trader's OCO orders (by definition these may be firm orders only).

The canned Firm All order book query may be invoked from the workspace <Ctrl><Insert> key combination to open up the order book and display all held orders from the current business day for the currently selected trader and workspace. When invoked by a trader, it may run for the trader himself/herself, and when invoked by a broker, it may run for the trader selected in the trade dropdown. The canned Show OCO order book query may be invoked from the workspace currently in focus via the new Show OCO mouse-menu option or the <Ctrl>S key combination to open up the order book and display all firm OCO orders for the currently selected trader and workspace. When invoked by a trader, it may run for the trader himself/herself, and when invoked by a broker, it may run for the trader selected in the trader dropdown.

Order Size Edit for Interactive Traders

According to an exemplary embodiment, the size of any order created or updated by a trader may be required to be a multiple of the default order size for the reference entity. If the trader attempts to create or update an order for a size that does not meet this condition, s/he may be given the following error message: 'Size should be a multiple of nn MM' where nn is the default order size. With direct cell entry, if the selected default size is not a multiple of the entity default size, then the user may receive this error, and may either be required to change the default setting, or use the price dialog in order to create the order.

Trade Execution

According to an exemplary embodiment, an Interactive Trader may execute a trade by hitting a standing bid, or lifting a standing offer on an entity with an Interactive access level only. Executions in entities with Voice Only, View Only or Semi-Interactive access levels may not be permitted, and the trader may not change the price of the selected bid or offer when submitting the trade The size of the trade may not be a multiple of the default order size for the reference entity (e.g., 25 M for an Iboxx IG index, 10 M for an Iboxx HY index, 5 M for a Corporate name, etc.), provided that it is not greater than the size of the selected bid or offer. If the trader attempts to execute a size that does not meet this condition, s/he may be given the following error message: 'Size should be a multiple of nn MM' where nn is the default order size Whenever an execution is submitted either by a broker or an interactive trader, the broker and/or the two traders involved in the deal may be notified about the success or failure of the trade. In particular, if the execution failed as a result of the price being removed from the market because it was either cancelled or executed by a rival broker/trader, the user submitting the execution may receive the following message: 'Sorry! Your execution failed—the selected price is no longer available' If the execution succeeded, only the traders involved on both sides of the deal (even if the execution was submitted by a broker) may be given the trade and counterparty details via a modal trade details popup which may require that it be viewed and acknowledged by the trader within 90 seconds of the execution. As soon as a trade is successfully executed by a broker or a trader, the trade icon may start flashing and counting down from 90 seconds only on the clients for the two traders involved in the deal.

The flashing icon alerts the traders when they have traded and flashes the remaining time available for them to click on the icon in order to view the details of the trade, so as not to interrupt the traders' current actions, and provide the trader the opportunity to finish up any in-progress activity before they have to view and acknowledge the trade details. If a trader does not click on the flashing icon within 90 seconds after the execution, the system may pop-up the trade details automatically when the time runs out. To close the pop-up the user may be required to acknowledge the trade either by clicking on the [Ok] button or by pressing <Enter>. When there is more than one trade for a trader to view, the popups may be stacked one behind the other, and the timer may be set based on the earliest one. After the trader has viewed and acknowledged the first trade, s/he may be presented with the next one, and so on until each stacked trade has been viewed and acknowledge. A non-resizable modal trade details popup may be proivded, which includes a system logo that appears on the top left area of the box. A "CreditMatch Trade Details heading may appear centered at the top of the box) and certain text may appear below the system logo. For example, for a single CDS: "You are party to the following CDS transaction", for a CDS Calendar Spread: "You are party to the following CDS Calendar Spread transactions", and for a CDS Switch: "You are party to the following CDS Switch transactions".

FIGS. 59 to 65 show exemplary illustrations of trade execution details pop up dialog. The exemplary trade execution details pop up may include the trade date of the execution (normally the current date) in dd, Monthly yyyy format, the effective date of the trade (trade date+1 calender day) in dd, Month yyyy format, calendar spreads and switches by interest leg, and maturity date of the interest in dd, Month yyyy format (presented separately for each leg of a calendar spread or a switch trade). An exemplary trade details pop up may also include the legal name of the seller company, followed by the full name of the selling trader on the next row (presented separately for each leg of a calendar spread or a switch trade—the seller of the first leg becomes the buyer of the second and vice versa), and the legal name of the buyer company, followed by the full name of the buying on the next row (presented separately for each leg of a calendar spread or a switch trade—the buyer of the first leg becomes the seller of the second and vice versa). An exemplary trade details pop up may further include the legal name of the reference entity on the interest in bold font (presented separately for each leg of a switch trade), the ISO code of the trade currency, followed by the fully expanded notional amount of the trade in bold font, and the trade price as entered (in terms of a percentage or basis points) in bold font. For trades involving an up-front interest/price, the up-front portion of the price may be displayed as a percentage followed by the constant 'Upfront,' then a '+,' and then the running points followed by the constant 'running points'. An exemplary trade details pop up may also display the full description of the restructuring type of the interest; (presented separately for each leg of a switch trade).

A "Copy Details" button may be provided so that the user may copy the trade details to the clipboard in text format, and an OK button (or <Enter>) may be provided to acknowledge the trade details, and close the popup.

Interactive Work-Up Duration by Entity

According to an exemplary embodiment, default settings may be provided for each entity to indicate the time allocated for interactive work-ups. In particular, entity defaults may be provided, which include a setting for 2-way interactive work-up duration. In this regard, the work-up duration may be specified in seconds and if set to zero, may indicate that there will be no interactive work-ups. The setting may apply only when the product line itself enables work-ups, and the user may specify a value between 0 and 60 seconds. All entities may be initialized to have a duration of zero seconds.

Toggle For Size Columns

According to an exemplary embodiment, a toggle function may be provided so that users may show/hide size columns in the Market Prices area of all their price sheets. The toggle function may be accesible via a button at the top of the main applet window. A button label may read Hide Size when the size columns are visible in the Market prices area, and may read Show Size when the size columns are hidden in the Market prices area. Pressing [Hide Size] may result in the Bid and Offer size columns being removed from the display in every price sheet on the user's desktop that contains those columns. When the size columns are hidden, any columns/price sheets to the right of the hidden size columns may be shifted over to the left so that they cover the space formerly occupied by the size columns. Conversely, when [Show Size] is pressed to redisplay hidden size columns, they may appear in their configured positions within each price sheet on the user's desktop than includes those columns. In this instance, as some columns and/or price sheets may be shifted to the right, the size of each affected price sheet may expand horizontally to make room for the size columns. The Size toggle may not apply to the size columns in the MyPrices area.

Toggle For Blotter Columns

According to an exemplary embodiment, a toggle function may be provided so that users may show/hide the blotter (a.k.a., the MyPrices area) in all their price sheets. In this regard, the toggle function may be accesible via a button at the top of the main applet window. The button label may read Hide Blotter when the blotter columns are visible in price sheets that include a MyPrices area, and may read Show Blotter when the blotter columns are hidden in price sheets that include a MyPrices area. Pressing [Hide Blotter] may result in the blotter columns being removed from the display in every price sheet on the user's desktop that contains a MyPrices area. When the blotter columns are hidden, any columns and/or pricesheets to the right of the hidden blotter columns may be shifted over to the left so that they cover the space formerly occupied by the blotter columns. Conversely, when [Show Blotter] is pressed to redisplay hidden blotter columns, they may appear in their configured positions within each price sheet on the user's desktop that includes a MyPrices area. In this instance, as some columns and/or price sheets may be shifted to the right, the size of each affected price sheet may expand horizontally to make room for the blotter columns.

Content for Trader Trade Log

According to an exemplary embodiment, for traders, the trade log may now include messages for trades that were executed interactively, as well as trades involving other traders from their own company. More specifically, in addition to their own trades, each trader may also see messages for trades that involve any site from their own institution, plus trades executed interactively by any trader if they relate to interests within the trader's selected workspace/s. However, counterparty names may not be shown in the messages for interactive trades that do not involve a trader's own institution. Trade messages that do not involve the trader himself may appear in black font, whereas those involving the trader himself may appear in green font.

Market Display of Work-Ups

According to an exemplary embodiment, during a work-up, the executed bid/offer may be highlighted, but not removed from the market, although it may no longer be available for execution by another user. In this regard, for the duration of a work-up, the price and size cells of the executed bid/offer may be flashed with a pale red background, like the one used to flash the last trade column. The flashing may indicate to all users that the highlighted price was executed, and that the trade is potentially being worked up interactively. The executed price may not be removed from the market until the work-up is terminated, however, it will no longer be available for execution by another user. No other user may hit or lift on the interest for the duration of the work-up. Users may enter and update prices on the interest during the work-up. Upon termination of the work-up, the quote may be updated to reflect the best bid and offer in the market for the interest at that point.

Unfilled Work-Up In Broker

According to an exemplary embodiment, for brokers, the trade log may include a message that may inform of any left over unfilled size from a trader's specified work-up. In this regard, during a work-up, when one counterparty submits an increased size that is in excess of that specified by the other counterparty, an unfilled work-up message may appear at the end of the work-up, within the trade log of every broker who has subscribed to a workspace that includes that interest. The message may include the time when the work-up was terminated will be displayed in hh:mm:ss format. The short name of the site of the trader with the excess size will be shown after the timestamp, and the name of the trader with the excess size will appear after the site short name. If the trader with the excess size was the buyer, then the term BUYS MORE may appear after the trader's name. If the trader with the excess size was the seller, then the term SELLS MORE will appear after the trader's name. In this regard, the market name of the entity on the interest may appear after the work-up direction, and the code for the interest's debt class may appear after the market name of the entity. Moreover, the interest term may appear after the debt class, the unfilled excess size may appear after the interest term, and the execution price preceded by an @ may appear after the unfilled size.

Trader-Level Timeout

According to an exemplary embodiment, the current timed order functionality may be provided with a single timeout setting per trader. Hence, instead of having a separate timeout setting per order, each trader may optionally set a global timeout applicable to all of his/her firm posted orders. In this regard, the timeout setting may be specified and displayed via a single editable field, which may appear at the top of the main applet window between the default size drop-down, and the icon bar. When the user's focus is in this field, it may be enabled for editing, allowing the user to modify the current setting. When the focus is away from this field, it may display a countdown of the timeout setting.

In this regard, the user may also specify the desired timeout value by placing his/her focus in the timeout field, which may switch it to edit mode. Pressing any key may clear the current contents of the field. The left and right arrow keys may enable navigation within the fields. The user may specify the new/changed timeout value either in terms of hours and minutes in the format hh:mm, or in terms of minutes only, since seconds may not be allowed in edit mode. Only the certain characters may be accepted as input, such as, for example, space, the numeric digits 0-9 and a single ":". A blank value may indicate that there is no timeout set. When not blank, the first character entered may be required to be a numeric digit. A single ":" may be specified when preceded by 1 or 2 numeric characters. The maximum number of hours accepted may be 12. When preceded by hours and a ":", the maximum number of minutes accepted may be 59. When not preceded by hours, the maximum number of minutes accepted may be 720. The timeout setting may take effect when the user tabs out of the field or changes focus using the mouse, which will switch the field from edit mode to display mode.

In display mode, a timeout display field may show a real-time countdown of the current timeout to the nearest second (format hh:mm:ss). This countdown may commence as soon as the field switches from edit to display mode. The timeout setting may be applicable to traders only, the timeout setting may apply to all firm posted prices across all workspaces that are owned by the trader, including those entered or last updated by a broker on behalf of the trader. Unposted prices may not be subject to the timeout, as they may not be maintained by the trader himself. When the timeout setting countdown reaches zero, all the of trader's firm prices in the system may be automatically held—in essence it may be akin to the trader doing a Hold All for all workspaces. The end-of-day process may hold all the relevant prices regardless of any timeout settings at that point in time. Hence, the timeout setting may be ignored at that point.

Multiple OCO Groups Per Trade

According to an exemplary embodiment, each trader may be assigned up to 10 different OCO groups so that the user may create multiple sets of linked OCO orders. In this regard, instead of a single set of OCO prices for each trader, multiple OCO order groups per trader may be provided by assigning a specific OCO group id to each OCO order. An OCO drop-down may be provided in the main applet window for the selection of a default OCO group, which may appear to the right of the Default Size at the top of the main applet window. The OCO selection list may include a blank setting for no OCO default, as well as the letters a through j, which may represent the OCO groups assigned to each trader. The user may use type-ahead functionality to specify the OCO group instead of selecting it from the list. All new prices created by the user may inherit the currently selected default OCO group. The OCO group ids on existing orders may not be affected by changes to the OCO default setting, even when updating or holding those orders.

Within the price dialog, an OCO drop-down may be provided, which includes a blank setting for no OCO default, as well as the letters a through j, to represent the ten OCO groups. The user may use type-ahead functionality to specify the OCO group instead of selecting it from the list. When adding new orders, the OCO group on both the bid and offer may be preset to the default OCO group.

Within the Order Book, drop-downs may also be provided, including a "OCO Filter drop-down" to display certain OCO orders, and an OCO Column drop-down to display the current OCO group for each displayed order. A pre-defined Show OCO Order Book query may be provided to run for an OCO filter setting of ALL to show all firm OCO orders in the system for the selected trader. However, the OCO filter may be enabled for the selection of a specific OCO group should the user wish to limit the query to all firm orders linked to just one of the selected trader's OCO groups. In this regard, the display of OCO orders in price sheets, traders may see their own OCO orders displayed with a superscript denoting the OCO group id to the right of the price, in both the MyPrices as well as the Market Prices areas. Brokers may see their currently selected trader's OCO orders displayed with a superscript denoting the OCO group id to the right of the price, in the MyPrices area only. For example, a bid of 20 that is linked to OCO group d, will appear as $20^{d}$.

Price Variance Check Levels

According to an exemplary embodiment, the levels for the high and low price variance checks on the CDS produce line may be set to 10% on either the low or high side. In this regard, the High Price Limit and the Low Price Limit may both be set to 10% for the CDS product line via a database script so that when a user enters a price that varies by 10% or more from last price, the price variance warning will be given.

Locked Market for Execution During Work-Ups

According to an exemplary embodiment, during a work-up, the market on the affected interest may be locked for subsequent executions. In particular, while a work-up is in progress, no further hits or lifts may be permitted against the interest involved in the work-up. However, users may enter or update bids and offers against that interest during the work-up. The Hit/Lift options may be disabled during a work-up. Upon termination of the work-up, the hit/lift options may be enabled for the appropriate users.

2-Way Trade Work-Ups

According to an exemplary embodiment, when executing a trade interactively, the initiator as well as the aggressor may be given the option to work-up the size of the trade independently, and then the smaller of the two submitted sizes will be executed, provided that it is equal to or greater than the initial size hit/lifted. In this regard, a new work-up dialog may be presented to both the initiator and aggressor immediately following an interactive execution so the two counterparties may increase the size of the execution subject to certain conditions.

In regards to the trade work-up workflow, when a bid/offer is interactively hit/lifted by a trader, both the aggressor and intiator may each immediately receive a timed pop-up displaying the details of the interest, with an option for each counterparty to independently increase the size. The dialog may count down in seconds, the time available for the counterparties to respond—the remaining seconds may be displayed prominently in large bold white and red font. The number of seconds available may depend on the work-up duration setting for the entity. Each counterparty may set their preferred total size either by typing it in in the field provided or by ticking it up/down to a multiple of the entity's default size, provided that the selected size is not lower than that originally hit/lifted. An increased size or work-up, may be required to be explicitly submitted by clicking on the [Submit] button or by pressing <Enter>. If both counterparties respond by submitting a larger size than that initially executed, then the smaller of the two increased sizes may be traded. If one or both counterparties do not respond within the time frame, then the trade may be created for the originally executed size. For the duration of the work-up, the size and price cell of the bid or offer that was executed may flash with a pale red background currently used in the last trade column.

During the work-up period, the market on the interest may be locked for execution, but not for order entry, that is, users may be allowed to enter and update orders, but not hit or lift orders in that interest. The work-up may terminate either when both counterparties have responded, or when it times out—whichever comes first. The termination of the work-up may finalize the trade, resulting in the removal of the executed bid/offer from the market display, which may unlock the interest for execution. When the trade is finalized, the trade details may be displayed in the trade log, and flashed in the last trade column. Any left over unfilled size from the work-up on either side, may be displayed in broker trade logs via a new message type. For example, if the initiator increased the size from 5 MM to 25 MM and the aggressor increased it to 15 MM, then a total of 15 MM may be traded, and brokers may be notified that the initiator desired an additional 10 MM. The counterparties may have only one chance to work-up the trade, that is, once the initial work-up times out or is submitted, there may be no further opportunity to work-up that trade.

Only interactive traders may receive the work-up pop-up. If the initiator is not an interactive trader, or is not logged on at that time, then only the aggressing trader may receive the pop-up, and the work-up may terminate either when the aggressor responds or when it times out. The work-up dialog may appear as a modal dialog on top of any other type of screen that might be displayed within the designated display area of the work-up.

If a counterparty to the trade already has one work-up dialog open, then a subsequent work—may not be displayed until the previous one has been dealt with, however the countdown may commence as soon as the original hit/lift is submitted.

Figure 66:
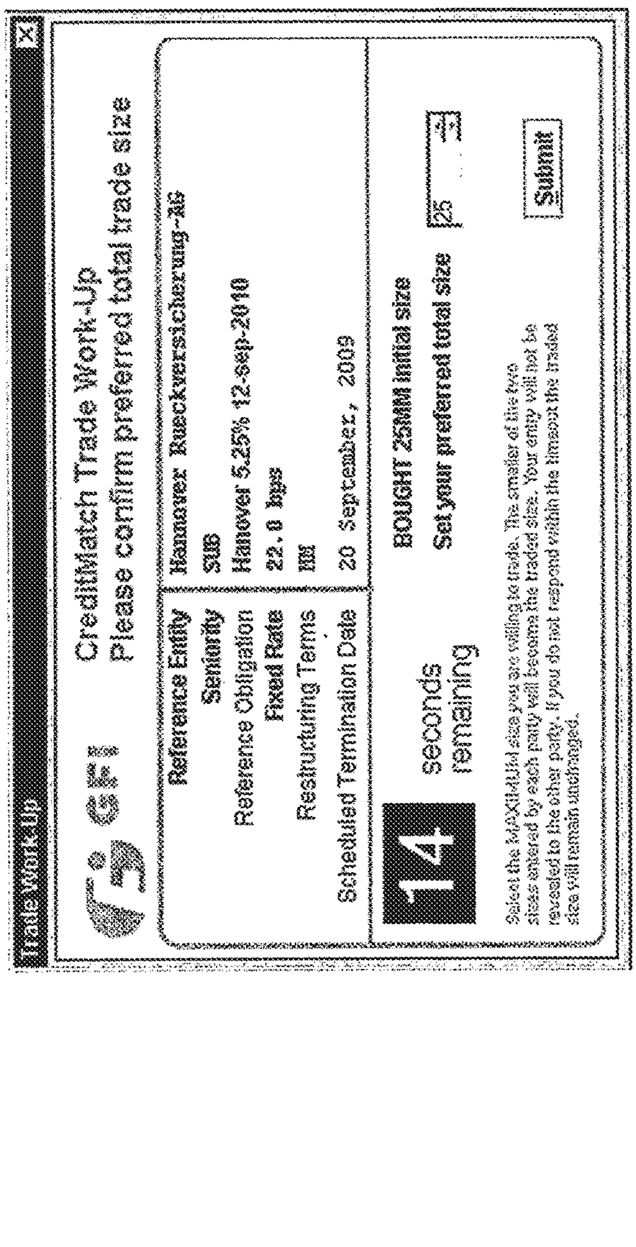
FIG. 66 shows an exemplary illustration of Work-Up dialog for a single CDS.
Figure 67:
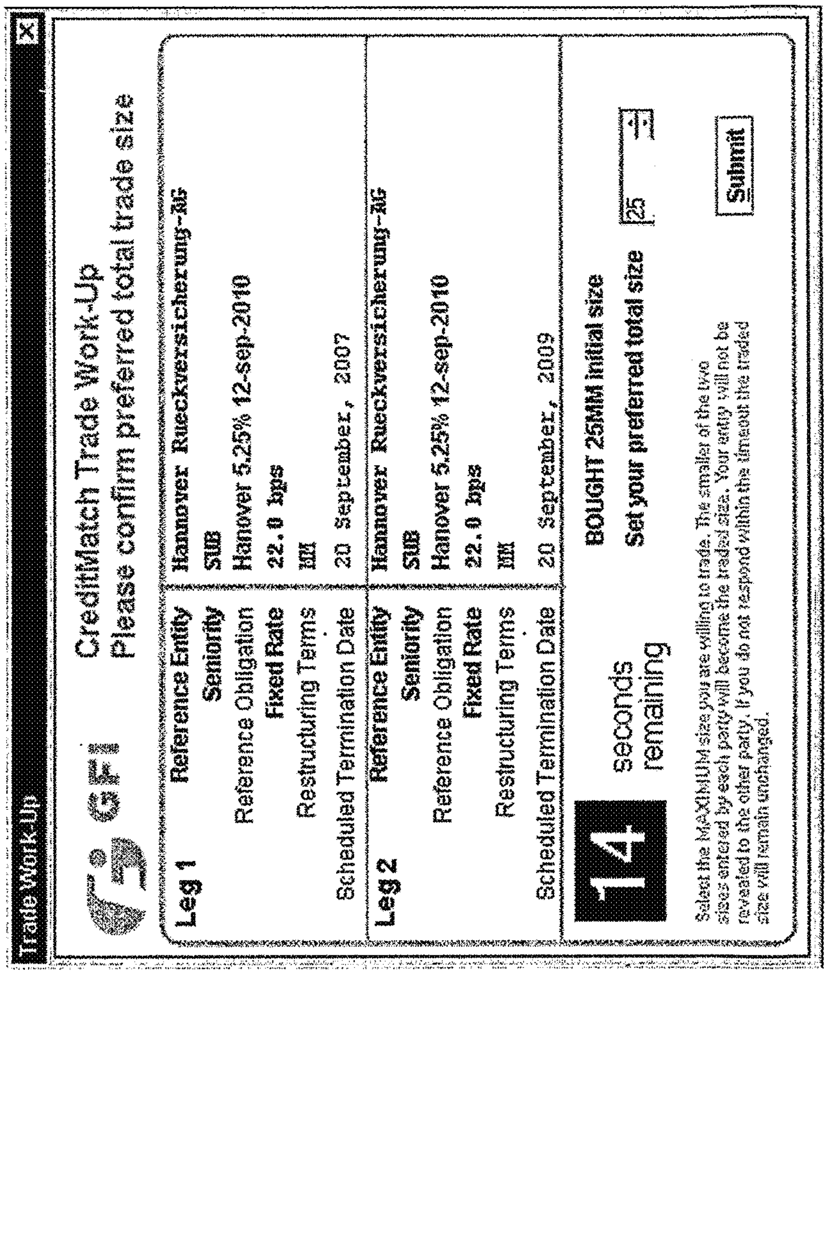
FIG. 67 shows an exemplary illustration of Work-Up dialog for a CAL or SWT.

FIGS. 66 and 67 show exemplary illustrations of the work-up dialog. The exemplary Work-Up dialog may include interest description information for each leg of the interest. In particular, the Work-Up dialog may include a label for the leg number (to be displayed only if the interest is a CAL or a SWT), the legal name of the entity on the leg, a code for the debt class of the leg, and a description of the default reference obligation for the entity on the leg will be displayed. The Work-Up dialog may also include the price of the selected bid or offer, and a code for the restructuring type of the leg, the maturity date of the leg, and a countdown present to the interactive work-up duration setting for the entity. For CALs and SWTs, this may be set to the setting of the entity with the shorter duration. The timer may count down the remaining seconds, which may be displayed in large bold font, alternating between white numbers on red background, and red numbers on a white background, from one second to the next to make the flashing more prominent. The Word-Up dialog may also include a total size preset to the size executed via the initial hit/lift action, in which each counterparty may tick this size up in multiples of the entity default size for the selected interest. The user may not be permitted to set the size lower than that of the original hit/lift. [Submit] or <Enter> or <Alt>S may submit the work-up for the selected size and close the work-up dialog. <Esc> or [x] may close the dialog without submitting a work-up.

According to an exemplary embodiment, the dialog may be modal, and may take precedence over any other dialog or pop-up that might be open concurrently on the user's desktop. The user may dismiss the dialog either by submitting an increased size for a potential work-up, or by closing the dialog. The dialog may automatically close if the user does not react to it before it times out. There may be only one opportunity for each counterparty to interactively work up a particular trade, that is, the work-up dialog may appear only once for each interactive execution. By default, the dialog may appear in the center of the user's main applet window. If the user re-positions the dialog elsewhere, its changed co-ordinates may be persisted the next time it appears on that user's desktop.

Only one work-up dialog may be displayed on a user's desktop at any given point in time, which should correspond to the earliest trade awaiting a work-up response from the user. If the user is counterparty to two or more trades that have triggered concurrent or overlapping work-up processes, the countdown on each may continue even though the user may not be able to view and deal with more than one at a time. In this case, one or more of the subsequent work-ups may expire before the user has had a chance to get to them.

Default Reference Obligations On Trade Ticket

Figure 68:
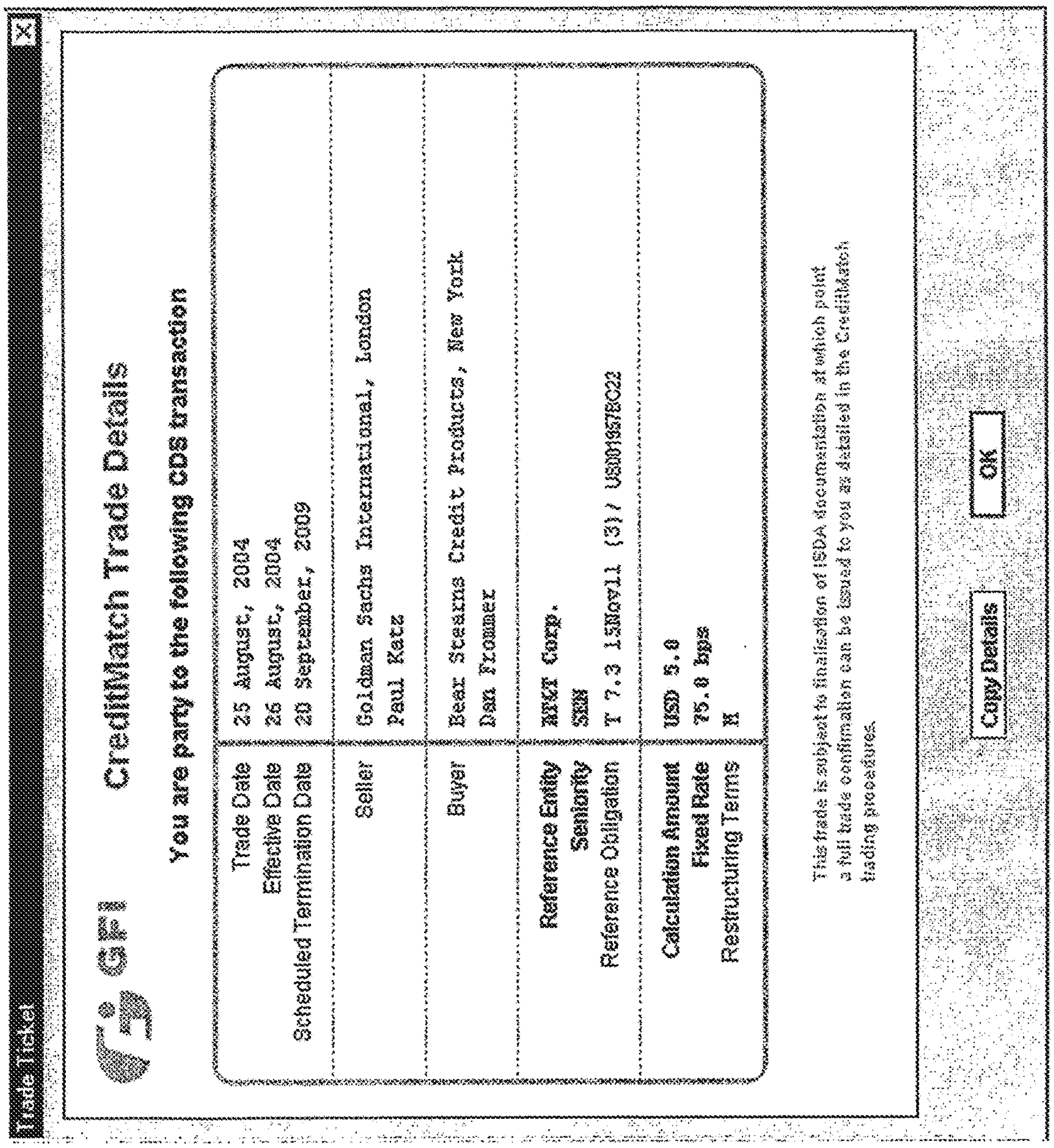
FIG. 68 shows an exemplary illustration of trade ticket with default reference obligation.

According to an exemplary embodiment, the trade ticket may show the bond name and ISIN of the default reference obligation/s for the interest. In particular, the bond name and ISIN of the default reference obligation may now appear within the trade ticket for each combination of entity and debt class on the trade as shown, for example, in FIG. 68. In this regard, the name of the default reference obligation for the Entity and debt class of each interest leg may be displayed to the right of the label for the Reference Obligation. If there is no default obligation specified for the entity and debt class combination, then the phrase'To be agreed. No default ref. ob. available' may appear instead. The 12 character ISIN of the default reference obligation may be displayed to the right of the bond name, separated from the bond name by a /. The ISIN may not appear if there is no default reference obligation specified for the entity and debt class combination, or if there is no ISIN for the bond.

User Roles By Product Line

According to an exemplary embodiment, user reference data maintenance may support the assignment of roles by product line so that user access levels may be set independently for each market. In this regard, user roles may be linked to specific product lines to enable varying levels of user access by market. In particular, user roles may be assigned separately for each product line that the user is entitled to access, and one or more roles for each product line may be selected. The available product lines may be displayed with the list of roles next to each. In particular, the name of the product line may be displayed, along with a list of available roles which may be selected by highlighting the desired roles.

Price Sheet Features

According to an exemplary embodiment, administrators may configure and organize CDS and IGB price sheets to better address special user needs. In this regard, Default Price Sheet Administration may support the definition and configuration of IGB price sheets, the sorting of interests based on a positional index, and the dynamic horizontal wrapping of price sheets to prevent interest overflow past the bottom of the current application window. Price Sheet Administration may support the creation of price sheets for the IGB product line. A Bond Id column may be provided for IGB as well as CDS. The list of display and default columns may be filtered based on the product line selected.

'Indexed Price Sheets' may be provided so that brokers may control the physical position of each interest, and insert additional label rows in specific positions for grouping and/or organizing those interests. Indexed price sheets, may be enabled via a sort option on the Price Sheet configuration page. An index value may be included that is automatically assigned to each interest, and calculated based on the physical position of each interest. When a new interest is added to an indexed price sheet, the system may insert it below the row that is currently in focus.

The interest index may be used for sorting, thus ensuring that interests appear in the desired order based on their original physical placement within the price sheet. If the product view used for the definition of an indexed price sheet includes interests originally added to a non-indexed price sheet, a very high max index value (e.g. 99999) may be assigned to each such index, and as a consequence those interests may appear at the very bottom of the indexed price sheet. Hence, brokers may not control the physical position of any interests appearing within an indexed price sheet that were not originally added to that price sheet. Moreover, brokers may insert and maintain additional label rows to help further group or organize interests within an indexed price sheet. This may be done via a simple dialog. A hotkey combination <Ctrl>L inserts a new label row below the row currently in focus. A mouse menu may be made available on each such label row to edit label via the same dialog, as well as the deletion of the label row.

Wrapped Price Sheets

Figure 69:
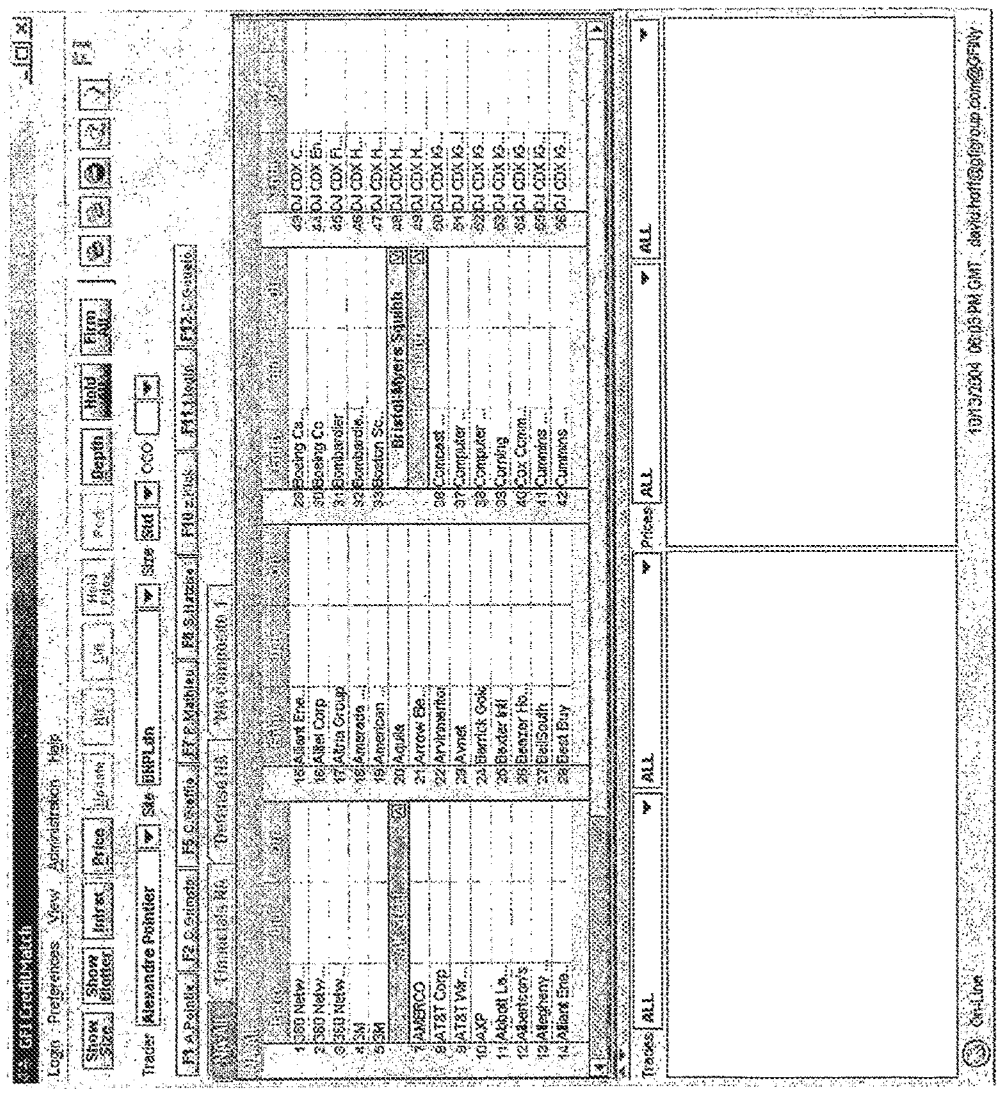
FIGS. 69 and 70 show screen shots of one wrapped price sheet automatically adjusted in 2 different configurations based on the window height.
Figure 70:
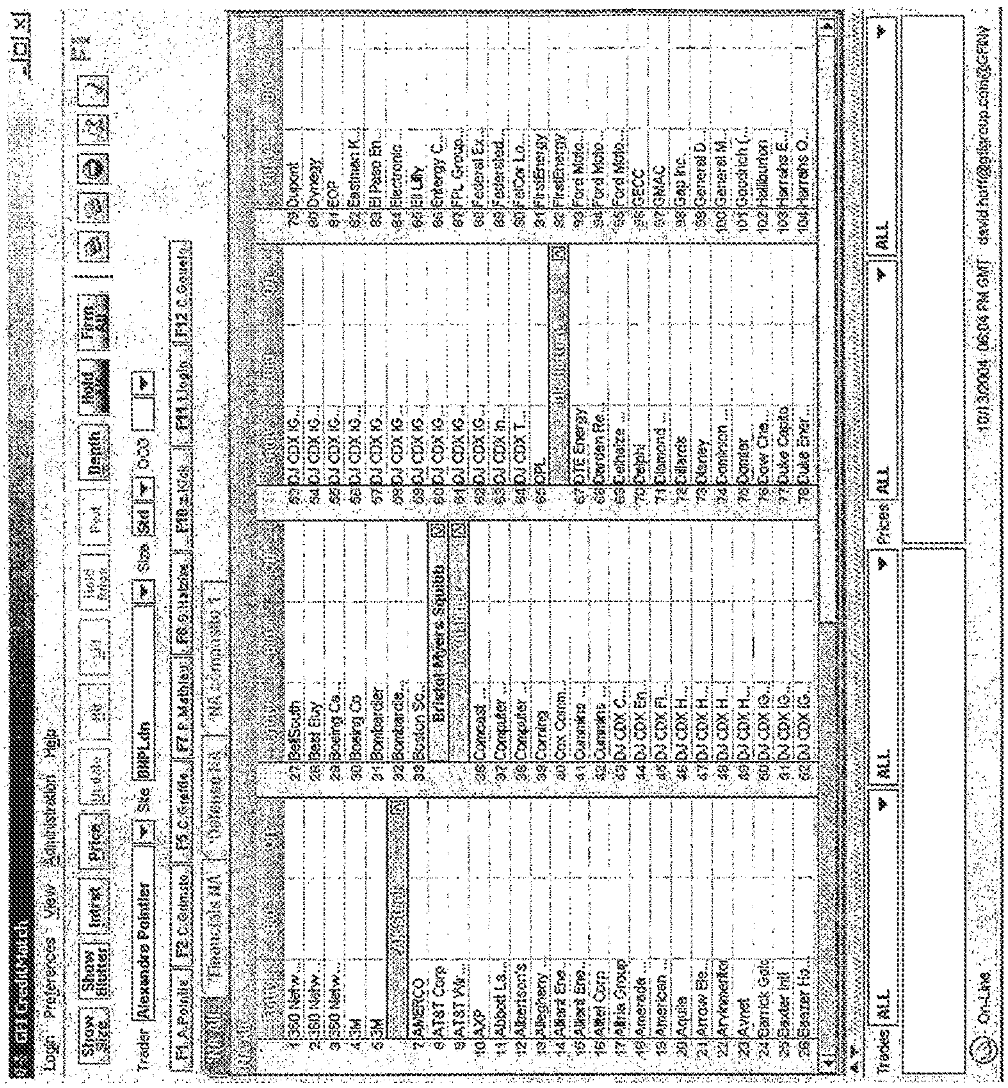

According to an exemplary embodiment, 'Wrapped Price Sheets' may be provided to ensure that interests do not scroll off the bottom of the current application window by horizontally wrapping the interest rows, resulting in two or more price sheet segments stacked side by side. Wrapped Price Sheets may prevent the overflow of interest rows below the lower boundary of the price sheet window. Therefore, a wrapped price sheet by definition may not have any vertical scroll bars. A wrapped price sheet may be set up to optionally display a sequence number at the beginning of each interest row, which may be different from the index used for sorting Indexed Price Sheets. The display of a wrapped price sheet may adjust dynamically to fit the current window size based on the certain rules and limitations. For example, if the number of interests is greater than can fit within the vertical boundaries of the current price sheet window, the price sheet may automatically be split up into two or more segments which are placed side by side horizontally until all of the interests are accommodated within the vertical frame. If the space required to accommodate all of the segments of a wrapped price sheet exceeds the current window width, horizontal scroll bars may be provided so the user may view all of the interests. When row numbers are included, their sequencing may span all of the price sheet segments. For example, if each segment contains 20 interest rows, then the first segment may display row numbers 1-20, segment 2 may display row numbers 21-40, and so on. The wrapping configuration may change each time the user resizes the window. For example, when the window is made shorter, then the number of segments may be increased as necessary. Conversely, when the window is made longer, then the number of segments may be reduced. Wrapped price sheets within multi-price sheet workspaces may have a static physical layout because resizing is disabled in such workspaces. FIGS. 69 and 70 show screen shots of one wrapped price sheet automatically adjusted in 2 different configurations based on the window height.

Price Sheet Administration

According to an exemplary embodiment, the Price Sheet administration user interface may incorporate the IGB product line and some new options. In this regard, the Price Sheet Definition and Configuration pages may be configured to handle one or more new product lines, and may include new options for the creation of wrapped and indexed price sheets. The price sheet definition page may include a product line drop-down to show Investment Grade Bonds as a product line (the list of price sheets displayed in the panel on the left may be filtered to show the existing price sheets for the selected product line), a product view drop-down to show a filtered list of all product views related to the product line selected above, and a list of price sheets available to be used as templates when adding a new price sheet, which is filtered based on the product line selected above. A set of special options may be used to control the behavior of each price sheet, which are mutually exclusive settings enabled via a radio-button type of control. These special options may include, for example, a standard option (default setting), a Free Format Page option, an Enable Dynamic Wrapping option (defines wrapped price sheets without row numbers), and Enable Dynamic Wrapping with row numbers option (defines wrapped price sheets with row numbers). Sorting methods may be provided that sort interests in ascending order solely on the basis of the bond id or market name. Alternatively, bond ids may be sorted alphabetically. The Price Sheet Administration User Interface may be used to create Indexed Price Sheets, which sort interests based on a system-assigned positional index.

Workspace Administration

According to an exemplary embodiment, Workspace administration may support the creation and configuration of IGB Workspaces, and a customized 'My Favorites' workspace for each user. In this regard, Product Line selection may enable the definition and configuration of IGB workspaces, and a filter may be provided to enable the definition and configuration of 'My Favorites' workspaces. In particular, a product line drop-down may be configured to include Investment Grade Bonds as a product line, and the list of workspaces displayed in the left panel may be filtered to show the existing workspaces for the selected product line.

A My Favorites filter may be provided to select a user name from a drop-down list, which may default to blanks, and may have type ahead functionality. When a user name is selected via this filter, the administrator may add, edit, rename or delete the 'My Favorites' workspace for the selected user using the existing functionality on the workspace definition page.

Moreover, the list of Available price sheets may be filtered to show only the price sheets for the product line selected on the Workspace Definition page, and all Free Format Pages. When configuring a 'My Favorites' workspace, the list of available price sheets may be limited based on the user's role and access to each product line.

IGB Market Display

According to an exemplary embodiment, the calculation of the best bid and best offer may depend on how the bond is quoted, and whether or not depth is enabled. In this regard, for a bond that is quoted on a spread basis, if the product line does not have depth enabled (Maintain Depth product line setting is unchecked), then the best bid may be set to the latest bid, and the best offer may be set to the latest offer. Otherwise, if the product line has depth enabled (Maintain Depth product line setting is checked), then the best bid may be set to lowest bid, and the best offer may be set to the highest offer. Likewise, for a bond that is quoted on either a cash or a percent basis, if the product line does not have depth enabled, then the best bid may be set to the latest bid, and the best offer may be set to the latest offer. Otherwise, if the product line has depth enabled, then the best bid will be set to highest bid, and the best offer may be set to the lowest offer.

According to an exemplary embodiment, the number of decimals displayed for sizes and prices may depend on the settings for each bond. According to another exemplary embodiment, the display of market depth may depend on the whether or not the product line Maintain Depth setting is checked, and on the quotation method. In particular, if the product line setting for Maintain Depth is unchecked, then the Depth button, mouse-menu option and hotkeys may be disabled as there may always be at most only one bid and one offer in the market for each interest. If the product line setting for Maintain Depth is checked, then the Depth button, mouse-menu option and hotkeys may be enabled when there is depth for the selected interest. The sorting of orders in the depth may depend on how the bond is quoted. For example, for bonds quoted on a spread basis, the lowest bid spread and highest offer spread will appear in the middle, with higher bid spreads in sorted in ascending order below the best bid, and lower offer spreads sorted in descending order above the best offer.

According to an exemplary embodiment, quote updates may be flashed for a duration equal to the setting of the Auto Quote Flash Duration for the product line, and trades may be flashed for a duration equal to the setting of the Auto Trade Flash Duration for the product line. In this regard, a duration setting of zero essentially translates into no auto flashing.

Workspace Setting Dialog

According to an exemplary embodiment, the dialog used for the selection of workspaces may be configured to limit the selection of workspaces made available to users based on their access levels for each product line. In particular, the streamlined workspace settings dialog may be configured so that the user may select multiple options for each available workspace via checkboxes. A workspace may or may not be made available to a user based on that user's access level for each product line represented within the workspace. It may be available to both brokers and traders. In this regard, the user may be entitled to access each product line represented within the workspace via a valid user role, and a workspace that is not enabled for external view may not be made available to non-GFI users.

Figure 71:
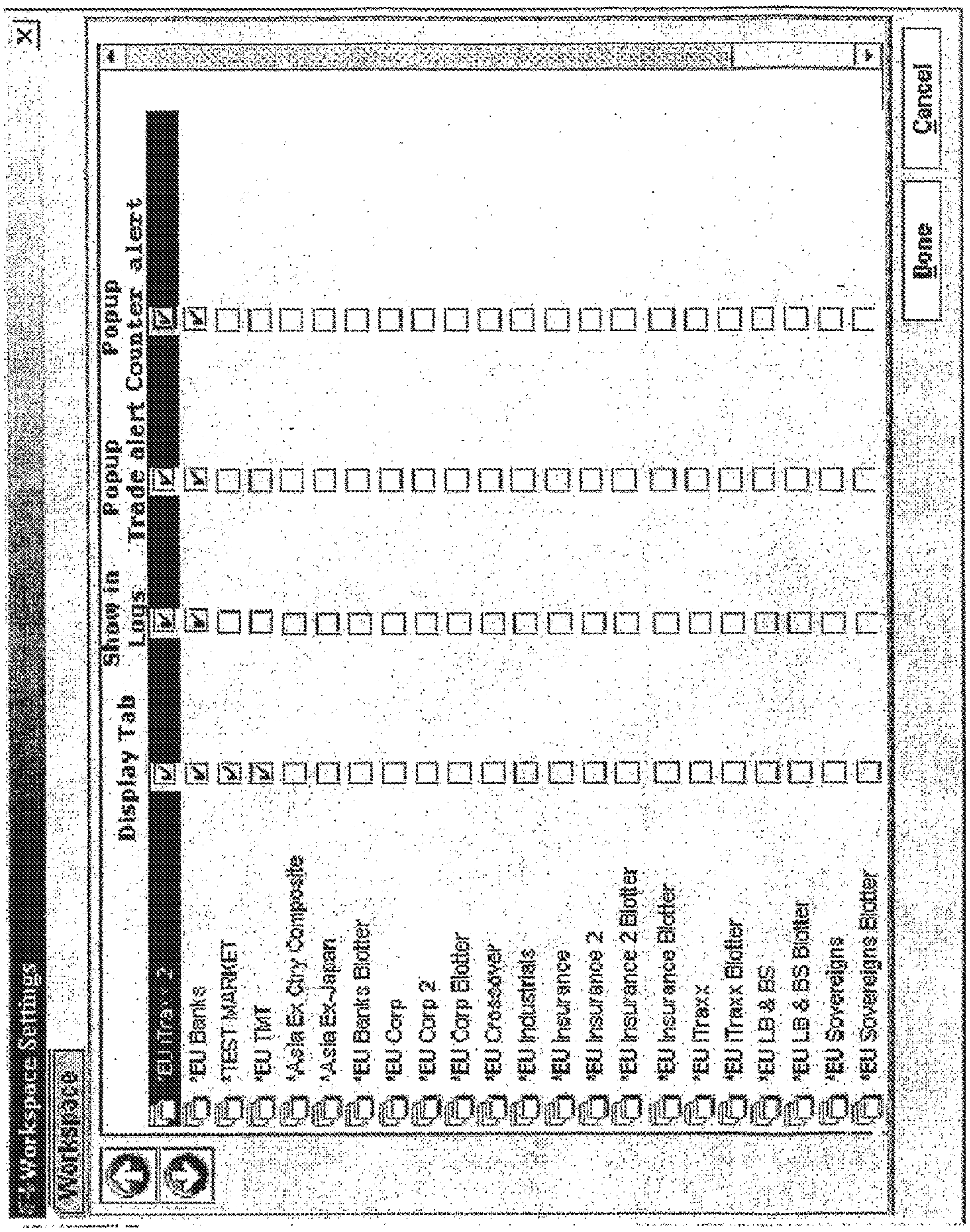
FIG. 71 shows an illustration of Workspace Setting Dialog.

FIG. 71 shows an illustration of Workspace Setting Dialog 7100, in which the workspace setting dialog box may appear as a tab, and all workspaces available to the user may appear in the row with checkbox options applicable to each workspace. In particular, a Display Tab is provided to indicate whether or not the user wants to view the workspace, a Show Tab in Logs is provided to indicate whether or not the user wants to see messages related to the workspace in the trade and activity logs. Not applicable to IGB workspaces, a Trade alert is provided to indicate whether or not the user wants to see a popup alert every time a trade occurs within the workspace. When this option is checked, a popup containing the details of the trade may be displayed on the user's desktop, and a Counter alert is provided to indicate whether or not the trader wants to see a popup alert when someone posts a price on the opposite side of an interest in that workspace where the trader himself has posted a price, or when someone tops/improves upon that trader's price in an interest within that workspace. A broker may not receive any counter messages, so that when a broker selects this option, no action is taken. When this option is checked by a trader, a popup containing the details of the topping/improved or counter bid/offer will be displayed on the user's desktop. Two up/down arrow icons may appear on the top left of the dialog which allow the user to alter the position/sorting order of the selected workspaces. On initial display, all of the workspaces available to the user may be sorted alphabetically. [Done] or <Enter> or <Alt>D may submit the user's workspace settings and close the dialog. [Cancel] or <Esc> or <Alt>C or the [X] icon may close the dialog without submitting any changes to the user's current workspace settings.

The user may access the Worskspace Settings dialog via an option under the Preferences menu. The current Workspace option may be renamed as Workspace Settings and will open up this new dialog. On display, the focus may be in the first checkbox on the first row. The user may tab across the row and then down to the next and so on, or simply use the arrow keys or the mouse to change focus to a different workspace row. Tabbing across each row all the way down may take the user to the [Done] and [Cancel] buttons after the last workspace row. The desired settings may be submitted by selecting [Done] or pressing <Enter>, which may close the dialog. The dialog may be closed without making any changes by selecting [Cancel] or pressing <Esc> or by clicking on the X icon. By default, the dialog may appear in the center of the user's main applet window. If the user re-positions the dialog elsewhere, its changed co-ordinates may be persisted the next time it appears on that user's desktop. The dialog may be sized so that it is not longer than the main applet window frame to ensure that the [Done] button does not appear off screen. Changes to workspace settings may take effect only after the user has submitted them and the dialog is closed.

The trade and counter alert popups may have title bars with an exclamation point in a larger bold white font on red (like an icon) followed by the popup title. The alert message formats may be identical to those of the trade and counter messages displayed in the trade and activity logs. The alert popups may be non-modal, and may be dismissed by pressing <Enter>, [OK], or by clicking on the [X] icon to close the window. If the user receives a new trade or counter alert while another trade or counter alert popup is already open on his desktop, the new message may be added to the existing popup below the previously displayed message/s. Therefore, the display may be similar to that of the logs. However, once the user has closed the popup, it may be cleared, so that the next time it appears, it may only display new messages received after it was last closed.

Toggle For Ghost Prices

According to an exemplary embodiment, a Ghost Prices toggle function may be provided so that users may show/hide the last valid bid and last valid offer for each currently unquoted interest in the currently selected workspace. The Ghost Prices toggle option may show/hide the latest historical firm bid and the latest historical firm offer for each interest within the selected workspace, which does not currently have a firm price on either the bid or the offer side.

The Ghost Prices toggle option may be invoked via a Show/Hide Last Price button, which may be labeled as Show LstPrc when ghost prices are hidden, and as Hide LstPrc when ghost prices are displayed, or via a hotkey G, which may be used to toggle the display of ghost prices on or off. A ghost price may be defined as the last or most recent firm posted bid or offer submitted for a given interest which currently does not have an active firm posted price on the bid and/or the offer side. This may include prices that were subsequently executed as well as those that were cancelled by a user or the EOD process.

The display of ghost prices, when turned on, may be subject to certain rules. For instance, a ghost price may appear only when there is no active firm posted price for an interest on a particular side. When there is no active firm bid, the latest firm posted bid for the interest may appear as the best bid, and when there is no active firm offer, the latest firm posted offer for the interest may appear as the best offer. A ghost price may appear where a firm bid or offer would normally appear within the price sheet. The size of ghost price may not be shown, that is, only the price itself may be displayed. In this regard, a ghost price may also appear in light grey font on a white background. Ghost prices may not be subject to the inverted market rule, that is, the last historical bid and offer may form an inverted market even if the product line does not allow for inverted markets. A tool tip for a ghost price may display the time and date when that price was either created or last updated before it was removed from the system. Moreover, a ghost price may be up to 7 calendar days old. An unquoted interest that had no firm prices posted within that time period may not have a ghost price. Furthermore, a ghost price may not be actionable in any way, that is, the user may not update, firm, post/un-post, or Subject a ghost price. When invoked, the ghost price function may affect the display of the currently selected workspace only. Hence, like other Show/Hide toggles, the Ghost Price toggle may be applicable at the workspace level only.

Subject All/Unsubject All Options

According to an exemplary embodiment, two options may be provided so that brokers may mark all the firm prices in the current workspace as being subject, and vice versa. In this regard, subject is an intermediate state in between Firm and Held, which is subject to confirmation, that is, it must be made 'unsubject' or firmed, before it may be executed. A Subject price may be updated, posted/unposted, held, 'unsubjected'/firmed or deleted.

Subject prices may be indicative, and may be treated like held prices. A Subject All option may be provided so that brokers may set the state of all firm prices in the selected workspace to Subject. Conversely, an UnSubject All option may be provided so that brokers may set the state of all Subject prices in the selected workspace back to Firm.

The Subject All option may be configured to be available to brokers only, and may be invoked via a [Subject All] button or <Ctrl>S hotkey combination. When invoked, the Subject All option may change the state of all the existing firm prices within the currently selected workspace to subject. Held and ghost prices may not be affected. Moreover, any firm prices entered subsequently against interests in the same workspace may also not be affected.

The UnSubject All option may be configured to be available to brokers only, and may be invoked via an [UnSubject All] button or <Ctrl>U hotkey combination. When invoked, the UnSubject All option may change the state of all the existing subject prices within the currently selected workspace to firm. Held and ghost prices may not be affected.

In regards to the display of Subject Prices, a subject price may appear in red font on a white background, and a subject price may not be hit/lifted. However the user may update, unsubject/firm, hold, delete, or post/un-post a subject price. Subject prices may appear as subject throughout the system, that is, every price sheet that contains the relevant interest.

Collapsable/Expandable Price Sheets

According to an exemplary embodiment, users may collapse and expand price sheets vertically within a workspace. In particular, users may control the display state of each individual price sheet within his selected workspace tabs via a collapse/expand icon. In particular, Collapsing or Expanding a price sheet may be enabled via an icon on the right hand side of the price sheet label. When collapsed, a single row with the label of the collapsed price sheet may be displayed along with the expand icon.

When all the price sheets within a workspace column are collapsed, then the column may be horizontally collapsed as well. Conversely, when one of those collapsed price sheets is expanded, the workspace column will automatically expand horizontally. When there is some pricing or trade activity related to an interest within a collapsed price sheet, the label row of that price sheet may flash with a different background colorfor 10 seconds. Certain transaction types may trigger flashing of labels for collapsed price sheets, including, for example, a change in quote, that is, a change in best bid and/or best offer, or a hit/lift. When the user logs out or loses his connection, the current display state of each price sheet selected on his desktop may be saved and persisted.

My Favorites Workspaces

According to an exemplary embodiment, a single customized private workspace may be created for each user, which may be referred to as the 'My Favorites' workspace, which when defined may be unique to each user. The My Favorites workspace may be created and maintained by an administrator via the standard workspace definition and user interface configuration, and may be composed of standard default price sheets for a single product line.

One of the product lines available to the user may be selected to filter the available price sheets. If the user has a My Favorites workspace defined, it may be auto-selected as the first tab, otherwise it may not appear. The workspace tab may read 'My Favorites,' and it may be linked to the user's name, so that it may be available to that user only.

IGB Price Entry

A price entry dialog may be provided for the entry and maintenance of prices for IGB interests. In particular, an IGB price dialog may be provided so that the user may enter a single order or a two-way spread or outright price for the currently selected bond, or may update an existing IGB bid or offer. In this regard, the user may enter either a bid or an offer, or both. A price may be entered as an outright (percent of par) value, or as a spread over a benchmark. The price entry may apply to the currently selected IGB interest, any details of the selected bond will be displayed at the top of the dialog box. The counterparty firm and trader may be required to be selected from drop-down lists that may show the broker's favored clients at the top. On a two-way order, the offer counterparty may be pre-populated with the one selected on the bid side. The price, size, and order comments may be required to be entered next, as well as the posting (for brokers only) and firm/held statuses. Both sides of the order may be required to be priced the same way, that is, either as an outright or spread price. The entered price(s) may be validated per the market rules and the user may receive the appropriate warnings or errors in the event of any exceptions.

Figure 72:
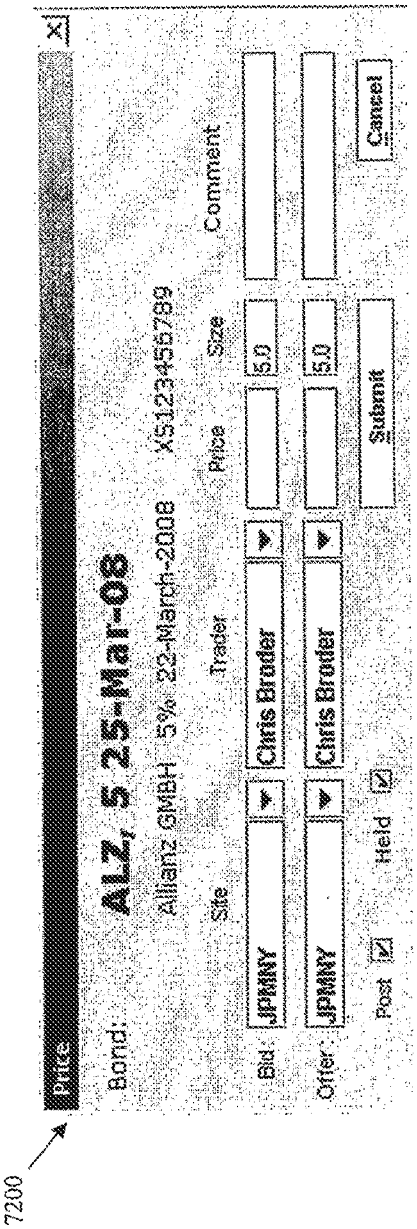
FIG. 72 shows an exemplary illustration of a hit dialog

FIG. 72 shows an exemplary illustration of a price entry dialog 7200, which includes certain price entry data fields. In particular, a market name of the selected bond may appear at the very top in large bold font, a full long) description of the bond may be shown below the market name, which includes the legal name of the issuer, the coupon rate of the bond as a percentage per annum after the issuer, the maturity date of the bond, and the ISIN number of the bond. Bid/offer data entry fields may be provided as well. In particular, a site field may be provided, which is pre-set to the site of the trader selected in the Trader drop-down, and sorted to show the broker's favored clients alphabetically, followed by the remaining sites also in alphabetical order. A trader field may also be provided, which is pre-set to the name selected in the Trader drop-down. An alternate trader name may be selected from a list of active traders for the selected site, and the trader names may be sorted to show the broker's favored clients alphabetically, followed by the remaining traders at the selected site also in alphabetical order. A price field may be provided which shows an outright (percent basis) or spread price for bond may be entered in this field. The broker may enter an outright or spread price even if the selected bond has a different quotation method set up as the default, and may accept no more than the maximum number of price decimals configured for the bond. A size field may be provided, which is pre-set to the value selected in broker's Default Size drop-down. When the Default Size setting is 'Std,' then the size may be pre-set to the bond's default order size, which may be overridden to a different value. A comment or free-text field may be provided that is used to attach any special conditions or reference information to the order. A post checkbox may be provided to indicate whether or not the bid and/or offer price/s are to be posted externally, that is to non-brokers. A single checkbox may apply to both sides. A held checkbox is provided to indicate whether or not the bid and/or offer prices may be created as a held prices, or updated from 'Firm' to 'Held' status. A single checkbox may apply to both sides. Un-checked by default, indicates that the prices are 'Firm.'<Enter> or [Submit] or <Alt>S may submit the order/s and close the dialog, and <Esc> or [Cancel] or <Alt>C or the [X] icon—may close the dialog without submitting any orders so that any information entered in the dialog may be lost.

When the user enters data for the bid, certain bid information may be copied over to the offer side fields, such as, for example, Site, Trader and Size. The user may change these as desired for the offer when creating a two-way order. Offer side information may not be replicated to the bid. In this regard, if the user enters data for the offer first, then the offer information may not be copied over to the bid fields. The same pricing method may be required to be used for all firm orders on an interest—although the user may have the flexibility of using a quotation method other than the default for the bond. Once a firm order has been submitted, all subsequent orders for the interest may be required to use the same pricing method to ensure that the depth and inverted market checks work correctly. Specifically, when there is a standing firm order already in the market, then a new order may be required to be submitted with the same pricing method as that of the standing order. When there is only one order in the market, the user may be permitted to update it's pricing method. When submitting a new order for an unquoted interest with a held order, the user may use a pricing method that differs from the one on the held order. When submitting a two-way order with no standing orders, the user may be required to use the same pricing method on both sides.

Hold All Orders For Trader On Logout Or Disconnect

According to an exemplary embodiment, when a user logs out or is disconnected from the system, all of his firm orders may automatically be held. In particular, when a user's session is terminated, any remaining firm orders that the user is responsible for, may automatically be held based on certain conditions. For example, all of the user's remaining firm prices may be held instantly whenever the user logs off, the user's client is disconnected from the server (as per the logic of the disconnect), or the user's session is disconnected from the server. The affected prices may vary based on the type of user. For a trader, all of his/her firm orders, including those entered or last updated by a broker may be held, and for a broker, all firm orders entered or last updated by a him/her, may be held.

Held Price Entry

According to an exemplary embodiment, a toggle may be provided so that brokers may set their current status to 'Firm' or 'Held.' When the status is set to 'Held,' then all new prices are entered in the system as held prices so that indicative prices may be entered. The new prices may be included in the determination of a 'ghost' price.

Brokers entering data onto the trading system at times may wish to do so even if they have prices that are not necessarily 'live' at the time of entry. Examples may include prices they hear away (at other brokers) that they wish to track, prices that they wish to enter for completeness of data capture for downstream data products or simply to record the levels for quick history. These prices may be required to be entered into a live, interactive market, such that brokers may get 'hit' on prices that are not exactly live, which has caused brokers to be more restricted in their data entry reducing the amount of data and losing valuable price info.

A button for brokers may be provided to set the State of entry. When in the Held state all prices entered are held. When the toggle is in the live state, all prices are entered as live. The text labels on the buttons may be "LIVE" and "HELD" respectively. The button may have a Red Background when in Live state and a GREY background when in Held state. An 'Enter as held' checkbox may be provided to the price dialog boxes that is only visible for brokers, which may affect both the bid and offer of any entered or updated price. When the market is in Held state, this checkbox may be ticked. When the market is in Live state, this checkbox may be unticked. The state of the button should not change when the broker changes tabs, may not have to be saved when logging in or logging out. Entry of a price in Held mode is effectively the same as entering a Live price and immediately holding it. Ghosted levels and quick history may update appropriately. A price entered as held should not be able to be acted upon externally. If there is an active price, then the addition of a held level may not affect best bid/best offer or ghosted levels as it is deemed that the active price has precedence over the held price. The held price, unless also not posted, may feed through to the history, Ghosted best bid/offer, and downstream data files in the same way a live price that was then held would have.

According to an exemplary embodiment, a broker sets the state to Held and enters prices into the blotter on behalf of a trader, and the price should never appear in the market. The trader may not Hit/Lift this price. According to another exemplary embodiment, a broker sets the state to Live and enters prices into the blotter on behalf of a trader. The price then appears in the market.

According to another exemplary embodiment, the broker sets the state to HELD and presses P to enter a price. The 'Enter as Held' checkbox is ticked as the Button state is HELD. When pressing submit, the price is entered. If there is no active price the last best bid/best offer updates in ghosted prices, the price is visible in quick history, the portal and Reuters. If there is an active price, then last best bid/best offer does not update in ghosted prices, the price may however be visible in quick history, the portal and Reuters.

According to another exemplary embodiment, the broker sets the state to Live and presses P to enter a price. The 'Enter as Held' checkbox is unticked as the Button state is Live. The price appears in the market.

IGB Execution Entry

According to an exemplary embodiment, hit/lift dialogs may be provided to execute and flash trades for IGB interests. In particular, an IGB Hit/Lift dialog may be provided so that brokers may enter or simulate an execution against a standing bid or offer. The word "HIT" or "LIFT" may flash in the affected price cell while the dialog is open. In this regard, the broker may open either the hit or lift dialog by selecting the desired bid or offer. Accordingly, the word HIT may start flashing in place of the selected bid or the word OFFER may start flashing in place of the selected offer as soon as the dialog box is opened. For price selection, Price Selection execution entry may apply to the currently selected IGB bid or IGB offer. The details of the selected bond may be displayed at the top of the dialog box. For counterparty selection, the aggressing counterparty site and trader may be required to be selected from drop-down lists that may show the broker's favored clients at the top. Accordingly, the execution size and price and posting status may be required to be entered. The user may then either submit the execution or exit by closing the dialog, which may terminate the flashing mentioned above. It the trade could not be successfully completed due to the cancellation or execution of the selected order by another broker, an appropriate error message may be displayed.

Figure 73:
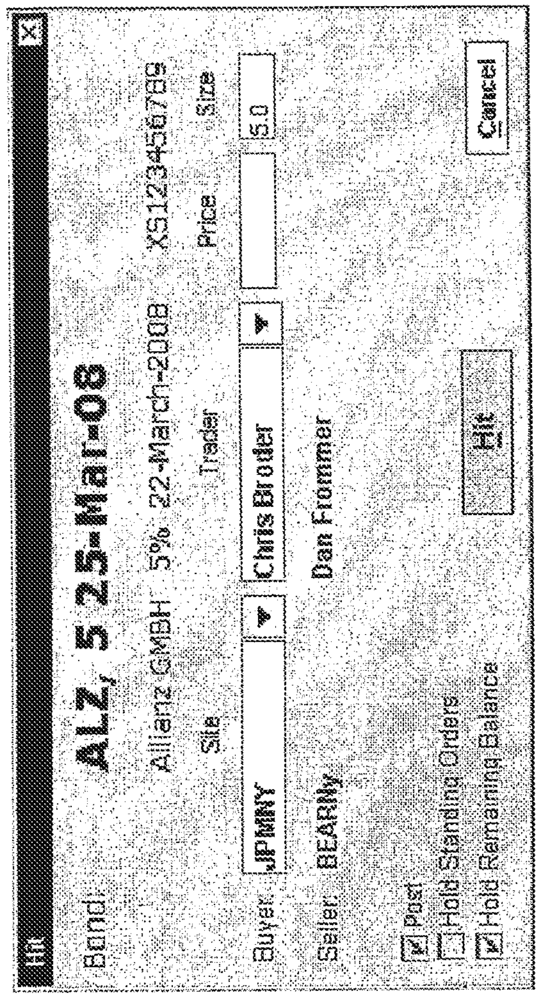
FIG. 73 shows an exemplary lift dialog.
Figure 74:
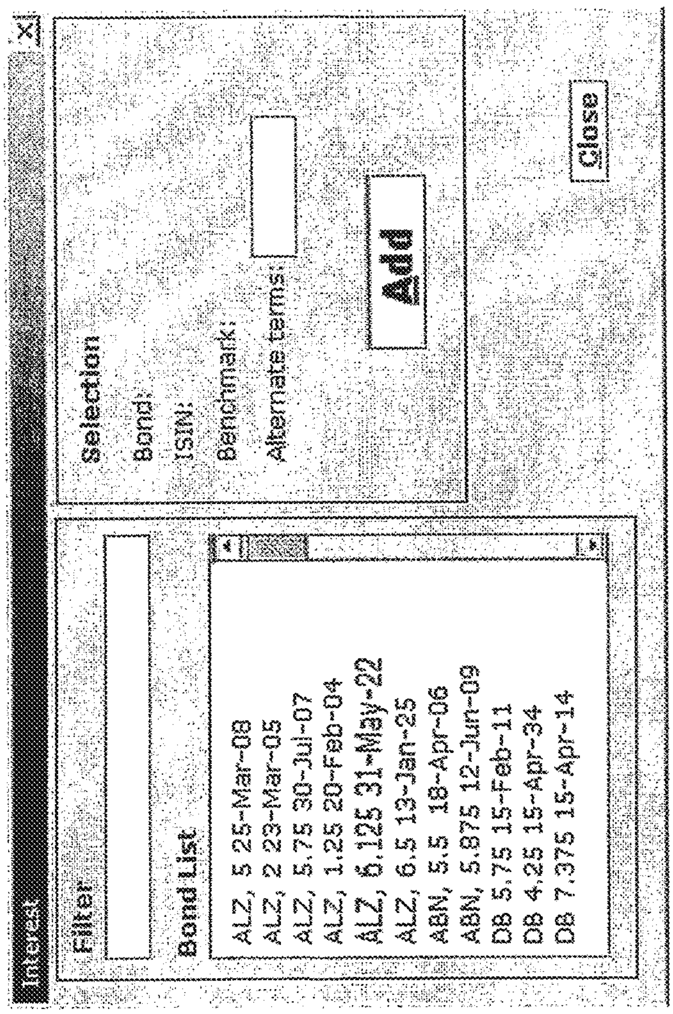
FIG. 74 shows another exemplary lift dialog.
Figure 75:
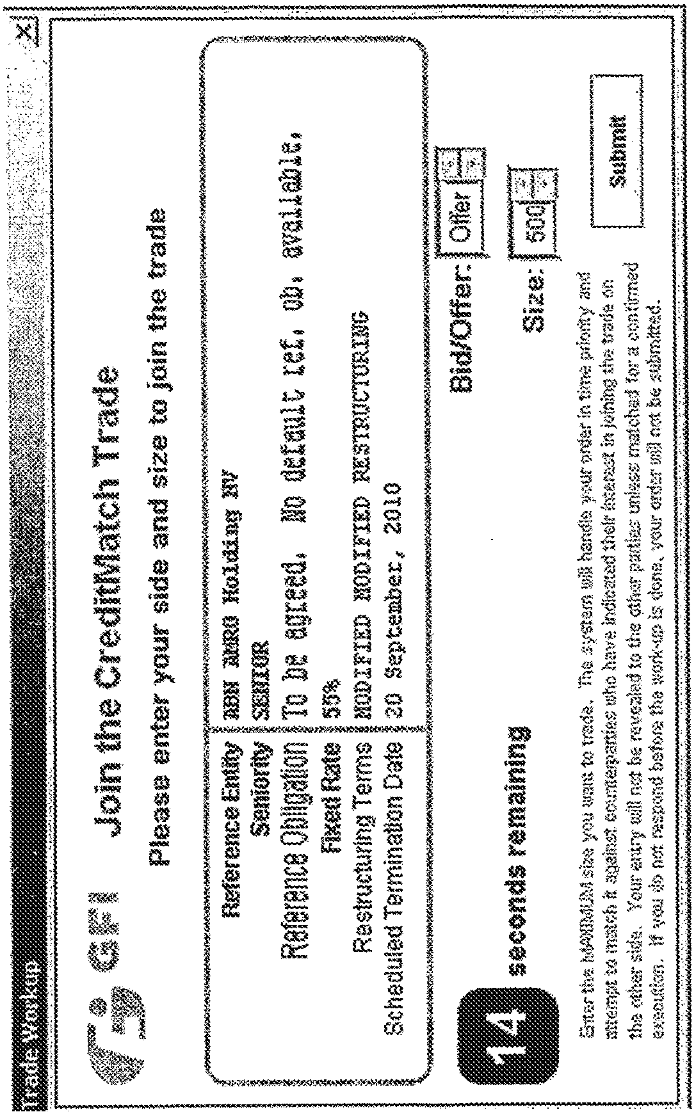
FIG. 75 shows an exemplary illustration of join dialog for a single CDS.

FIG. 72 shows an exemplary illustration of a Hit dialog, and FIG. 73 shows an exemplary lift dialog. Certain details related to the selected bond interest may be displayed at the top of the dialog, including, for example, the market name of the selected bond, and the full description of the bond, which includes the legal name of the issuer, the coupon rate of the bond as a percentage per annum after the issuer, the maturity date of the bond, and the ISIN number of the bond. The Buyer Site and Trader may appear below the bond details. In the hit dialog, the Bid Site and Trader may be displayed and in the Lift dialog, the Buyer and Trader may be pre-set to the site and trader selected in the Trader and Site drop-downs. An alternate Buyer Site and Trader may be selected from lists of sites and traders entitled to the product line. The selection lists may be sorted to show the broker's favored clients alphabetically, followed by the remaining sites and traders also in alphabetical order.

The Seller Site and Trader may appear below the Buyer Details. In the Lift dialog, the Offer Site and Trader may be displayed, and in the hit dialog, the Seller Site and Trader may be pre-set to the site and trader selected in the Trader and Company drop-downs. An alternate Seller Site and Trader may be selected from lists of sites and traders entitled to the product line. The selection lists may be sorted to show the broker's favored clients alphabetically, followed by the remaining sites and traders also in alphabetical order.

Certain data fields may appear next to the buyer information in the Lift dialog, and next to the seller information in the Hit dialog. In particular, a price set to the value of the price field on the selected bid or offer. The broker may change this price or blank it out and enter a spread price instead. The system may accept no more than the maximum number of price decimals configured for the bond. A size may be provided, which is pre-set to the size of the selected bid or offer. The broker may override the size. However, the system may accept no more than the maximum number of size decimals configured for the bond. A post checkbox may be provided to indicate whether or not the trade is to be posted externally, that is, to non-brokers.

To handle standing orders, two checkboxes for 'Hold Standing Orders,' and 'Hold Remaining Balance' may appear below the Seller information, which indicate whether or not other standing orders for the aggressing trader are to be held, and also whether any remaining balance on the executed order (in the case of a partial execution) should be held. <Enter> or [Submit] or <Alt>S may submit the execution, close the dialog, and terminate the flashing of HIT or LIFT, and the selected bid/offer may be removed from the market if the trade succeeded, otherwise <Esc> or [Cancel] or <Alt>C or the [X] icon may close the dialog without submitting the trade, and terminate the flashing of HIT or LIFT. Any information entered in the dialog may be lost, and the selected bid/offer may remain in the price sheet.

Certain processing rules may apply within the Price dialog. In particular, the broker may override the price and size of the selected bid/offer, including the pricing method. The institution on the buy and sell side may not be the same. As soon as the Hit dialog opens, the word HIT may start flashing in the selected bid cell, and may continue to flash until the dialog is closed. As soon as the Lift dialog opens, the word LIFT may start flashing in the selected offer cell, and may continue to flash until the dialog is closed. If the execution was successful, the selected bid or offer may be removed from the market, otherwise it may re-appear when the dialog is closed.

Rather than preventing a user from having more than one hit/lift dialog open at a time, brokers may have multiple hit/lift dialogs open simultaneously in order to allow them to flash HIT/LIFT on more than one bond at a time.

Locked Market On Broker Hit/Lift

According to an exemplary embodiment, the moment a broker selects Hit/Lift, the affected price may be made unavailable to other users, and the market on the related interest may be locked for other executions. In this regard, all users other than the broker who is trying to execute, may be prevented from hitting or lifting any price in that interest until the broker has completed his action. In addition, the price selected by the broker for execution may not be available for maintenance by any other user, including the trader who owns the price.

As soon as the broker selects Hit/Lift, the price that was hit/lifted may start flashing with a red background should indicate that an execution is in progress. The Hit/Lift options may be disabled for all other users. No other user may be able to update, hold or delete the price that was selected for execution by the broker—this may be done by disabling those options when another user focuses on that price. The locks on the price and interest may be in effect as long as the broker has the hit/lift dialog open, even if s/he may not have actually submitted the trade yet. The locks may be released when the hit/lift dialog is closed by the initiating broker either after submitting the execution or after canceling out of it. If the broker cancelled the execution, the price may become available to other users. If the broker submitted the execution for a size equal to or greater than that of the selected order, the order may be removed from the market display.

If the broker submitted the execution for a size less that of the selected order, and the Hold remaining balance option was checked, the order may be removed from the market display. If the broker submitted the execution for a size less that of the selected order, and the Hold remaining balance option was unchecked, the order size may be updated appropriately in the market display.

Join The Trade Option

According to an exemplary embodiment, when a work-up is in progress, counterparties other than those currently engaged in the work-up, may be permitted to "Join the trade" by submitting a bid or offer at the executed price. In particular, when an execution is in the course of being "worked-up," with the executed price highlighted and the market on the interest locked for further executions, other users may be permitted to join the trade at the executed price by specifying the desired side (bid/offer) and size. Upon termination of the work-up, the system may automatically match up the "joining" buyers and sellers and generate the necessary executions. In this regard, when an interactive execution is being "worked up," that is, while the market on the executed interest is locked for execution, and the traded price cell is flashing, a trader or broker may join the trade by submitting a bid/offer at the same price. The join feature may be invoked, for example, by double-clicking on the flashing price cell, by using the Join mouse-menu option (w/focus on the selected price), or by using the J hotkey (w/focus on the selected price). When a user invokes the option, s/he may be presented with a Join dialog/pop-up that will enable the entry of the trader (if the user is a broker), desired side and size. The trader and size may be set to the user's default settings. The Join dialog may display the work-up countdown so that the user knows how much time is available for him/her to join the trade. The user may be required to submit his/her response within the total time allocated for the work-up (e.g., 15 seconds), otherwise the dialog may automatically close when the work-up timer counts down to zero.

Accordingly, the window of opportunity provided for joining a trade may be the full duration allocated for the work-up, even if the two respondents engaged in the work-up react within a shorter period. Hence, even if a work-up ends before its allocated duration, the market may continue to remain locked on the interest, and the price cell flashing may continue to enable other interested parties to join the trade. When the work-up ends after responses from both counterparties, any residual size left over from either counterparty engaged in the work-up, may become the first "joining" order eligible for matching with others who want to join the trade on the opposite side. All bids/offers submitted via this option may be ranked according to their time of submission, with the earliest appearing first on either side. However, a residual size may be ranked from a work-up first on the relevant side. Any previously standing orders at the same price level may not participate in the joining process—in other words, if there is a standing bid or offer at the same price level that was not submitted via the Join option, it may not be included in the queue of orders available for automatic matching. After the termination of the work-up, the system may automatically match up the joining bids and offers based on their rankings, and generate the relevant executions. Depending on the size submitted, a single joining bid may be matched up with one or more joining offer/s, or vice versa. Any unmatched and left over joined orders may be discarded. All counterparties whose joined orders were auto-matched and executed, may receive the appropriate trade ticket pop-ups to inform them of their trade/s.

Certain data fields may appear within the Join dialog, including certain information for each leg of the interest, such as, for example, a label for the leg number (only if the interest is a CAL or a SWT), the legal name of the entity on the leg, the code for the debt class of the leg, the description of the default reference obligation for the entity on the leg, the price of the selected bid or offer, the code for the restructuring type of the leg, and the maturity date of the leg in dd-Month-yyyy format.

A countdown may be synchronized to the timer/countdown for the work-up on the related interest. The timer may count down the remaining seconds, which may be displayed in large bold font, alternating between white numbers on red background, and red numbers on a white background, from one second to the next to make the flashing more prominent.

A Bid/Offer field may be provided which is preset to the aggressor's side. The user may enter or select the opposite side if desired, and a Size field may be provided which is preset to the user's default size setting. The user may tick this size up in multiples of the entity default size for the interest. The entry may be subject to all of the edits applicable to the size field in the price dialog. [Submit] or <Enter> or <Alt>S—may submit the join order for the selected side and size and close the join dialog. <Esc> or the [x] icon closes the dialog without submitting a join order.

According to an exemplary embodiment, the join option may be enabled only when the user has selected a price cell that is flashing during the course of a work-up following an interactive hit/lift. However, it may be disabled for the users already engaged in that work-up. On display, the focus may be in the side field. The user may tab to the size, the [Submit] button and back to the side. The desired side and size may be submitted by selecting [Submit] or pressing <Enter>, which may dismiss the dialog. The join may be cancelled, by closing the dialog or pressing <Esc>. The dialog may be modal, and may take precedence over any other dialog or pop-up that might be open concurrently on the user's desktop. The user may dismiss the dialog either by submitting a side and size for a potential join, or by closing the dialog. The dialog may automatically close if the user does not react to it before it times out. By default, the dialog may appear in the center of the user's main applet window. If the user re-positions the dialog elsewhere, its changed coordinates may be persisted the next time it appears on that user's desktop. Only one join dialog may be displayed on a user's desktop at any given point in time, which may be the one corresponding to the first price selected by the user for joining the trade.

When double clicking on a price cell, if a work-up is in progress against the selected price, and the user is not engaged in that work-up, the Join dialog may be displayed. Otherwise, if the user is engaged in that work-up, nothing may happen. If the price is a bid not owned by the selected trader's institution, and there is no work-up in progress, then the user may be presented with a Hit dialog. If the price is an offer not owned by the selected trader's institution, and there is no work-up in progress, then the user may be presented with a Lift dialog. If the price is owned by the selected trader's site, and there is no work-up in progress, then the user may be presented with an Update dialog. In all other cases, double-clicking may do nothing.

What is claimed is:

1. A method for providing integrated credit derivative brokerage services, the method comprising:

controlling, by at least one hardware processor of a computer system in communication with a memory of the computer system:

providing, by a credit default swap (CDS) software application of the memory, trading, trade capture, confirmations, maintenance of reference data, and reporting, the CDS software application including a CDS database (CDS DB), in which the CDS software application provides at least one of a workspace that organizes logically market and product data, a price sheet that groups together related products within the workspace, a trade log that displays trading details, an order book that displays and manages at least one of open or cancelled orders, or a trader's eye function that displays a market from a perspective of a specific trader;

providing, by a credit portal software application of the memory, a customer front end of real-time credit market data, and a historical reporting and search facility to at least one of brokers or traders;

providing, by a credit mart software application of the memory, a credit data mart disseminating real time credit market data, in which the credit mart software application serves as a data source of the credit portal software application, which provides a customer-facing front end to access real time credit market data;

providing, by a credit editor software application of the memory, a data-cleansing interface to the credit mart software application accessed via the credit portal software application;

providing, by a credit trading system (CTS) software application in the memory having an associated back-end CTS database (CTS DB), order management and an authoritative source of real-time, electronic orders of credit default swaps for the CDS software application;

providing, by a credit trade capture (CTC) software application in the memory, a middle-office trade capture and confirmation system;

centrally storing, by a data depot (DD) in the memory, all of the credit market data; and by a market data application in the memory, collecting, transforming, and formatting the credit market data, wherein the market data application is a trade management service (TMS) client and a price broadcast service (PBS) client;

creating a trade by looking up a factory class, invoking the factory class to instantiate a manager class, and invoking the manager class with trade data to create the trade, and querying, by a TMS software application in the memory, at least one of an individual trade or a collection of trades, in which querying the at least one of the individual trade or the collection of trades includes looking up a given factory class, invoking the given factory class to instantiate a given manager class, invoking the given manager class to instantiate a query manager class, and invoking the query manager class to perform a trade query for pending data regarding the at least one of the individual trade or the collection of trades.

2. The method of claim 1, further comprising controlling, by the at least one hardware processor, validating the trade using the TMS software application.

3. The method of claim 1, wherein validating the trade includes looking up the factory class, invoking the factory class to instantiate the manager class, and invoking the manager class to validate the trade.

4. The method of claim 1, further comprising controlling, by the at least one hardware processor, publishing a data change using the TMS software application.

5. The method of claim 4, wherein publishing the data change includes looking up the factory class, invoking the factory class to instantiate the manager class, and invoking the manager class to publish the data change.

6. The method of claim 1, further comprising controlling, by the at least one hardware processor, registering a trade change using the TMS software application.

7. The method of claim 6, wherein registering the trade change includes looking up the factory class, invoking the factory class to instantiate the manager class, invoking the manager class to instantiate an event manager class, and invoking the event manager class to register the trade data.

8. The method of claim 1, wherein the TMS client includes Application Programming Interfaces (APIs) managing trades during a trade lifecycle, the APIs including a TMS Event module to allow clients to receive trade notifications and events in real time, a TMS Store module to allow clients to record previously presented trades or to change existing trades, and a TMS Query module to allow clients to query service providers of a trade event history.

9. The method of claim 1, wherein the CTC software application controls straight-through-processing (STP) to clients, wherein the CTC software application serves as an authoritative source of record of credit default swaps of the CDS software application, wherein the CTC software application serves as a trade management service (TMS) software application, and wherein the CTC software application includes an associated back-end CTC database (CTC DB).

* * * * *